United States Patent [19]
Spiller

[11] Patent Number: 6,047,122
[45] Date of Patent: *Apr. 4, 2000

[54] SYSTEM FOR METHOD FOR PERFORMING A CONTEXT SWITCH OPERATION IN A MASSIVELY PARALLEL COMPUTER SYSTEM

[75] Inventor: Cynthia J. Spiller, Wakefield, R.I.

[73] Assignee: TM Patents, L.P., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/916,136

[22] Filed: Aug. 21, 1997

Related U.S. Application Data

[63] Continuation of application No. 08/698,396, Aug. 15, 1996, abandoned, which is a continuation of application No. 08/249,654, May 26, 1994, abandoned, which is a continuation of application No. 07/880,125, May 7, 1992, abandoned.

[51] Int. Cl.$^7$ ................................................. G06F 13/00
[52] U.S. Cl. ............................................................ 395/678
[58] Field of Search ............................... 395/678, 200.31, 395/200.38, 569, 200.82; 370/408

[56] References Cited

U.S. PATENT DOCUMENTS

| | | | |
|---|---|---|---|
| 3,573,852 | 4/1971 | Watson et al. | 395/650 |
| 4,608,631 | 8/1986 | Stiffler et al. | 395/325 |
| 4,709,327 | 11/1987 | Hillis et al. | 364/200 |
| 4,831,518 | 5/1989 | Yu et al. | 395/650 |
| 4,835,685 | 5/1989 | Kun | 395/650 |
| 4,847,755 | 7/1989 | Morrison | 395/650 |
| 4,860,201 | 8/1989 | Stolfo et al. | 395/800 |
| 5,113,390 | 5/1992 | Hayashi et al. | 370/65 |
| 5,123,109 | 6/1992 | Hillis | 395/800 |
| 5,129,077 | 7/1992 | Hillis | 395/500 |
| 5,152,000 | 9/1992 | Hillis | 395/800 |
| 5,170,482 | 12/1992 | Shu et al. | 395/800 |
| 5,179,702 | 1/1993 | Spix et al. | 395/650 |
| 5,197,130 | 3/1993 | Chen et al. | 395/325 |
| 5,212,777 | 5/1993 | Gove et al. | 395/575 |
| 5,265,207 | 11/1993 | Zak et al. | 395/200 |
| 5,353,412 | 10/1994 | Douglas et al. | 395/200.15 |
| 5,390,298 | 2/1995 | Kuszmaul et al. | 395/800 |
| 5,530,809 | 6/1996 | Douglas et al. | 395/200.2 |
| 5,590,283 | 12/1996 | Hillis et al. | 395/200.02 |
| 5,680,550 | 10/1997 | Kuszmaul et al. | 395/200.15 |

*Primary Examiner*—Lance Leonard Barry
*Attorney, Agent, or Firm*—Cesari and McKenna, LLP

[57] ABSTRACT

A parallel computer comprises a plurality of processing elements and a control processor all interconnected by a communications network. The control processor and the processing elements process a plurality of user programs, with the control processor and the processing elements processing each user program in parallel. The control processor, while processing each user program, generates user program processing commands and transfers them to the processing elements over the communications network, and each the processing element processes data associated with a particular user program in response to each user program processing command received from the communications network. The control processor periodically further generates a context switch command to enable the processing elements to, in parallel, perform a context switch operation, in which they switch processing of a user program they are currently processing and begin processing of another user program.

10 Claims, 63 Drawing Sheets

| FIG. 2B-1 |
| FIG. 2B-2 |

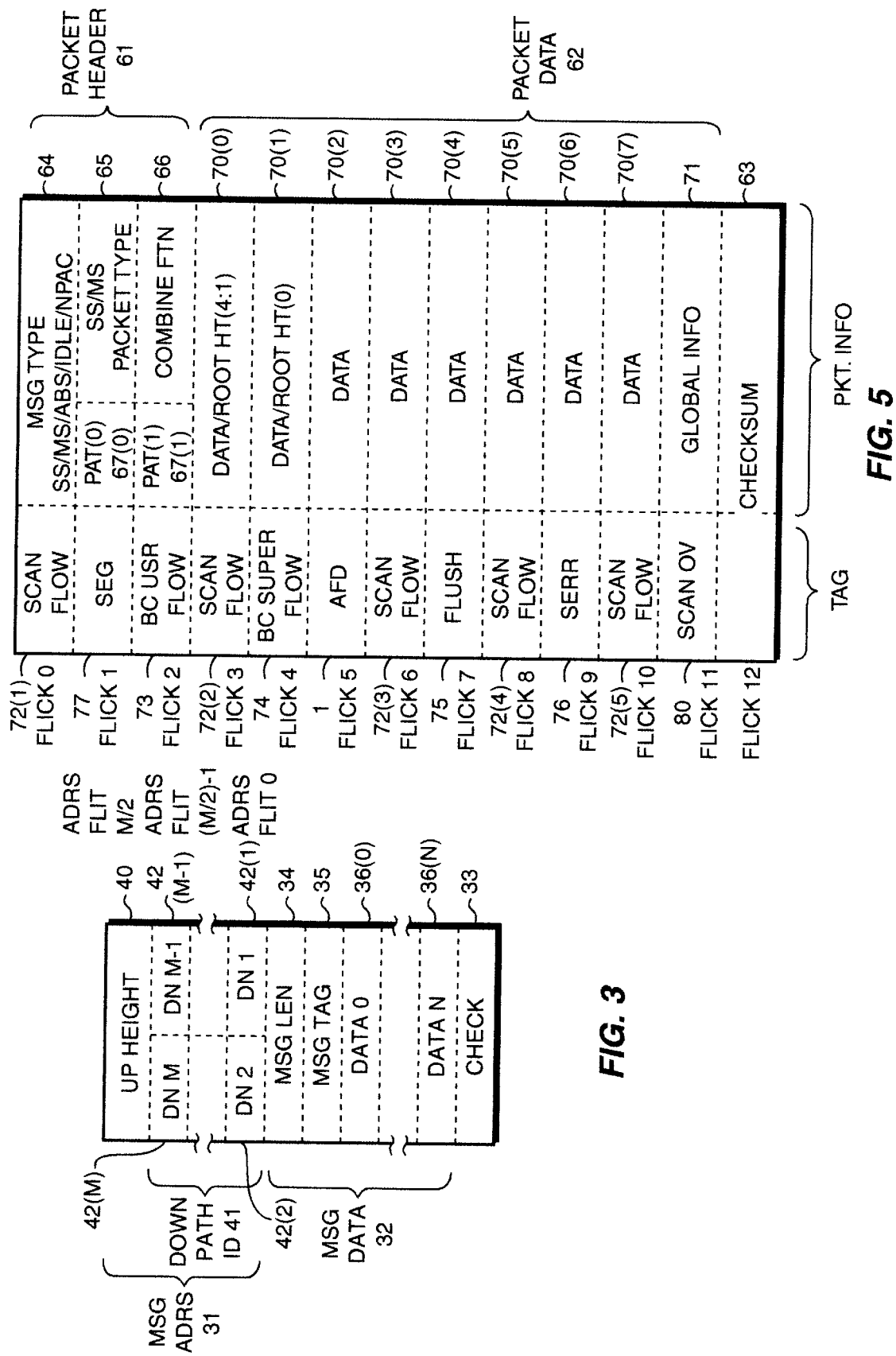

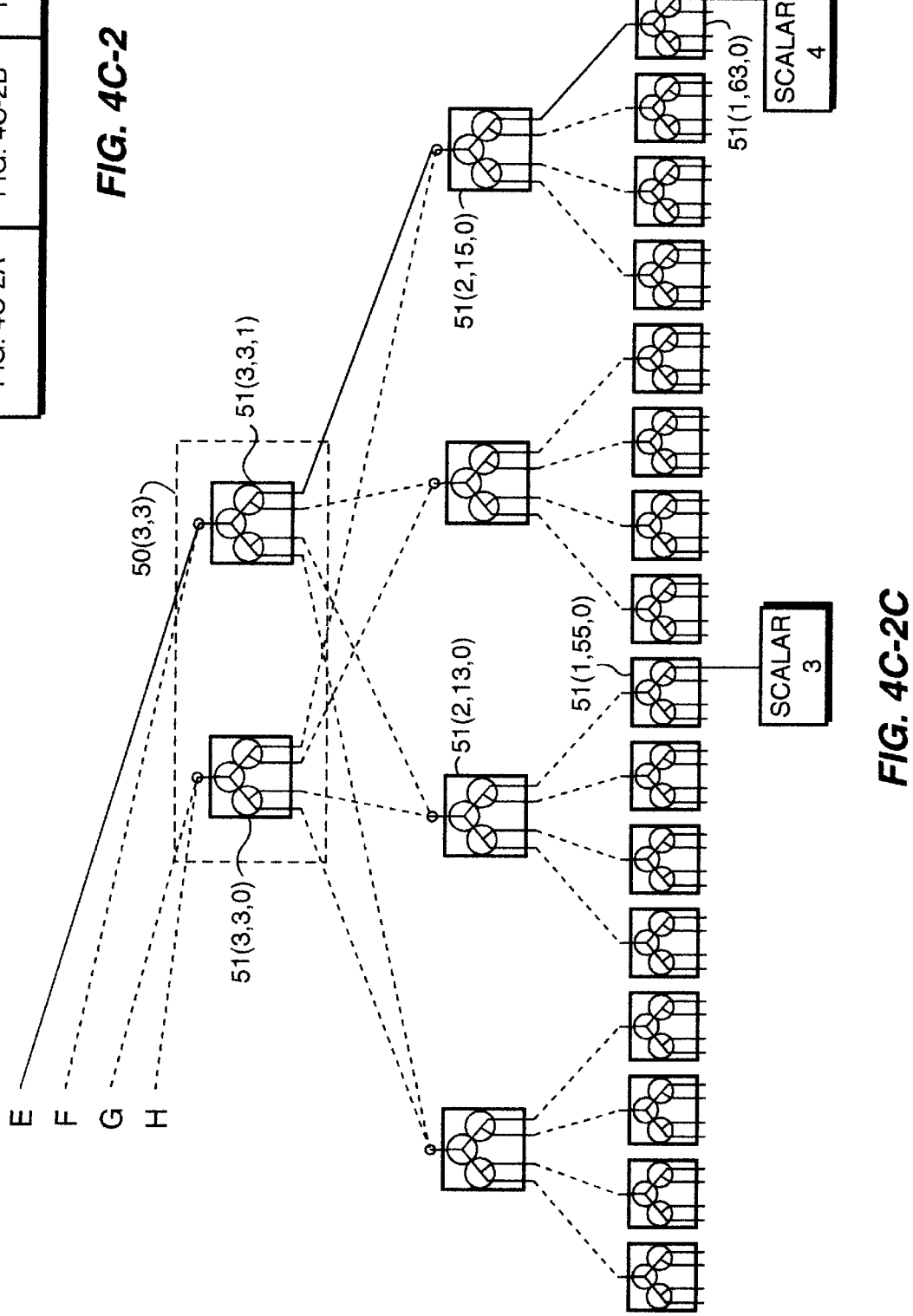

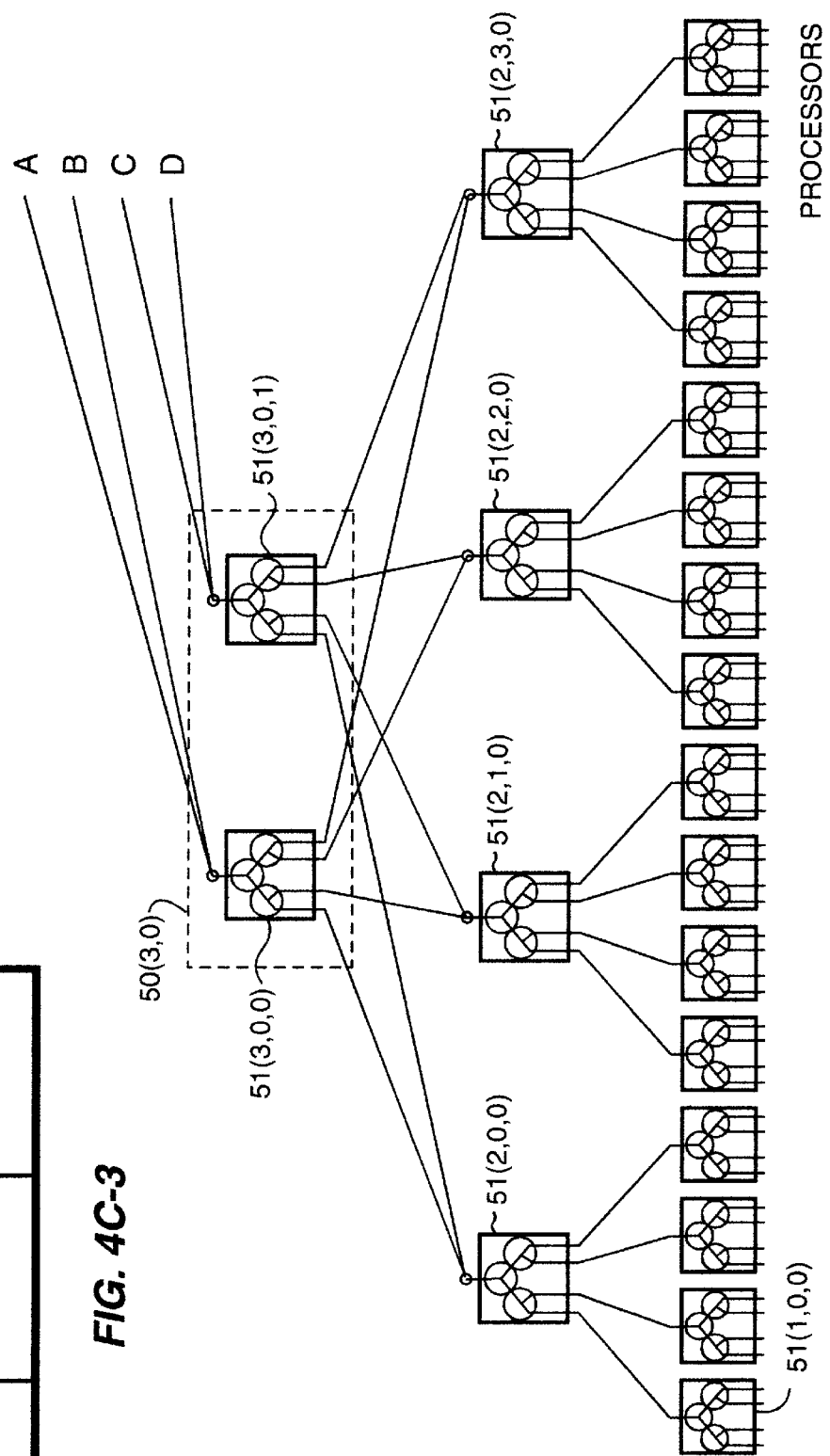

| | | |
|---|---|---|
| LDR STATUS | 293 | |
| LDR PRIVATE | 294 | DRI LEFT INTERFACE REGISTERS 290 |
| LDR REC | 295 | |
| LDR SEND FIRST | 296 | |
| LDR SEND | 297 | |
| RDR STATUS | 300 | |
| RDR PRIVATE | 301 | DRI RIGHT INTERFACE REGISTERS 291 |
| RDR REC | 302 | |
| RDR SEND FIRST | 303 | |
| RDR SEND | 304 | |
| PARTITION BASE | 305 | |
| PARTITION SIZE | 306 | |
| CHUNK TABLE ADRS | 307 | DATA ROUTER ADRS GEN REGISTERS 292 |
| CHUNK TABLE DATA | 310 | |
| CHUNK SIZE | 311 | |
| RE PHYS SELF ADRS | 312 | |
| MSG COUNT | 313 | |

*FIG. 7A-2B*

SYSTEM FOR METHOD FOR PERFORMING A CONTEXT SWITCH OPERATION IN A MASSIVELY PARALLEL COMPUTER SYSTEM

This is a continuation of application Ser. No. 08/698,396 filed on Aug. 15, 1996 now abandoned, which is a continuation of application Ser. No. 08/249,654 filed on May 26, 1994 now abandoned, which is a continuation of application Ser. No. 07/880,125 filed on May 7, 1992 now abandoned.

FIELD OF THE INVENTION

The invention relates generally to the field of digital computer systems, and more particularly to computer systems including a plurality of processors operating generally in parallel.

BACKGROUND OF THE INVENTION

A digital computer system generally comprises three basic elements, namely, a memory element, an input/output element and a processor element. The memory element stores information in addressable storage locations. This information includes data and instructions for processing the data. The processor element fetches information from the memory element, interprets the information as either an instruction or data, processes the data in accordance with the instructions, and returns the processed data to the memory element. The input/output element, under control of the processor element, also communicates with the memory element to transfer information, including instructions and the data to be processed, to the memory, and to obtain processed data from the memory.

Most modern computing systems are considered "von Neumann" machines, since they are generally constructed according to a paradigm attributed to John von Neumann. Von Neumann machines are characterized by having a processing element, a global memory which stores all information in the system, and a program counter that identifies the location in the global memory of the instruction being executed. The processing element executes one instruction at a time, that is, the instruction identified by the program counter. When the instruction is executed, the program counter is advanced to identify the location of the next instruction to be processed. In many modern systems, the program counter is actually advanced before the processor has finished processing the current instruction.

Von Neumann systems are conceptually uncomplicated to design and program, since they do only one operation at a time. A number of advancements have been made to the original von Neumann paradigm to permit the various parts of the system, most notably the various components of the processor, to operate relatively independently and to achieve a significant increase in processing speed. One such advancement is pipelining of the various steps in executing an instruction, including instruction fetch, operation code decode (a typical instruction includes an operation code which identifies the operation to be performed, and in most cases one or more operand specifiers, which identify the location in memory of the operands, or data, to be used in executing the instruction), operand fetch, execution (that is, performing the operation set forth in the operation code on the fetched operands), and storing of processed data, which steps are performed relatively independently by separate hardware in the processor. In a pipelined processor, the processor's instruction fetch hardware may be fetching one instruction while other hardware is decoding the operation code of another instruction, fetching the operands of still another instruction, executing yet another instruction, and storing the processed data of a fifth instruction. Since the five steps are performed sequentially, pipelining does not speed up processing of an individual instruction. However, since the processor begins processing of additional instructions before it has finished processing a current instruction, it can speed up processing of a series of instructions.

A pipelined processor is obviously much more complicated than a simple processor in a von Neumann system, as it requires not only the various circuits to perform each of the operations (in a simple von Neumann processor, many circuits could be used to perform several operations), but also control circuits to coordinate the activities of the various operational circuits. However, the speed-up of the system can be dramatic.

More recently, some processors have been provided with execution hardware which includes multiple functional units each being optimized to perform a certain type of mathematical operation. For example, some processors have separate functional units for performing integer arithmetic and floating point arithmetic, since they are processed very differently. Some processors have separate hardware functional units each of which performs one or only several types of mathematical operations, including addition, multiplication, and division operations, and other operations such as branch control and logical operations, all of which can be operating concurrently. This can be helpful in speeding up certain computations, most particularly those in which several functional units may be used concurrently for performing parts of a single computation.

In von Neumann processors, including those which incorporate pipelining or multiple functional units (or both, since both may be incorporated into a single processor), a single instruction stream operates on a single data stream. That is, each instruction operates on data to enable one calculation at a time. Such processors have been termed "SISD," for "single-instruction/single-data." If a program requires a segment of a program to operate on a number of diverse elements of data to produce a number of calculations, the program causes the processor to loop through that segment for each calculation. In some cases, in which the program segment is short or there are only a few data elements, the time required to perform such a calculation may not be unduly long.

However, for many types of such programs, SISD processors would require a very long time to perform all of the calculations required. Accordingly, processors have been developed which incorporate a large number of processing elements all of which may operate concurrently on the same instruction stream, but with each processing element processing a separate data stream. These processors have been termed "SIMD" processors, for "single-instruction/multipledata." An example of such a system is disclosed in U.S. Pat. No. 4,598,400, issued Jul. 1, 1986, in the name of W. Daniel Hillis, for Method And Apparatus For Routing Message Packets.

SIMD processors are useful in a number of applications, such as image processing, signal processing, artificial intelligence, database operations, and computer simulation of a number of things, such as electronic circuits and fluid dynamics. In image processing, each processing element may be used to perform processing on a pixel (picture element) of the image to enhance the overall image. In signal processing, the processors concurrently perform a number of the calculations required to perform such computations as the "Fast Fourier transform" of the data defining the signal. In artificial intelligence, the processors perform searches on extensive rule bases representing the stored knowledge of the particular application. Similarly, in database operations, the processors perform searches on the data in the database, and may also perform sorting and other operations. In computer simulation of, for example, electronic circuits, each processor may represent one part of the circuit, and the processor's iterative computations indicate the response of the part to signals from other parts of the circuit. Similarly, in simulating fluid dynamics, which can be useful in a number of applications such as weather prediction and airplane design, each processor is associated with one point in space, and the calculations provide information about various factors such as fluid flow, temperature, pressure and so forth.

Typical SIMD systems include a SIMD array, which includes the array of processing elements and a router network, a control processor and an input/output component. The input/output component, under control of the control processor, enables data to be transferred into the array for processing and receives processed data from the array for storage, display, and so forth. The control processor also controls the SIMD array, iteratively broadcasting instructions to the processing elements for execution in parallel. The router network enables the processing elements to communicate the results of a calculation to other processing elements for use in future calculations.

More recently, in massively parallel computing systems, multiple instruction/multiple data (MIMD) systems have been developed in which a plurality of processors each operates in response to its own instruction stream processes data. In a MIMD system, each processor can process data based on its individual programming and the results of previous processing, separately from the other processors, which can be an advantage over SIMD systems in connection with some types of problems. However, a processor often requires the results of processing by other processors, or the processors must synchronize their respective processing statuses, which can be more easily achieved in a SIMD system.

As a result, new computer architectures are being developed, generally known as "S/MIMD" (for "synchronous MIMD"). In an S/MIMD system, a control processor transmits commands to a set of processors, each of which processes data in response to the command. In response to each command, a processor may execute one or more instructions. S/MIMD systems thus maintain a single point of control, but the control is on a command-by-command basis, rather than on an instruction-by-instruction basis. The particular instruction or series of instructions executed by a particular processor in response to a command may depend on the command itself, as well as on results of previous processing by the particular processor, and perhaps on results of previous processing by other processors. In any case, the control processor provides a degree of synchronization for the processors which receive commands therefrom.

SUMMARY OF THE INVENTION

The invention provides a new and improved parallel computer including an arrangement for performing in a parallel manner a context switch operation.

In brief summary, the new arrangement provides in one aspect a parallel computer comprising a plurality of processing elements and a scalar processor all interconnected by a communications network. The communications network further comprises a data router for transferring data between processors and a control network for transferring program commands, status information, and synchronization signals between processors. The scalar processor and the processing elements process a plurality of programs, with the scalar processor and the processing elements processing each program in parallel. The scalar processor, while processing each program, generates commands and transfers them to the processing elements over the communications network, and each of the processing elements processes data associated with a particular program in response to each command received from the communications network. The scalar processor periodically further generates a command to enable the processing elements to, in parallel, switch processing of a program they are currently processing and begin processing of another program.

In another aspect, the new arrangement provides a parallel computer comprising a plurality of processing elements and a control element. Each of the plurality of processing elements processes user programs in response to program commands. Each processing element further comprises a context switch program for enabling it, in response to receipt of a context switch command, to switch from processing of a user program it is then processing to processing of another user program. The control element generates program commands for transfer to the processing elements generally in parallel to enable the processing elements to process the user programs such that all of the processing elements are generally processing the same user program in parallel. The control element in response to selected conditions transmits context switch commands to the processing elements to enable the processing elements to, in parallel, switch from processing of a user program it is then processing to processing of another user program.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 5 is a diagram depicting the structure of message packets transferred over the control network;

FIG. 7A-1 comprises a general block diagram of a data router interface circuit useful in interfacing the processing element depicted in FIG. 6 to the data router of the computer system depicted in FIG. 1, and FIG. 7A-2A and 7A-2B contain definitions of registers in the data router interface;

FIG. 7B-1 comprises a general block diagram of a control network interface circuit useful in interfacing the processing element depicted in FIG. 7A-1 to the control network of the computer system depicted in FIG. 1, and FIG. 7B-2A and 7B-2B contain definitions of registers in the control network interface;

DETAILED DESCRIPTION OF AN ILLUSTRATIVE EMBODIMENT

I. General Description of Computer System
II. General Description of Communications Networks
   A. Data Router
   B. Control Network
III. General Description of Processing Element
   A. General
   B. Data Router Interface
   C. Control Network Interface
IV. Operations of System in Connection with a Context Switch Operation I. General Description of Computer System The invention provides new and improved facilities for controlling a massively-parallel computing system. Prior to describing an illustrative embodiment of the particular invention, it would be helpful to describe in detail one embodiment of a massively-parallel computing system which makes use of the invention. Further details of the embodiment are disclosed in U.S. patent application Ser. No. 07/592,029, entitled Parallel Computer System, filed Oct. 3, 1990, in the name of David C. Douglas, et al., now abandoned in favor of several continuations-in-part including U.S. patent application Ser. No. 07/746,035 (see below) and U.S. patent application Ser. No. 07/746,038 (see below); U.S. patent application Ser. No. 07/746,035, entitled Massively Parallel Computer Partitionable Through Switchable Fat-Tree Control Network, filed Aug. 16, 1991, in the name of David C. Douglas, et al., now matured into U.S. Pat. No. 5,353,412; and U.S. patent application Ser. No. 07/746,038, entitled Input/Output System For Massively Parallel Computer System, filed Aug. 16, 1991, in the name of David Wells, et al., now matured into U.S. Pat. No. 5,361,363, all of which are assigned to the assignee of the present application.

Figure 1:
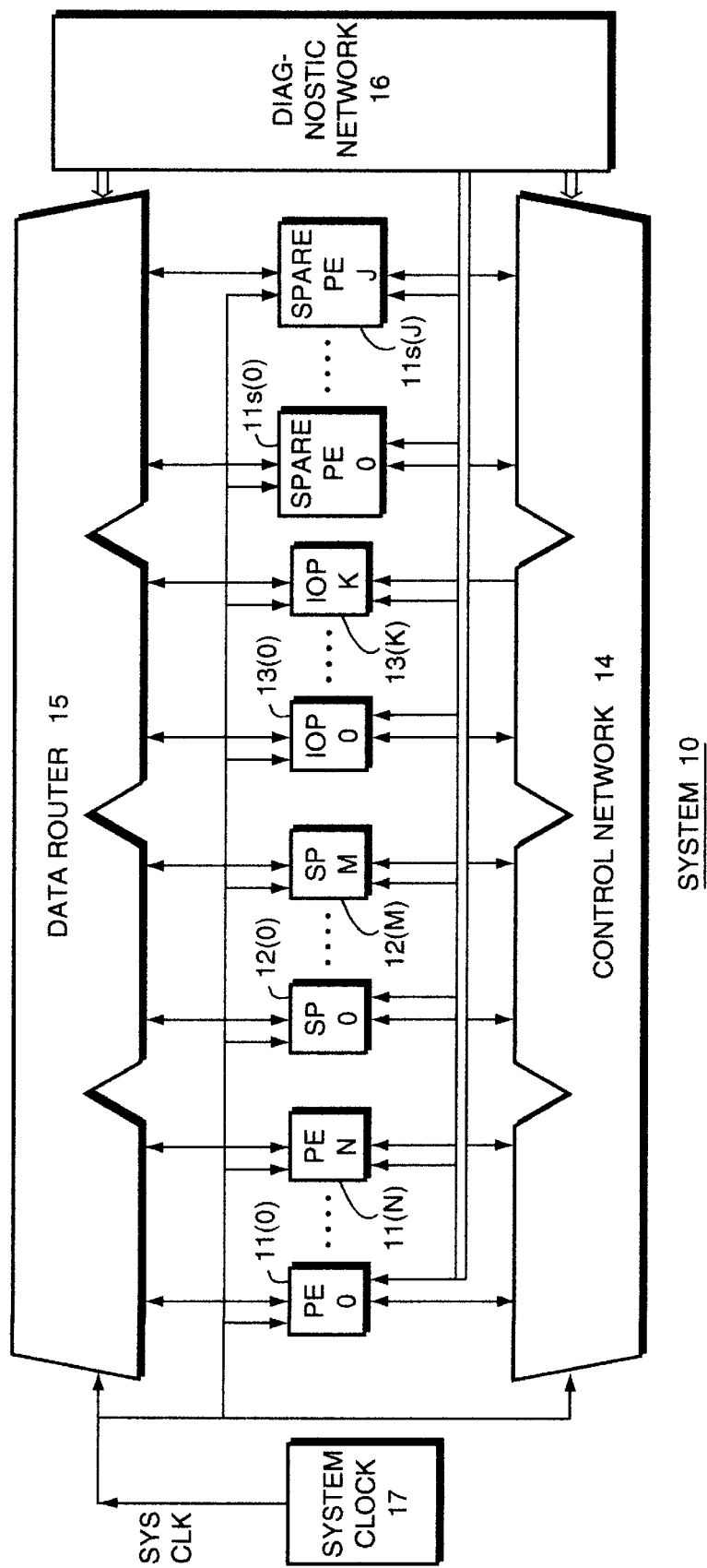
FIG. 1 is a general block diagram of a massively parallel computer system constructed in accordance with the invention.

FIG. 1 is a general block diagram of a massively parallel computer system 10 which makes use of the invention. With reference to FIG. 1, system 10 includes a plurality of processing elements 11(0) through 11(N) (generally identified by reference numeral 11), scalar processors 12(0) through 12(M) (generally identified by reference numeral 12) and input/output processors 13(0) through 13(K) (generally identified by reference numeral 13). Input/output units (not shown), such as, for example, disk and tape storage units, video display devices, printers and so forth may be connected to the input/output processors to supply information, including data and program commands, for processing by the processing elements 11 and scalar processors 12 in the system, and may also receive processed data for storage, display and printing. The scalar processors 12 may also be connected to input/output units including, for example, video display terminals which permit one or more operators to generally control system 10. The system 10 may also include a plurality of spare processing elements 11s(0) through 11s(J) (generally identified by reference numeral 11s) which may be used as described below. The system 10 further includes a control network 14, a data router 15 and a diagnostic network 16. The control network 14 permits one or more scalar processors 12 to broadcast program commands to processing elements 11. The processing elements 11 which receive the commands execute them generally concurrently. The control network 14 also permits processing elements 11 to generate status information which they may supply to the scalar processors 12. The control network 14 is also used by the processing elements 11 to perform selected types of arithmetic operations, termed "scan" and "reduce" operations, as described below. The control network 14 may also be used to provide status and synchronization information among the processing elements 11.

The data router 15 transfers data among the processing elements 11, scalar processors 12 and input/output processors 13. In particular, under control of the scalar processors 12, the input/output processors 13 retrieve data from the input/output units and distribute the data to the respective scalar processors 12 and processing elements 11. During processing, the scalar processors 12 and processing elements 11 can transfer data among themselves over the data router 15. In addition, the processing elements 11 and scalar processors 12 can transfer processed data to the input/output processors 13. Under control of the scalar processors 12, the input/output processors 13 can direct the processed data that they receive from the data router 15 to particular ones of the input/output units for storage, display, printing, or the like. The data router 15 in one particular embodiment is also used to transfer input/output commands from the scalar processors 12 to the input/output processors 13 and input/output status information from the input/output processors 13 to the scalar processors 12.

The diagnostic network 16, under control of a diagnostic processor (not shown in FIG. 1), facilitates testing of other portions of the system 10 to identify, locate and diagnose defects. The diagnostic processor may comprise one or more of the scalar processors 12. In addition, the diagnostic network 16 may be used to establish selected operating conditions in the other portions of the system 10 as described below. One embodiment of the diagnostic network 16 is described in detail in the aforementioned Douglas, et al., and Wells, et al., patent applications and will not be repeated here.

The system 10 is synchronous. All of its elements operate in accordance with a global SYS CLK system clock signal provided by a clock circuit 17.

One particular embodiment of system 10 may include hundreds or many thousands of processing elements 11 operating on a single problem in parallel under control of commands broadcast to them by the scalar processors 12. In that embodiment, the processing elements 11 operate in parallel on the same command on their individual sets of data, thereby forming a parallel computer system.

In addition, the system 10 may be dynamically logically partitioned, by logical partitioning of the control network 14 as described below, into multiple logical subsystems which may concurrently operate on separate problems or separate parts of a single problem. In that case, each partition includes at least one scalar processor 12 and a plurality of processing elements 11, the scalar processor 12 supplying the commands for processing by the processing elements in its partition. The spare processing elements 11s, which except for the positions of their connections to the control network 14 and data router 15 are otherwise similar to processing elements 11, may be used to substitute for failed processing elements 11 in a partition as described below, to augment the number of processing elements in a partition if there are insufficient processing elements 11 to form a partition with a desired number of processing elements 11, or to provide additional processing elements which may themselves be formed into partitions. In the following, unless otherwise stated explicitly, a reference to a processing element 11, in either the singular or plural, will also be taken as a corresponding singular or plural reference to a spare processing element 11s; that is, the processing elements 11 and spare processing elements 11s will be jointly referred to herein generally as processing elements 11.

It should be noted from the following description that the partitioning is only in relation to the control network 14, but not the data router 15. This facilitates transfer of data between processing elements of different partitions if they are, for example, processing different parts of a particular problem, or, more generally, for inter-process communications, if each processing element of the diverse partitions is processing correspondingly diverse, but possibly interacting, processes. This further facilitates transfer of data from processing elements of any partition to the input/output processors 13 to permit storage or display of data, as well as transfer from the input/output processors 13 of stored data to processing elements of any partition.

II. General Description of Communications Networks

Figure 2A:
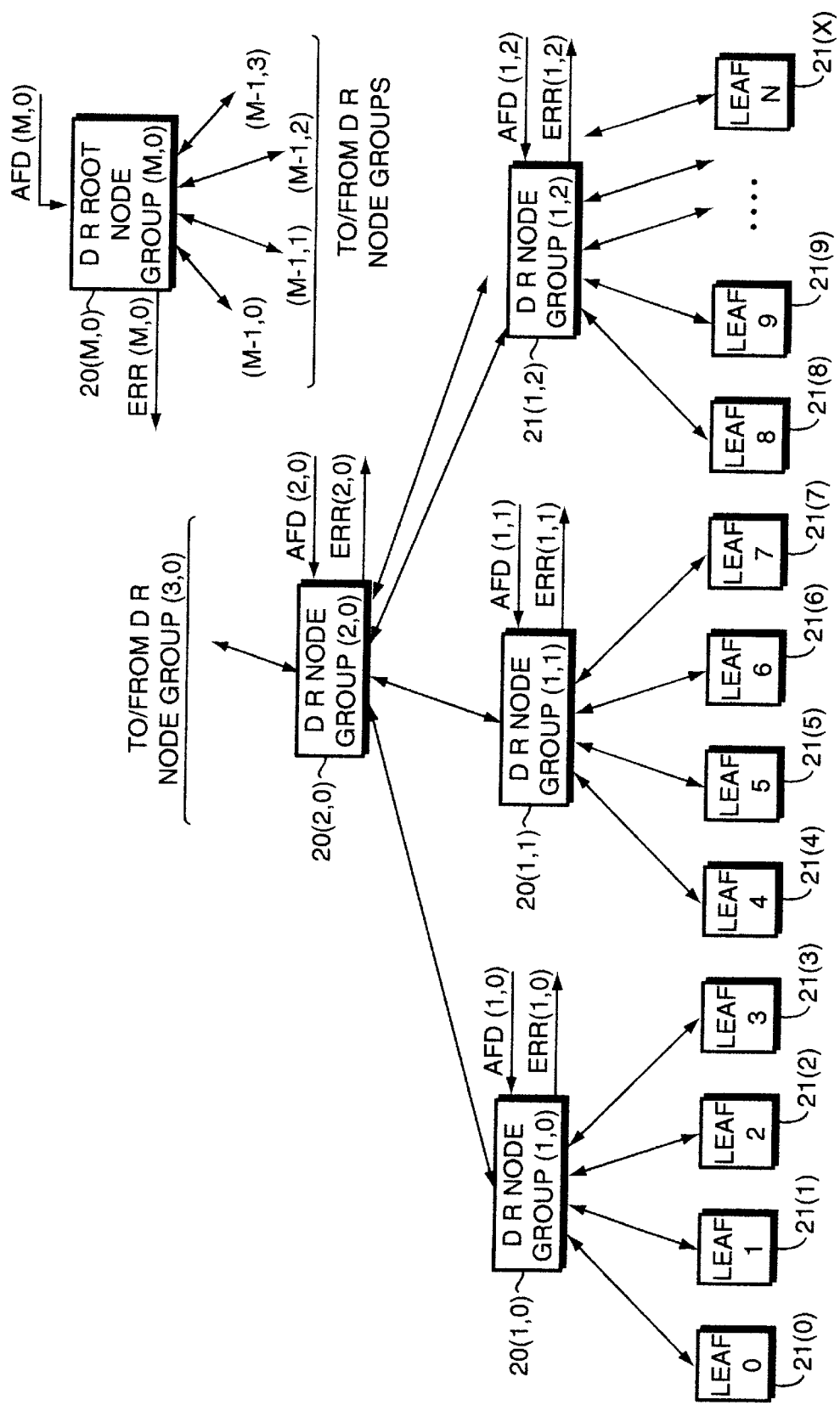
FIG. 2A and 2B, together with FIG. 2B-1 and 2B-2, are block diagrams useful in understanding the structure and operation of the data router of the computer system of FIG. 1.
Figures 1, 2B:
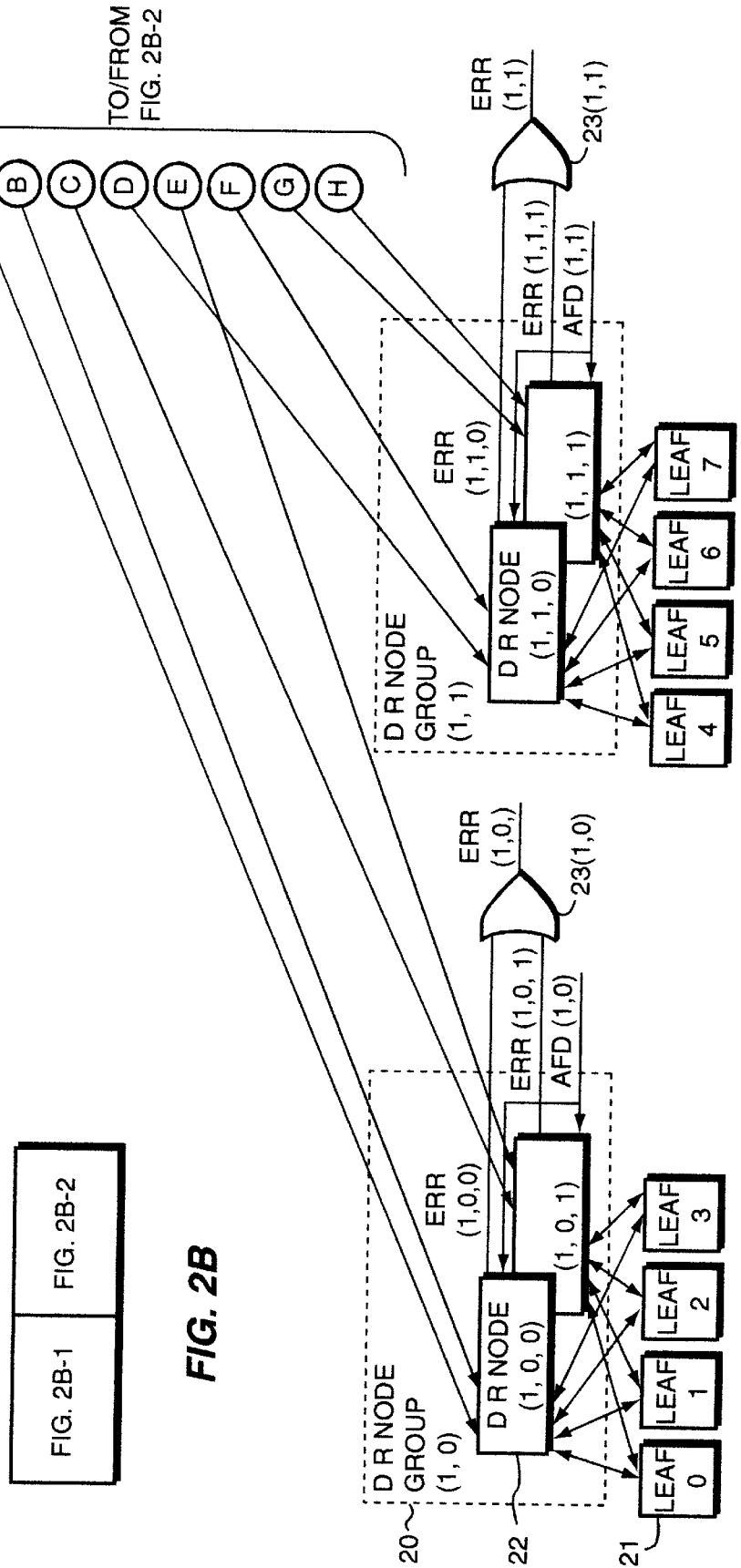

A. Data Router 15 Before proceeding to a detailed description of the system 10 and its various components, it would be helpful to generally describe the structures of the control network 14 and data router 15. The data router 15 and control network 14 both transfer information in the form of message packets, which will be described in detail below in connection with FIGS. 3 and 5, respectively. FIGS. 2A and 2B, along with FIGS. 2B-1 through 2B-4, depict the general structure of the data router 15 and FIGS. 4A through 4E depict the general structure of the control network 14, and further illustrates partitioning of the control network 14.

With reference to FIG. 2A, the data router 15 is generally tree-structured, having a plurality of data router node groups 20(i,j) (i and j are integers) organized in a plurality of levels each identified by the index i in reference numeral 20(i,j). A data router node group 20(i,j) at each level i is connected to a selected number of data router node groups 20(i−1,j) in the next lower level i−1 to form a tree. As will be described in detail below, the data router node groups 20(i,j) perform message switching operations to transfer data, in the form of data router message packets, among the processing elements 11, scalar processors 12 and input/output processors 13, which are collectively identified as leaves 21(0) through 21(x) (generally identified by reference numeral 21). Each data router node group 20(1,j) in the lowest level is connected to one or more leaves 21. In the reference numeral 20(i,j), the index i uniquely identifies each of the data router node groups 20(i,j) at the level i.

In the data router 15 represented in FIG. 2A, the data router node group 20(M,0) at the highest level M is termed the "physical root" of the tree. At each level i, each data router node group 20(i,j) is termed the "parent" of the data router node groups 20(i−1,j) connected thereto, and each data router node group 20(i−1,j) is termed a "child" of the data router node group 20(i,j) to which it is connected. It will be appreciated that the data router node group 20(i,j) will also be a child of the data router node group 20(i+1,j) connected thereto. In one particular embodiment, each data router node group 20(i,j) in a particular level i is connected to four child data router node groups 20(i−1, j). In that embodiment, the "fan-out" of the tree, that is, the number of child data router node groups connected to each parent, is four. It will be appreciated from the following that the fan-out need not be constant, but may vary from level to level and also among data router node groups 20(i,j) within the same level.

It will further be recognized that the values for the indices j in the reference numerals for a data router node group 20(i,j) and its child data router node groups 20(i−1,j), as used in the preceding paragraphs, are not necessarily the same, and further that the relationships between the values will be determined by the respective fan-outs at each level. In particular, if the fan-out at a particular level is four, and if the indices start at zero, the value of the index j of a parent data router node group will be the greatest integer in the value of any of the indices of the child data router node groups 20(i−1,j) divided by four. Thus, for example, as shown in FIG. 2A, the data router node group 20(2,0) at level 2 is connected to data router node groups 20(1,0) through 20(1,3) as children. In each case of the indices j in the reference numerals for the child data router node groups 20(1,0) through 20(1,3), the greatest integer in the value of the index divided by four is zero, which is the value of the index j of the parent data router node group 20(2,0).

The structure of the data router 15 is further termed a "fat-tree", and will be particularly described in connection with FIG. 2B. With reference to FIG. 2B, along with FIG. 2B-1 and 2B-2, at least some of the data router node groups 20(i,j) include at least one, and typically two or more data router nodes 22(i,j,k), wherein k is an integer that uniquely identifies each data router node within a data router node group 20(i,j). Each data router node 22(i,j,k) in a data router node group 20(i,j) is connected to a plurality of data router nodes 22(i+1,j,k) in level i+1, with the connections being established so that the data router nodes 22(i,j,k) in each data router node group 20(i,j) are connected to different ones of the data router nodes 22(i+1,j,k) in the data router node group 20(i+1,j) in level i+1. For example, in data router node group 20(1,0), data router node 22(1,0,0) is connected to data router nodes 22(2,0,0) and 22(2,0,1) of data router node group 20(2,0), and data router node 22(1,0,1) is connected to data router nodes 22(2,0,2) and 22(2,0,3) of data router node group 20(2,0). In addition, each data router node 22(i,j,k) in a parent data router node group 20(i,j) is connected to one data router node 22(i−1,j,k) in that parent's child data router node groups 20(i−1,j). Accordingly, as shown in FIG. 2B, data router node (2,0,0) in data router node group 20(2,1) is connected to one data router node 22(1,j,0), where j equals 0, 1, 2 and 3, in each of the data router node groups 20(1,0) through 21(1,3).

It will be appreciated that the collection of data router nodes 22(i,j,k) from each leaf 21 to and including the data router nodes 22(M,0,k) in the root data router node group 20(M,0) essentially forms an inverted tree. Each leaf 21 effectively comprises the root of one inverted tree and the data router nodes 22(M,0,k) of the root data router node group 20(M,0) form all of the leaves of all of the inverted trees defined by the collection of leaves 21. The number of data router nodes 22(i,j,k) in each data router node group 20(i,j) at a particular level i in the tree defining data router 15 will be determined by the fan-out at each level from level 1 to level i in the inverted tree. The fan-out at a particular level i is the number of data router nodes 22(i+1,j,k) at level i+1 to which each data router node 22(i,j,k) at level i is connected. Thus, for example, since data router node 22(1, 0,0) of data router node group 20(1,0) in level 1 is connected to two data router nodes 22(2,0,0) and 22(2,0,1) of data router node groups 20(2,0) in level 2, the fan-out from data router node 22(1,0,0) is two. In one particular embodiment, the fan-out from data router nodes 22(i,j,k) at a particular level i is the same for the entire level, but it may differ from level to level as described below. As with the values of indices j as among the data router nodes 20(i,j) as described above, it will be recognized that the values for the indices k in the reference numerals for a data router node 22(i,j,k) and its child data router nodes 22(i−1,j,k), as used here, are not necessarily the same, and further that the relationships between the values will be determined by the respective fan-outs at each level.

As noted above, the data router 15 transfers message packets among the processing elements 11, scalar processors 12 and input/output processors 13, all of which are represented by leaves 21. Each connection shown in FIG. 2B between a leaf 21 and a data router node 22(1,j,k) of level 1, which is represented by a line therebetween, actually represents two unidirectional data paths, one for transferring a message packet in each direction. Thus, for example, the connection between leaf 21(0) and data router node 22(1,0, 0) of data router node group 20(1,0) represents two data paths. One data path is used by the leaf 21(0) to transmit a message packet to the data router node 22(1,0,0) for delivery to another leaf 21(x). The other data path is used by the data router node 22(1,0,0) to deliver message packets originating at other leaves 21 destined for the leaf 21(0).

Similarly, each connection between a data router node 22(i,j,k) of a level i and a data router node 22(i+1,j,k) of a level i+1, which is also represented in FIG. 2B by a line, represents two unidirectional data paths, one for transferring a message packet in each direction. Thus, for example, the connection between data router node 22(1,0,0) of data router node group 20(1,0) and data router node 22(2,0,0) represents two data paths, one used to transfer message packets from data router node 22(1,0,0) to data router node 22(2,0,0) and the other to transfer message packets in the opposite direction, that is, from data router node 22(2,0,0) to data router node 22(1,0,0).

Transfer of a message packet from one leaf 21(x) to another leaf 21(y) through the data router 15 message transfer proceeds in two general operations. First, the data router nodes 22(i,j,k) transfer the message packet first up the tree, that is, to data router nodes in successively higher levels, until it reaches a selected maximum level determined in part by the separation between the source and destination leaves. After a message packet has reached the selected maximum level, the transfer continues down the tree, during which the data router nodes 22(i,j,k) transfer the message packet to data router nodes at successively lower levels until it is delivered to the destination leaf 21(y). As will be clear from the detailed description of the structure and operation of a data router node 22(i,j,k) in FIGS. 11A through 11D below, the data router 15 can transfer a plurality of messages concurrently to any of the data router nodes 22(i,j,k) and can direct messages up the tree and other messages down the tree at the same time.

Before proceeding further, it may be helpful to describe the structure of a message packet transferred over the data router 15. With reference to FIG. 3, a data router message packet 30 includes three general portions, including a message address portion 31, a message data portion 32, and a checksum portion 33, each comprising one or more "flits." In one embodiment, each flit comprises four bits, which are transferred in parallel over a data router connection, that is, between a leaf 21 and a data router node 22(i,j,k) or between two data router nodes 22(i,j,k).

The message data portion 32 includes several elements, including a length flit 34, a tag flit 35 and one or more data flits 36(0) through 36(N) (generally identified by reference numeral 36). The tag flit 35 contains control information which may be used by the destination leaf, identified herein by reference numeral 21(y), in processing the data. In one particular embodiment, the leaves 21 may selectively operate in a supervisor operating mode, as when it is processing an operating system program, or a user operating mode, as when it is processing a user application program. In that case, the contents of the tag flit 35 of a particular data router message packet may, for example, identify the operating mode in which the leaf was operating when it generated the data router message packet 30. Tag flit contents identifying the supervisor operating mode, may be particularly useful in identifying the data router message packet as being for input/output purposes or for transfers between partitions for, for example, inter-process communications. On the other hand, tag flit contents identifying the user operating mode may be particularly useful in identifying the message packet as being for intra-partition transfers, for, for example, intra-process communications.

The data flits 36 generally contain the actual message data being transferred over the data router 15, which may vary from packet to packet. The contents of the length flit 34 identify the number of flits in the message data portion 32, in particular, the number of data flits 36, and may vary depending on the amount of data being transferred in a particular packet 30. In one particular embodiment, the contents of length flit 34 identify the number of thirty-two bit words in the data flits 36 of the message packet. In that embodiment, the number of data flits 36 in the message packet is eight times the value in the length flit 34.

In addition, in data router message packets generated by leaves in the supervisor operating mode in that embodiment, the first eight data flits 36, corresponding to the first thirty-two bit word, may contain sequence information for the data contained in the remainder of the message portion 32. This may be particularly useful since, as will be appreciated, data router message packets, even if they are transmitted by the input/output processors 13 in a particular ordered sequence, may be received by the destination leaves 21(y) in random order. In addition, the first word may contain a process identification portion to identify the particular process in which the data is to be processed.

The checksum portion 33 contains a value which is used in detecting errors in packet transmission over the data router 15.

The data router 15 uses the contents of the message address portion 31 to determine a path to be traversed by the message packet 30 from the source leaf to the destination leaf. The message address portion 31 includes a header 40, which identifies the selected maximum level to which the message packet is to be transferred when going up the tree, and a down path identification portion 41 which identifies the path down the tree to the destination leaf 21(y) when going down the tree. When directing a message packet up the tree, a data router node 22(i,j,k) at level i, randomly selects one of the data router nodes 22(i+1,j,k) connected thereto in level i+1 in data router node group 20(i+1,j) to receive the message packet. Other than specifying the selected maximum height for the message packet, the packet does not otherwise specify the particular path it is to take up the tree.

The down path identification portion 41 of message packet 30 defines the path the packet is to take down the tree from the data router node group 20(i,j) at the selected maximum level to the destination leaf 21(y). The down path identification portion includes one or more down path identifier fields 42(1) through 42(M) (generally identified by reference numeral 42). The successive down path identifier fields 42, beginning with field 42(M), are used by the data router nodes 22(i,j,k) at successively lower levels as they direct the packet down the tree.

The down path identifier field 42(i) for level i identifies the child data router node group 20(i−1,j) to which the parent data router node group 20(i,j) that receives the packet at level i is to direct the message packet 30. It will be appreciated that the down path identifier fields 42 need not specifically identify one of the data router nodes 22(i−1,j,k) in the data router node group 20(i,j) at each level to which the message packet is to be directed, since the path down the tree is effectively a traversal of the inverted tree of which the destination leaf 21(y) is the root.

In one embodiment, in which each parent data router node group 20(i,j) is connected to four child data router node groups 20(i−1, j) or four leaves 21, each down path identifier field 42 comprises two bits that are binary encoded to identify one of the four children to which the message is to be directed. As indicated by FIG. 3, two fields 42 are packed into a single four-bit flit in the message packet 30. Since one down path identifier field 42 is used to at each level (i) in the downward traversal, the number of down path identifier fields 42 required to define the downward path corresponds to the selected maximum level in the path up the tree, which, in turn, corresponds to the contents of header 40. During the downward traversal mode, the data router nodes 22(i,j,k) through which a message packet 30 passes decrement the contents of the header 40 and, after both down path identifier fields 42 contained in a flit have been used, discard the flit. Thus, the length and content of a message packet 30 may change as it is being passed down the tree.

It will be appreciated that the addressing arrangement provided by the header 40 and down path identification portion 41 can be viewed as follows. The selected maximum height in header 40 effectively identifies the data router node group 20(i,j) which is the root of a sub-tree, preferably the smallest sub-tree, of the data router 15 that contains both the source leaf 21(x) and the destination leaf 21(y). On the other hand, the down path identification portion 41 details the exact path from that root to the destination leaf 21(y).

The provision of increasing numbers of data router nodes 22(i,j,k) in data router node groups 20(i,j) at higher levels in the data router 15, thereby resulting in a "fat-tree" design, provides several advantages. In a massively parallel computer SIMD system, processing elements 11 typically transfer messages during a message transfer operation, initiated by commands from the scalar processors 12. During a message transfer operation, a large number of processing elements 11 may transfer messages concurrently. If the data router 15 did not have increasing numbers of data router nodes 22(i,j,k) at higher levels to which the message packets 30 can be directed when going up the tree, the bandwidth of the data router 15, that is, the rate at which it can transfer message packets 30, would decrease at higher levels.

Since increasing numbers of data router nodes 22(i,j,k) are provided at higher levels in the "fat-tree" design, the reduction in bandwidth at higher levels can be minimized or controlled. As noted above, the fan-out of data router node groups 20(i,j), that is, the number of data router nodes 22(i+1,j,k) at level i+1 connected to each data router node 22(i,j,k) at level i can vary from level to level, and can be selected to maintain a desired minimum bandwidth between the respective levels i and i+1. Alternatively, the fan-outs from each level to the next higher level can be selected so that the entire data router 15 has a selected minimum bandwidth.

Further, as noted above, each data router node 22(i,j,k) randomly selects the data router node 22(i+1,j,k) in the next higher level to which it directs a message packet 30 in the path up the tree. Accordingly, the message packets are randomly distributed through the higher levels of the tree, which minimizes the likelihood of bottlenecks through the data router 15 and maximizes the bandwidth in the higher levels.

As shown in FIG. 2A and 2B, each data router node group 20(i,j), and in particular each data router node 22(i,j,k), in the data router 15 receives an AFD(i,j) all-fall-down (i,j) signal. The AFD(i,j) all-fall-down (i,j) signal is provided by the control network 14, as will be described below in connection with FIG. 4A through 4A-2 and 4B. The AFD(i,j) signal is generated under control of the processing elements 11 within a partition during a context switch operation of the processing elements 11 within the partition. The AFD(i,j) all-fall-down (i,j) signal, when asserted, enables selected node groups 20(i,j) of the data router 15, that is, those data router node groups 20(i,j) in a sub-tree just including the processing elements in the partition, to enter an all-fall-down mode, in which that sub-tree quickly empties itself of data router message packets. In response to the AFD(i,j) all-fall-down (i,j) signal, the appropriate data router node groups 20(i,j) direct all message packets 30 directly down the tree to the leaves 21, where they are stored until the context in which the data router message packets were generated is restored. At that point, the leaves 21 which receive such messages can transmit them over the data router 15, which will deliver them to the intended destinations.

In contrast to the normal operation described above, in which the contents of the header 40 are decremented and flits containing down path identifier fields 42 discarded as the message packet 30 is directed down the tree, when the AFD(i,j) all-fall-down (i,j) signal is asserted the contents of the header 40 are not decremented and no changes are made to the flits containing the down path identifier fields 42. When the context is restored and the leaves 21 return the message packets to the data router 15, they will be delivered to the proper destination leaves. This can be seen from the following explanation.

In the following explanation, reference numerals 21(x) and 21(y) will refer to the original source and destination leaves, respectively, for a message packet 30 and reference numeral 21(x') will refer to the intermediate storage leaf which receives and stores the message packet 30 while the context in which the data router message packet 30 was generated is being switched out. First, for those message packets that are being transferred up the tree or that have reached the selected maximum height when the AFD(i,j) all-fall-down (i,j) signal is asserted, the contents of the header 40 and down path identification portion 41 are the same as when they were originally transmitted by the source leaf 21(x). Since the intermediate storage leaf 21(x') receives the message packet 30 it must be part of a sub-tree of the data router 15 that includes both the source leaf 21(x) and the destination leaf 21(y). Further, the sub-tree has the same root data router node group 20(i,j) that the message packet 30 would have reached had the AFD(i,j) all-fall-down (i,j) signal not been asserted. Accordingly, when the intermediate storage leaf 21(x') transmits the message packet over the data router 15, the packet will go up the tree and reach the same data router node group 20(i,j) that it would have reached if the AFD(i,j) all-fall-down (i,j) signal had not been asserted, and from there will follow the same downward path, defined by the down path identification portion 41, that it would have taken.

On the other hand, if a message packet is being transferred down the tree when the AFD(i,j) all-fall-down (i,j) signal is asserted, prior to the signal's assertion the contents of the header field 40 are decremented as the message packet is passed from level to level. Accordingly, it will be appreciated that, when the message packet 30 is transmitted by the intermediate storage leaf 21(x'), in its path up the tree it will go only to a data router node group 20(i,j) at the level indicated in the header field 40, which, in turn, corresponds to the data router node group 20(i,j) which controlled the direction of transfer of the message packet 30 when the AFD(i,j) all-fall-down (i,j) signal was asserted. It will be appreciated that the data router node group 20(i,j) that the message packet 30 reaches may not be the root of a sub-tree that includes the source leaf 21(x). However, it will be the root of a sub-tree that includes both the intermediate storage leaf 21(x'), since the message packet 30 was transferred from that data router node group 20(i,j) to the intermediate storage leaf 21(x'), and the destination leaf 21(y), since the message packet 30 could have been transferred from that data router node group 20(i,j) to the destination leaf had the AFD all-fall-down (i,j) signal not been asserted.

In addition, each data router node 22(i,j,k) generates an error signal, identified as ERR (i,j,k) which is asserted if it detects selected error conditions. A data router node 22(i,j,k) may assert its ERR (i,j,k) signal to indicate, for example, the occurrence of an error in connection with transfer of a message packet 30. Each data router node group 20(i,j) has an associated OR gate 23(i,j) which receives the ERR (i,j,k) node error signals from the data router nodes 22(i,j,k) connected thereto and generates a consolidated ERR (i,j) node group error signal if any of the received error signals is asserted. The ERR (i,j) node group error signals from the OR gates 23(i,j) are coupled to the control network 14 and used as described below.

As will be described in further detail below, each leaf 21 maintains a message counter that it increments when it transmits a message packet over the data router 15, and that it decrements when it receives a message packet from the data router 15. As noted above, the control network 14 performs selected arithmetic operations, whose results can be provided to the processing elements 11 and scalar processors 12. By enabling the control network 14 to perform selected arithmetic operations using the values of the message counters, the results can identify when all of the message packets that were transmitted over the data router 15 have been received by the leaves 21, thereby indicating that the data router 15 is empty. This can be used to indicate that a message transfer operation has been completed, or that the router 15 is empty as a result of the assertion of an AFD(i,j) all-fall-down (i,j) signal so that a context switch can occur.

B. Control Network 14 As noted above, the control network 14 may be used to: (1) transfer program commands from the scalar processors 12 to the processing elements 11; (2) return status information to the scalar processors 12; and (3) provide status and synchronization information among the processing elements 11. In addition, the control network 14 may be used to perform selected types of arithmetic operations. The control network 14 will be generally described in connection with block diagrams depicted in FIG. 4A through 4E, and with FIG. 5, which depicts the structure of a control network message packet.

Figure 4A:
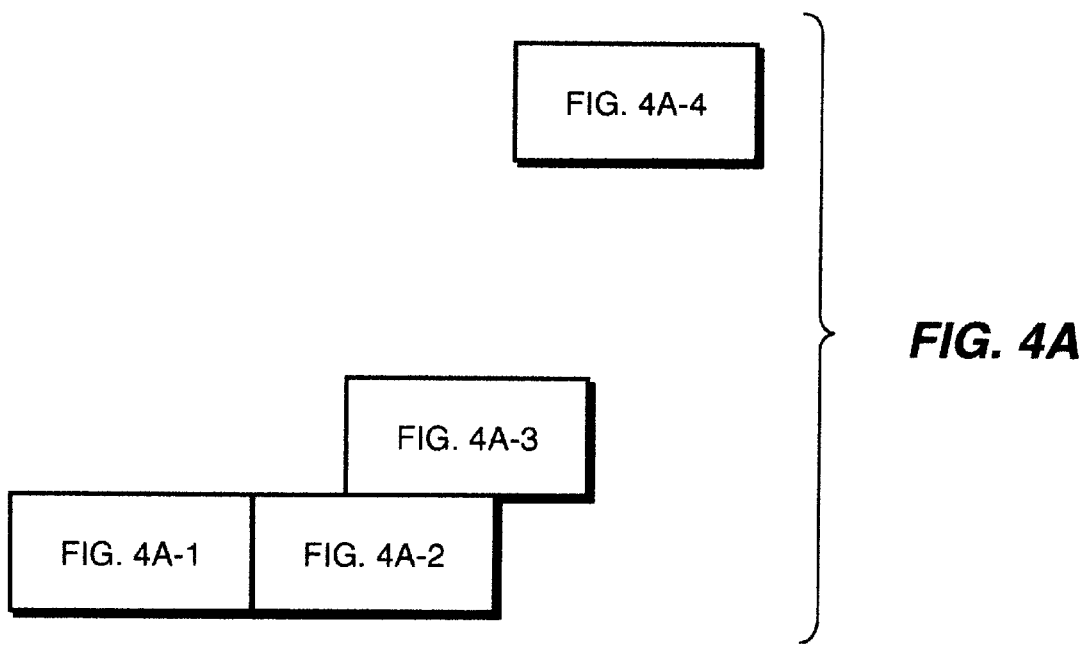
FIG. 4A, together with FIG. 4A-1 through 4A-4, along with FIG. 4B through 4E are block and logic diagrams useful in understanding the structure and operation of the control network of the computer system of FIG. 1.
Figures 1, 4A:
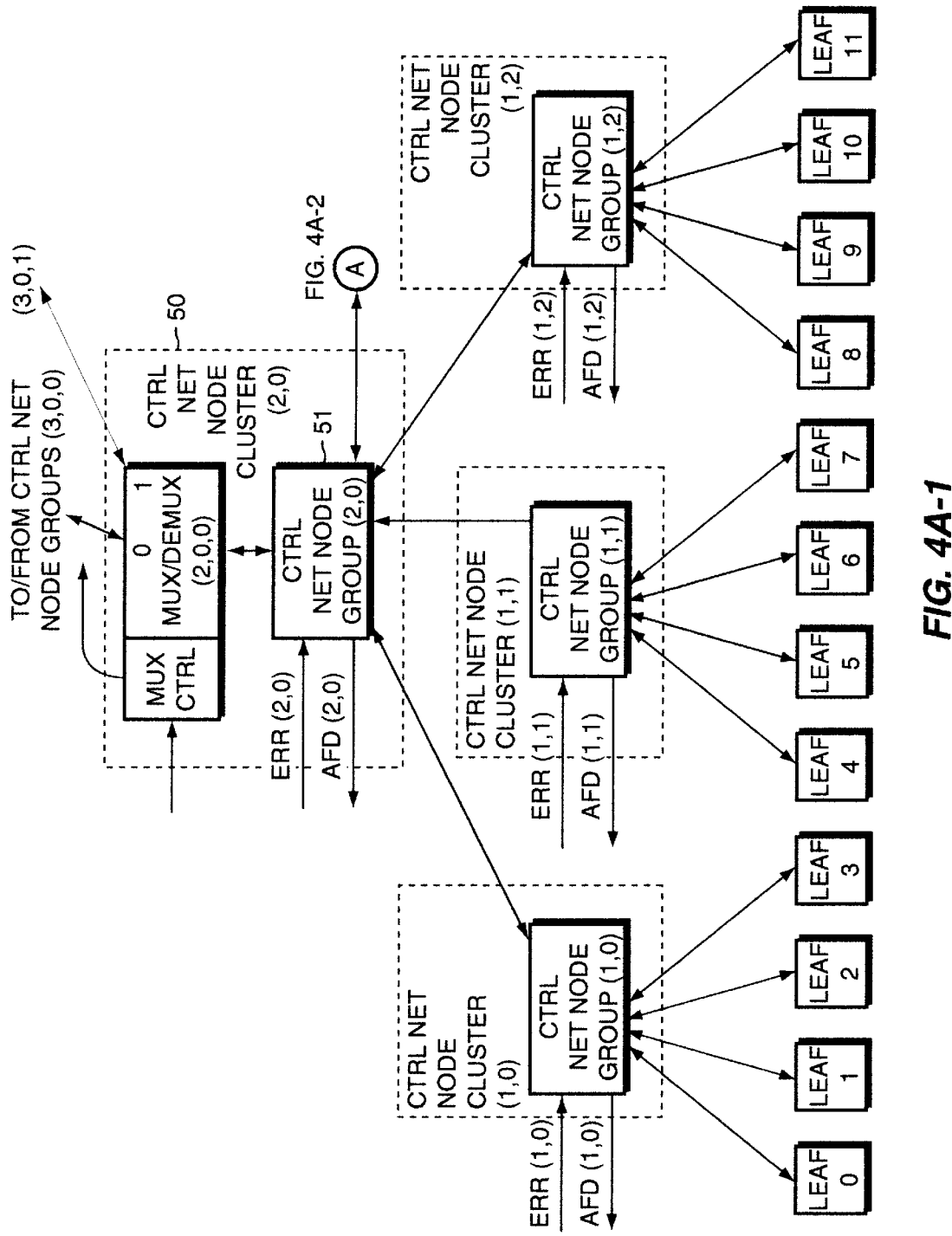
Figure 4B:
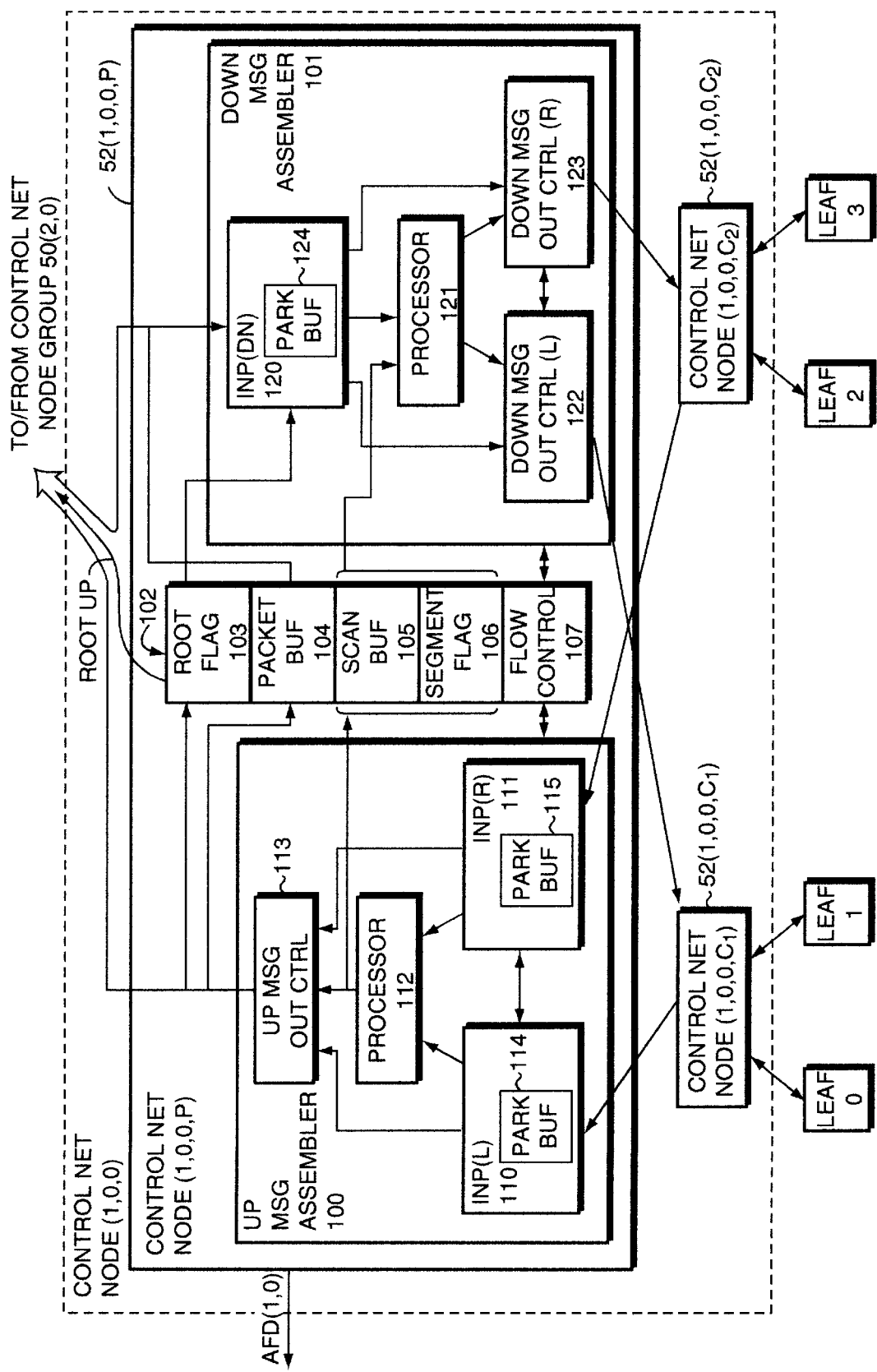
Figures 2, 4A:
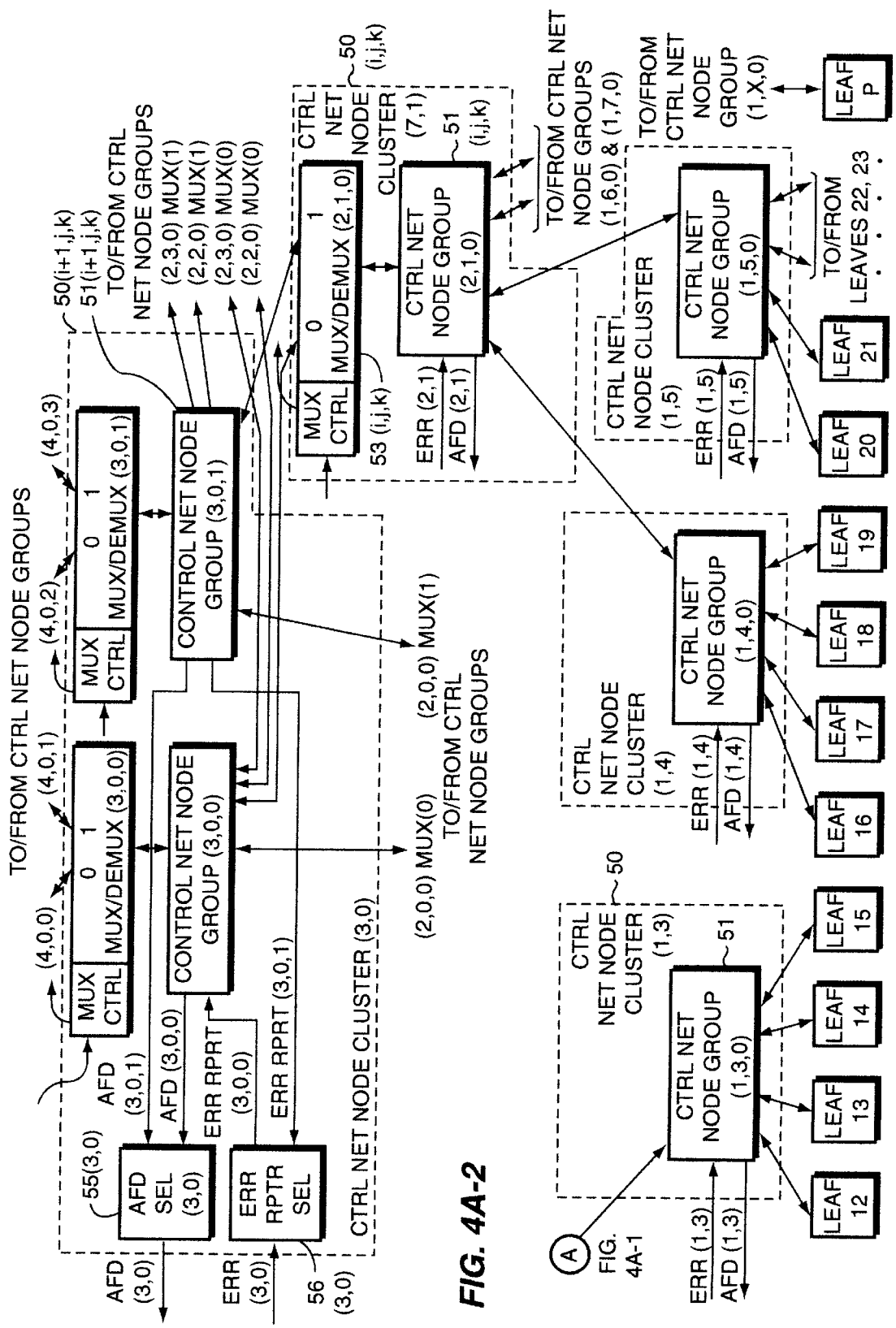
Figures 3, 4A:
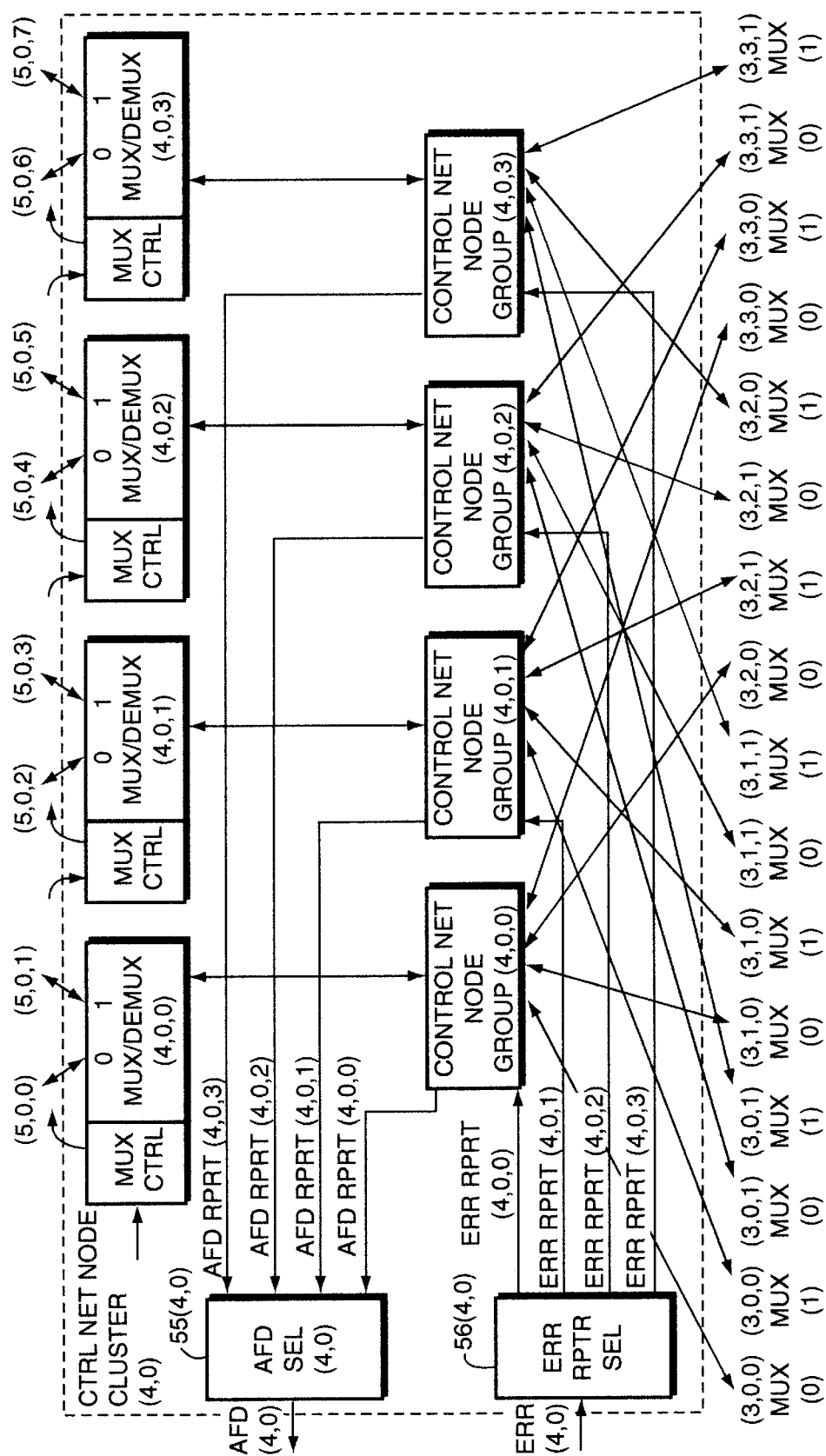
FIG. 3 is a diagram depicting the structure of message packets transferred over the data router.
Figures 4, 4A:
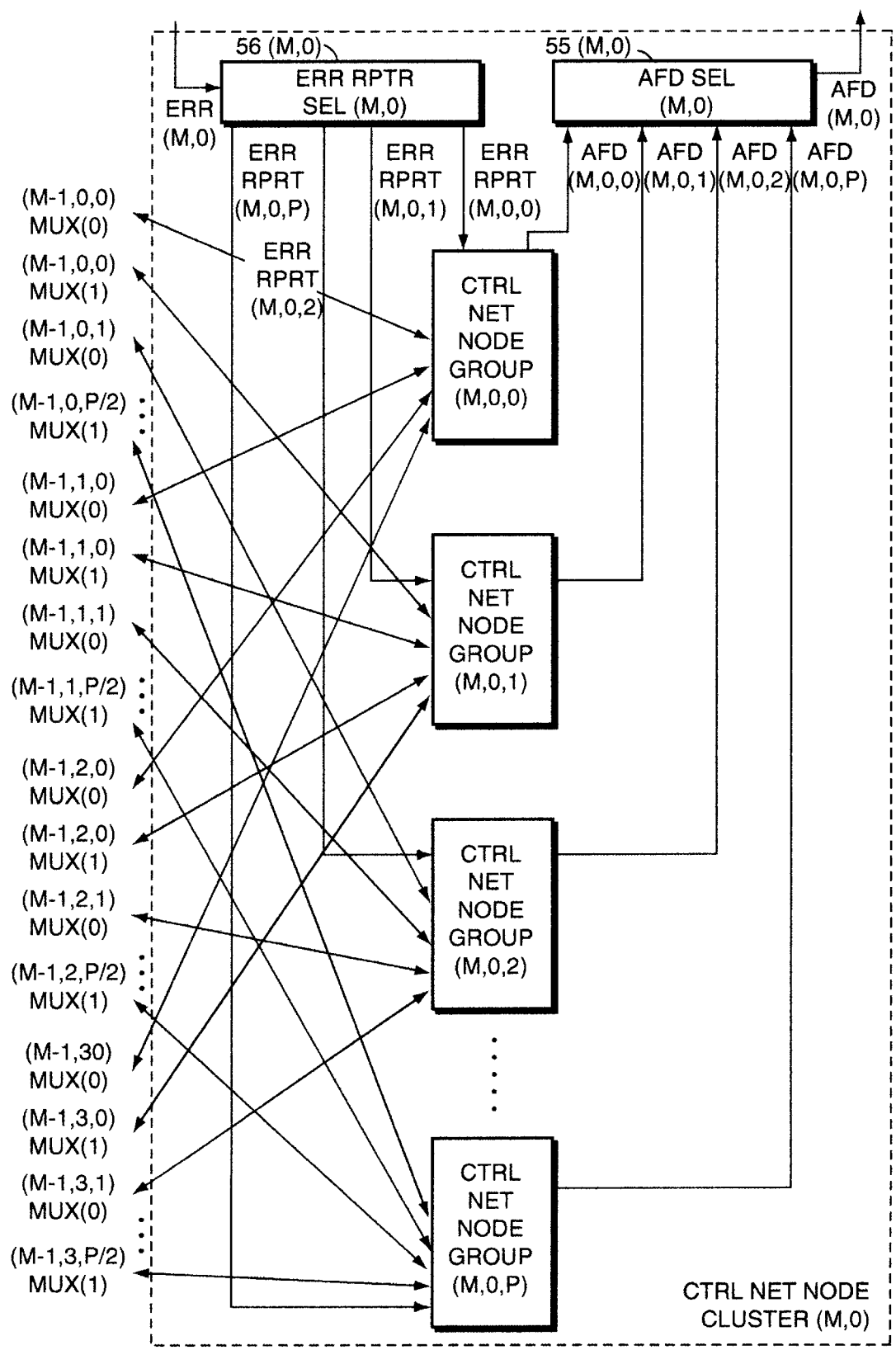

FIGS. 4A-1 through 4A-4, as laid according to FIG. 4A, generally depict the structure of the control network 14. With reference to FIGS. 4A-1 through 4A-4, the control network 14, like the data router 15, is generally tree-structured, having a plurality of control network node clusters 50(i,j) (i and j are integers) organized in a plurality of levels each identified by the index i in reference numeral 50(i,j). In the reference numeral 50(i,j), the index i distinguishes the control network node clusters 50(i,j) at the level i.

The tree structure of the control network 14 is generally similar to that of the data router 15. In particular, each control network node cluster 50(i,j) is generally associated with a data router node group 20(i,j) having the same values for indices i and j, and connections among control network node clusters 50(i,j) follow a similar tree-like pattern as connections among data router node groups 20(i,j). Each control network node cluster 50(1,j) in the lowest level may be connected to one or more leaves 21, in a similar tree-like pattern as the connections in the data router 15.

Similar terminology will be used in describing the control network 14 as was used in describing the data router 15 above. In particular, in the control network 15 represented in FIG. 2A, the control network node cluster 50(M,0) at the highest level M is termed the "physical root" of the tree. At each level i, each control network node cluster 50(i,j) is termed the "parent" of control network node cluster 50(i−1,j) connected thereto, and each control network node cluster 50(i−1,j) is termed a "child" of the control network node cluster 50(i,j) to which it is connected. The control network node cluster 50(i,j) will also be a child of the control network node cluster 50(i+1,j) connected thereto. In one particular embodiment, each control network node cluster 50(i,j) in a particular level i is connected to four child control network node clusters 50(i−1,j), in which case the "fan-out" of the tree, that is, the number of children connected to each parent, is four.

Figures 2, 2B:
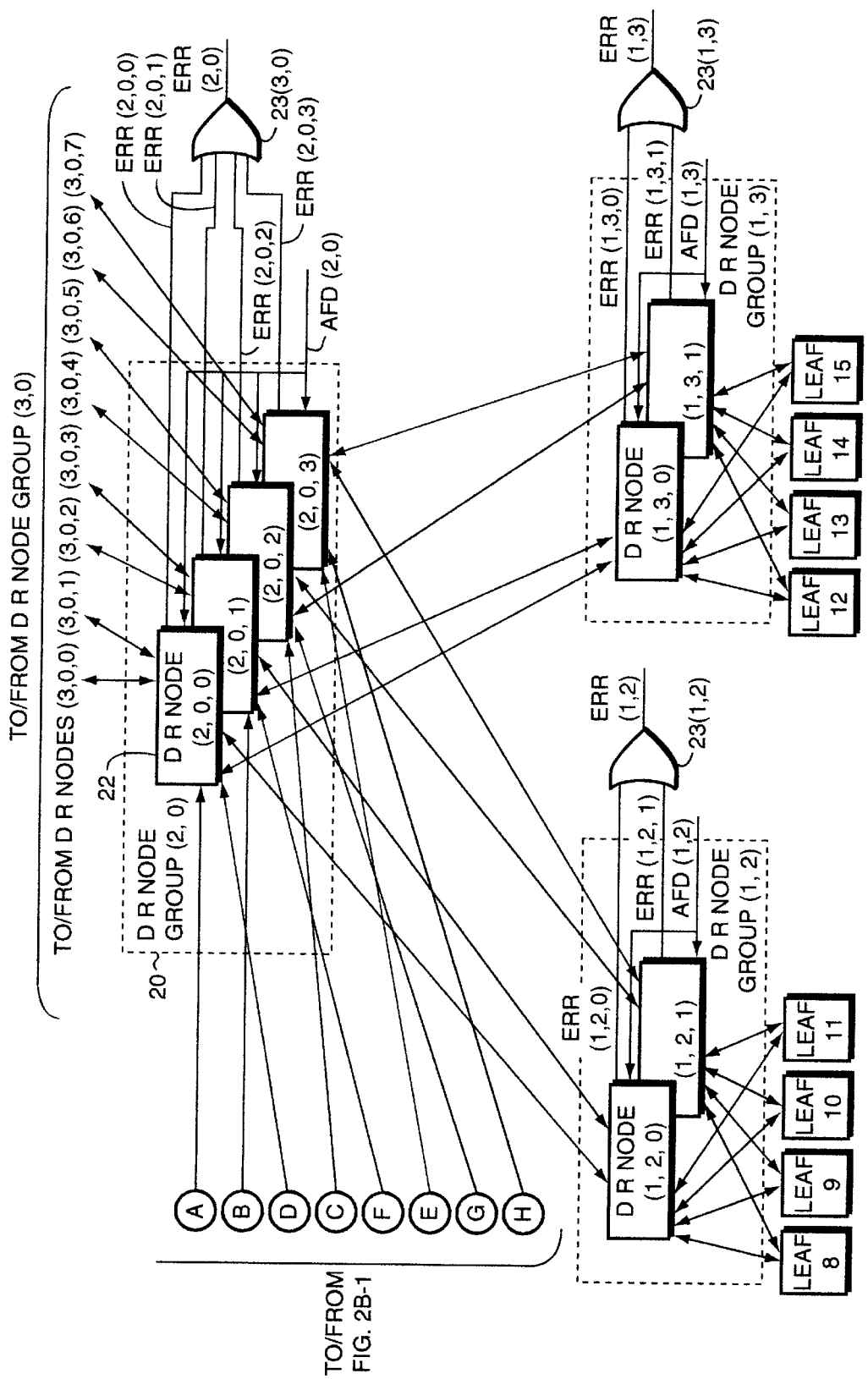

As was the case with the values of index j in the reference numerals for each data router node group 20(i,j) and its child data router node groups 20(i−1,j), the values for j in the reference numerals 50(i,j) for the respective parent and child control network node clusters 50(i,j) and 50(i−1,j) may not be the same, and will in particular be determined by the respective fan-outs at each level. In particular, if the fan-out at a particular level is four, and if the indices start at zero, the value of the index j of a parent control network node cluster will be the greatest integer in the value of any of the indices of the child control network node cluster 50(i−1,j) divided by four. Thus, for example, as shown in FIG. 4A-1 and 4A-2, the control network node cluster 50(2,0) at level 2 is connected to control network node clusters 50(1,0) through 50(1,3) as children. In each case of the indices j in the reference numerals for the child control network node clusters 50(1,0) through 50(1,3), the greatest integer in the value of the index divided by four is zero, which is the value of the index j of the parent control network node cluster 50(2,0).

The structure of a control network node cluster 50(i,j) will be described in connection with FIGS. 4A-1 through 4A-4. As shown in those figures, each control network node cluster 50(i,j) includes at least one control network node group 51(i,j,k), with each cluster 50(i,j) in the upper levels including a plurality of control network node groups. Like the data router 15 described above, the control network 14 has generally a fat-tree structure, in which the control network 14 has multiple paths from each leaf 21 to the root control network node cluster 50(M,0). Unlike the data router 15, however, the control network 14 is, what will be termed herein, a switched fat-tree structure. That is, each control network node group 51(i,j,k) above a predetermined level includes a multiplexer/demultiplexer 53(i,j,k) that is connected to two control network node groups 51(i+1,j,k) in the parent control network node cluster 50(i+1,j). Each control network node group 51(i+1,j,k) in the parent control network node cluster 50(i+1,j) is connected to at most one control network node group 51(i,j,k) through the associated multiplexer 53(i,j,k) in each of the control network node clusters 50(i,j) constituting its children.

Each multiplexer/demultiplexer 53(i,j,k) is connected to a multiplexer control circuit 54(i,j,k) to selectively connect the control network node group 51(i,j,k) to one of the control network node groups 51(i+1,j,k) in the parent control network node cluster 50(i+1,j,k). Each multiplexer control circuit 54(i,j,k) is controlled by the diagnostic network 16 to selectively establish a connection from the control network node group 51(i,j,k) to one of the control network node groups 51(i+1,j,k) connected thereto in its parent control network node cluster 50(i+1,j). The connection so established is maintained until changed by the diagnostic network 16. The connections among the control network node groups 51(i,j,k) are configured to establish within the switched fat-tree structure one or more tree networks, with each tree network defining a partition. Each tree network so established within the control network 14 has a fat-tree structure, that is, a tree network in which connections are established between each control network node group 51(i,j,k) and one of the control network node groups 51(i+1,j,k) in its parent control network node cluster 50(i+1,j). In one particular embodiment, the control network node clusters 50(i,j) starting at level two have multiplexer/demultiplexers 53(i,j,k), and so it will be appreciated that in that embodiment the minimum number of consecutive leaves 21 in tree network, and thus in a partition, will be sixteen.

The control network node groups 51(i,j,k) and their respective multiplexer/demultiplexers 53(i,j,k) and multiplexer control circuits 54(i,j,k) can be configured by the diagnostic network 16 to form diverse tree networks within the control network 14, as will be described below in connection with FIGS. 4C-1 through 4C-3C. First, however, the structure of a control network node group 51(i,j,k) will be described in connection with FIG. 4B. The structure of a control network node group 51(i,j,k), which is shown in FIG. 4B, differs from the structure of a data router node group 20(i,j). With reference to FIG. 4B, a control network node cluster 50(i,j) includes three control network nodes 52(i,j,k,1), where 1 can have the values P, $C_1$, or $C_2$. Within a control network node cluster 50(i,j), the control network nodes are connected so that control network node 52(i,j,k,P) is parent of child control network nodes 52(i,j,k,$C_1$) and 51(i,j,k,$C_2$), all within the same control network node group 52(i,j,k). It will be appreciated that parent control network node 52(i,j,k,P) of control network node cluster 50(i,j) is itself a child of a control network node 52(i+1,j,k,$C_1$) or control network node 52(i+1,j,k,$C_2$) of a control network node cluster 50(i,j) of the next higher level i+1. Similarly, each child control network node 52(i,j,k,$C_1$) is a parent of either a leaf 21 or a control network node 52(i−1,j,k,P) of the next lower level i−1.

It should be noted that, in FIGS. 4A-1 through 4C-3C, the indices j for control network nodes 52(i,j,k,1) in each level increase from left to right. In the following, for each parent control network node 52(i+1,j,k,1), the child control network node 52(i,j,k,1) connected thereto with the lower index j will be termed the "left" child, and the control network node 52(i,j,k,1) with the higher index j will be termed the "right" child. If control network nodes 52(i,j,k,1) are in the same control network node group 52(i,j,k), they will have the same indices; in that case, the child control network node 52(i,j,k,$C_1$) will identify the "left" child, and child control network node 52(i,j,k,$C_2$) will identify the "right" child, both of parent control network node 52(i,j,k,P).

Each control network node group 51(i,j,k) thus contains two sub-levels of control network nodes 52(i,j,k,1), one defined by parent control network node 52(i,j,k,P), and the other defined by child control network nodes 52(i,j,k,$C_1$) and 52(i,j,k,$C_2$). This enables the control network node clusters 50(i,j) to have the same fan-out connection pattern within the control network 14 as the corresponding data router node groups 20(i,j) within the data router 15, while at the same time providing a two-child/one-parent connection for the control network nodes 52(i,j,k,1) which simplifies performance of the arithmetic operations as described below.

As in the data router 15, each connection between control network nodes 52(i,j,k,1) represents two unidirectional data paths, which transfer control network message packets in opposite directions between the respective nodes, and lines for propagating an error signal between the respective nodes.

The structure of control network 14 will be described in connection with FIGS. 4C-1 through 4C-3C. FIGS. 4C-1A through 4C-1C, when put together as shown in FIG. 4C-1, depict a portion of control network 14, specifically depicting control network node clusters 50(i,j) with connections available for a maximum of two hundred and fifty-six leaves 21, with processing elements 11 (not shown) being connected as leaves 21 toward the left and scalar processors 12 being connected toward the right. The portion depicted in FIG. 4C-1A through 4C-1C will accommodate one hundred and twenty eight processing elements 11 (not shown). Four scalar processors 12, identified as Scalar 1 through Scalar 4, are included, although any number up to the number of connections, that is one hundred and twenty eight, may be included.

Figures 1B, 4C:
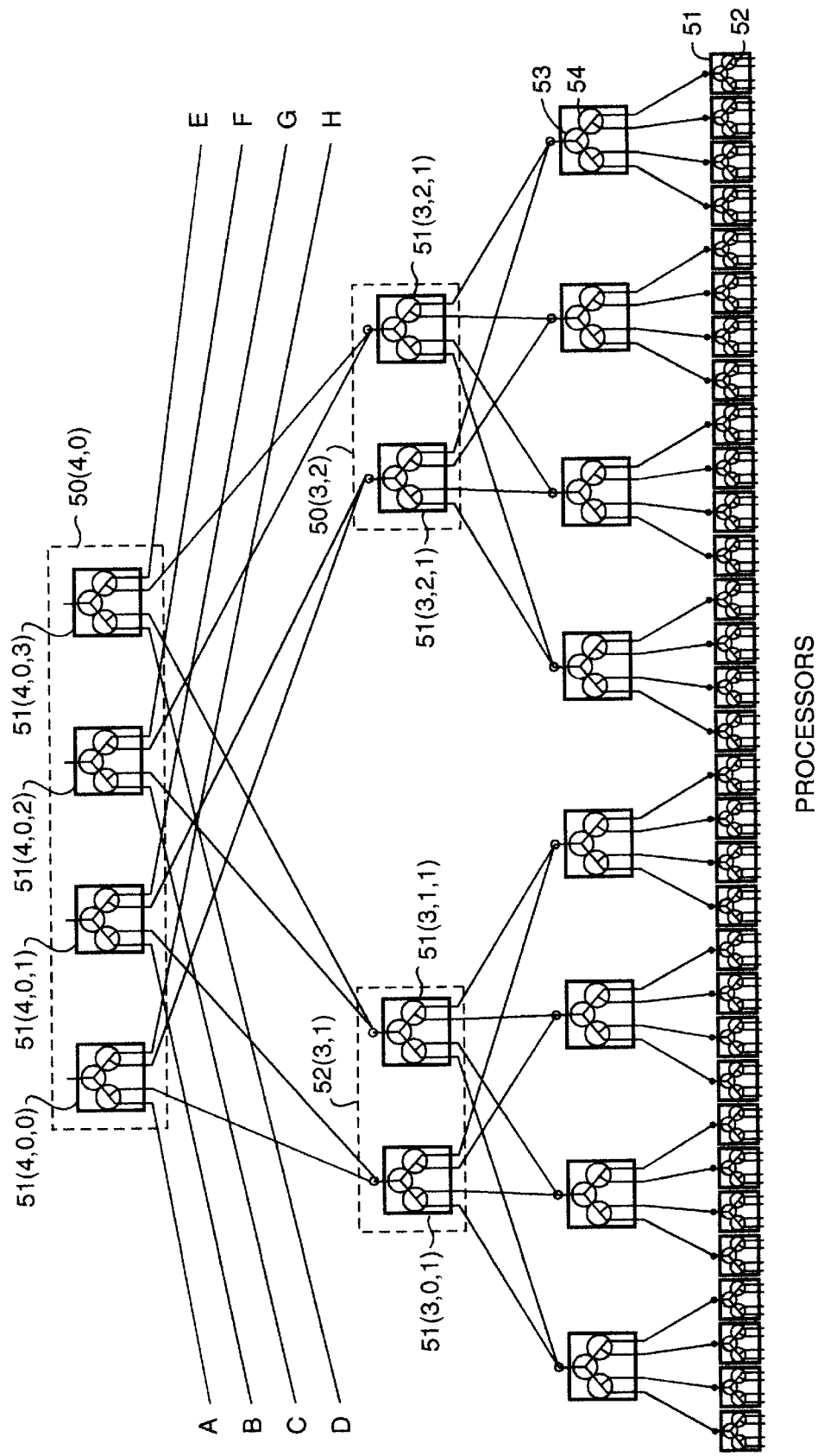
Figures 1C, 4C:
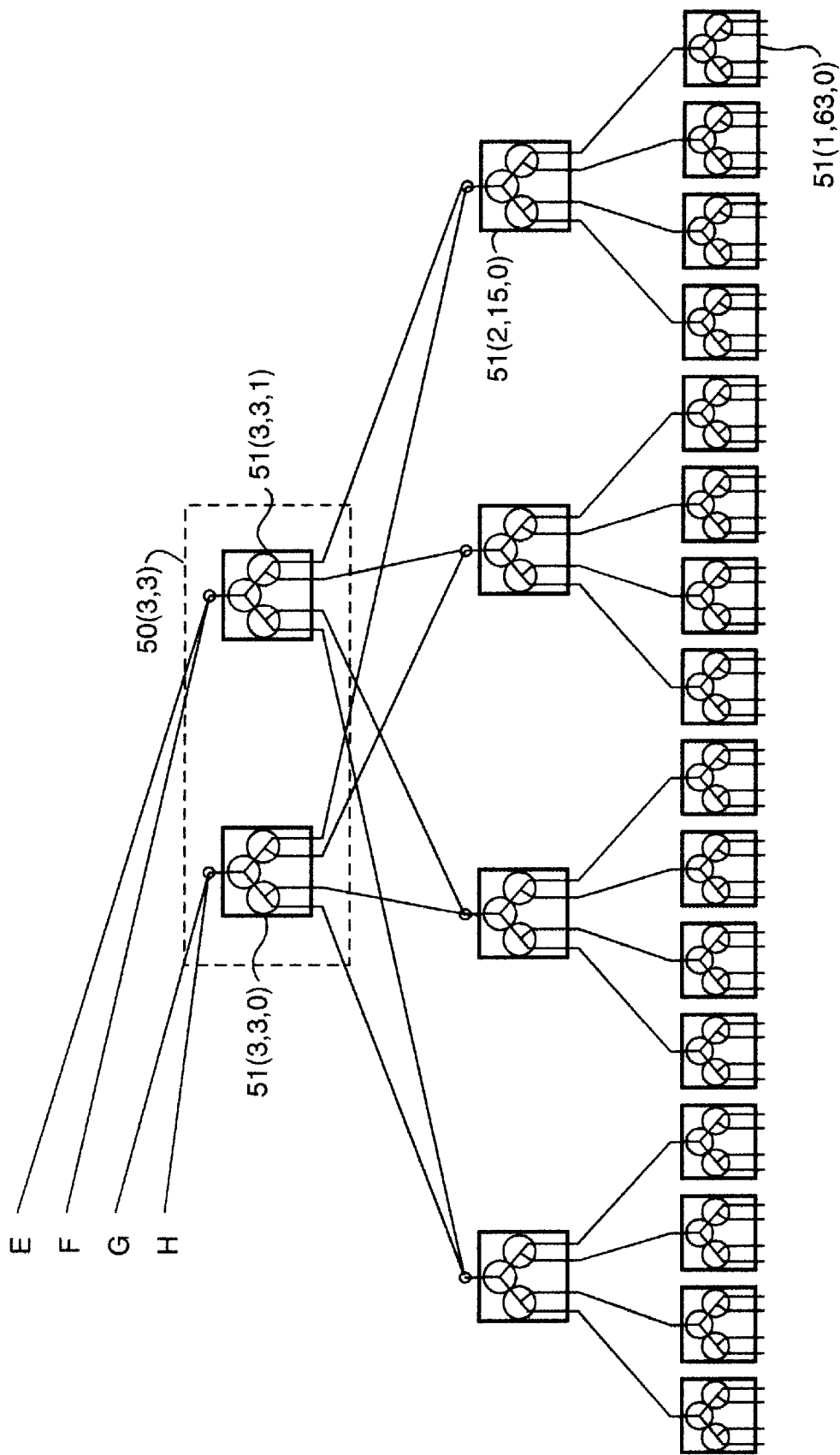
Figures 2A, 4C:
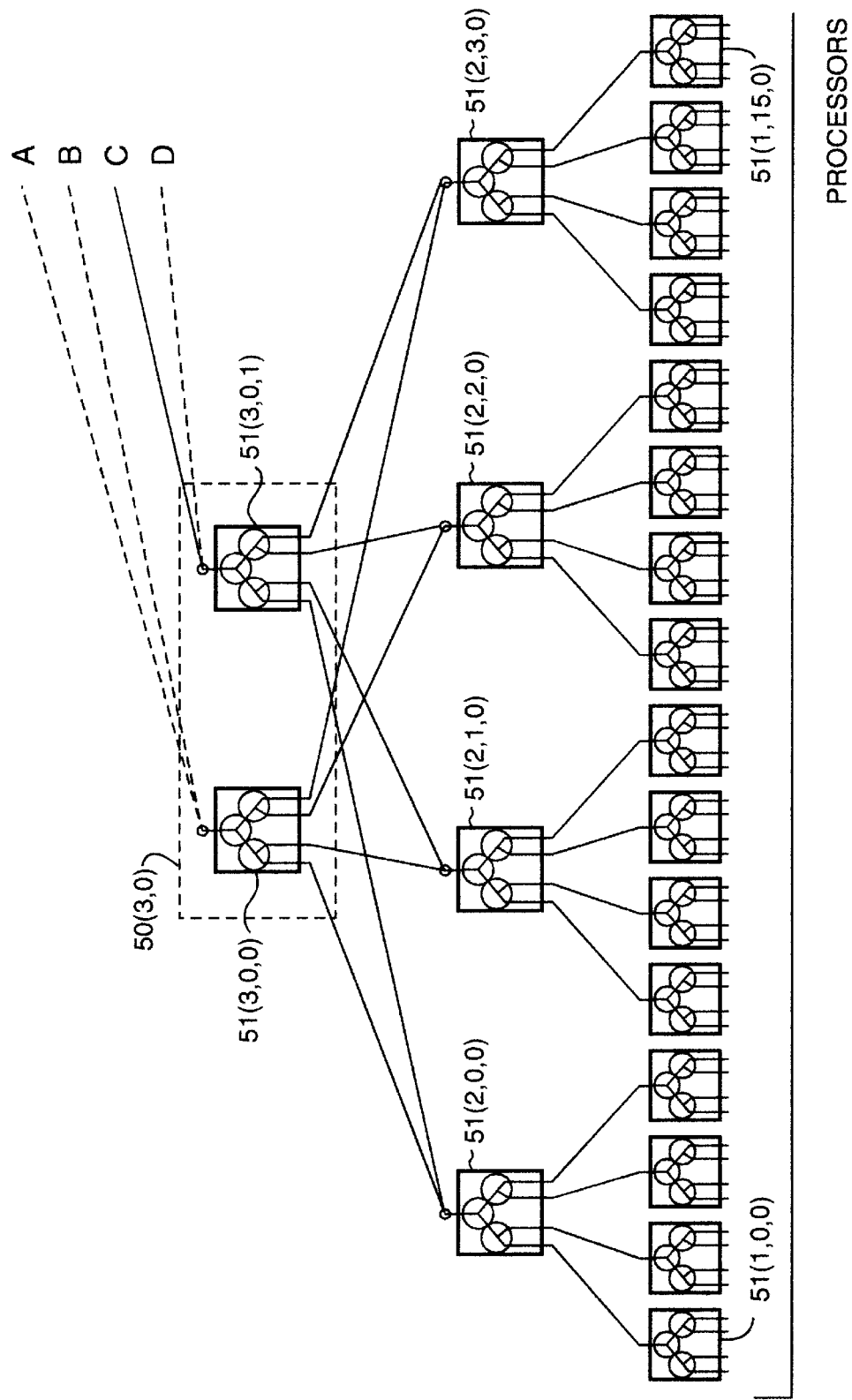
Figures 2B, 4C:
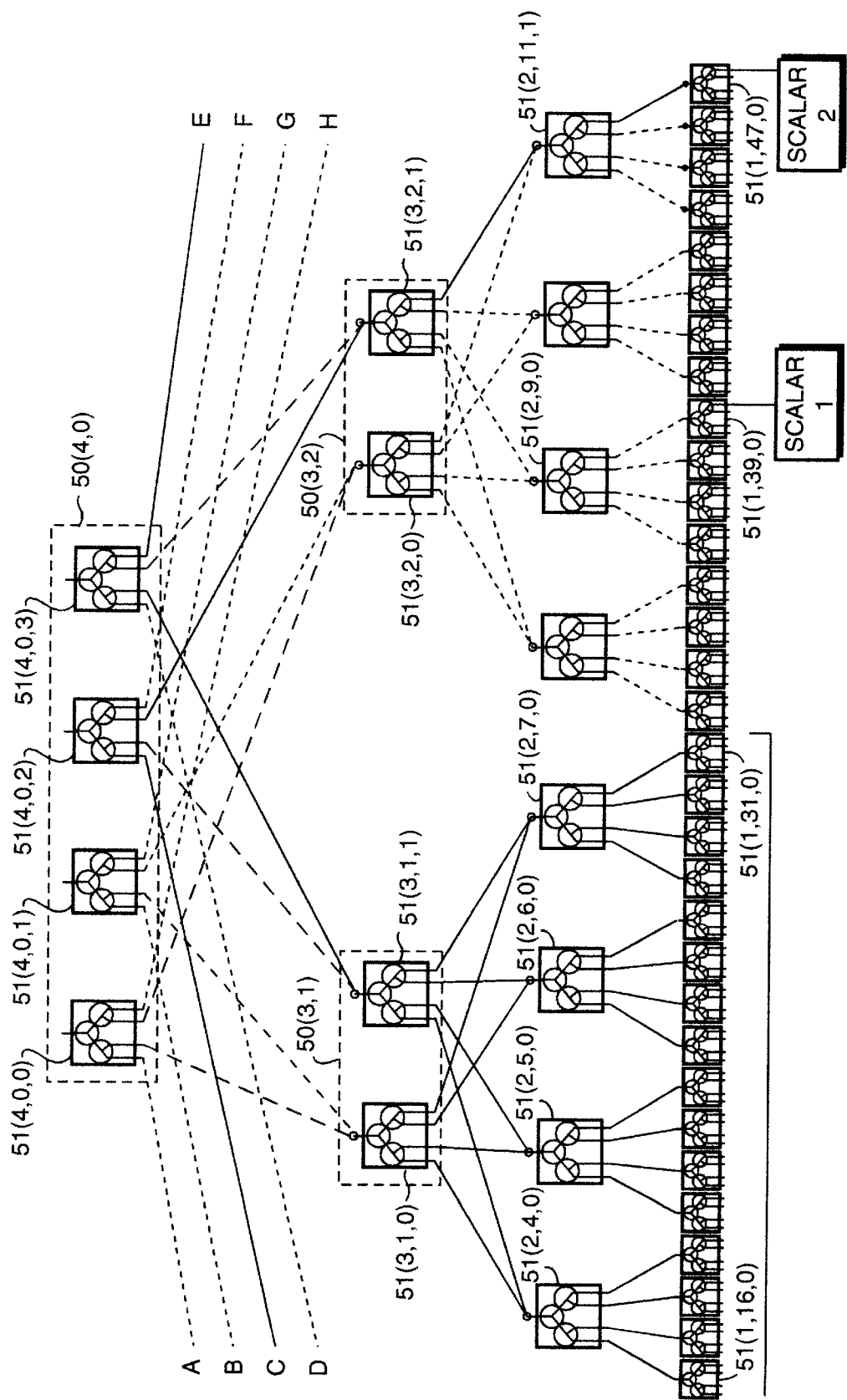
Figures 3B, 4C:
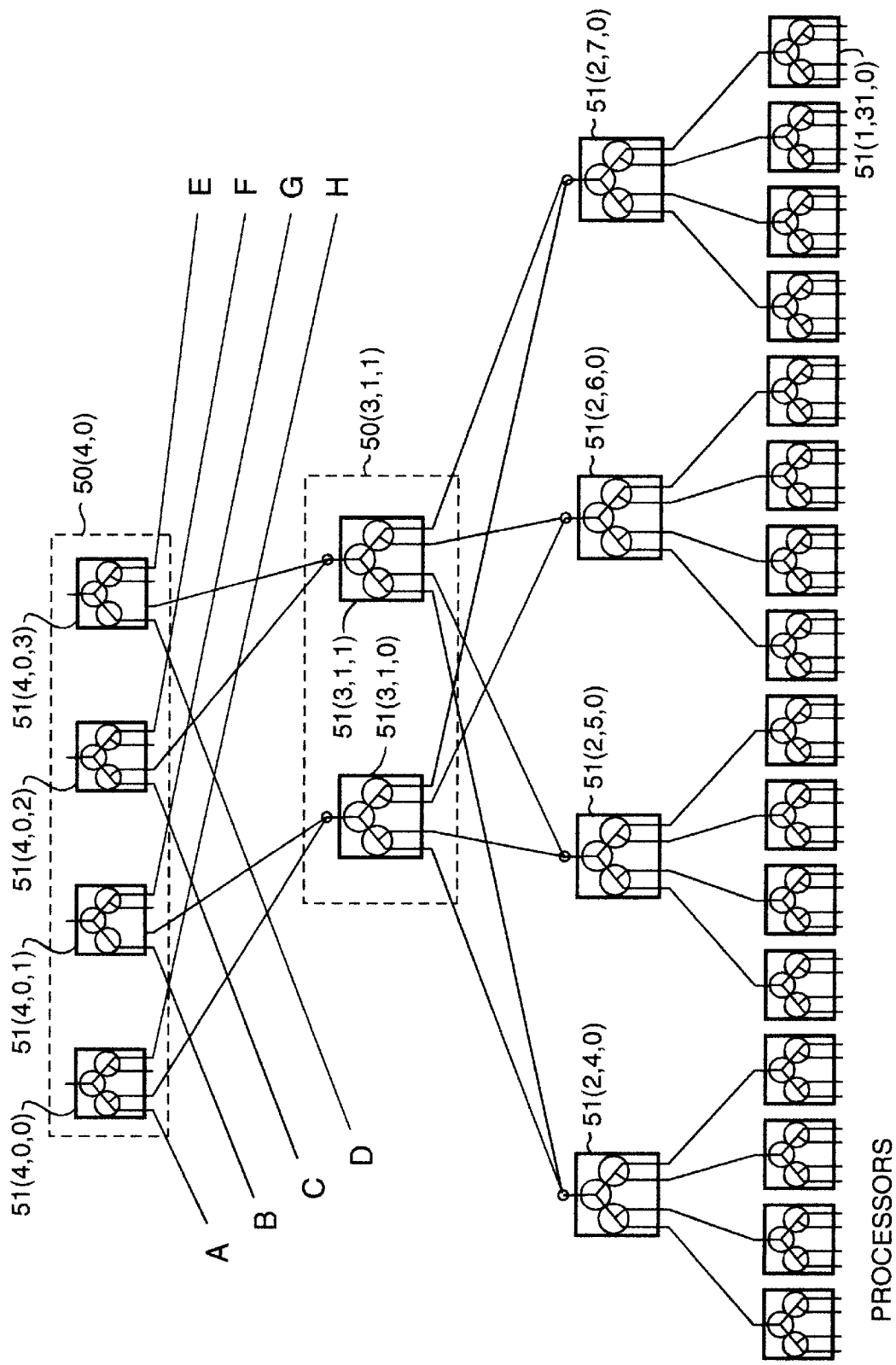
Figures 3C, 4C:
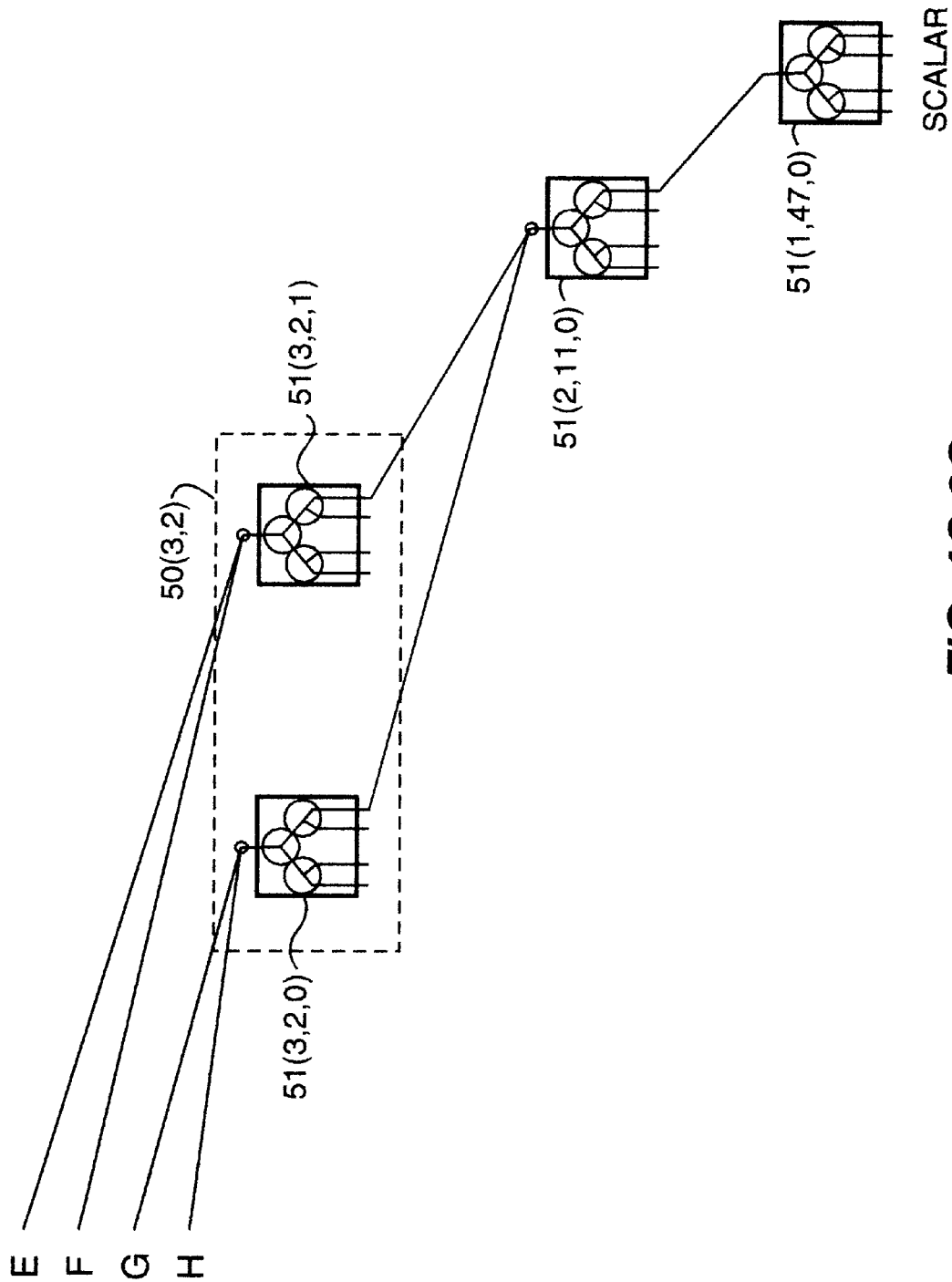

The portion of control network 14 depicted in FIGS. 4C-1A through 4C-1C comprises control network node clusters 50(i,j) organized into four levels. As described above, each control network node cluster 50(i,j) depicted in FIGS. 4C-1 through 4C-3C includes at least one control network node group 51(i,j,k), with the control network node clusters 50(3,j) and 50(4,0) above level two comprising multiple control network node groups. In FIGS. 4C-1 through 4C-3C, each control network node group 51(i,j,k) is represented as a box surrounding three circles each representing a control network node 52(i,j,k,1) (not identified by reference numeral in the Figs.). Each multiplexer/demultiplexer 53(i,j,k) and associated multiplexer control circuit 54(i,j,k) (neither of which are identified in FIGS. 4C-1 through 4C-3C by reference numeral) is represented in FIGS. 4C-1 through 4C-3C as a circle just above the associated control network node group 51(i,j,k). It will be appreciated that, if the control network 14 includes additional levels (not shown) which may accommodate connections for more than two hundred and fifty six leaves, the control network nodes groups 51(4,j,k) in the fourth level will also have associated multiplexer/demultiplexers 53(4,j,k) and multiplexer control circuits 54(4,j,k), which are not depicted in the figure. The additional connections may be used for additional processing elements 11 or scalar processors 12. They may also be used for input/output processors 13 and spare processing elements 11s.

As noted above, the control network node clusters 50(i,j), comprising respective control network node groups 51(i,j,k) and their associated multiplexer/demultiplexers 53(i,j,k) and multiplexer control circuits 54(i,j,k), can be configured to form diverse fat-tree networks within the control network 14. Each tree will include at least one leaf 21 comprising a scalar processor 12 and a plurality of leaves 21 comprising processing elements 11. This will be described in connection with FIGS. 4C-1 through 4C-2C. Effectively, the diagnostic network 16 conditions selected multiplexer control circuits 54(i,j,k) to establish a connection between its associated control network node group 51(i,j,k) and one of the two control network node groups 51(i+1,j,k) in the next higher level connected thereto. The multiplexer control circuits 54(i,j,k) of the control network node groups so conditioned are selected to form, from the switched fat-tree structure, a fat-tree network structure including a scalar processor 12 and a plurality of processing elements 11, with each tree thus formed defining a partition. Each fat-tree that is formed to create a partition includes one control network node group 51(i,j,k) within those of the control network node clusters 50(i,j) required to form a tree including the processing elements 11 and scalar processor 12, to be included in the partition, as well as any input/output processors 13 and spare processing elements 11s.

FIGS. 4C-2A through 4C-2C, when put together as shown in FIG. 4C-2, together depict the control network 14 as shown in FIGS. 4C-1A through 4C-1C, in which connections defining two partitions have been established, one including scalar processor 12 identified as "Scalar 2" and the other including scalar processor 12 identified as "Scalar 4." To form the partition including the Scalar 4 scalar processor, the multiplexer control circuits 54(i,j,k) condition the multiplexer/demultiplexers 53(i,j,k) to establish the connections among control network node groups 51(i,j,k) as depicted in heavy solid lines. Similarly, to form the partition including Scalar 2, the multiplexer control circuits 54(i,j,k) condition the multiplexer/demultiplexers 53(i,j,k) to establish the connections among control network node groups 51(i,j,k) as depicted in light solid lines. The other lines interconnecting the control network node groups 51(i,j,k) are depicted in broken lines.

It will be appreciated that the interconnections among the control network node groups 51(i,j ,k) to establish each partition establishes a tree of control network node groups. In the tree established for the partition including the Scalar 4 scalar processor 12, the root node comprises control network node group 51(4,0,3) in level 4, and connections are established through the respective multiplexer/demultiplexers 53(i,j,k) to include control network node group 51(3,1,1) in level 3, control network node groups 51(2,4,0) through 51(2,7,0) in level 2 and control network node groups 51(1,16,0) through 51(1,31,0) in level 1. This partition includes the processing elements 11 (not shown) which are connected to control network node groups 51(1,16,0) through 51(1,31,0). In addition, connections are established through the respective multiplexer/demultiplexers 53(i,j,k) to include control network node group 51(3,3,1) in level 3, control network node group 51(2,15,0) in level 2 and control network node group 51(1,63,0) in level 1, to provide an interconnection from scalar 4 to the root node 51(4,0,3) in level 4.

Similarly, in the tree established for the partition including the Scalar 2 scalar processor 12, the root node comprises control network node group 51(4,0,2) in level 4, and connections are established through the respective multiplexer/demultiplexers 53(i,j,k) to include control network node group 51(3,0,1) in level 3, control network node groups 51(2,0,0) through 51(2,3,0) in level 2 and control network node groups 51(1,0,0) through 51(1,15,0) in level 1. This partition includes the processing elements 11 (not shown) which are connected to control network node groups 51(1,0,0) through 51(1,15,0). In addition, the connections are established through the respective multiplexer/demultiplexers 53(i,j,k) to include control network node group 51(3,2,1) in level 3, control network node group 51(2,11,0) in level 2 and control network node group 51(1,47,0) in level 1, to provide an interconnection from scalar 4 to the other node 51(4,0,2) in level 4.

Although not shown in FIGS. 4C-1 through 4C-2C, as described above in connection with FIG. 1, the system 10 also includes input/output processors 13 and spare processing elements 11s, which may be connected to control network node groups 51(1,j,k) of higher index j than is shown in FIGS. 4C-1B and 4C-2B. In that case, additional levels of control network node clusters 50(i,j) will also be provided to connect the control network node groups 51(i,j,k) of higher index j to the control network node groups 51(i,j,k) shown in the Fig. A partition may be created including these components by establishing a root control network node group at a higher level, and conditioning the paths from the root node to the required processing elements 11, spare processing elements 11s, scalar processor 12 and input/output processors 13.

One particular embodiment of the system 10 comprises far fewer scalar processors 12 than, for example, processing elements 11. As shown in FIGS. 4C-1 through 4C-2C, in the section of the fat-tree comprising the control network 14 to which the scalar processors 12 are connected, scalar processors 12 are not connected to every child connection from the first-level control network node groups 51(1,j,k). In that case, the control network node groups 51(i,j,k) for which there is no connection to a scalar processor 12 need not be provided, as is shown in FIGS. 4C-3 through 4C-3C. FIGS. 4C-3A through 4C-3C, when put together as shown in FIG. 4C-3, depict a section of the portion of the control network 14 depicted in FIGS. 4C-1 through 4C-2C, specifically including all control network node groups 51(1,0,0) connected to processing elements 11, and control network node groups 51(1,47,0), 51(2,11,0), and 51(3,2,1) that are necessary to interconnect the Scalar 2 scalar processor 12 and the control network node cluster 50(4,0). As depicted in FIGS. 4C-3A through 4C-3C, the control network node groups 51(1,40,0) through 51(1,46,0) in the first level, none of which are not connected to a scalar processor 12, and control network node group 51(2,10,0) in the second level, which would be connected only to the control network node groups 51(1,40,0) through 51(1,46,0) in the first level, are not provided. Similarly, control network node groups 51(i,j,k) need not be provided in connection with other types of leaves 21 if specific leaves are not provided in the system 10.

As noted above, the scalar processors 12 use the control network 14 to broadcast commands to the processing elements 11. In this operation, a scalar processor 12 transmits a control network message packet, which will be described below in detail in connection with FIG. 5, to the control network node 52(1,j,k,C$_1$) to which it is connected. Each control network node 52(i,j,k,1), as it receives a control network message packet from one or more children, generates therefrom and from status information as described below, a control network message packet, which may include the command, which it transfers to its parent. This continues up the tree to the root node 52(M,0,k,P). The root node, in turn, begins generating therefrom and from status information which it receives, a control network message packet for transmission to its children, which packet also may include the command. This procedure is repeated as the command is transmitted, in message packets generated and transmitted from control network node to control network node down the tree to its children. As each control network node receives such a downward-going message packet, it generates packets including the command for transmission to all of its children, which continues until the command is delivered to the leaves 21 in the scalar processor's partition. The control network 14 thus effectively broadcasts the command to all of the processing elements 11. It will be appreciated that the message packet will be received at leaves 21 comprising scalar processors 12 and input/output processors 13, but these processors can be configured to ignore the command or otherwise use the command in their operations.

Commands from the scalar processors 12 may also be used to control the control network 14. In particular, commands from a scalar processor 12 may control the operation of control network node groups 51(i,j,k) in its partition. Commands from a scalar processor 12 may be used to establish a particular parent node 52(i,j,k,P) in a control network node group 51(i,j,k) as a logical root. As described above, the parent nodes 50(M,0,k,P) of the control network node cluster 50(M,0) jointly constitute the "physical root" of the switched fat-tree comprising the control network 14. A logical root may be located at the control network node group 51(M,0,k) at the physical root in the partition or it may be located at a control network node group 51(i,j,k) at a lower level. In either case, the logical root effectively comprises the root of a sub-tree within the partition whose leaves include at least the scalar processor 12 and one or more other leaves 21 in the partition. If a control network node 52(i,j,k,1) becomes a logical root, while it is a logical root its parent node 52(i+1,j,k, 1) in the control network 14 does not transmit downward-going message packets thereto. To facilitate establishment of a logical root, each control network node 52(i,j,k,1) includes a root flag 103 (FIG. 4B). When the root flag 103 is set as described below, the control network node 52(i,j,k,1) is a root of the control network 15. If the control network node 52(i,j,k,1) is to be a physical root, the root flag 103 may alternatively be set by appropriate conditioning of an input signal that controls the control network node. To establish a control network node 52(i,j,k, 1) as a logical root, the scalar processor 12 generates a command therefor, termed herein a "configuration" command, which it transmits in a control network message packet up the tree comprising control network 14. The message packet includes a height value identifying the level and sub-level at which the logical root is to be established. Each control network node 52(i,j,k,1) which receives the configuration command determines whether the height value corresponds to its level and sub-level, and if not passes the command in a message packet to the next control network node 51(i,j,1) up the tree. When a control network node 52(i,j,k,1) determines that the height value in the configuration command corresponds to its level and sub-level, it sets its root flag 102 and begins operating as a root node as described above. In connection with that, the control network node 52(i,j,k,1) notifies its parent control network node 52(i+1,j,k,1) that it is a logical root.

It will be appreciated that a scalar processor 12 may generate a configuration command to enable a control network node 52(i+x,j,m) at a higher level or sub-level to operate as a logical root. A scalar processor 12 may issue such a configuration command to, for example, increase the number of processing elements 11 in the partition, or to add input/output processors 13 or spare processors 11s to the partition. In addition, a scalar processor 12 may issue such a configuration command to add scalar processors 12 to the partition, which may, for example, permit them to jointly control the partition. In that event, the control network node 52(i,j,k,1) will receive a control network message packet including the configuration command, which will enable the control network node 52(i,j,k,1) currently operating as a logical root to clear its root flag 102, which, in turn, enables it to stop operating as a logical root. At that point, the control network node 52(i,j,k,1) begins transmitting a message packet, including the configuration command, to its parent control network node 52(i+1,j,k,1). When the configuration command reaches the control network node 52(i,j,k,1) at the level and sub-level identified in the configuration command, that node will set its root flag 102 and begin operating as a logical root.

To simplify the following description, the term "root node," which may appear with or without the reference numeral 52(i,j,k,1), will be used to generally refer to the physical root control network node 52(M,0,k,P) and to a control network node 52(i,j,k,1) comprising a logical root.

As noted above, the control network nodes 52(i,j,k,1) comprising a partition in the control network 14 also performs several types of arithmetic operations in response to control network message packets therefor, including scan and reduce operations. Scan operations are generally described in Guy E. Blelloch, *Scan Primitives and Parallel Vector Models*, (Ph.D. Dissertation, Massachusetts Institute of Technology: 1988). In a scan operation initiated by processing elements 11 that are logically arranged in a particular ordering, such as with increasing indices i in reference numeral 11(i) (with indices increasing, for example, from left to right as shown in FIG. 4B), the scan operation for a particular arithmetic operator "*" on items of data D(i) maintained by the processing element 11 (i) produces at each of the successive processing elements 11 in the ordering the result R(i):

$$R(i)=D(0)*D(1)*D(2)*\cdot* \text{---} *D(i-1), \text{ with } R(0)=0 \qquad [\text{Eqn. 1}]$$

In the scan operation, the arithmetic operator may constitute a number of types of operators, including, for example, signed or unsigned addition, OR, XOR (exclusive-OR) and MAX, the latter referencing determination of a maximum of a set of values.

The structures of all of the control network nodes 52(i,j,k, 1) are similar, and so the structure of only one control network node, namely, node 52(1,0,0,P) is shown in detail in FIG. 4B, which will be described in detail below. To accommodate scan and reduce operations, each control network node 52(i,j,k) includes an up message assembler 100, a down message assembler 101, a scan buffer 105 and a segment flag 106. To initiate a scan operation, the processing elements 11 transfer control network message packets therefor over the control network 14. The control network message packet provided by each processing element 11 (i) includes that processing element's data item D(i). With reference to FIG. 4B, each control network node 52(1,j,k, $C_1$) and 52(,j,k,$C_2$), on receiving a message packet from the processing elements 11 connected thereto, loads the data from the processing element 11 comprising its left child, that is, the processing element 11(i) with the index i being zero or an even number, into its scan buffer 105. In addition, the up message assembler 100 of each control network node 52(1,j,k,$C_1$) performs the arithmetic operation on the data to generate a result that corresponds to the combination of the data received from the two processing elements 11 connected thereto, combined according to the arithmetic operator being used in the scan operation. The control network node 52(1l, j,k,$C_1$) uses the value generated by the up message assembler 100 as data in a message packet, which it transmits to its parent.

Each control network node 52(i,j,k, 1), except for the root node, on receiving message packets from both its left and right children, performs the same series of operations. In particular, each control network node $52(i,j,k,1)$ at each sub-level up to the root node:

(a) stores in its scan buffer 105 the data in the control network message packet that it receives from its left child control network node $52(i-1,j,k,1)$; it will be appreciated that this value corresponds to the combination of the data from the processing elements in the sub-tree of the control network 14 whose root is the left child control network node $52(i,j,k,1)$, combined according to the arithmetic operator being used in the scan operation, and (b) performs, using its up message assembler 100 the operation, defined by the arithmetic operator being used in the scan operation, in connection with data from both of its children to generate a value which it uses in generating a control network message packet for transmission to its parent; it will be appreciated that this value corresponds to the combination of the data from the processing elements in both sub-trees of the control network 14 whose roots are both child control network nodes $52(i-1,j,k,1)$ connected thereto.

Thus, at the point at which a control network message packet has been received by the root node, the scan buffer 105 at each control network node $52(i,j,k,1)$, other than the root node, contains a value corresponding to the data provided by the processing elements 11 in the sub-tree whose root is the node's left child, processed according to the scan operation's arithmetic operator. The root node receives, from each child, a value corresponding to the data provided by the processing elements 11 in the sub-tree whose root is the respective child, processed according to the scan operation's arithmetic operator. It will be appreciated that the value received from the left child control network node corresponds to the combination of the data from the processing elements in the sub-tree of the control network 14 whose root is that left child control network node, and the value received from the right control network node corresponds to the combination of the data from the processing elements in the sub-tree whose root is the right control network node, in both cases the data being combined according to the scan operation's arithmetic operator.

When the root node receives message packets from both of its children containing intermediate results for the scan operation, it transmits message packets to its children to initiate completion of the scan operation. To its left child, the root node transmits a message packet whose data has the value zero. To its right child, the root node transmits a packet whose data has the value received from the left child. As noted above, that value corresponds to the combination of the data from the processing elements in the sub-tree of the control network 14 whose root is that left child control network node, combined according to the scan operation's arithmetic operator.

When each control network node $52(i,j,k,1)$ below the root node receives a control network message packet from its parent, it (a) uses the down message assembler 101 to generate a value corresponding to the value of the data received from the parent combined with the intermediate result stored in the nodes' scan buffer 105 according to the arithmetic operator used in the particular scan operation, which it uses in generating a control network message packet for transmission to its right child; it will be appreciated that this value corresponds to the combination of the data from the processing elements 11 in all sub-trees of the control network 14 up to the one whose root is the left child of the control network node, combined according to the arithmetic operator being used in the scan operation, and (b) generates a control network message packet for transmission to its left child, the control network message packet having data with the same value as that in the packet received from the parent; it will be appreciated that this value corresponds to the combination of the data from the processing elements in all sub-trees of the control network 14 up to the one whose root is the left child of the parent of the control network node, combined according to the arithmetic operator being used in the scan operation.

Thus, the control network message packets transmitted by the control network nodes $52(i,j,k,1)$ down the tree will propagate the zero value down the left side to the left-most processing element, such as, for example, processing element 11(0). The next processing element 11(1) will receive the combination, as defined by the arithmetic operator, of the zero value propagated from the root node and the value stored in the scan buffer 105 of the control network node $52(1,0,k,C_1)$, which corresponds to the value of the data transmitted by the processing element 11(0).

The next processing element 11(2) will receive, as the left child connected to the control network node $52(1,0,k,C_2)$, the value stored in the scan buffer 105 of the control network node $52(1,0,k,P)$, which, as noted above, corresponds to the combination, as defined by the scan operation's arithmetic operator, of the data from the processing elements 11(0) and 11(1). The processing element 11(3) will receive, as the right child, the combination of that value and the value in the scan buffer 105 of control network node $52(1,0,k,C_2)$, which, as noted above, corresponds to the data provided by the processing element 11(2). Accordingly, the processing element 11(3) will receive the combination, as defined by the scan operation's arithmetic operator, of the data from processing elements 11(0), 11(1) and 11(2).

It will be appreciated that the control network nodes 52 will similarly combine the data provided to the successive processing elements 11 in the sub-tree of the root node's left child. Accordingly, each processing element 11(i) in that sub-tree will receive a value corresponding to the data from processing elements 11(i−1) through 11(0) combined according to the arithmetic operator of the particular scan operation.

The control network nodes $52(i,j,k,1)$ in the sub-tree of the root node's right child also combine the data in the control network message packet provided by their respective parents with the data in their respective scan buffer 105 in a similar manner. As noted above, the root node transmits to its right child a control network message packet including a value corresponding to the combination of the data provided by the processing elements 11 in the sub-tree defined by the root node's left child, combined according to the scan operation's arithmetic operator. It will be appreciated that the control network message packets transmitted by the control network nodes $52(i,j,k,1)$ in that sub-tree will propagate that value down the left side of the sub-tree to the left-most processing element 11(i), so that that processing element 11(i) also receives a value corresponding to data from processing elements 11(i−1) through 11(0) combined according to the arithmetic operator of the particular scan operation. Since the control network nodes $52(i,j,k,1)$ in that sub-tree operate in a manner similar to those in the sub-tree defined by the root node's left child, each processing element 11(i) will receive a value corresponding to data from processing elements 11(i−1) through 11(0) combined according to the arithmetic operator of the particular scan operation.

The control network 14 can also perform a backward scan operation, in which the scan direction is from right to left, that is, toward processing elements 11(i) of lower indices. In that case, each processing element 11(i) will receive a value corresponding to data from processing elements 11(i+1) through 1(N) (where N is the highest index) combined according to the arithmetic operator of the particular scan operation. In that operation, each control network node 52(i,j,k,1) interchanges control network message packets that it receives at its input terminals from its children, and also the control network message packet that it transmits through the outputs to its children, and otherwise operates similar to that above. This effectively interchanges the left and right children at each level, so that if the control network nodes 52 otherwise operate as described above, the scan direction will be reversed.

In addition, the control network 14 can perform a segmented scan operation, in which the processing elements 11 of a partition may be divided into two or more segments. In each case, the first processing element 11(i) in the first segment is the first processing element 11(i) in the partition. The first processing element 11(i) in each succeeding segment transmits a control network message packet in which a segment bit is set. Each control network node 52(i,j,k,1) also includes a segment flag 106 (FIG. 4B). Each control network node 52(i,j,k,1) operates as described above, except that in transmitting control network message packets up the control network tree:

(a) if it receives a control network message packet from its right child in which the segment bit is set, it transmits in a control network message packet to its parent data corresponding only to the data in the control network message packet received from the right child; and (b) if it receives a control network message packet from either child in which the segment bit is set, it sets its segment flag 106, and sets the segment bit in the control network message packet it that transmits to its parent.

In either case, the control network node 52 buffers the data received from the left child control network node in its scan buffer 105, in the same manner as in an unsegmented scan operation as described above.

In connection with control network message packets that are transmitted down the control network tree, each control network node 52, if its segment flag 106 is set, transmits to its right child a control network message packet whose data corresponds to the value stored in the scan buffer 105. The control network node 52 transmits to it left child a control network message packet whose data corresponds to the data from its parent, in the same manner as the unsegmented scan operation described above.

It will be appreciated that the first processing element 11(i) which is the first in each segment, other than the processing element 11(i) comprising the first in the partition, will not receive the value zero, as required in Eqn. 1 above. However, since those processing elements 11, in initiating the scan operation transmitted control network message packets whose segment bits were set, they are aware that they are the first processing elements 11(i) in their respective segments, and can interpret the value received as zero.

A reduce operation for a particular arithmetic operator "*" on items of data D(i) maintained by the processing elements 11(i) produces at all of the processing elements 11 the same result R:

$$R = D(0)*D(1)*D(2)* \text{ - - - } *D(i) \qquad [\text{Eqn. 2}]$$

In a reduce operation, the arithmetic operator may constitute a number of types of operators, including, for example, signed or unsigned addition, OR, XOR and determination of a maximum. In performing a reduce operation, the processing elements 11 transfer message packets therefor to the respective control network nodes 51(1,j,k) of the control network 14. The message packet provided by each processing element 11(i) includes that processing element's data item D(i). With reference to FIG. 4B, each control network node 52(1,j,k,$C_1$), on receiving a message packet from the processing elements connected thereto, performs the operation specified by the mathematical operator to generate an intermediate result, which it transmits in a message packet to its parent node 52(1,j,k,P).

This operation is repeated at successive parent nodes at higher levels in the tree comprising control network 14 until message packets reach the root node. When the root node receives message packets from both of its children, it performs the operation specified by the mathematical operator on the data from its two children to generate a result value. The root node generates message packets whose data is the result value and transmits them to both of its children. Each of the control network nodes 52(i,j,k,1) that receives such a message packet repeats it to both of its children, until they reach the processing elements 11, thereby broadcasting the result to all of the processing elements 11.

As noted above, the leaves 21(i) may comprise a processing element 11 or 11s, a scalar processor 12 or an input/output processor 13. In the above description, only the processing elements 11(i) have been indicated as engaging in scan operations and reduce operations. It will be appreciated, however, that scalar processors 12(i) and input/output processors 13(i) may, along with processing elements 11(i), also engage in such operations. Alternatively, the scalar processors 12(i) and input/output processors 13(i) may abstain from the scan and reduce operations. They may accomplish this either by transmitting control network message packets which contain data having a value of zero, or by transmitting a special type of control network message packet, described below as an abstain type, which the control network nodes 52(i,j,k,1) may treat as containing data having the value zero, or ignore in generating control network messages for transmission to their respective parent nodes.

As noted above, each processing element 11 maintains a message counter which counts data router message packets it transmits and receives over the data router 15. The processing element 11 increments the message counter when it transmits a data router message packet over the data router 15 and decrements the counter when it receives a data router message packet over the data router 15 during a message transfer operation. It will be appreciated that during a message transfer operation some processing elements 11 may transmit more data router message packets than they receive, and thus at the end of the message transfer operation the message counter will have a positive value. On the other hand, some processing elements 11 may receive more data router message packets than they transmit during the message transfer operation, in which case the message counter will have a negative value at the end of the message transfer operation.

The processing elements 11 use the control network 14, in particular enabling a reduce operation, to determine when the data router 15 is empty, that is, when the data router 15 has delivered all data router message packets to processing elements 11. More specifically, each processing element 11, after it transmits all of its data router message packets for the message transfer operation, begins periodically transmitting control network message packets specifying a reduce operation, with signed addition as the arithmetic operator. The data in each control network message packet is the current value of the processing element's message counter. The processing elements 11 iteratively transmit such control network message packets until they receive a control network message packet whose data has the result value of zero. It will be appreciated that, at that point the processing elements 11 have collectively received as many data router message packets as they transmitted during the message transfer operation, and so the data router 15 will be empty of data router message packets.

As noted above in connection with the description of the data router 15, the data router node groups 20(i,j) receive corresponding AFD (i,j) all-fall-down signals from the control network 14. As shown in FIG. 4A-1 through 4B, each control network node cluster 50(i,j) generates the AFD(i,j) signal, which is coupled to the corresponding data router node groups 20(i,j) in the data router. The control network nodes 52(i,j,k,1) control the condition of an all-fall-down status bit 81, described below in connection with FIG. 5, in the respective control network message packets they generate for transmission to their respective parent nodes, with the condition of the bit in an outgoing control network message packet depending on the conditions of the all-fall-down status bits 81 in the control network message packets they contemporaneously receive from their child nodes or the leaves 21 connected thereto.

In addition, the parent control network node 52(i,j,k,P) in a cluster 50(i,j) generates, in response to the condition of the all-fall-down status bits 81 in the contemporaneously received control network message packets, corresponding AFD(i,j,k) all-fall-down node signal(s) from which the AFD(i,j) all-fall-down signal is generated for transmission to the data router node groups 20(i,j) having the same indices i and j. In particular, a parent control network node 52(i,j,k,P) asserts the AFD(i,j,k) all-fall-down node signal if it contemporaneously receives control network message packets from both of its child nodes 52(i,j,k,$C_1$) and 52(i,j,k,$C_2$) in which the all-fall-down status bits are set. Since each control network node 52(i,j,k,1), including the child nodes 52(i,j,k,$C_1$) and 52(i,j,k,$C_2$), set the all-fall-down status bits 81 in an outgoing control network message packet if the all-fall-down status bits 81 in contemporaneously-received control network message packets are also set, control network node groups 51(i,j,k) in a sub-tree of a partition will assert their respective AFD(i,j,k) all-fall-down node signals if all leaves 21 within the sub-tree are contemporaneously transmitting control network message packets in which the all-fall-down bits 81 are set. This ensures that AFD(i,j) all-fall-down signals are asserted, enabling data router nodes 22(i,j,k) in data router node groups 20(i,j) having corresponding indices i and j to go into the above-described all-fall-down mode, in a sub-tree of the data router 15 in which the leaves 21 are transmitting control network message packets in which all-fall-down bits 81 are set.

If a control network node cluster 50(i,j) comprises one control network node group 51(i,j,k), such as in the first two levels, the AFD(i,j,k) all-fall-down node signal constitutes the AFD(i,j) all-fall-down signal that is coupled to all of the corresponding nodes 22(i,j,k) of the data router node groups 20(i,j) in the data router 15. On the other hand, if the control network node cluster 50(i,j) includes a plurality of control network node groups 51(i,j,k), as is the case in node clusters 50(i,j) above the second level, the control network node cluster 50(i,j) includes an AFD select circuit 55(i,j) to receive the various AFD(i,j,k) node all-fall-down signals from the control network node groups 51(i,j,k) in the cluster 50(i,j) and generate therefrom one AFD(i,j) all-fall-down signal, which is coupled to all of the nodes 22(i,j,k) of the corresponding data router node groups 20(i,j) in the data router 15. In particular, the AFD select circuit 55(i,j) is configured to selectively couple as the AFD(i,j) all-fall-down signal, the AFD(i,j,k) node all-fall-down signal generated by the one control network node group 51(i,j,k) in the cluster 50(i,j), if any, that is included in the tree defining the partition. It will be appreciated that at most one control network node group 51(i,j,k) within a cluster 50(i,j), namely, the one included in the tree defining the partition, should be enabled to assert its AFD (i,j,k) node all-fall-down signal. If any control network node group 51(i,j,k) in a cluster 50(i,j) is included in the tree defining the partition, the AFD select circuit 55(i,j) ensures that only that node group's AFD(i,j,k) node all-fall-down signal is used in generating the AFD (i,j) all-fall-down signal coupled to the associated data router node group 21(i,j).

Figure 4D:
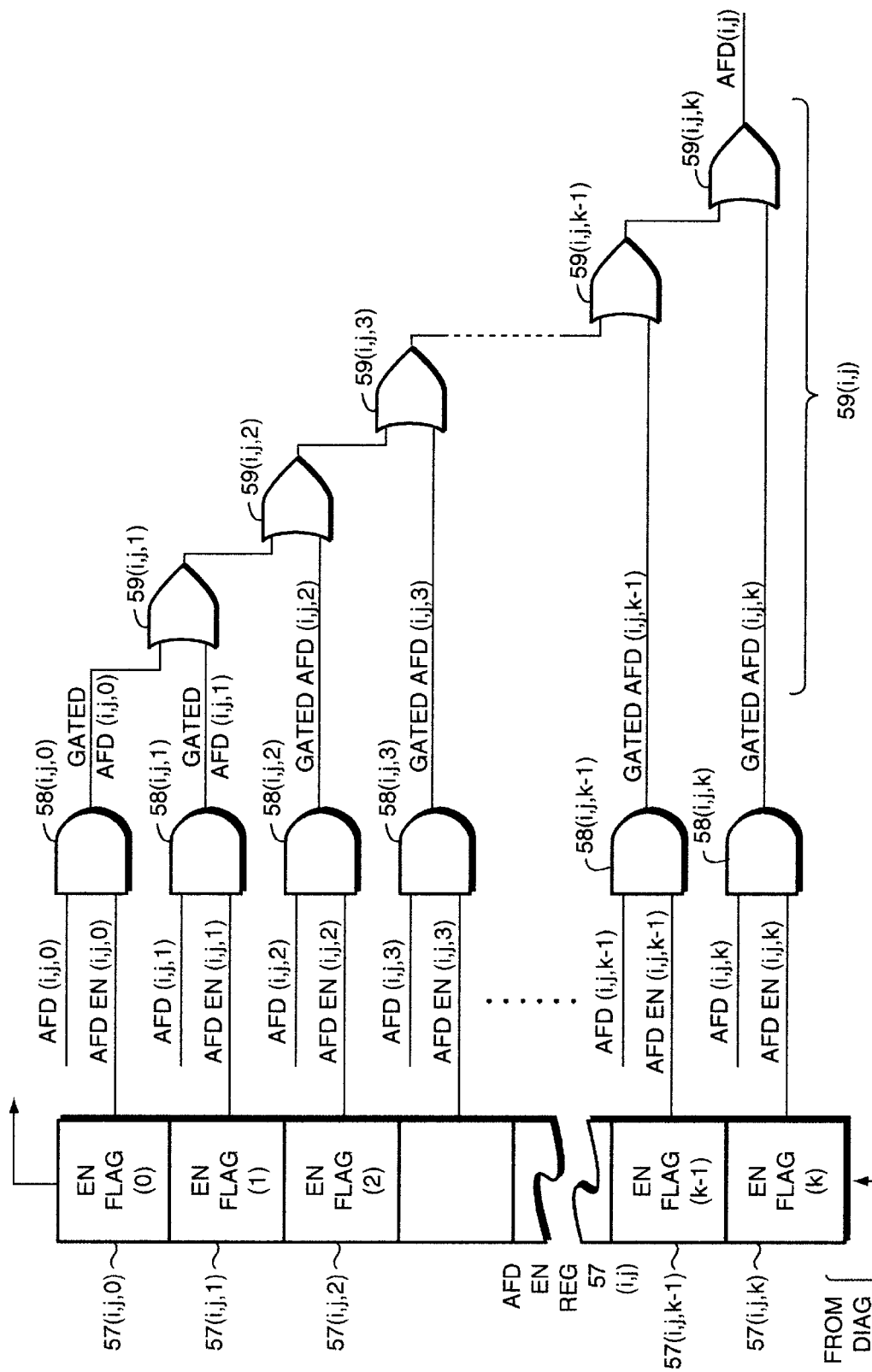

The structure of an AFD select circuit 55(i,j) is depicted in FIG. 4D. With reference to FIG. 4D, the AFD select circuit 55(i,j) includes a mask register 57(i,j), identified on the figure as an "all-fall-down enable" register, including a number of enable flags 57(i,j,k) each associated with one of the control network node groups 51(i,j,k) in the cluster 50(i,j). An enable flag 57(i,j,k) is associated with a control network node group 51(i,j,k) in a cluster 50(i,j) if the indices i, j, and k in the reference numerals 50(i,j), 51(i,j,k) and 57(i,j,k) are all the same. The mask register 57(i,j) is a shift register that is loaded by the diagnostic network 16 so that one enable flag 57(i,j,k) is set and the others are clear. The enable flag 57(i,j,k) that is set is the one associated with the control network node group 51(i,j,k) that is included in the tree defining the partition.

Each enable flag 57(i,j,k) generates an AFD EN (i,j,k) all-fall-down enable signal that controls one input terminal of an AND gate 58(i,j,k). It will be appreciated that at most one enable flag 57(i,j,k) in the register 57(i,j) will assert its AFD EN (i,j,k) all-fall-down enable signal at any one time, and so only the one associated AND gate 58(i,j,k) will be enabled at a time. The other input terminal of each AND gate 58(k) receives the AFD (i,j,k) node all-fall-down signal from the associated control network node group 51(i,j,k). The enabled AND gate 58(i,j,k) associated with the set enable flag 57(i,j,k) will thus be energized when the control network node group 51(i,j,k) asserts its AFD(i,j,k) node all-fall-down signal, thereby asserting its GATED AFD(i,j,k) gated node all-fall-down signal, and will be negated when that node group's AFD(i,j,k) node all-fall-down signal is not asserted. Since the other AND gates, that is, those AND gates associated with clear enable flags, are not enabled, they will not be energized regardless of the conditions of the AFD (i,j,k) node all-fall-down signals of their associated node groups 51(i,j,k), and so their GATED AFD (i,j,k) gated node all-fall-down signals will remain negated.

The GATED AFD (i,j,k) gated node all-fall-down signals are coupled to an OR network 59(i,j) which generates therefrom the single AFD (i,j) all-fall-down signal that is coupled to all of the nodes 22(i,j,k) of the associated data router node group 20(i,j). The OR network 59(i,j) comprises a chain of OR gates 59(i,j,k), with the first OR gate 59(i,j,1) in the chain receiving the GATED AFD (i,j,1) and GATED AFD (i,j,1) gated node all-fall-down signals from corresponding AND gates 58(i,j,0) and 58(i,j,1). Each of the other OR gates 59(i,j,k) (the index k being greater than 1) in the OR network 59(i,j) receives the output signal from the preceding OR gate 59(i,j,k−1) in the chain and the GATED AFD(i,j,k) gated node all-fall-down signal from the AND gate 58(i,j,k). The output signal of each OR gate 59(i,j,k) is asserted if any of the GATED AFD (i,j,k) gated node all-fall-down signals is asserted, and is otherwise negated. The last OR gate 59(i,j,K) in the chain generates the AFD (i,j,) all-fall-down signal, which is asserted if any of the GATED AFD (i,j,k) gated node all-fall-down signals is asserted.

As noted above, the data router node groups 20(i,j), specifically associated OR gates 23(i,j) assert corresponding ERR (i,j) error signals if any of the nodes 22(i,j,k) therein detect selected error conditions. The ERR (i,j) error signal associated with each data router node group 20(i,j) is coupled to the control network node cluster 50(i,j) of corresponding indices i and j. For control network node clusters 50(i,j) in levels in which each cluster has one control network node group 51(i,j,k), the ERR (i,j) signal is coupled directly to the control network node group 51(i,j,k). On the other hand, for control network node clusters 50(i,j) in levels with multiple control network node groups 51(i,j,k) in each cluster 50(i,j), each cluster 50(i,j) includes an error reporter select circuit 56(i,j). The error reporter select circuit 56(i,j) generates a plurality of ERR RPRT (i,j,k) error report signals, which are coupled to associated ones of the control network node groups 51(i,j,k) within the control network node cluster 50(i,j), and which enable them to send error signals to their parent control network node groups 51(i+1, j,k) and child control network node groups 51(i−1,j,k). The error reporter select circuit 56(i,j), in response to the assertion of the ERR (i,j) error signal, asserts a selected one or more of the ERR RPRT (i,j,k) error report signals as selected by the diagnostic network 16.

Figure 4E:
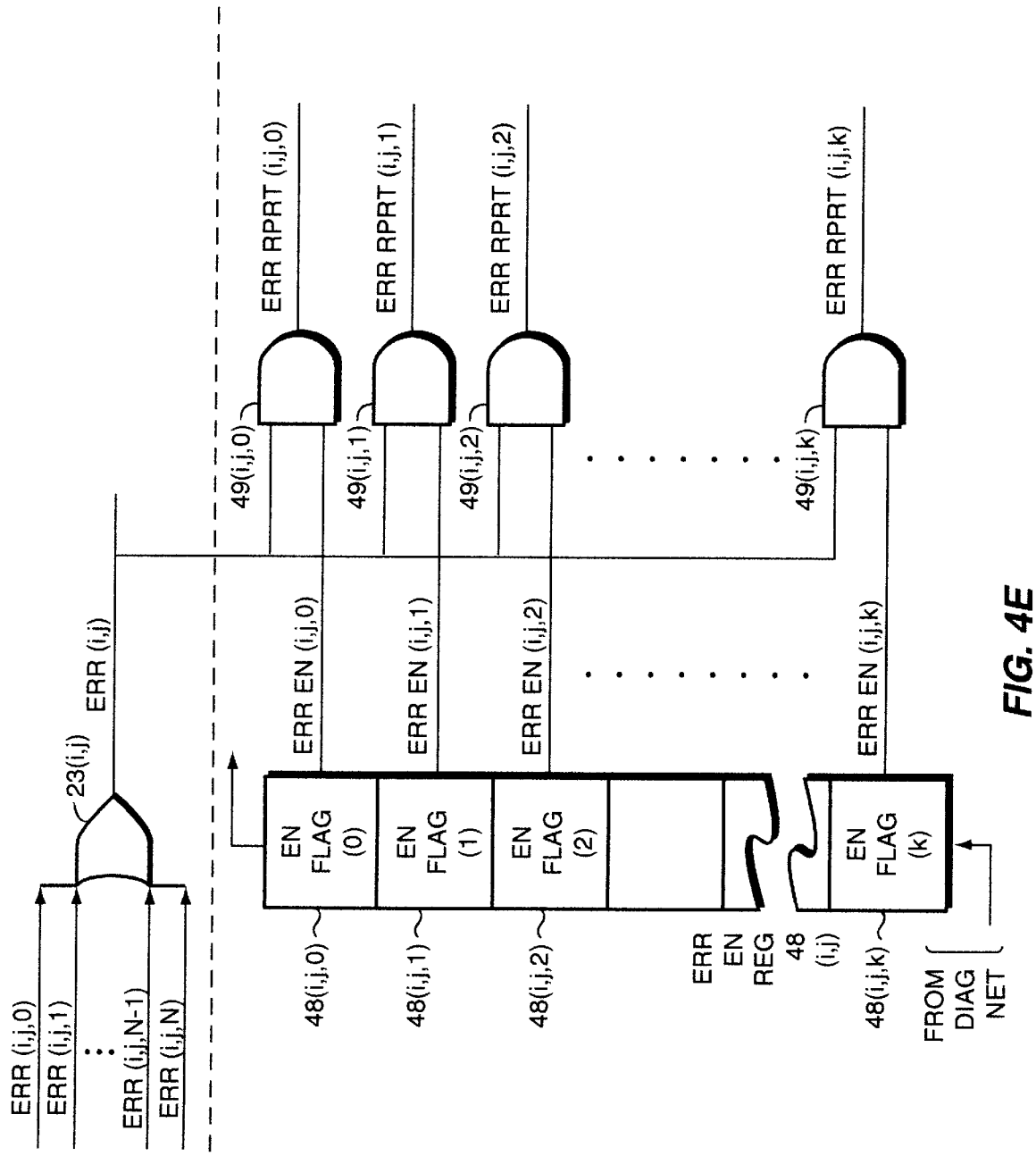

The error reporter select circuit 56(i,j) will be described in connection with FIG. 4E. With reference to FIG. 4E, the error reporter select circuit 56(i,j) includes mask register 48(i,j), identified on the figure as an error enable register, including a number of enable flags 48(i,j,k) each associated with one of the control network node groups 51(i,j,k) in the cluster 50(i,j). An enable flag 48(i,j,k) is associated with a control network node group 51(i,j,k) in a cluster 50(i,j) if the indices i,j, and k in the reference numerals 50(i,j), 51(i,j,k) and 57(i,j,k) are all the same. The mask register 48(i,j) is a shift register that is loaded by the diagnostic network 16.

Each enable flag 48(i,j,k) generates an ERR EN (i,j,k) error enable signal that controls one input terminal of an AND gate 49(i,j,k). It will be appreciated that the number of enable flags 48(i,j,k) in the register 48(i,j) asserting their ERR EN (i,j,k) error enable signal at any one time will be determined by the number of enable flag 48(i,j,k) that are set. The other input terminal of each AND gate 49(i,j,k) receives the ERR (i,j) error signal from the OR gate 23(i,j) (see also FIGS. 2A-1 through 2A-4) of the associated data router node group 20(i,j). The enabled AND gate(s) 49(i,j,k) associated with the set enable flag(s) 48(i,j,k) will thus be energized when the OR gate 23(i,j) asserts its ERR (i,j) error signal, thereby asserting its or their ERR RPRT (i,j,k) error report signal. For those enable flags 48(i,j,k) which are clear, the ERR EN (i,j,k) error enable signals will be negated and the associated AND gates 49(i,j,k) will remain de-energized, thereby maintaining the associated ERR RPRT (i,j,k) error report signals at their negated levels, regardless of whether the ERR (i,j) signal from OR gate 23(i,j) is asserted.

The diagnostic network 16 controls the conditioning of each of the individual enable flags 48(i,j,k). The selection of which enable flags 48(i,j,k) to be set and which to be clear may be based on a number of considerations, in particular whether error signals are to be provided by the control network 14 to one scalar processor in a partition, for example, or to a plurality of scalar processors regardless of the respective partitions. For example, if a control network node cluster 50(i,j) has only one control network node group 51(i,j,k) that is part of a particular partition, the data router nodes 22(i,j,k) in the corresponding data router node group 20(i,j) will only be handling data router message packets related to leaves 21 for the same partition. This will be particularly the case in connection with control network node clusters 50(i,j) in the lower levels of the control network 14. In that case, the data router nodes 22(i,j,k) will generate respective ERR (i,j,k) error signals in response only to errors detected in connection with data router message packets originating from or destined to leaves 21 only in that partition. In that case, it may be desirable to have such errors reported to the scalar processor or processors 12 included in that partition, and so the mask register 48(i,j,k) may be conditioned so that only the enable flag 48(i,j,k) associated with the control network node group 51(i,j,k) in the partition is set.

On the other hand, in connection with a control network node cluster 50(i,j) which may have several control network node groups 51(i,j,k) each in a different partition, the data router nodes 22(i,j,k) in the corresponding data router node group 20(i,j) may be handling data router message packets related to leaves 21 for multiple partitions. This will be particularly the case in connection with control network node clusters 50(i,j) in the upper levels of the control network 14. In that case, the data router nodes 22(i,j,k) may generate respective ERR (i,j,k) error signals in response to errors detected in response to errors detected in data router message packets originating from or destined to leaves 21 in any of the partitions. In that case, it may be desirable to have such errors reported to all of the scalar processors 12, and so the mask register 48(i,j,k) may be conditioned so that the enable flags 48(i,j,k) associated with all control network node groups 51(i,j,k) included in any partition, or all control network node groups 51(i,j,k) in the cluster 50(i,j) is set. It will be appreciated that additional error reporting arrangements may be established by appropriate conditioning of the enable flags 48(i,j,k) of the mask registers 48(i,j) in the respective error reporter select circuits 56(i,j).

FIG. 5 depicts the structure of a control network message packet 60 that is transferred over the control network 14. With reference to FIG. 5, the control network message packet 60 has a fixed length of thirteen "flicks." In one embodiment, each flick has five bits, with the first twelve flicks, identified as FLICK 0 through FLICK 11, including four packet information bits (labeled "PKT INFO" in FIG. 5) and one tag bit. The packet information portion of the first twelve flicks comprise a packet header portion 61 and a packet data portion 62. The thirteenth flick, namely FLICK 12 identified by reference numeral 63, contains a checksum used in error detection. The checksum is generated across all five bits of the successive flicks in the packet 60. The tag bits contain control information as described below.

The packet header portion 61 includes four fields, including a message type field 64, a packet type field 65, a combine function type field 66 and a pattern field 67(0) and 67(1) (collectively identified by reference numeral 67). The packet data portion 62 includes eight four-bit data nibbles 70(0) through 70(7) (generally identified by reference numeral 70) and a four-bit nibble 71 containing four global information bits 71(A) through 71(D).

The message type field 64 identifies the type of message contained in the message packet 60. In one embodiment, a packet 60 can contain one of five different types of messages, including an SS (single-source) message, an MS (multiple-source) message, an ABS abstain message, an IDLE message and an NPAC nil packet message. When a scalar processor 12 broadcasts a command to the processing elements 11 for processing thereby, it uses a single-source message packet to carry the command. In addition, a scalar processor 12 may also use single-source message packets to broadcast other types of control information to one or more of the processing elements 11 or input/output processors 13, or to another scalar processor 12.

A single-source message packet is passed by each control network node 52(i,j,k,1) which receives it up the control network tree from node to node until it reaches the root node. The root node transmits the single-source message packet down the tree to its children. Each control network node 52(i,j,k,1), which receives a single-source message packet from its parent transmits it down the tree to both its children, effectively broadcasting the packet to all of the processing elements 11 in the partition.

Multiple-source messages are used by the processing elements 11 to initiate scan and reduce operations as described above. Idle message packets are transmitted when a leaf 21 or control network node 52(i,j,k,1) has no other types of message packets to transmit. A leaf 21 transmits abstain message packets to indicate that it is not participating in a scan or reduce operation. If a control network node 52(i,j,k,1) receives idle or abstain message packets from both of its children, it may transmit a message packet of the same type to its parent. If a control network node 52(i,j,k,1) receives a multiple-source message packet from one of its children and an abstain message packet from its other child, it does not thereafter wait for a multiple-source message packet therefrom to use in the arithmetic operation specified in the multiple-source message packet that it receives from the one child. Instead, the control network node 52(i,j,k,1) forwards the multiple-source message packet that it receives to its parent, and, if the abstain message packet came from its left child, stores the data from the message packet in its scan buffer 105.

A message packet of the nil packet type, unlike message packets of other message types, is only one flick in length. In particular, a nil packet message comprises only the message type flick 64, the contents indicating that the message packet is of the nil packet type. A control network node 52(i,j,k,1) continually transmits messages of the nil packet type to its parent while it [that is, the control network node 52(i,j ,k,1)] is a logical root of a partition, and the parent transmits message packets of the same type to that child. If the parent receives a multiple-source message packet from its other child, it forwards it to its parent.

The packet type field 65, combine function type field 66 and a pattern field 67 contain further information about the information in the control network message packet 60.

In one particular embodiment, the processing elements 11 can operate in two operational modes, identified herein as "supervisor" and "user." If the message type field 64 indicates that the control network message packet is a single-source message packet, the packet type field 65 can identify a message packet as a broadcast supervisor packet or a broadcast user packet. If the packet type field 65 indicates that the control network message packet is a broadcast supervisor packet, it contains a command for execution by the processing elements 11 in the supervisor mode. On the other hand, if the packet type field indicates that the control network message packet contains a broadcast user packet, it contains a command for execution by the processing elements 11 in the user mode.

In addition, if the message type field 64 indicates that the control network message packet is a single-source message packet, the packet type field 65 may indicate that the control network message packet is an interrupt packet. The interrupt packet may be used to initiate operations at particular ones of the processing elements 11. The operations and the particular ones of the processing elements 11 to perform them may be identified in the packet data portion 62.

Further, if the message type field 64 indicates that the control network message packet is a single-source message packet, the packet type field 65 may indicate that the control network message packet contains configuration information which enables the establishment or elimination of a logical root at a particular control network node 52(i,j,k,1). If the packet type field identifies the message packet as containing configuration information, the first two flicks 70(0) and 70(1) of packet data portion 62 contain data specifying the level and sub-level in control network 14 at which the logical root is to be established. The control network node 52(i,j,k,1) at that level and sub-level which receives the configuration message packet establishes itself as the logical root.

If the message type field 64 identifies the message packet as a multiple-source message packet, the packet type field 65 identifies the operation to be performed as a scan involving data in a single packet or a plurality of packets, or to perform an operation to determine whether the data router 15 is empty. The data to be used is contained in data fields 70(0) through 70(7) (generally identified by reference numeral 70) of the packet data portion 62. If the packet type field 65 identifies a scan operation involving data in a single packet, the scan operation is limited to a data value having a single thirty-two bit word. However, if the packet type field identifies a scan operation involving data in a plurality of successively-transmitted packets, which will be identified as a "multi-word scan," the scan operation involves data values of more than thirty-two bits, which are contained in control network message packets 60 successively transmitted by the processing elements 11. In either case, if the packet type field 65 identifies the operation as a scan operation, the pattern field 67 further identifies it as either a scan forward or scan backward operation or a reduce operation, and combine function type field 66 identifies the particular arithmetic operator to be used in the operation.

As has been described above, control network message packets of the multiple-source type may be used, with arithmetic operations, to determine whether the data router 15 is empty, using the contents of message counters maintained by the processing elements 11 as data. Similar control network message packets may also be used to perform other control operations using, for example, bits of the global information field 71. For example, the scalar processors 12 may need to be notified when all of the processing elements 11 have finished executing a particular command before they transmit a subsequent command. In that case, each processing element when it has finished executing a command, may transmit a control network message packet 60, of the multiple-source type, indicating a reduce operation using the OR operator, with a particular bit in the global information field 71 being set. It will be appreciated that, after all of the processing elements 11 have executed the instruction and transmitted corresponding packets, the root node will as the result of the reduce operation, broadcast control network message packets down the control network tree in which the bit will be set. When the scalar processor 12 receives the resulting control network message packet from the control network node 52(1,j,1) connected thereto, it can determine the condition of the bit and determine therefrom that the command has been executed.

Bits of the global information field 71 may also be used by the processing elements 11. In processing certain commands from the scalar processors 12, the processing elements 11 sometimes may reach a point in processing a command at which they have to verify that all of the processing elements have reached the same point before they proceed. To accomplish that, when each processing element has reached the particular processing point it may transmit a control network message packet as described above, that is, of the multiple-source type, indicating a reduce operation using the OR operator, with a particular bit in the global information field 71 being set. When the processing elements 11 receive the resulting control network message packet from their respective control network nodes 52(1,j,1) connected thereto, they can determine therefrom that all of the processing elements 11 have reached the required point in their processing of the command, and continue processing.

To accomplish these and other operations, the global information field includes four bits, namely, a synchronous global bit 71(A), a synchronous global valid bit 71(B), a supervisor global bit 71(C) and a global bit 71(D). The processing elements 11 and scalar processors 12 use the supervisor global bit 71(C) in the supervisor mode, and in one embodiment is primarily used in connection with error reporting. The processing elements 11 and scalar processors 12 may use the global bit 71(D) in either the supervisor mode or the user mode. In the control network 14, each control network node 52(i,j,k,1) generates a supervisor global bit 71(C) for transmission in a control network message packet 60 in response to the OR of the supervisor global bits 71(C) from the contemporaneously received packets 60 from both its children. Similarly, each control network node 52(i,j,k,1) generates a global bit 71(D) for transmission in a control network message packet 60 in response to the OR of the global bits 71(D) from the contemporaneously-received packets 60 from both its children. That is, in connection with both bits 71(C) and 71(D), a control network node 52(i,j,k,1) transmits packet 60 having a bit having a et condition if either of the corresponding bits from either child are set, and otherwise transmits a packet 60 having a bit having a clear condition. In control network message packets 60 transmitted down the tree, each control network node 52(i,j,k,1) transmits, in control network message packets 60 transmitted to both its children, supervisor global bit 71(C) and the global bit 71(D), respectively, having conditions corresponding to the condition of the respective bits in the control network message packet 60 received from the parent.

By using the supervisor global bits 71(C) and the global bits 71(D) a processing element 11 or scalar processor 12 of a particular partition can initiate a global operation to notify others in the partition of a particular occurrence. For example, if one processing element 11 or a scalar processor 12 determine that an error has occurred, it can transmit a control network message packet 60 in which the supervisor global bit 71(C) is set. The control network nodes 52(i,j,k,1) will couple message packets 60 up the tree such that the logical root will receive a packet 60 in which the supervisor global bit is set. The logical root will transmit a packet 60 to both children in which the supervisor global bit 71(C) is also set. In response, all of the control network nodes 52(i,j,k,1) will transmit to their children packets 60 in which the supervisor global bit 71(C) is set. It will be appreciated that packets 60 will eventually be delivered to the processing elements 11 and scalar processors 12 in the partition in which the supervisor global bit 71(C) is set, thereby notifying them of the error. The global bit 71(D) may be used similarly. It will be appreciated that, although the control network nodes 52(i,j,k,1) perform OR operations in connection with the supervisor global and global bits 71(C) and 71(D), respectively, in control network message packets 60 in the partition, the processing elements 11 and scalar processors 12 can suitably assign the set and clear conditions to the respective high or low signal levels of signals defining the bits 71(A) transmitted over the control network 14, to effectively enable the nodes 52(i,j,k,1) to perform AND operations in connection with the bits. In particular, if the processing elements 11 and scalar processors 12 participating in the global synchronization operation define the low signal level as the logical set condition for the respective bits 71(C) and 71(D), and the high signal level as the logical clear condition, the processing elements II and scalar processors 12 will determine the received supervisor global and global bits 71(C) and 71(D) as being set only if the signals representing the respective bits provided by all of the processing elements 11 and scalar processors 12 have- the low signal level, that is, only if they all have the set condition. This effectively represents an AND operation in connection with the respective supervisor global and global bits 71(C) and 71(D) transmitted by the processing elements 11 and scalar processors 12.

The synchronous global bits 71(A) and synchronous global valid bits 71(B) are used during a global synchronization operation. As with the supervisor global bit 71(C) and global bit 71(D), each control network node 52(i,j,k,1) generates control network message packets 60 for transmission up the tree in which the synchronous global bits 71(A) represent the OR of the respective corresponding bits from its children. In addition, each control network node 52(i,j,k,1) generates control network message packets 60 for transmission down the tree to both its children which have the same condition as the synchronous global bit 71(A) from its parent. In control network message packets 60 transmitted down the tree, each control network node 52(i,j,k,1) operates similarly in connection with the synchronous global valid bits 71(B), but for transmission of control network message packets 60 transmitted by each control network node 52(i,j,k,1) up the tree the synchronous global valid bit 71(B) represents the AND of the synchronous global valid bits 71(B) in the control network message packets 60 received from the children.

It will be appreciated that, similar to the supervisor global and global bits 71(C) and 71(D), although the control network nodes 52(i,j,k,1) perform OR operations in connection with the synchronous global bits 71(A) in control network message packets 60 in the partition, the processing elements 11 and scalar processors 12 can suitably assign the set and clear conditions to the respective high or low signal levels of signals defining the bits 71(A) to effectively enable the nodes 52(i,j,k,1) to perform AND operations in connection with the bits. In particular, if the processing elements 11 and scalar processors 12 participating in the global synchronization operation define the low signal level as the logical set condition, and the high signal level as the logical clear condition, the processing elements 11 and scalar processors 12 will determine the received synchronous global bits 71(A) as being set only if the signals representing the bits provided by all of the processing elements 11 and scalar processors 12 have the low signal level, that is, only if they all have the set condition. This effectively represents an AND operation in connection with the synchronous global bits 71(A) transmitted by the processing elements 11 and scalar processors 12.

As described above, the control network nodes 52(i,j,k,1) perform a logical AND operation in connection with the synchronous global valid bits 71(B) received in control network message packets 60 received from their respective children. In one embodiment, the logical AND operation is effectively performed in the same manner as described above in connection with the synchronous global bits 71(A). That is, a synchronous global valid bit 71(B) is deemed set if the signal representing it has a low signal level, and clear if the signal has a high signal level. Accordingly, the control network nodes 52(i,j,k,1) perform the AND operation in connection with the synchronous global valid bits 71(B) from the respective children by performing an OR operation in connection with the signals representing the bits received from the respective children.

The processing elements 11 and scalar processors 12 use the synchronous global and synchronous global valid bits 71(A) and 71(B) during a global synchronization operation in a manner different than the supervisor global and global bits 71(C) and 71(D). In particular, the processing elements 11 and scalar processors 12 (a) receive the results of a global synchronization operation in synchrony, and (b) will not initiate a subsequent global synchronization operation until they receive the results of a previously initiated global synchronization operation, that is, until the previous global synchronization operation has completed. As a result of condition (b), the processing elements 11 and scalar processors 12 can synchronize their respective operations at particular points using iterative global synchronization operations. The use of the supervisor global and global bits 71(C) and 71(D) does not involve condition (b).

The processing elements 11 and scalar processors 12 use the synchronous global valid bits 71(B) to determine when the global synchronization operation has completed, and the synchronous global bits 71(A) to provide a respective value for the global synchronization operation. When a processing element 11 or scalar processor 12 is providing a control network message packet having a valid synchronous global bit 71(A), the synchronous global valid bit 71(B) has the set condition. Since, as described above, the control network 14 performs an AND operation in connection with the synchronous global valid bits 71(B) in the control network message packets 60 from the various processing elements 11 and scalar processors 12, the processing elements 11 and scalar processors 12 will receive control network message packets 60 from the control network 14 having set synchronous global valid bits 71(B) only when all processing elements 11 and scalar processors 12 are contemporaneously transmitting control network message packets 60 having set synchronous global valid bits 71(B). At that point, the processing elements 11 and scalar processors 12 can examine the condition of the synchronous global bits 71(A) in the same control network message packets 60 to determine the result of the global synchronization operation.

Particular processing elements 11 and scalar processors 12 in a partition may be enabled to abstain from a global synchronization operation. An abstaining processing element 11 or scalar processor 12 will transmit control network message packets 60 in which the synchronous global valid bit 71(B) is set, and the signal representing the synchronous global bit 71(A) has a low signal level. It will be appreciated that, since the signal representing the synchronous global bit 71(A) has a low signal level, it will not affect any results provided to the processing elements 11 and scalar processors 12 during a global synchronization operation involving either an OR operation or an AND operation.

The tag bits of the successive flicks in a control network message packet 60 contain various types of control and status information. Several of the tag bits control the flow of control network message packets through the control network 14. Five tag bits comprise scan flow bits, generally identified by reference numerals 72(i) (i is an integer from 1 through 5). The control network nodes 52(i,j,k,1), processing elements 11 and scalar processors 12, as well as any input/output processors 13 which transmit and receive control network message packets over the control network 14, use the scan flow bits to control the transfer of message packets between directly-connected components in the control network 14.

Two tag bits, including a broadcast user flow bit 73 and a broadcast supervisor flow bit 74 are conditioned by the processing elements 11, scalar processors 12 and those input/output processors 13 which transmit control network message packets over the control network 14, to indicate whether they are able to receive control network message packets containing control information for the supervisor and user modes respectively. Each processing element 11, scalar processor 12 and input/output processor 13, respectively, conditions bits 73 and 74 in any control network message packets that it transmits to indicate whether it can receive single-source message packets having packet types, as indicated in packet type field 65, of broadcast supervisor type and broadcast user type, respectively.

Another tag bit that controls the control network 14 is a flush bit 75. When a control network node 52(i,j,k,1) receives a control network message packet in which the flush bit 75 is set, it clears its scan buffer. This may be used to clear intermediate results of a scan or reduce operation from the control network 14 during a context switch.

A soft error bit 76 is used by a control network node 52(i,j,k,1) to indicate that it has detected a software error from the contents of a control network message packet 60. For example, if the control network node 52(i,j,k,1) determines that the contents of the packet type field 65 do not identify one of the established packet types for the message type identified in message type field 65, the node may set the soft error bit 76.

As described above, the control network 14 performs segmented scan operations using data in message packets transmitted by the processing elements 11. A segment bit 77, when set, indicates that the control network message packet 60 contains data for the upper end of a segment. A scan overflow bit 80, when set, indicates that the result of the arithmetic operation is larger than can be accommodated in the data fields 70 of the control network message packet 60. The scan overflow bit 80 may also be used to indicate overflow during a reduce operation. If the scan overflow bit 80 is set, the operation can be repeated in a multi-word operation.

Finally, a control network message packet 60 includes the aforementioned AFD all-fall-down bit 81. If a parent control network node 52(i,j,k,P) in a control network node group 52(i,j,k) contemporaneously receives control network message packets 60 from both its children 52(i,j,k,C₁) in which the AFD all-fall-down bit 81 is set, it asserts an AFD(i,j,k) all-fall-down signal, which is supplied, either directly or indirectly through the AFD select circuit 55(i,j) to the data router nodes 22(i,j,k) of the data router node group 20(i,j) having the same indices i and j. Each control network node 52(i,j,k,1) also asserts the AFD all-fall-down bit 81 in an outgoing control network message packet 60 if it contemporaneously receives control network message packets 60 from its children in which the AFD all-fall-down bit 81 is set.

Returning to FIG. 4B, the details of a control network node 52(i,j,k,1) will be described. Since all of the nodes 52(i,j,k,1) are similar, only node 52(1,0,0,P) will be described in detail. That node includes the up message assembler 100, the down message assembler 101, and an internal up/down node interface 102 which enables the up and down message assemblers to transmit information, including data and control information, therebetween. The internal up/down node interface 102 includes a root flag 103, a packet buffer 104, the scan buffer 105, the segment flag 106 and a flow control circuit 107. The up message assembler 100 includes a left input circuit 110 and a right input circuit 111, a processor 112 and an up message output control circuit 113. The left input circuit 110 receives control network message packets 60 from the left child 52(1,0,0,$C_1$) and the right input circuit 111 receives control network message packets from the right child 52(1,0,0,$C_2$) The left and right input circuits 110 and 111 couple the packet information bits of flicks 64 through 66 comprising the packet header 61 directly to the up message output control 113. In response to these flicks, the packet header will determine the message type and packet type of an output control network message packet 60.

The packet information bits of succeeding flicks, comprising the packet data portion 62, are coupled to the processor 112, which generates output flicks representing results of predetermined mathematical operations in connection with the flicks, which it receives from the respective input circuits 110 and 111. The packet information bits of packet data portion 62 are also coupled directly to the up message output control 113. The up message output control 113 generates the packet information bits of the packet data portion 62 of the outgoing control network message packet using the information from one of the input circuits 110 or 111. Alternatively, the up message output control 113 uses information from processor 112 representing a mathematical function as identified by the combine function portion 66 of the packet header 61 if the outgoing control network message packet 60 is of the multiple-source message type. The up message output control 113 also sets the tag bits in response to flow control information in the control network message packets from the child control network nodes 52(1,0,0,$C_1$) and 52(1,0,0,$C_2$) and from the down message assembler 101 through flow control circuit 107.

If the up message assembler 100 receives a control network message packet of the single-source message type and of the configuration packet type, and if the information bits of the first two flicks of the packet data portion identify the control network node's level, the up message assembler 113 will also set the root flag 103. That will enable the control network node 52(1,0,0,P) to assert a ROOT UP signal to notify the parent that it will be a root starting with the beginning of the next control network message packet 60. At that point, the up message assembler 100 also begins loading the control network message packet 60 into the packet buffer 104, to be retrieved and used by the down message assembler 101 as described below.

If the up message assembler 100 contemporaneously receives from both of its children control network message packets 60 of the multiple-source message type specifying in fields 65, 66 and 67 the same packet type, arithmetic operation and scan pattern, it generates a control network message packet 60 identifying the same message and packet type, arithmetic operation and scan pattern in fields 64 through 67. If the packet type identifies a scan or reduce operation, the packet data portion 62 is provided by the processor 112. If the packet type identifies a scan operation, the up message assembler further loads an intermediate value into the scan buffer 105. In addition, if the segment bit 77 of a received control network message packet 60 is set, the up message assembler 100 sets segment flag 106. If the up message assembler 100 receives control network message packets 60 as described in the previous paragraph, with the pattern field 67 identifying a backward scan pattern, the input circuits 110 and 111 interchange the packet data portion 62 from the control network message packets 60 received from the respective children 52(1,0,0,$C_1$) and 52(1,0,0,$C_2$). Since this would occur across all control network nodes 52(i,j,k,1) in the partition, the control network effectively reverses the scan pattern.

Each input circuit 110 and 111 in the up message assembler 100 includes a park buffer 114 and 115, respectively. If the up message assembler 100 contemporaneously receives a control network message packet 60 of the multiple-source message type from one child 52(1,0,0,$C_1$) and a control network message packet 60 of the single-source message type from the other child 52(1,0,0,$C_j$), the up message output control 113 assembles a control network message packet 60 of the single-source message type using the packet 60 from child 52(1,0,0,$C_j$), and loads the packet 60 of the multiple-source type from child 52(1,0,0,$C_i$) into the respective park buffer 114 or 115. When a control network message packet 60 of the multiple-source type is received from the child 52(1,0,0,$C_j$), that packet 60 is used along with the buffered packet in park buffer 114 or 115 by the up message output control 113 in the assembly of an appropriate control network message packet 60. The buffered packet is also used if a control network message packet 60 of the abstain or NPAC nil packet type is received from the child 52(1,0,0,$C_i$). While the buffer 114 or 115 is buffering a control network message packet 60 received from child 52(1,0,0,$C_j$), the down message assembler 101 couples control network message packets 60 to that child 52(1,0,0,$C_i$) in which the scan flow bits 57(i) are set to inhibit it from transmitting control network message packets of the multiple-source message type thereto.

The down message assembler 101 includes an input circuit 120, a processor 121 and two down message output controls 122 and 123. The input circuit 120 receives control network message packets 60 from the parent node or from the packet buffer 104, depending on the condition of the root flag 103. If the root flag is clear, the control network node 52(1,0,0,P) is not a logical root, and so the input circuit 120 receives the control network message packets 60 from the parent node. On the other hand, if the root flag 103 is set, the control network node 52(1,0,0,P) is a logical root and so the input circuit receives the control network message packets from the packet buffer 104.

If the control network message packet 60 received by input circuit 120 is of the single-source message type, the input circuit 120 couples it to the down message output controls 122 and 123, which assemble corresponding packets 60, also of the single-source message type, for transmission to the child nodes 52(1,0,0,$C_1$) and 52(1,0,0,$C_2$). Since this will be repeated at each level down the tree in the partition, it will be appreciated that a control network message packet 60 of the single-source type will, upon reaching the logical root of the partition, be transmitted to all of the processing elements 11 and scalar processors 12 in the partition.

If the received control network message packet 60 is of the multiple-source message type, and packet type identifies a scan operation, and further if the scan buffer contains an intermediate value, the packet information bits of the packet header 61 are coupled to the down message output controls 122 and 123 for transmission to the child nodes 52(5,0,0,$C_1$) and 52(1,0,0,$C_2$). The packet information bits of the packet data portion 62 of the packet 60, along with the contents of the scan buffer 105, are coupled to the processor 121, which generates data in response thereto which it couples to down message output controls 122 and 123 which they couple in the packet data portions 62 of control network message packets 60 for transmission to the respective child nodes 52(1,0,0,$C_1$) and 52(1,0,0,$C_2$).

The input circuit 120 also includes a park buffer 124. If the input circuit receives from the parent node a control network message packet 60 of the multiple-source type, and if the scan buffer 105 is empty, the input circuit 120 buffers the received control network message packet 60 in the park buffer 124. When the up message assembler 100 subsequently loads an intermediate value into the scan buffer 105, the input circuit 120 can enable the contents of the park buffer to be transmitted with the intermediate value to the processor 121. If the park buffer 124 is full, the down message assembler 101 through flow control circuit 107 through flow control circuit 107 enables the up message assembler 100 to set the scan flow bits 72(i) of the control network message packets 60 transmitted thereby, which in turn disables the parent node from transmitting control network message packets 60 of the multiple-source type to control network node 52(1,0,0,P). Accordingly, the control network node 52(1,0,0,P) further uses the park buffer to buffer a control network message packet of the multiple-source message type while the node's up message assembler receives control network message packets 60 of the multiple-source message type whose scan flow bits 72(i) are set, indicating that at least one of the child nodes 52(1,0,0,$C_1$) or 52(1,0,0,$C_2$) is unable to receive such packets 60.

If the down message output controls 122 and 123 receive packet headers 61 from the input circuit 120 identifying a multiple-source message type in respective fields 64, a scan operation in fields 65 and a backward scan pattern in field 67, they will interchange the packet information bits of the packet data portion 62. This provides that the scan results for the backward scan pattern will be coupled to the proper processing elements 11 and scalar processors 12 in the partition participating in the scan operation.

III. General Description of Processing Element 11(i)

A. General

Figure 6:
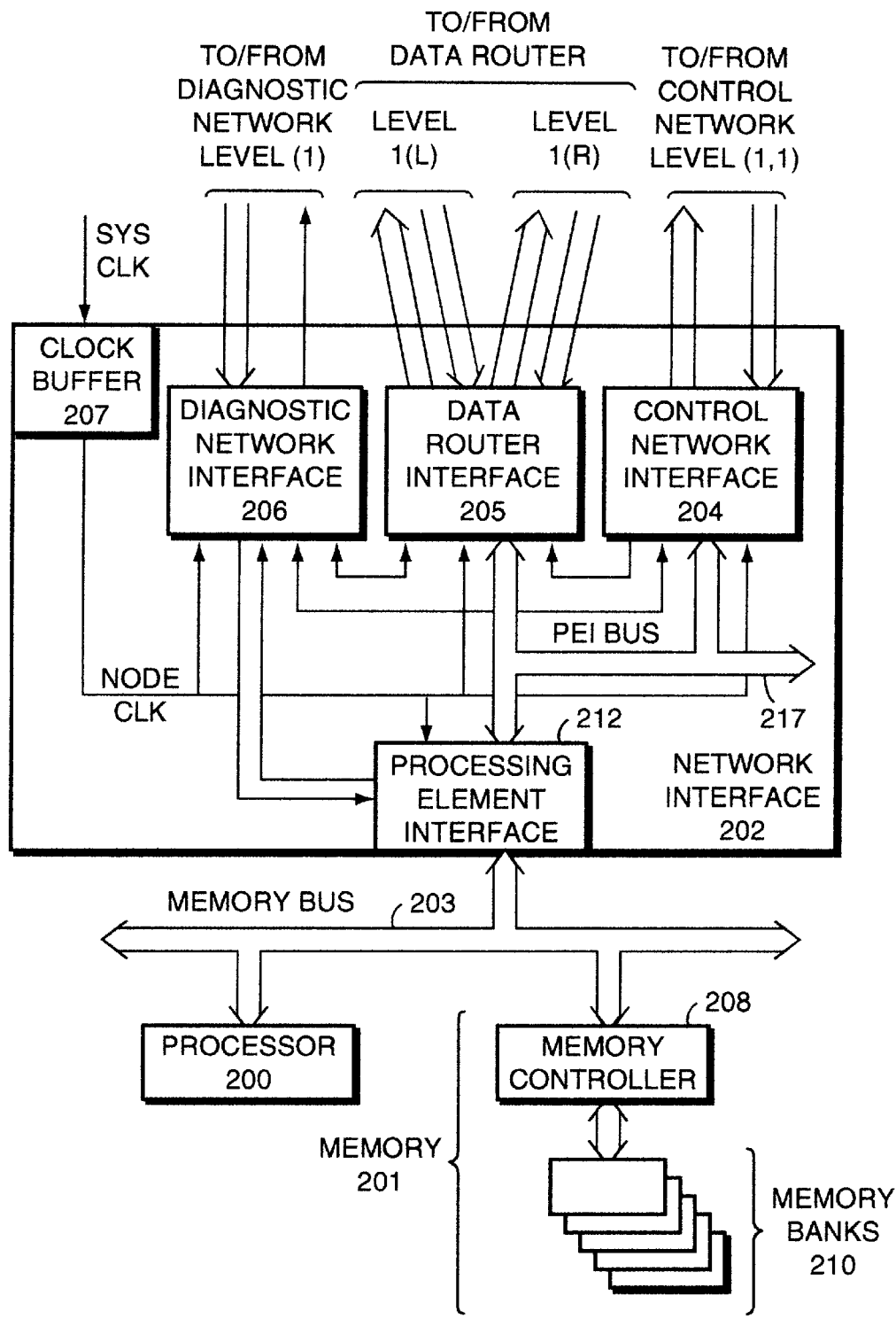
FIG. 6 is a general block diagram of a processing element in the computer system depicted in FIG. 1.

FIG. 6 is a general block diagram of a processing element 11(i) (generally identified by reference numeral 11) in the computer system 10 depicted in FIG. 1. A scalar processor 12 may have a generally similar block diagram structure and organization, except as noted below. With reference to FIG. 6, a processing element 11 includes a processor 200, memory 201 and network interface 202 all interconnected by a memory bus 203. The network interface 202 interfaces the processing element 11 to the various communication mechanisms 14, 15 and 16 in system 10. In particular, the network interface 202 includes a control network interface 204 that receives (ejects) control network message packets 60 from the control network 14, and that transmits (injects) control network message packets 60 to the control network 14. Similarly, a data router interface 205 receives (ejects) data router message packets 30 from the data router 15 and transmits (injects) data router message packets 30 to the data router 15, and a diagnostic network interface 206 receives diagnostic network message packets from the diagnostic network 16 and transmits diagnostic network results over the diagnostic network 16.

As noted above, scalar processors 12 may be generally similar, at a block diagram level as shown in FIG. 6, to the processing element 11 depicted on FIG. 6. Scalar processors 12 may also include, for example, video display terminals (not shown) which may comprise consoles to allow control of the system 10 by an operator. In addition, scalar processors 12 may include such elements as, for example, magnetic disk storage subsystems (also not shown) to store programs and data to be processed. It will be appreciated that processing element 11 may also include such elements.

The network interface 202 includes a clock buffer 207 that receives the SYS CLK system clock signal from the clock circuit 17 and generates a NODE CLK node clock signal in response. In one particular embodiment, the clock buffer 207 comprises a buffer as described in U.S. Pat. No. 5,118,975, issued on Jun. 2, 1992 to W. Daniel Hillis, et al., entitled Digital Clock Buffer Circuit Providing Controllable Delay, and assigned to the assignee of the present application. The network interface 202 uses the NODE CLK node clock signal to synchronize its operation with the control network 14, data router 15, and diagnostic network 16. The NODE CLK node clock signal may also be used in generating clock signals for controlling the other components of the processing element 11 shown in FIG. 6, but it will be appreciated that those components may alternatively be controlled by signals other than the NODE CLK node clock signal.

The memory bus 203 transfers address signals that define a processing element address space. The memory 201 includes a memory controller 208 and a plurality of memory banks generally identified by reference numeral 210, the memory banks 210 including a plurality of addressable storage locations within the processing element address space. In addition, the control network interface 204 and data router interface 205 include a plurality of registers, described in more detail below, which are also within the processing element address space.

The interfaces 204, 205 and 206 are connected through a bus 211 to a processing element interface 212, which, in turn, is connected to the memory bus 203. In response to receipt of control network message packets 60 from the control network 14 or data router message packets 30 from the data router 15, the processing element interface 212 can interrupt the processor 200. In response to the interrupt, the processor 200 can, by reading appropriate registers in the respective interface 204 or 205, retrieve the contents of the packet from the network interface 202. The processor may store the retrieved packet contents in the memory 201. In addition, the processor 200 can initiate transfer of a control network message packet 60 over the control network 14 or a data router message packet 30 over the data router 15. In this operation, the processor 200 transmits packet information over bus 203 to particular registers in the network interface 202. The processing element interface 212, in response to address signals over memory bus 203 identifying the registers, receives the packet information and loads it into the respective registers. Upon receiving the packet information, the respective interface 204 or 205 initiates transmission of a message packet 60 or 30 over the respective control network 14 or data router 15.

The processor 200 executes the commands transmitted in control network message packets 16 over the control network 14 by the scalar processors 12 and received by the control network interface 204. In response to a command, the processor 200 processes one or more instructions, which are maintained in memory 201, which may enable the processor 200 to process data in the memory 201. In addition, the instructions may enable the processor 200 to transmit packet information to respective registers in the network interface 202 to initiate a transfer of a packet 30 or 60 over the respective data router 15 or control network 14, or to read information from respective registers to thereby retrieve the received packet information.

B. Data Router Interface 205

Figures 1, 7A:
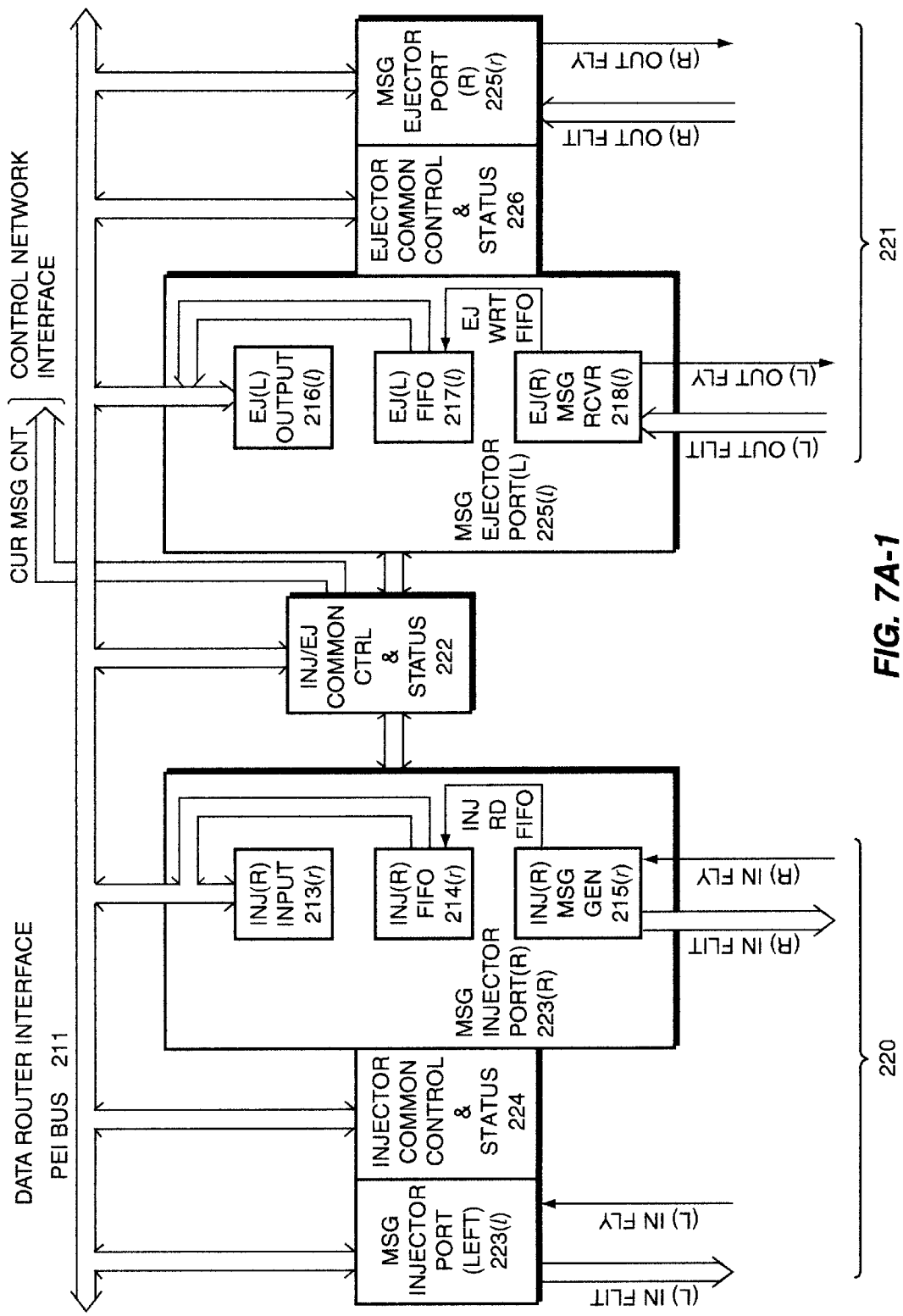
Figures 2A, 7A:
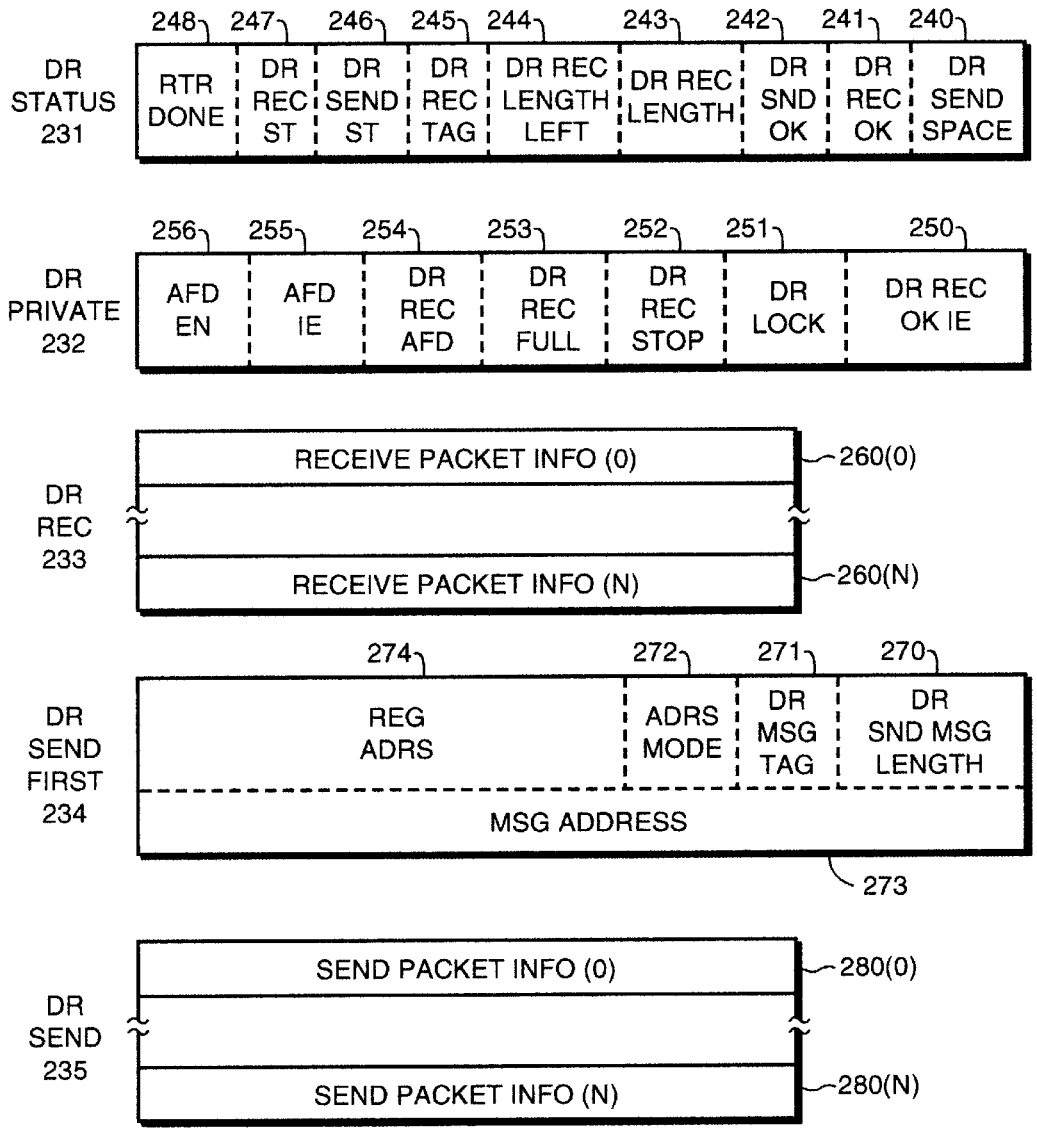

The details of data router interface 205 will be described in connection with FIG. 7A-1 through 7A-2B. With reference to FIG. 7A-1, the data router interface 205 includes a data router message injector portion 220, a message ejector portion 221 and an injector/ejector common control/status portion 222, all connected to processing element interface bus 211. The data router message injector portion 220 injects data router message packets 30 over the data router 15; that is, it transmits data router message packets 30 to the data router nodes 22(1,j,0) and 22(1,j,1) connected thereto.

The data router message injector portion 220 includes two message injector ports identified as left message injector port 223(1) and right message injector port 223(r) for injecting message packets 30 into the data router 15. In the following, data router node 22(1,j,0) is termed the "left" node, and data router node 22(1,j,1) is termed the "right" node; in that case, left message injector port 223(1) is connected to transmit data router message packets to data router node 22(1,j,0) and right message injector port 223(r) is connected to transmit data router message packets to data router node 22(1,j,1). The elements of a message injector port are described in detail in the aforementioned U.S. patent application Ser. No. 07/592,029. The message injector ports 223(1) and 223(r) are generally similar, and so elements of only one, namely right message injector port 223(r), are shown in FIG. 7A-1. In brief, the right injector portion 223(r) includes an input section 213(r) which receives data, which includes address information used to generate the message address section 31, information used to generate the message length and tag portions 34 and 35, and message data used for the data portion 36(i), all of which is used by the message injector port 223(r) to form a data router message packet 30. The input section 213(r) loads the data into an injector first-in/first-out (FIFO) buffer 214(r), which buffers the data until it can be received and used by an injector message generator 215(r) to generate data router message packets 30 for transmission over the data router 15. The injector message generator 215(r) retrieves data from the injector FIFO 214(r) using an INJ RD FIFO injector read FIFO signal, and generates successive flits which it transmits as (R) IN FLIT injected flit signals. The processor 200 can also retrieve the contents of the injector FIFO 214(r) during, for example, a context switch operation as described below.

In one particular embodiment, as described in the aforementioned U.S. patent application Ser. No. 07/592,029, essentially, the injector FIFO 214(r) includes a plurality of storage locations that are sequentially loaded with data in the form of words from the injector input 213(r). In addition the injector FIFO 214(r) includes a store pointer which points to the next location to store a word, and a message pointer pointing to the first word for a data router message packet 30, and a read pointer which points to the next location whose contents are to be transferred to the injector message generator 215(r). Each time a word is loaded into the injector FIFO 214(r), the store pointer is advanced. If all of the words for a data router message packet 30 have been received and stored in the injector FIFO 214(r), the message pointer is advanced to point to the last location containing a word for the message. If the message injector port 223(r), or another element in the network interface 202, detects an error in the loading of words into the injector FIFO 214(r), the store pointer returns to point to the location storing the first word of data for the data router message packet 30, that is, the storage location following the location pointed to by the message pointer, and an error is indicated.

In that embodiment, each time the injector message generator 215(r) retrieves a word from the injector FIFO 214(r), the read pointer advances, but if the read pointer reaches the message pointer the injector message generator 215(r) stops retrievals until the message pointer is again advanced. Thus, the injector message generator 215(r) retrieves data words for a data router message packet 30 from the injector FIFO 214(r) only if the injector FIFO 214(r) has received all of the data words for the data router message packet. These features ensure that the message injector port 223(r) does not send a data router message packet 30 unless it has correctly received all of the data, to avoid the possibility that it will receive a corrupted data word after transmitting an initial portion of the data router message packet 30. The features further ensure that the message injector port 223(r) will, at successive ticks of the NODE CLK signal, be able to transmit successive flits of the data router message packet while the data router 15 can accept them, so that possible delays in receiving data during transmission of a message do not result in delays in transmitting flits to the data router 15. As a result of these features, when the processor 200 attempts to retrieve the contents of the injector FIFO 214(r), the only locations whose data it can retrieve are those following the message pointer, up to the location pointed to by the store pointer. The contents of locations in the injector FIFO 214(r) between that pointed to by the read pointer and that pointed to by the message pointer will be used in forming data router message packets 30 regardless of whether a context switch takes place.

Data router message injector portion 220 also includes an injector common control/status portion 224 that connects to, and controls certain operations of, both left and right message injector ports 223(1) and 223(r). For example, when the processor 200 initiates transmission of a data router message packet 30, it may specify that the message packet 30 be transmitted through either the left or the right message injector port 223(1) or 223(r). In that case, the data router interface 205 will transmit the packet 30 through the specified port 223(1) or 223(r). Alternatively, the processor may not specify the particular port 223(1) or 223(r), in which case the injector common control/status portion 224 will select one of the ports 223(1) or 223(r) to transmit the packet 30. The message ejector portion 221 receives and buffers data router message packets 30 from the data router 15. In addition, the message ejector portion 221 may initiate interrupting of the processor 200 on receiving a new data router message packet, and it transmits the buffered packets over the processing element interface bus 211 in response to a retrieval request from the processor 200. The message ejector portion 221 includes a left message ejector port 225(1) and a right message ejector port 225(r) that are connected to receive data router message packets 30 from data router nodes 22(1,j,0) and 22(1,j,1), respectively.

The message ejector ports 225(1) and 225(r) are generally similar, and so elements of only one, namely left message ejector port 223(1), are shown in FIG. 7A-1. In brief, the left ejector portion 225(1) includes a message receive section 218(1) which successively receives (L) OUT FLIT output flit signals representing successive flits of a data router message packet 30, and forms therefrom data words which it stores in a left ejector FIFO 217(1) in response to an EJ WRT FIFO ejector write FIFO signal. The left ejector FIFO 217(1) can supply data words to an ejector output circuit 216(1) which couples them onto the bus 211 for transmission to the processor.

Data router message ejector portion 221 also includes an ejector common control/status portion 226 that connects to, and controls certain operations of, both left and right message ejector ports 225(1) and 225(r). For example, if both right and left ejector ports 225(1) and 225(r) have received message packets 30 and the processor 200 has requested that the message data be transmitted to it without identifying either the particular left or right ejector port 225(1) or 225(r), the ejector common control/status portion 226 determines the order in which the ports 225(1) and 225(r) will transmit the packets over the processing element interface bus 211.

To transmit a data router message packet 30 to the data router node 22(1,j,0) connected thereto, the left message injector port 223(1), in synchrony with the NODE CLK node clock signal, iteratively transmits (L) IN FLIT left inject flit signals to transmit successive flits of the packet 30 to the data router node 22(1,j,0). The left message injector port 223(1) may transmit while the data router node 22(1,j,0) is asserting an (L) IN FLY left input fly signal; if the data router node 22(1,j,0) negates the (L) IN FLY left input fly signal the left message injector port 223(1) stops transmitting. The right message injector port 223(r) transmits similar (R) IN FLIT right inject flit signals to data router node 22(1,j,1) in response to an asserted (R) IN FLY right input fly signal.

The left message ejector port 225(1), in synchrony with the NODE CLK node clock signal, iteratively receives (L) OUT FLIT left eject flit signals to for successive flits of the packet 30 from the data router node 22(1,j,0). The left message ejector port 225(1) may enable the data router node 22(1,j,0) to transmit by asserting an (L) OUT FLY left eject fly signal; if the port 225(1) negates the (L) OUT FLY left eject fly signal the data router node 22(1,j,0) stops transmitting. The data router node 22(1,j,1) transmits similar (R) OUT FLIT right eject flit signals to right message ejector port 225(r) in response to an asserted (R) OUT FLY right eject fly signal.

FIG. 7A-2A and 7A-2B depict the registers in the control/status portions 222, 224 and 226 in the data router interface 205. FIG. 7A-2A depicts the details of a data router interface middle 25 register set 230 which is used by the processor 200 when it does not specify the particular message injector port 223(1) or 223(r) to transmit a particular data router message packet 30, or the message ejector port 225(1) or 225(r) from which it is to receive a data router message packet 30. With reference to FIG. 7A-2A, register set 230 includes two status and control registers, including a status register 231 and a private register 232, a receive register 233, and two transmit 30 registers, namely, a "send first" register 234 and a "send" register 235.

The status register 231 includes a number of fields shown in FIG. 7A-2A. As described in connection with FIG. 7A-1, each data router message injector port 223(1) and 223(r) includes a first-in first-out (FIFO) buffer which buffers information from processor 200 from which the packet 30 is generated. A send space field 240 identifies the amount of space left in the FIFO buffer in the particular port 223(1) or 223(r) that is currently selected to transmit the packet 30. The contents of the send space field 240 are provided by the currently selected left or right data router message injector port 223(1) or 223(r).

Two flags 241 and 242 indicate the status of the last reception and transmission, respectively, of a data router message packet 30 through the currently selected port. If the last data router message packet 30 to be received can be successfully received, flag 241 is set, and if the last data router message packet 30 to be injected was successfully injected, flag 242 is set. The flags 241 and 242 are conditioned by message injector portion 220 and message ejector portion 221, respectively.

A receive message length field 243 indicates the length of the data router message packet 30 received through the currently selected port, and a length left field 244 identifies the amount of data in a data router message packet 30 currently being retrieved by the processor 200 that is remaining to be retrieved. The contents of the receive message length field 243 correspond to the contents of length field 34 (FIG. 3) of the data router message packet 30. The contents of a receive tag field 245 correspond to the contents of the tag field 35 of the same data router message packet 30. The length left field 244 is effectively provided by a counter into which the contents of length field 34 are loaded when the processor 200 begins retrieving the message packet 30, and which is decremented as the message data is transmitted to the processor 200. The contents of fields 243, 244 and 245 are provided by the message ejector portion 221.

A send state field 246 and receive state field 247 identify the state of injection and ejection, respectively, of respective message packets 30 by the message ejector portion 220 and message injector portion 221. The send state field 246, whose contents are provided by the message injector portion 220, indicates whether either or both of the left or right message injector ports 223(1) and 223(r) contain partially-injected data router message packets 30. Similarly, the receive state field 247, whose contents are provided by the message ejector portion 221, indicates whether either or both of the left or right message ejector ports 225(1) and 225(r) contain partially-ejected (that is, received) data router message packets 30.

Finally, a router done flag 248, whose contents are actually provided by the control network interface 204, indicates whether the router is empty following a message transfer operation. The condition of the router done flag 248 is derived from the reduce operation performed over the control network 14 to determine whether the data router 15 is empty as described above.

The private register 232 also includes a number of fields, comprising flags 250 through 256. Several flags, which are included in the ejector common control/status portion 226, control the operation of the message ejector portion 221. A receive interrupt enable flag 250, when set, enables the data router interface 205 to generate an interrupt for transmission by the network interface 202 to processor 200 when a data router message packet 30 is received by the currently selected left or right message ejector port 225(1) or 225(r). A receive stop flag 252, when set by the processor 200, disables reception of subsequent data router message packets 30 by the currently selected left or right message ejector port 225(1) or 225(r). The currently selected port 225(1) or 225(r) stops receiving flits immediately upon the flag 252 being set. A receiver full flag 252, when set by the currently-selected ejector port 225(1) or 225(r), indicates that a buffer maintained by the currently-selected ejector port is full.

The private register 232 also includes a lock flag 251, included in the injector common control/status portion 224, that controls the operation of the message injector portion 220. The lock flag 251 enables or disables the currently selected left or right message injector port 223(1) or 223(r). When set by processor 200, the currently selected left or right message injector port 223(1) or 223(r) ignores subsequent transmissions from processor 200, and the flag 242 in status register 231 is cleared, indicating unsuccessful injection of the data router message packet 30.

The private register 232 also includes three flags that control operation of the data router interface 205 in connection with the all-fall-down mode of the data router 15 as described above. A received all-fall-down flag 254, controlled by the control network interface 204, indicates that it has received a data router message packet 30 while the data router 15 is operating in all-fall-down mode, for which the leaf 21 is not the destination. An all-fall-down interrupt enable flag 255, when set by processor 200, enables the network interface 202 to generate an interrupt request for transmission to the processor upon the setting of the received all-fall-down flag 254. Finally, an all-fall-down enable flag 256, when set by processor 200, enables the control network interface 204 to set the all-fall-down bit 81 of the next control network message packet 60 that it transmits.

The remaining registers in the middle interface register set 230 are used to transmit and receive data router message packet information. A receive register 233 contains a number of words 260(0) through 260(N) representing the data in a data router message packet 30 received through the currently selected left or right message ejector port 225(1) or 225(r). In reference numeral 260(N), N is an integer related to the maximum amount of data that can be transmitted in a single data router message packet 30. The data stored in receive register 233 is from the data flits 36 of the received message packet 30, and it will be appreciated that the data is actually provided by the ejector FIFOs 217(1) and 217(r), through the respective output circuits 216(1) and 216(r). The receive register is represented by a single address in the address space of memory bus 203. The processor can retrieve the data from a message by iteratively using the address in a read operation over memory bus 203. It will be appreciated that the data router interface 205 decrements the contents of the receive length left field 244 as the processor 200 accesses the receive register to retrieve the message data.

Two registers, namely, the send first register 234 and the send register 235 are provided to enable the processor to supply information used by the message injector portion to generate data router message packets 30 for injection into the data router 15. A high-order address field 274 in the first word contains an address value, in the address space defined for the memory bus 203 (Fig.) of the network interface 202 and, specifically, of the particular data router send first register being addressed in the control network interface 204. The send first register 234 also includes fields 270 and 271 in which message length and message tag information is loaded. The contents of fields 270 and 271 are copied into the message length and message tag fields 34 and 35 in a data router message packet 30.

The send first register 234 also includes a message address field 273 that is used to generate the contents of message address portion 31 of packet 30, and an address mode field 272. The message address in field 273 can be a physical address, which specifically identifies the leaf 21(y) to receive the message, or a relative address, which identifies a displacement from the leaf 21(x) transmitting the data router message packet 30 to the leaf 21(y) to receive the packet 30. The contents of the address mode field 272 indicate whether the message address in field 273 is an physical address or a relative address. It will be appreciated that the information loaded into the send first register 234 is actually loaded into a respective injector FIFO 214(1) or 214(r) through a respective input circuit 213(1) or 213(r).

The send register 235, like receive register 233, contains a number of words 280(0) through 280(N) representing the data in a data router message packet 30 to be transmitted through the currently selected left or right message injector port 223(1) or 223(r). In reference numeral 280(N), N is an integer related to the maximum amount of data that can be transmitted in a single data router message packet 30. The data stored in send register 235 is copied into the data flits 36 of the transmitted message packet 30. The send register is represented by a single address in the address space of memory bus 203. The processor can load data into the register by iteratively using the address in a write operation over memory bus 203. It will be appreciated that the information loaded into the send register 234 is actually loaded into a respective injector FIFO 214(1) or 214(r) through a respective input circuit 213(1) or 213(r).

As noted above, the processor 200 uses the data router interface middle register set 230 when it does not specify the particular message injector port 223(1) or 223(r) to transmit a particular data router message packet 30. The data router interface 205 includes two additional register sets, identified as a left and right interface register sets 290 and 291 (shown on FIG. 7A-2B), respectively, which the processor 200 uses when specifies a left or right message injector port 223(1) or 223(r) to transmit a particular data router message packet 30, or a left or right message ejector port 225(1) or 225(r) from which it will retrieve data router message packet data. Both left and right interface register sets 290 and 291 include respective status, private, receive, send first and send registers, identified by reference numerals 293–297 (left register set 290) and 300–304 (right register set 291). The registers in register sets 290 and 291 have fields and flags that are substantially the same as those of respective registers 231–235 of the middle interface register set, except that the left and right interface status registers 293 and 300 do not have fields corresponding to send and receive state fields 246 and 247 or router done flag 248 of status register 231. In addition, left and right interface private registers 294 and 301 do not have fields corresponding to all-fall-down interrupt enable flag 255 or all-fall-down enable flag 256 of private register 232. The information addressed to the left send first and send registers 296 and 297 is loaded through the left injector input circuit 213(1) into the left injector FIFO 214(l), and the information addressed to the right send first and send registers 303 and 304 is loaded through the right injector input circuit 213(r) into the right injector FIFO 214(r). In addition, the information retrieved from the left receive register 295 is supplied by the left ejector output circuit 216(1) from the left ejector FIFO 217(1), and the information retrieved from the right receive register 302 is supplied by the right ejector output circuit 216(r) from the right ejector FIFO 217(r).

The data router interface 205 also includes a set of registers 292 which contain information that it uses, along with the message address information in field 273 of the send first register 234 of the middle interface register set 230 or corresponding fields of send first registers 296 or 303 of the respective left or right interface register set, in generating address information for the message address field 31 of a data router message packet 30 to be transmitted. As described above, the system 10 can be partitioned, and a partition base register 305 and partition size register 306 contain values identifying the base and size of the processing element's partition. In particular, the partition base register 305 contains the index (i) of the leaf 21(i) in the system that is the lowest-indexed element in the partition. In addition, the contents of the partition size register 306 identify the number of leaves 21 in the partition. A physical self address register 312 for a particular leaf 21(i) identifies the leaf's own index i in the system 10, which comprises an address or other identifier that uniquely identifies the leaf 21 in the system.

Finally, the registers maintained by the data router interface 205 include the previously-mentioned data router message counter 313 and a count mask register 314. Data router message counter 313 is maintained by the injector/ejector common control/status portion 222. The message counter 313 is incremented to reflect the injection by data router message injector port 220 of a data router message packet over the data router 15 during a message transfer operation, and decremented to reflect the ejection, by the data router message ejector port 221 of a data router message packet 30 that it receives from the data router 15. The count mask register 314 contains values identifying which, if any, encodings of the tag field 35 of each message will enable the message counter 313 to increment or decrement, to permit, for example, data router message packets 30 generated by leaves 21 in the user operating mode to be counted, but not packets 30 generated by leaves 21 in the supervisor operating mode. The injector/ejector common control/status portion 222 generates a CUR MSG CNT current message count signal which identifies the current value of the message counter 313, and which it provides to the control network interface 204 for use in generating a router done control network message as described above.

C. Control Network Interface 204

As noted above, the control network interface 204 receives (ejects) control network message packets 60 from the control network 14, and transmits (injects) control network message packets 60 to the control network 14. A general block diagram of control network interface 204 is shown in FIG. 7B-1.

Figure 7B:
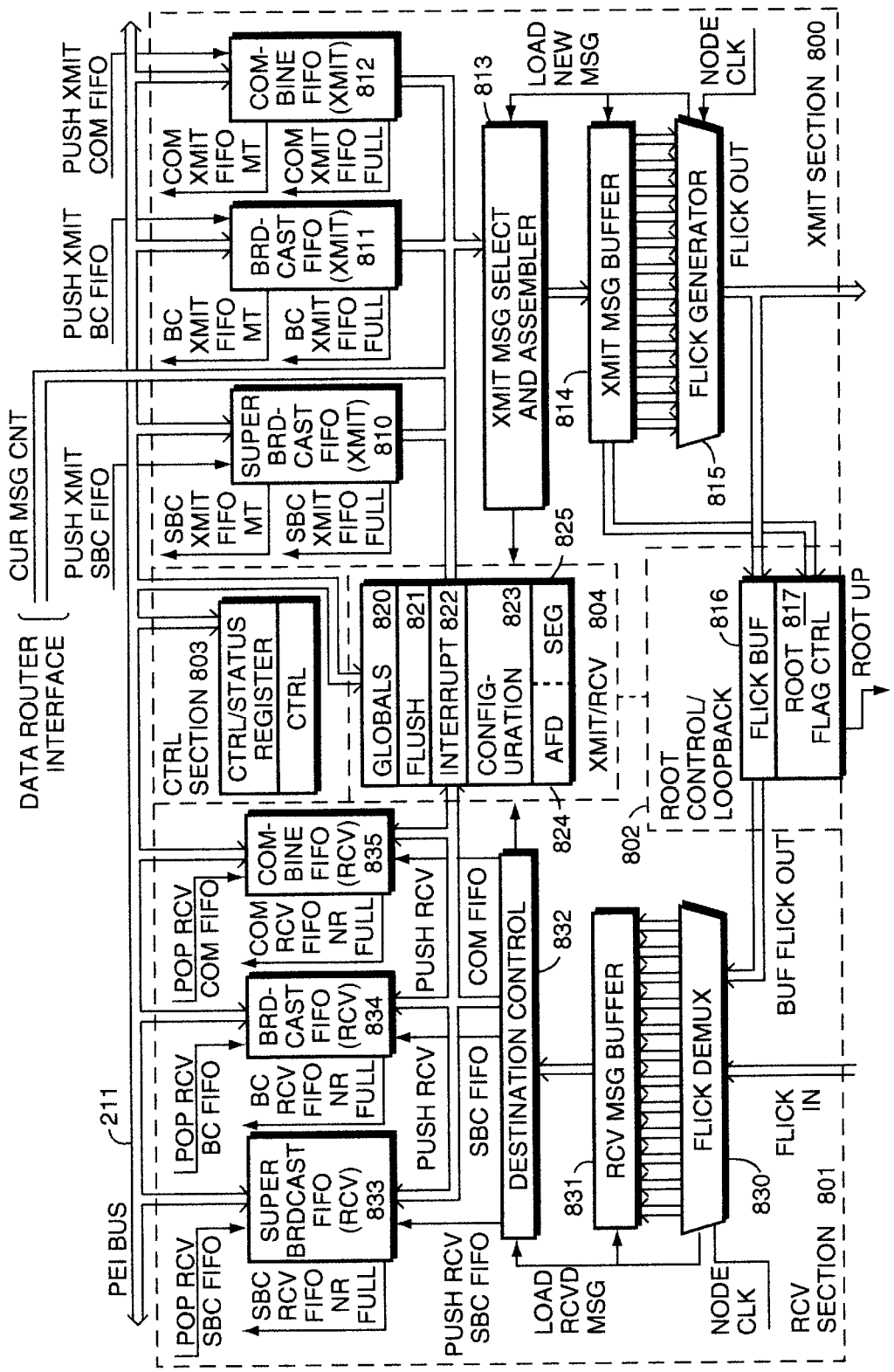
Figures 2A, 7B:
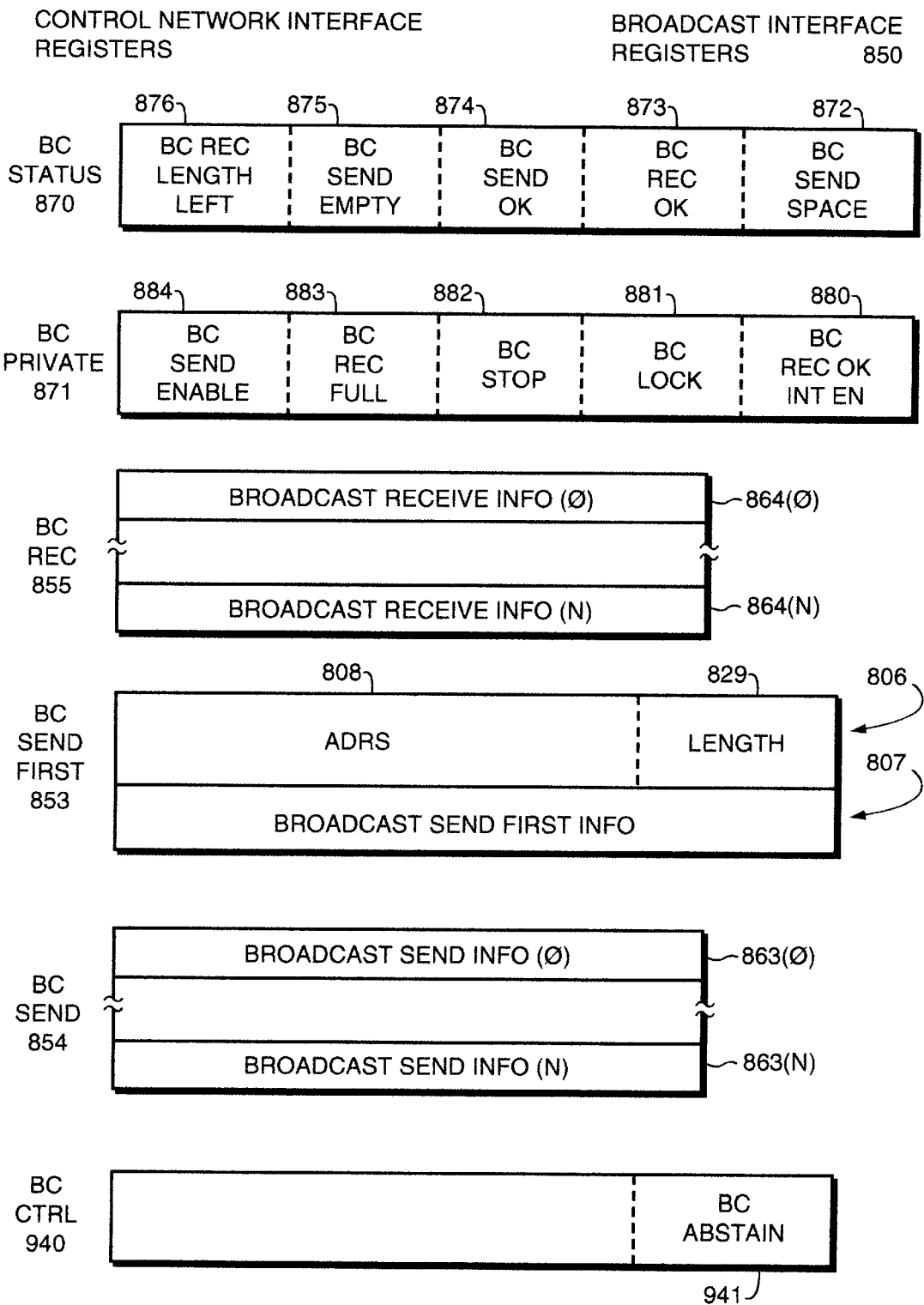
Figures 2B, 7B:
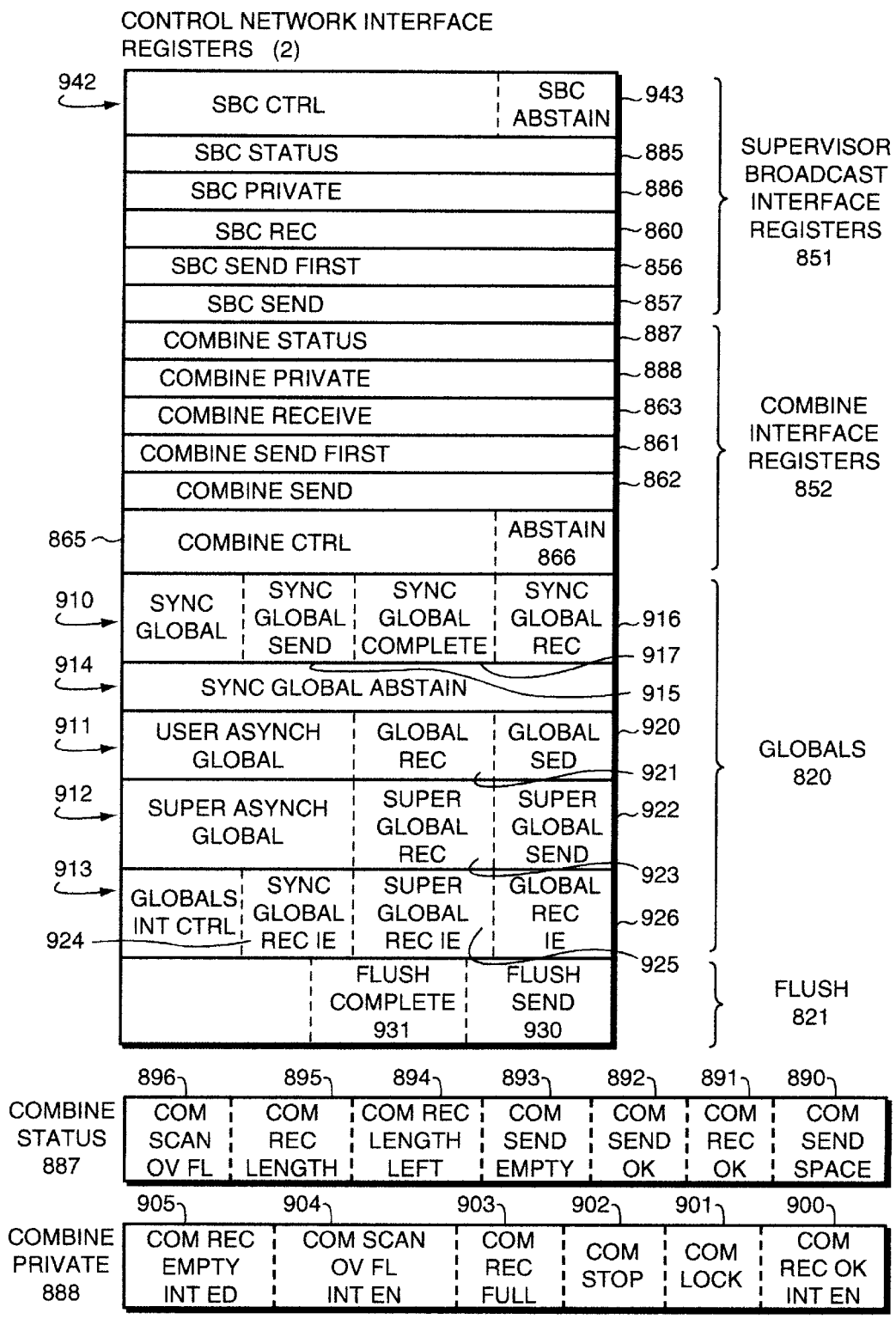

With reference to FIG. 7B-1, the control network interface 204 includes a transmit section 800 that transmits control network message packets 60 over the control network 14, a receive section 801 that receives control network message packets 60 from the control network 14, and a root control/loopback section 802, all of which are controlled by a common control section 803 and set of registers 804. The transmit section 800 transmits, that is, injects, control network message packets 60 over the control network 14. The receive section 801 receives, that is, ejects, control network message packets from the control network 14, in particular, from the control network node 50(1,j) (FIG. 4A) connected thereto.

The root control/loopback section 802 determines whether the control network interface 204 is a logical root of a sub-tree, and if so asserts a ROOT UP signal, which is received by the control network node 50(1,j). It will be appreciated that, if the control network interface 204 is asserting the ROOT UP signal, it is the root of a sub-tree that comprises only the single leaf 21.

The common control section 803 maintains several control and status registers and effectively controls the operations of the interface 204 as will be described below. The registers 804 contain information which is used in generating control network message packets 60. The registers 804 can be written by the processor 200 to transmit some control information over the control network 14 in message packets 60 transmitted by the transmit section 800. Alternatively, the registers 804 may be loaded with control information which the receive section 801 obtained from control network message packets 60 received thereby. Like the data router interface 205, the control network interface 204 also makes use of a number of registers to enable the processor 200 to initiate transfers of message packets 60 over the control network 14, and facilitate reception by the processor 200 of data from control network message packets 60 that the control network interface 204 receives from the control network 14. The registers will be described in detail in connection with FIGS. 7B-2A and 7B-2B.

With reference to FIGS. 7B-2A and 7B-2B, the registers in the control network interface 204 include a plurality of interface registers including a broadcast interface register set 850, a supervisor broadcast register set 851 and a combine interface register set 852. In particular, the processor may initiate transmissions over the control network 14, by loading information in the broadcast register set 850, supervisor broadcast register set 851, or combine register set 852, depending on the particular type of control network message packet 60 to be transmitted or received and the operating mode of the processor 200. For example, if the processing element 11 is to transmit or receive a control network message packet 60 of the single-source message type and the processor 200 is operating in the user operating mode, it will use the broadcast interface register set 850. On the other hand, if the processing element 11 is to transmit or receiver a control network message packet 60 of the single-source message type and the processor 200 is operating in the supervisor operating mode, it may use the supervisor broadcast interface set 851. If the processing element 11 is to transmit or receive a control network message packet 60 of the multiple-source message type, such as to initiate a scan or reduce operation or obtain the result thereof, the processor 200 will use the combine interface register set 852.

All of the register sets 850, 851 and 852 are generally similar, and so broadcast interface register set 850 will initially be described in detail. Like the register sets 230, 290 and 291 (FIGS. 7A-2A and 7A-2B), broadcast interface register set 850 includes a broadcast send first register 853, a broadcast send register 854 and a receive register 855, which are used in a manner generally similar to the send first, send and receive registers 234, 235, and 233, respectively of the data router interface 205 (FIG. 7A-2A), except that the first word of the send first registers in the control network interface register sets includes diverse fields, as will be described in connection with FIG. 7B-2A. The supervisor broadcast includes send first, send and receive registers 856, 857 and 860 and the combine interface register set 852 includes send first, send and receive registers 861, 862 and 863, which are similar to the correspondingly-named registers 853, 854 and 855 in the broadcast interface register set 850 as shown on FIG. 7A-2A, they will not be described in detail further herein.

The processor 200 enables the control network interface 204 to generate control network message packets 60 in a manner similar to that in which it enables the data router interface 205 to generate data router message packets 30. In particular, the processor 200 first transmits information to the send first register. Thereafter, if the control network message packet 60 is, for example, for a multi-word scan operation, requiring multiple control network message packets 60 each having a thirty-two bit word, the processor 200 can provide the additional words by loading them into the send register in the particular register set.

When the control network interface 204 receives a control network message packet 60 from the control network 14, it enables the processing element interface 212 to interrupt the processor 200, identifying the particular register set into which the information from the message packet 60 was loaded. The processor 200 can obtain the data received from a particular control network message packet 60 by retrieving the contents of the receive register in the particular register set identified in the interrupt.

The send first register 853 in the broadcast interface register set 850 has the general structure which is shown in FIG. 7B-2A. With reference to FIG. 7B-2A, each send first register includes two words 806 and 807. A high-order address field 808 in the first word 806 contains an address value, in the address space defined for the memory bus 203 (FIG. 6) of the network interface 202 and, specifically, of the particular control network send first register being addressed in the control network interface 204. A length field 829 includes a length value identifying the number of words to be transmitted. If the length value is one, the message length is one and the data in the word 807 is used to form one control network message packet 60. On the other hand, if the length value differs from one, multiple control network message packets 60 are to be transmitted, with data in the respective data fields 70, the first data word obtained from word 807 of the broadcast send first register 853, and subsequent data words being obtained from successive ones of words 263(0) through 263(N) (generally identified by reference numeral 263) of the broadcast send register 854. The first word of the supervisor broadcast send first register 856 is generally similar to that of the broadcast send first register 853. The first word of the combine send first register 861 includes some additional fields, including a combine function field and pattern field (not shown) which the control network interface 204 uses in generating the packet header 61.

The processor 200 uses the broadcast receive register 855 in connection with the retrieval of data words from control network message packets 60 received from the control network 14. The broadcast receive register 855 includes a number of words 864(0) through 864(N) (generally identified by reference numeral 864) which store one or more successively-received words from data fields 70 of control network message packets 60. The supervisor broadcast receive register 860 and the combine receive register 863 have a similar structure and are used by the processor in a similar manner.

The broadcast interface register set 850 also includes a broadcast status register 870 and a broadcast private register 871 which, in a manner similar to that of correspondingly named registers 231 and 232, store information relating to the transmission and reception of control network message packets 60. The broadcast status register 870 includes a plurality of fields, including a send space field 872 which will be described below. A broadcast receive OK flag 873 and a broadcast send OK flag 874 indicate the status of the last reception and transmission, respectively, of a control network message packet 60. A send empty flag 875 is set if all data received through the broadcast send first register 853 and broadcast send registers 854 has been used in control network message packets. A broadcast receive length left field 876 identifies the number of words 864 to be retrieved by the processor 200 through the broadcast receive register 855.

The broadcast private register 871 includes a number of flags, generally controlled by processor 200, which control transmission and reception by the control network interface 204 of control network message packets 60 using the broadcast interface register set 850. A broadcast receive OK interrupt enable flag 880, when set, enables the network interface 202 to interrupt the processor 200 in response to receipt from the control network 14 of a control network message packet 60 of the single-source type, whose packet type field 65 identifies the user mode. A broadcast lock flag 881, when set, disables the control network interface 204 from accepting additional words through the broadcast send first register 853 and broadcast send register 854 for further control network message packets 60. A broadcast stop flag 882, when set, disables the control network interface 204 from transmitting control network message packets using data provided through the broadcast interface register set 850. If the control network interface 204 has additional data words to transmit, after the broadcast stop flag 882 is set, the control network interface 204 holds them until the broadcast lock flag is cleared or until they are retrieved by processor 200.

In addition, the broadcast private register includes a broadcast receive flag 883 and a broadcast send enable flag 884. The broadcast receive flag will be described below. The broadcast send enable flag 884, when set, enables the control network interface 204 to transmit data the processor 200 has previously supplied thereto through the broadcast interface register set 850 over the control network 14.

The supervisor broadcast interface register set 851 also each has a status register 885 and a private register 886, both of which are similar to the status and private registers 870 and 871 of the broadcast interface register set 850. Similarly, the combine interface register set 852 also has a status register 887 and private register 888. The combine status register 887 has a number of flags and fields 890 through 894 which are similar to correspondingly-named fields 872 through 876 of the broadcast status register 870. In addition, the combine status register 887 includes a receive length field 895, which receives a value identifying the number of data words involved in a scan or reduce operation which the processor 200 can retrieve through the combine interface register set 852, and a scan overflow flag 896 which reflects the condition of the scan overflow bit 80 (FIG. 5) of the last received control network message packet 60 which carried the data for a scan or reduce operation which the processor 200 can retrieve through the combine interface register set 852.

Similarly, the combine private register 888 includes a number of flags 900 through 903 which are similar to the correspondingly-named fields 880 through 883 of the broadcast private register 871. In addition, the combine private register 888 includes a combine scan overflow interrupt enable flag 904 and a combine receive empty interrupt enable flag 905. The combine scan overflow interrupt enable flag 905, when set, enables the network interface 202 to interrupt the processor 200 when the combine scan overflow flag 896 is set. Similarly, the combine receive empty interrupt enable flag 905, when set, enables the network interface 202 to interrupt the processor 200 when the processor has retrieved the last data word from the control network interface 204 through the combine interface register set 852.

The combine interface register set 852 also includes a combine control register 865 that includes an abstain flag 866. When the abstain flag 866 is set, the control network interface 204 transmits control network message packets 60 of the abstain message type so that the processing element 11 will abstain from a scan or reduce operation.

Returning to FIG. 7B-1, the transmit section includes three first-in first-out buffers, namely, a supervisor broadcast transmit first-in first-out buffer (FIFO) 810, a broadcast transmit FIFO 811 and a combine transmit FIFO 812. Generally, the supervisor broadcast transmit FIFO 810 stores information used by the control network interface 204 in creating control network message packets 60 of the single-source message type, while the processor 200 is in its supervisor operating mode. Similarly, the broadcast transmit FIFO 811 stores information used by the control network interface 204 in creating control network message packets 60 of the single-source message type, while the processor 200 is in its user operating mode. The combine transmit FIFO 812 stores information used by the control network interface in creating control network message packets 60 of the multiple-source message type, including router done packets 60 which are used to determine if the data router 15 is empty. Information in the combine transmit FIFO 812 that enables creation of packets other than a router done packet includes the data that will be used in establishing the contents of the data nibbles 70(i) (FIG. 5) of the packet 60. However, information in the combine transmit FIFO 812 that enables creation of router done packets does not include such data; the data is instead provided by the CUR MSG CNT current message count signals from the data router interface 205.

Each transmit FIFO 810 through 812 has data input terminals that are connected to the interface bus 211 and is loaded by the interface 212 with the contents of the send first and send registers of the respective supervisor broadcast, broadcast and combine register set when the processor 200 transfers information thereto. In particular, the information loaded by the processor 200 through the supervisor broadcast send first and send registers 856 and 857 is actually loaded into the supervisor broadcast transmit FIFO 810, information loaded by the processor 200 through the broadcast send first and broadcast send registers 853 and 854 is actually loaded into the broadcast transmit FIFO 811, and information loaded by the processor 200 through the combine send first and combine send registers 861 and 862 is actually loaded into the combine transmit FIFO 812. The interface 212 asserts a PUSH XMIT SBC FIFO push transmit supervisor broadcast first-in first-out buffer signal, a PUSH XMIT BC FIFO push transmit broadcast first-in first-out buffer signal or a PUSH XMIT COM FIFO push transmit combine first-in first-out buffer signal to enable the respective FIFO 810 through 812 to receive and store the information.

Each transmit FIFO 810 through 812 generates status signals "XXX" XMIT FIFO FULL transmit buffer full signal and "XXX" XMIT FIFO MT transmit buffer empty signal ("XXX" may comprise "SBC" which identifies the supervisor broadcast transmit FIFO 810, "BC" which identifies the broadcast transmit FIFO 811, or "COM" which identifies the combine transmit FIFO 812) which indicate whether the respective buffer is nearly full or nearly empty. If a particular FIFO 810 through 812 is asserting its "XXX" XMIT FIFO FULL signal, the interface 212 rejects attempts by the processor 200 to load information.

Each transmit FIFO 810 through 812 also includes data output terminals that are connected to a transmit message select and assembler circuit 813. Under control of a LOAD NEW MSG load new message signal, circuit 813 receives the "XXX" XMIT FIFO MT signals, determines whether any of them have information to be used in a control network message packet 60, and if so assembles a control network message packet 60. In assembling the message packet, the circuit 813 may also use the contents of registers 804 and CUR MSG CNT current message count signals from the data router interface 205 if the PKT TYPE XMIT signals indicate that the control network message packet 60 is a router done packet. As is typical with a FIFO buffer, as the transmit message select and assembler circuit uses data from the supervisor broadcast transmit FIFO 810 and the broadcast transmit FIFO 811 in assembling control network message packets 60, that data is removed from the respective transmit FIFOs 810 and 811. However, the combine transmit FIFO 812 retains the data until results of the particular combine operation are received by the receive section.

The transmit message select and assembler 813 couples forty-eight bit words representing the header 61 and data portion 62 of the assembled message packet 60 to a transmit message buffer 814, which latches it in response to the LOAD NEW MSG signal. In response to successive ticks of the NODE CLK signal, a flick generator iteratively selects four-bit nibbles from the transmit message buffer 814 and appends to each selected nibble a high-order bit comprising the tag bit. The flick generator 815 transmits the result as FLICK OUT (4:0) flick output signals to the control network node 50(1,j) connected thereto, and also to a flick buffer 816 in the root control/loopback circuit 802.

As it iteratively transmits the FLICK OUT (4:0) signals, the flick generator 815 generates a checksum, which it transmits as the thirteenth flick of the control network message packet. Contemporaneously with transmission of the last flick of the message packet 60, the flick generator 815 asserts the LOAD NEW MSG load new message signal to enable the transmit message buffer 814 to latch a new word and the transmit message select and assembler 813 to generate a new control network message packet 60 for transmission.

As noted above, the control network interface 204 includes a set of registers 804 that provide information which may also be used by the transmit message select and assembler 813 in generating message packets. A globals register set 820 contains global bits that can be used to perform a global operation as described above. With reference to FIG. 7B-2B, the globals register set 820 includes a number of globals registers, each of which includes one or more flags. A synchronous global register 910, a user asynchronous global register 911 and a supervisor asynchronous global register 912 store flags that are used in conditioning the four global information bits 71(A) through 71(D) contained in the four-bit nibble 71 of transmitted control network message packets 60, and that are conditioned in response to the same bits of received control network message packets 60. The globals register set 820 also includes a globals interrupt control register 913 and a synchronous global abstain register 914.

The synchronous global register 910 includes a synchronous global send flag 915, a synchronous global received flag 916 and a synchronous global complete flag 917. The user asynchronous global register 911 includes a global send flag 920 and a global receive flag 921, and the supervisor asynchronous global register 912 includes a supervisor global send flag 922 and a supervisor global receive flag 923. In addition, the globals interrupt control register 913 includes a synchronous global receive interrupt enable flag 924, an asynchronous supervisor global receive interrupt enable flag 925 and an asynchronous user global receive interrupt enable flag 926.

During a global synchronization operation, if a processing element 11 is not to abstain from the global synchronization operation, the processor 200 will condition the synchronous global send flag 915 to either the set or clear condition, at which point the synchronous global complete flag 917 will also be cleared. Prior to the clearing of the synchronous global complete flag 917, if the synchronous global abstain flag is clear indicating that the processing element 11 is not to abstain from the global synchronization operation, the transmit message select and assembler 813 will assemble a control network message packet 60 in which the synchronous global valid bit 71(B) will be in the clear condition, that is, that the signal representing the bit will have a high signal level. However, when the processor 200 clears the synchronous global complete flag 917, the message select and assembler 813 will thereafter assemble control network message packets 60 in which the synchronous global valid bit 71(B) will be in the set condition, so that the signal representing the bit will have a low signal level. In the same control network message packets 60, the transmit message select and assembler 813 will provide the synchronous global bit 71(A) having a condition corresponding to that of the synchronous global send flag 915.

When the control network interface 204, particularly the receive section 801, receives a control network message packet 60 in which the synchronous global valid bit 71(B) is in the set condition, it sets the synchronous global complete flag 917 and conditions the synchronous global receive flag 917 in response to the condition of the synchronous global bit 71(A) of the control network message packet 60. If the synchronous global receive interrupt enable flag 924 in globals interrupt control register 913 is set, the network interface 202 will interrupt the processor 200 to notify it of the receipt of the control network message packet 60, indicating the end of the global synchronization operation. If, after the processor 200 has conditioned the synchronous global send flag 915 and cleared the synchronous global complete flag 917, and before the receive section 801 has set the synchronous global complete flag 917, the processor attempts to further condition the flags 915 and 917, the network interface 202 signals an error to the processor and does not allow the subsequent conditioning of the flags 915 and 917. As a result, all of the processing elements 11, as well as any scalar processors 12 participating in the global synchronization operation, must complete the global synchronization operation and receive respective control network message packets whose synchronous global valid bits 71(B) are set, before any of them can initiate a subsequent global synchronization operation.

The processor 200 can condition the global send flag 920 and the supervisor global send flag 922, in the user asynchronous global register 911 and the supervisor asynchronous global register 912, respectively. The transmit message select and assembler 813, in assembling a control network message packet 60, conditions the global bit 71(D) and supervisor global bit 71(C), respectively, in response to the condition of these flags 920 and 922 at the time it assembles the control network message packet 60. The receive section 801 conditions the global receive flag 921 and the supervisor global receive flag 923 of the user asynchronous global register 911 and the supervisor asynchronous global register 912 in response to the condition of the global bit 71(D) and supervisor global bit 71(C), respectively, in a received control network message packet 60. If the global receive interrupt enable flag 926 or supervisor global receive interrupt enable flag 915 is set, the network interface 202 will interrupt the processor 200 in response to a change in condition of the respective global receive flag 921 and the supervisor global receive flag 923.

The registers 804 (FIG. 7B-1) further include a flush register 821 that includes two flags, namely, a flush send flag 930 and a flush complete flag 931. The processor 200 can control the flush send flag 931. If the processor 200 sets the flush flag, the transmit message select and assembler 813 sets the flush bit 75 in the control network message packet 60. As described above, the control network message packets 60 whose flush bits 75 are set enable the control network nodes 52(i,j,k,1) to flush intermediate results of a scan operation or reduce operation, effectively clearing the respective park buffers and scan buffers (FIG. 4B). When the receive section 801 receives a control network message packet 60 whose flush bit is set, it sets the flush complete flag 931. This will occur contemporaneously in all of the network interfaces 202 of all processing elements 11 and scalar processors 12 in the partition, to notify them that such intermediate results have been cleared from all of the control network nodes 52(i,j,k,1) in the partition.

The registers 804 also include an interrupt register 822 that can be loaded with an interrupt value that can be transmitted in a single-source message packet of the interrupt type, to broadcast interrupt information to other leaves 21 in the partition. In addition, a configuration register 823 contains a value that can be used in a single-source message packet of the configuration type to identify the level and sub-level at which the logical root is to be established for the partition. This information is loaded into flicks 70(0) and 70(1) of the packet data portion 62. An all-fall-down mode flag 824, which is derived from all-fall-down enable bit 256 of the private register 232 (FIG. 7A-2A) is used to initiate an all-fall-down operation in the data router 15. The all-fall-down mode flag 824 is used to condition all-fall-down mode bit 81 of the control network message packet 81. Finally, a segment flag 825, which may be conditioned by the processor 200, is used in segment bit 77 of a multiple-source control network message packet 60 to identify the beginning of a segment in a segmented scan operation.

The receive section 801 includes a flick demultiplexer 830 that iteratively receives, at each tick of the NODE CLK signal, either the FLICK IN signals from the control network node 50(i,j) or the BUF FLICK OUT buffered flick out signals from the root control/loopback circuit 802. If the root control/loopback circuit 802 is asserting SEL XMIT select transmit section signal, generally indicating that the control network interface 204 is a logical root, the flick demultiplexer 830 selects the BUF FLICK OUT signals, and otherwise it selects the FLICK IN signals. The flick demultiplexer 830 strips off the tag signals, some of which it buffers, and demultiplexes the other received signals so that successively received signals are used to form successive nibbles of a forty-eight bit word. At the same time, the flick demultiplexer 830 maintains a running checksum of the signals received at each tick of the NODE CLK signal. The flick generator uses the checksum to determine whether the control network message packet was correctly received, and, if so, it asserts a LOAD RCVD MSG load received message packet signal. The assertion of the LOAD RCVD MSG signal enables a received message buffer 831 to latch the word generated by the flick demultiplexer. In addition, the asserted LOAD RCVD MSG signal enables a receive message buffer and destination select circuit 832 to examine the word contained in the received message buffer 831, and determine in which of the following the word should be loaded: a supervisor receive broadcast FIFO 833, a broadcast receive FIFO 834, a combine receive FIFO 835, or one of the registers 804. It will be appreciated that, if the destination control 832 determines that the word should be loaded into the combine receive FIFO 835, it will be the result of a combine operation in connection with data from the combine transmit FIFO 812, and so the destination control 832 may also condition the combine transmit FIFO to receive that data therefrom. The network interface 202 may interrupt the processor 200 to notify it that data has been loaded in the receive FIFOs 833 through 835. The processor 200 may then enable retrieval of the data from the particular receive FIFO 833 through 835 through the respective receive register 855, 860 or 863, which it does by initiating retrieval through the respective receive registers 855, 860 and 863. In particular, if the processor 200 is to retrieve data from the supervisor broadcast FIFO 833, it may do so by initiating a retrieval through the supervisor broadcast receive register 860. This enables the interface 202 to assert a POP RCV SBC FIFO pop receive supervisor broadcast FIFO signal, which enables the supervisor broadcast receive FIFO to transmit data onto the bus 211, which is transferred to the interface 202 and from there to the processor 200. Similarly, if the processor 200 is to retrieve data from the broadcast FIFO 834 or combine FIFO 835, it may do so by initiating a retrieval through the broadcast or combine receive registers 855 or 863. The initiation of a retrieval through either register 855 or 863 by the processor 200 will enable the interface 202 to assert a POP RCV BC FIFO or POP RCV COM FIFO pop receive broadcast or combine FIFO signal, which enables the respective broadcast receive FIFO 834 or combine receive FIFO 835 to transmit data onto the bus 211, which is transferred to the interface 202 and from there to the processor 200.

Each receive FIFO 833, 834 and 835 generates an "XXX" RCV FIFO NR FULL receive FIFO nearly full signal ("XXX" may comprise "SBC" which identifies the supervisor broadcast receive FIFO 833, "BC" which identifies the broadcast receive FIFO 834, or "COM" which identifies the combine receive FIFO 835) which indicate whether the respective FIFO is nearly full. The "XXX RCV FIFO NR FULL signal is used by the transmit message select and assembler 813 in generating several of the tag signals for the various flicks. In addition, the flick demultiplexer 830 couples several of the tag signals which it receives to the flick generator to control transmission of control network message packets 60 thereby.

IV. Operations of System in Connection with a Context Switch Operation

With this background, the operations of system 10, in particular of processing elements 11 and one or more scalar processors 12 in a partition, in connection with a context switch will be described in connection with FIGS. 8SP-1 through 9K. It will be appreciated that a context switch may be used to accommodate, for example, time sharing of the processing elements 11 and scalar processor 12 in the partition among a plurality of users or among a plurality of processes which may be used by one or more users.

A context switch operation proceeds in two general steps. Prior to the context switch operation, the processing elements 11 and scalar processor 12 in a partition are all executing a user program, in the user operating mode, in a process context. The scalar processor 12 can enable and synchronize operations by the processing elements 11, enabling them to operate generally concurrently, by use of control network message packets of the single-source type which include as packet data commands which are processed by the processing elements 11. To enable a switch from the current process to another process, the scalar processor 12, using one or more control network message packets 60, transmits commands which initiate a context switch operation with the processing elements 11. In response, all of the processing elements 11 and the scalar processor 12 within the partition proceed to switch out the current user process, whose context is to be switched out in the context switch operation. In switching out the current user process, the scalar processor 12 and processing elements 11 cooperate to empty the control network 14 and data router 15 of control network and data router message packets 30 and 60 relating to the particular user process whose context is being switched out, and to save contents of various registers and FIFOs in the control network interface 204 and data router interface 205 of their respective network interfaces 202 which contain data supplied by or to be provided to that user process. These operations are described in connection with FIGS. 8SP-1 through 8SP-12, which detail the operations performed by the scalar processor 12 which is initiating the context switch operation, and in connection with FIGS. 8PE-1 through 8PE-12, which detail the operations performed by the processing elements 11 in connection with the context switch operation.

The control network message packet initiating the context switch operation includes the identification of a process whose context is to be switched in. After switching out the current context, the scalar processor 12 and processing elements 11 load the previously saved data defining the context for the user process whose context is to be switched in into the respective registers and FIFOs in the control network interface 204 and data router interface 205 of the respective network interfaces 202. These operations are similar as among the scalar processor 12 and processing elements 11, and will be described in connection with FIGS. 9A through 9J.

Figure 8S:
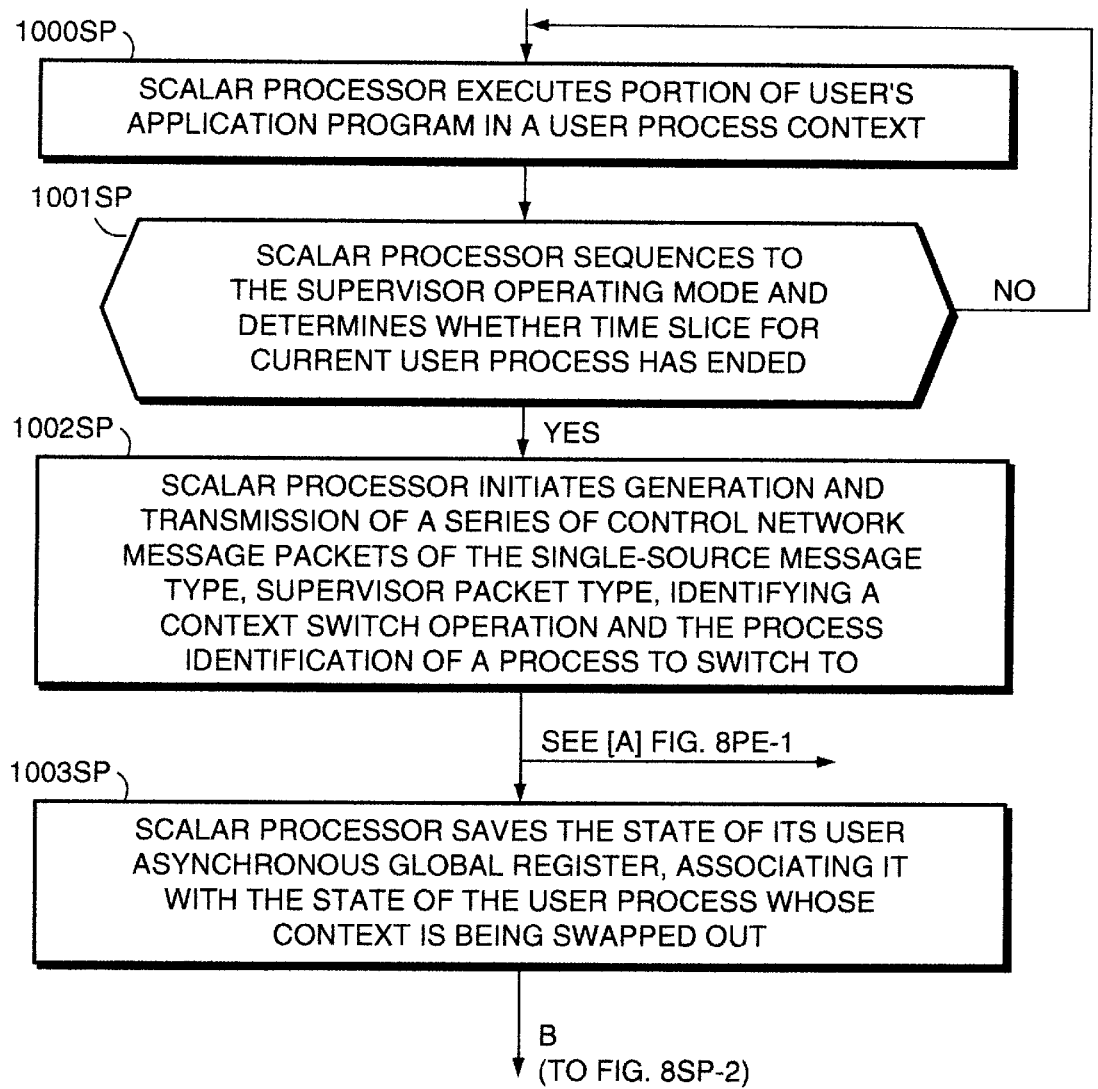
FIG. 8SP-1 through 8SP-12, 8PE-1 through 8PE-12, and 9A through 9K detail the operations performed in connection with a context switch operation.
Figure 8S:
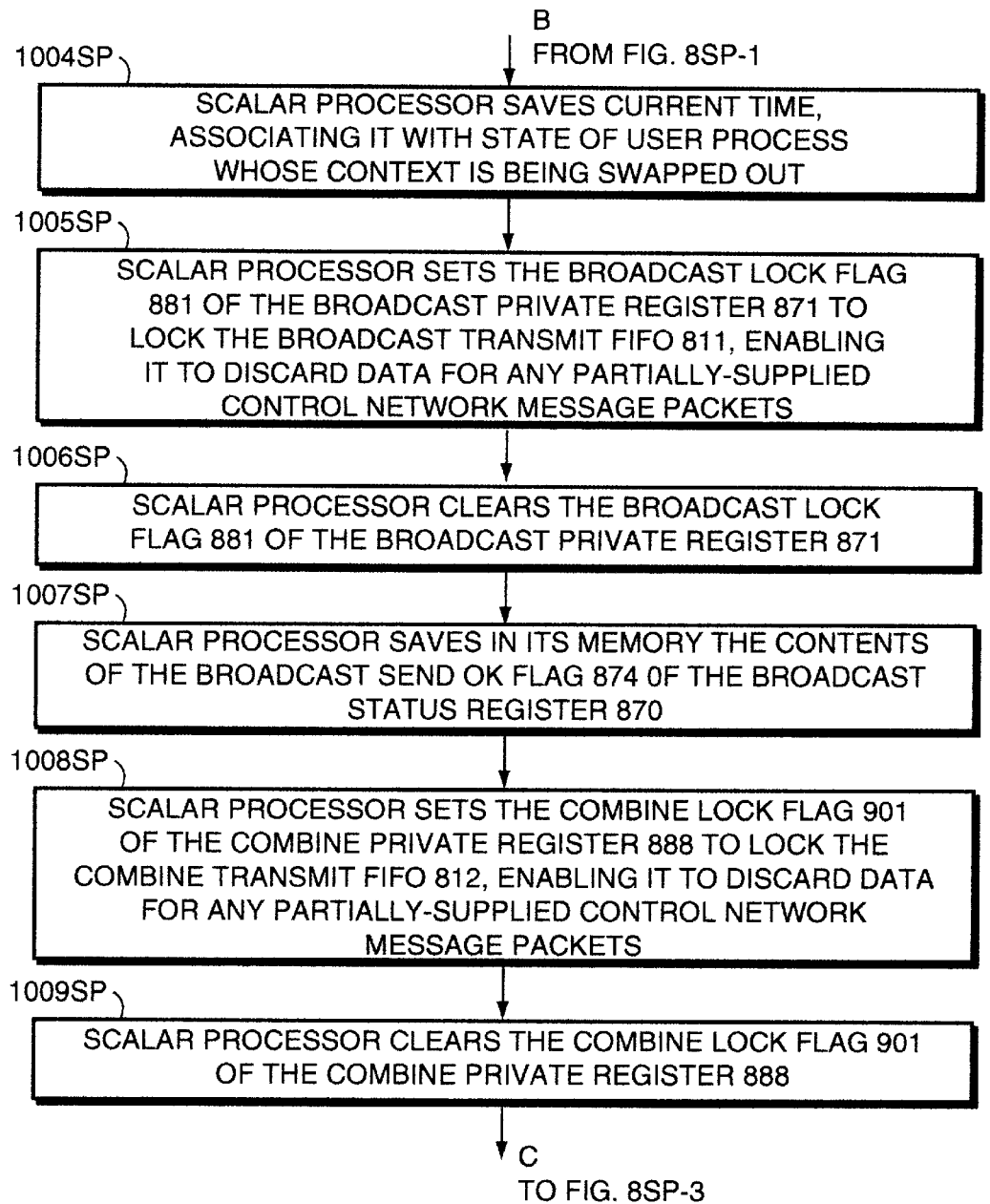
Figure 8S:
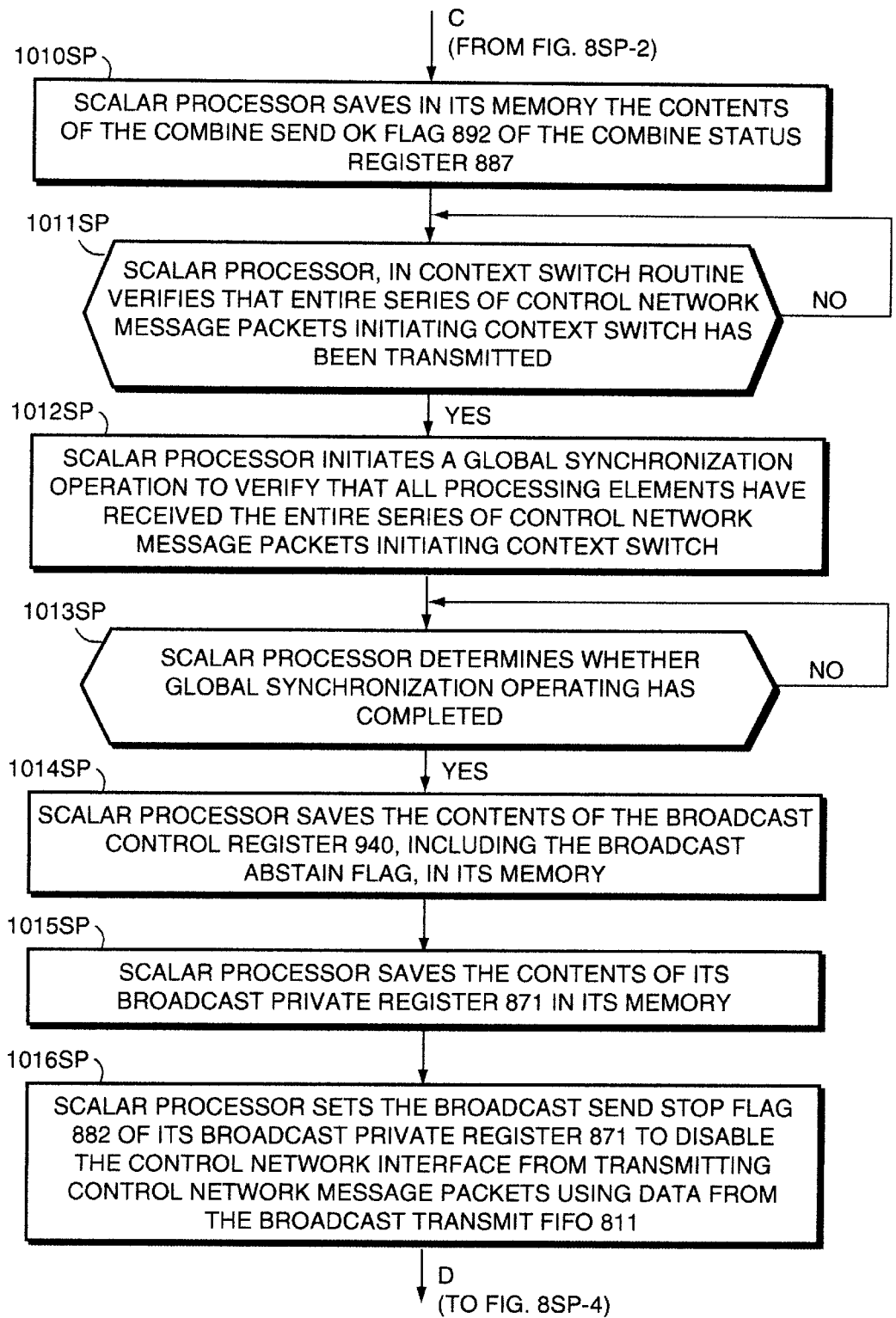
Figure 8S:
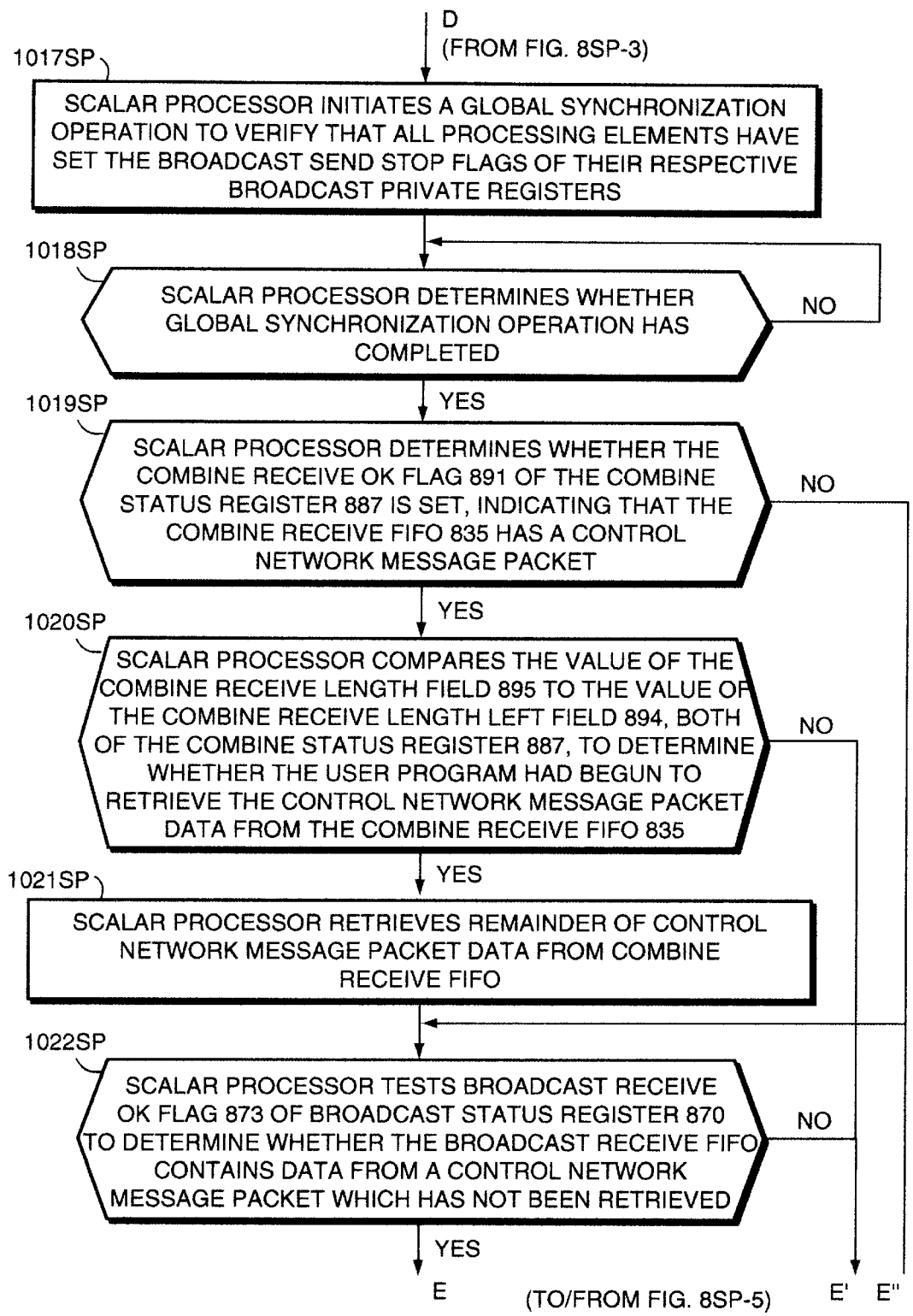
Figure 8S:
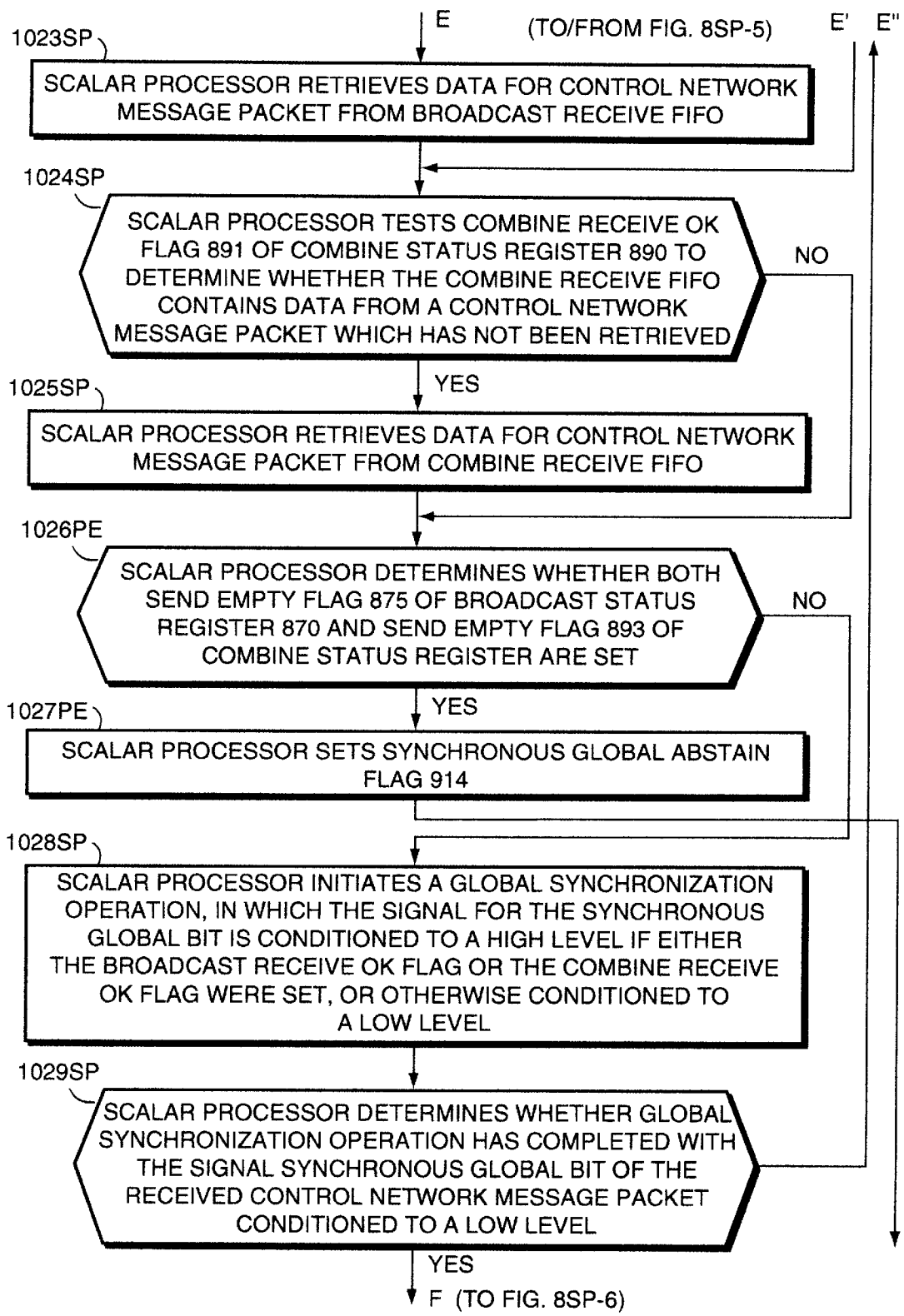
Figure 8S:
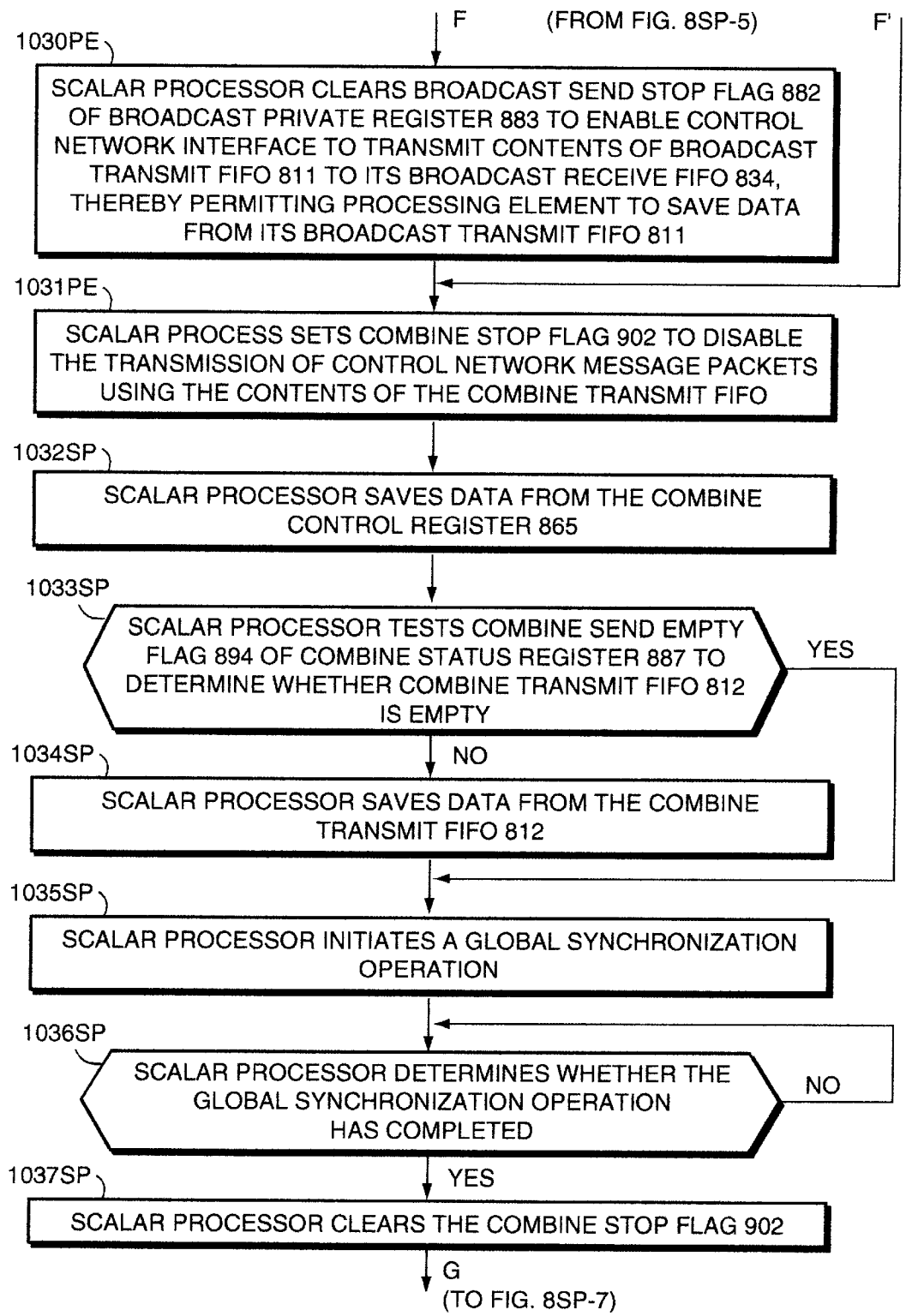
Figure 8S:
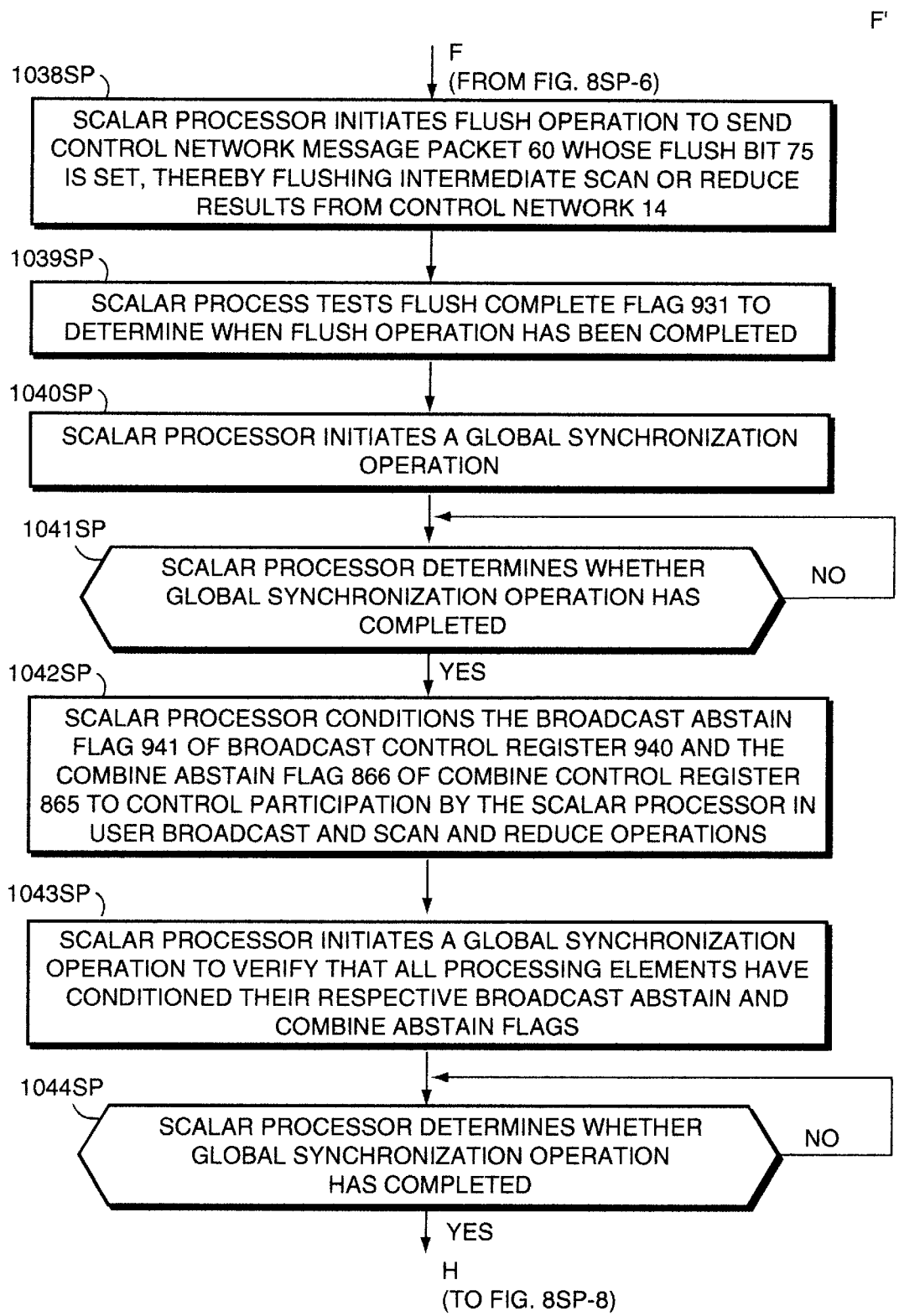
Figure 8S:
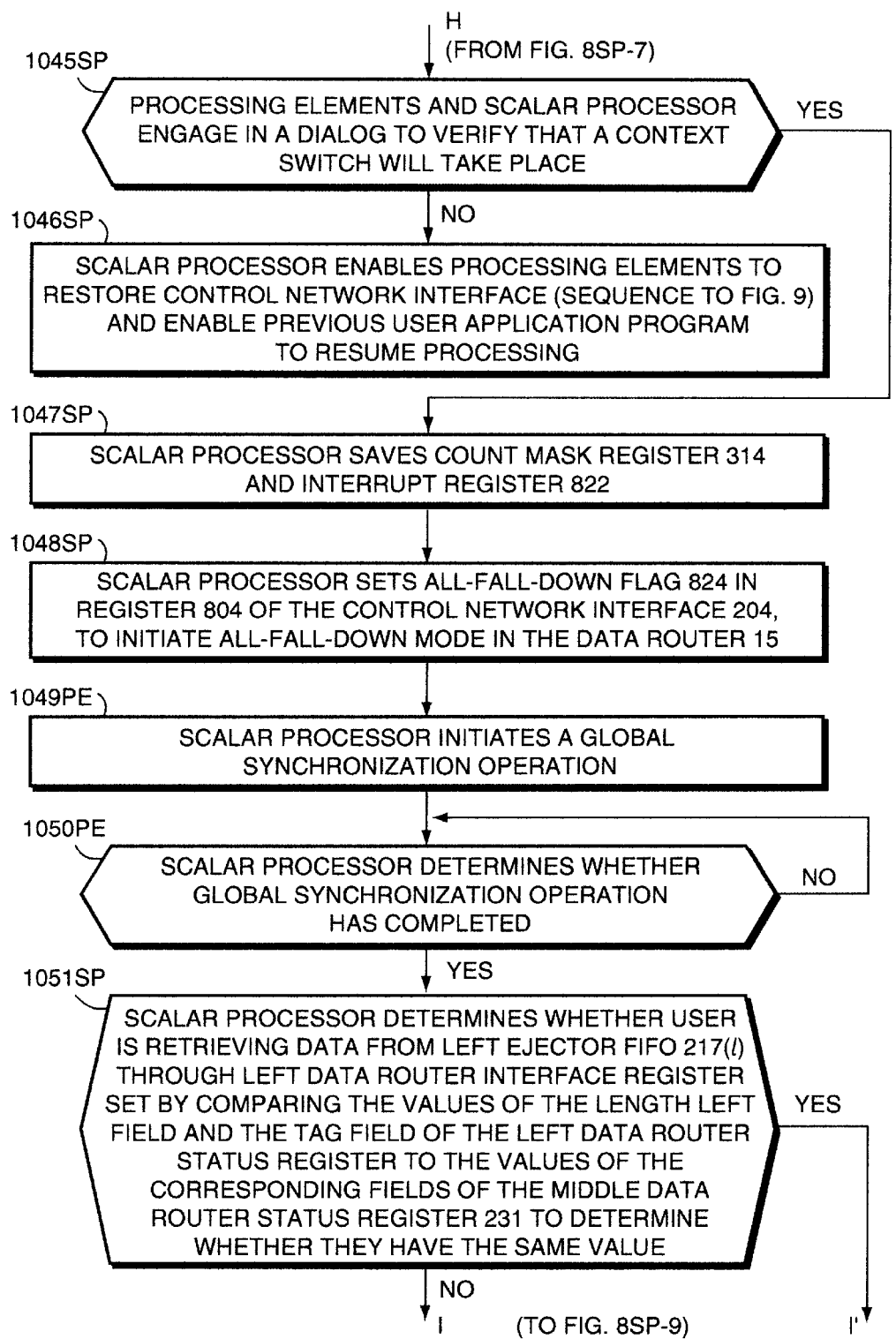
Figure 8S:
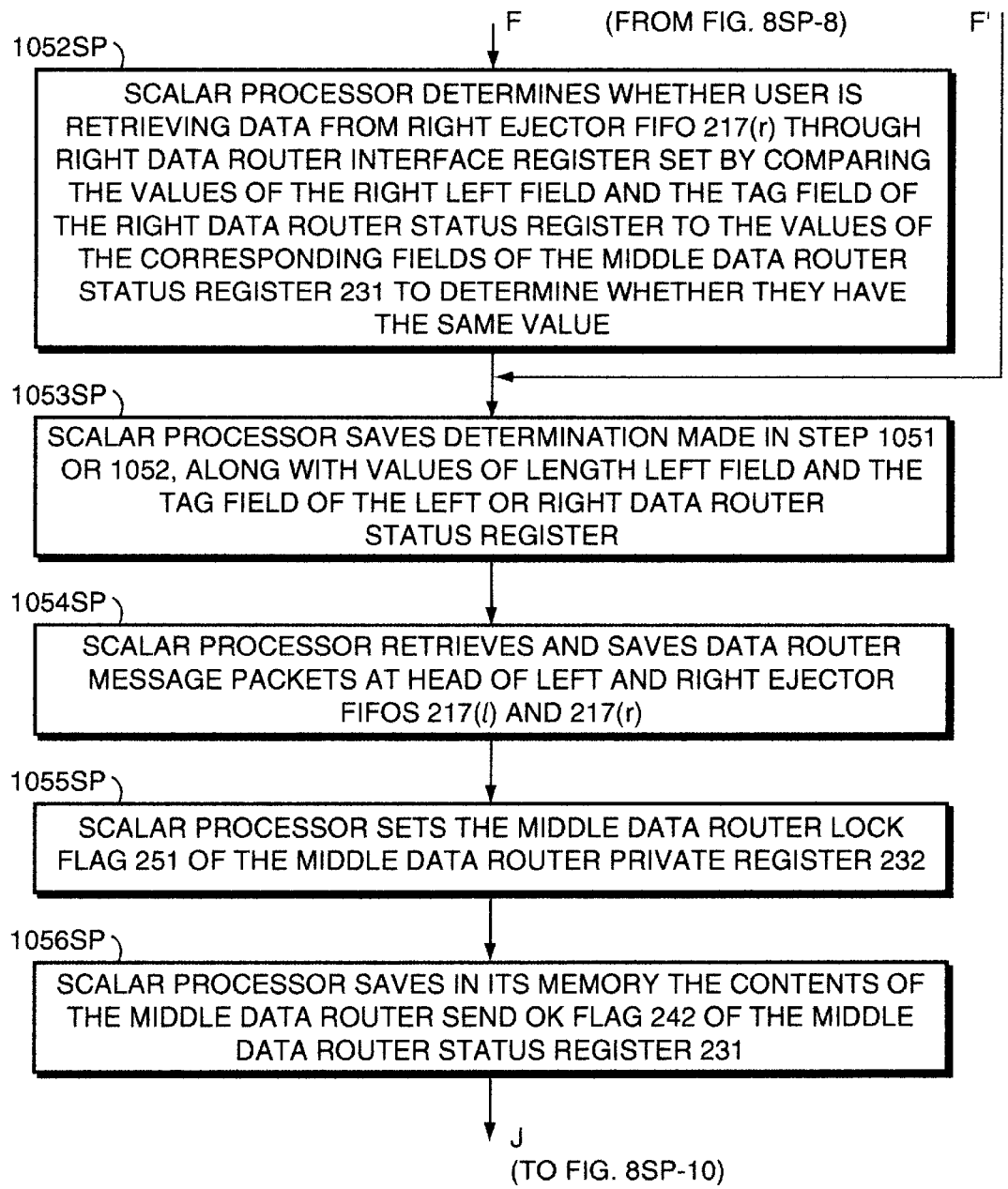
Figure 8S:
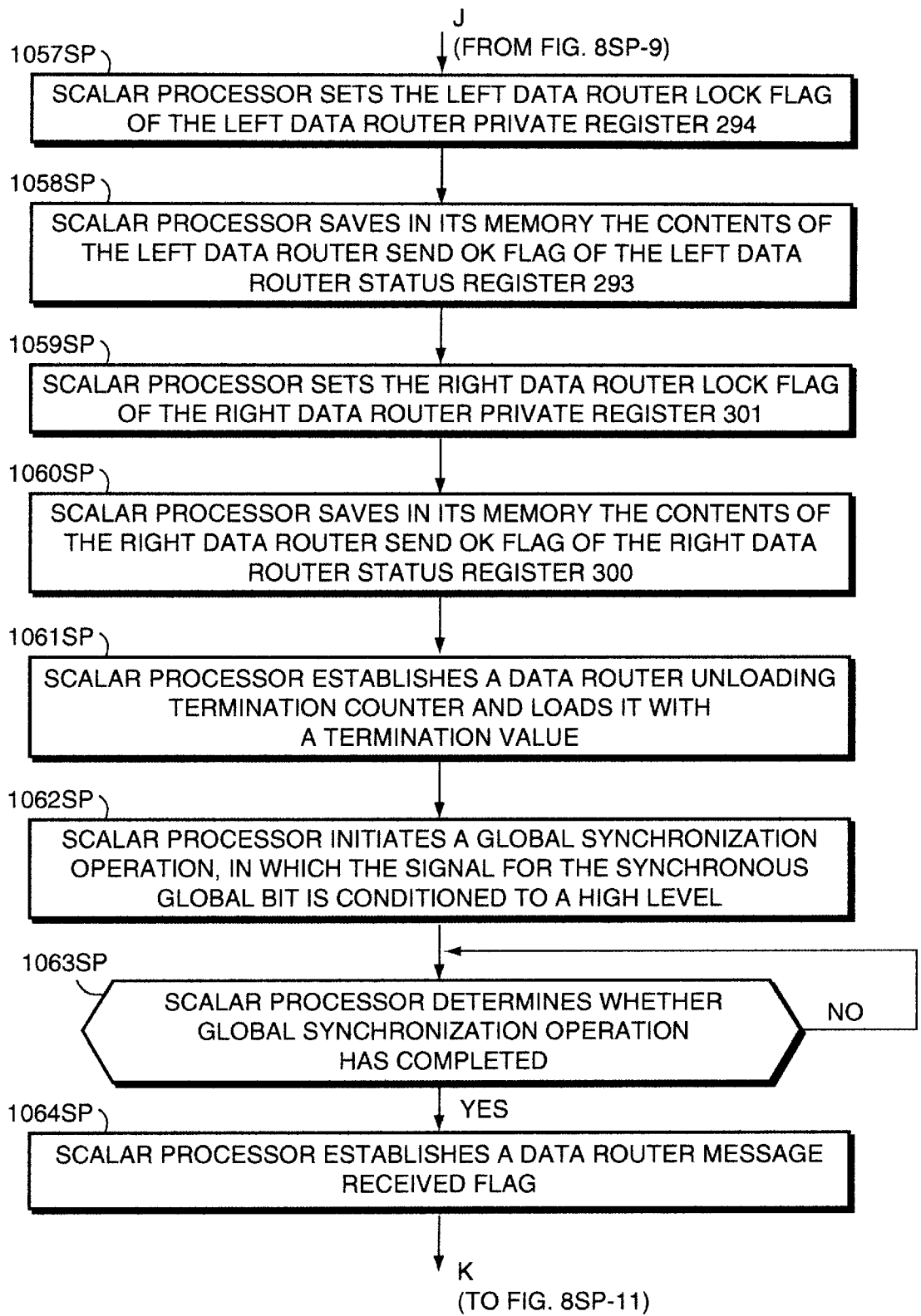
Figure 8S:
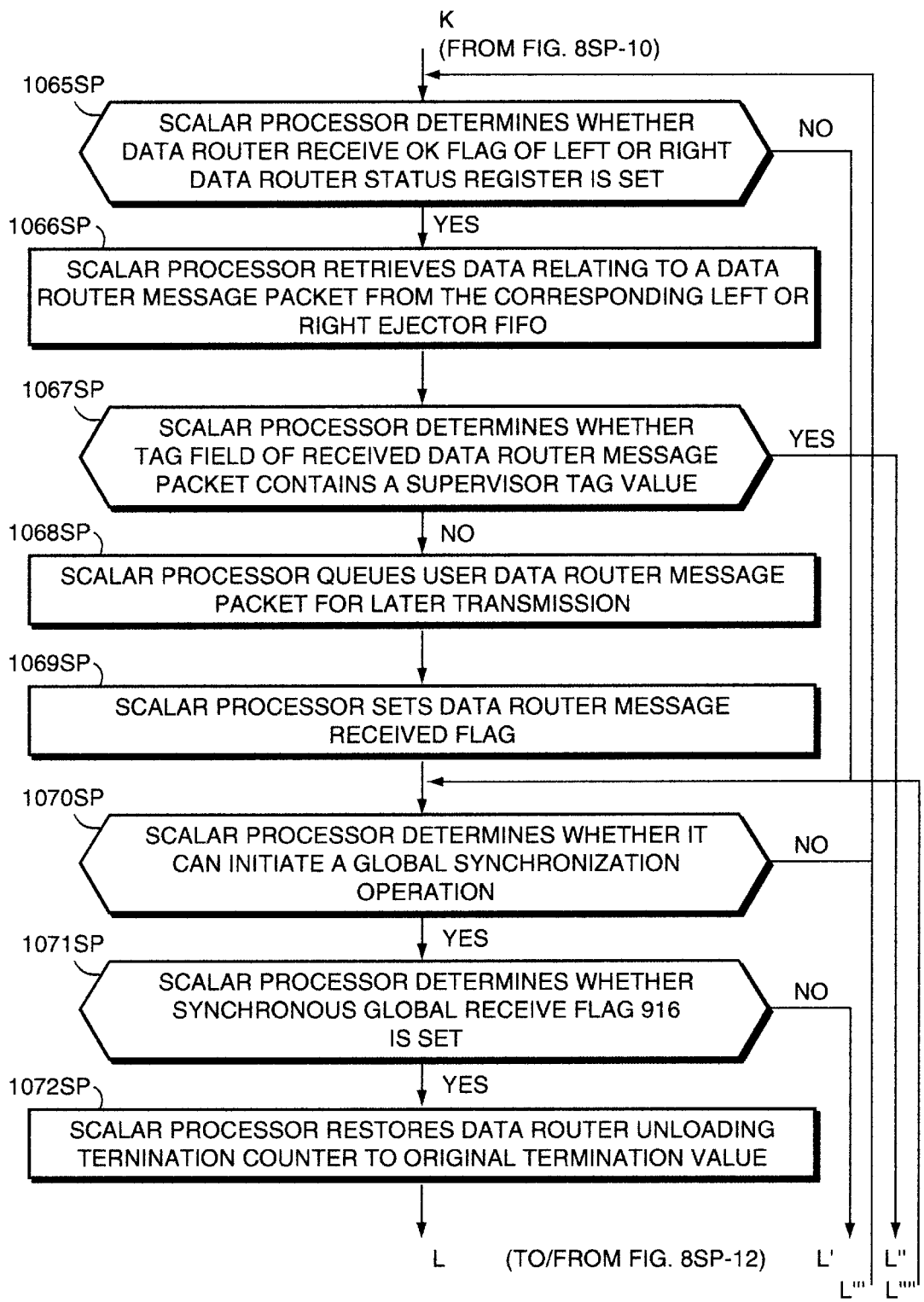
Figure 8S:
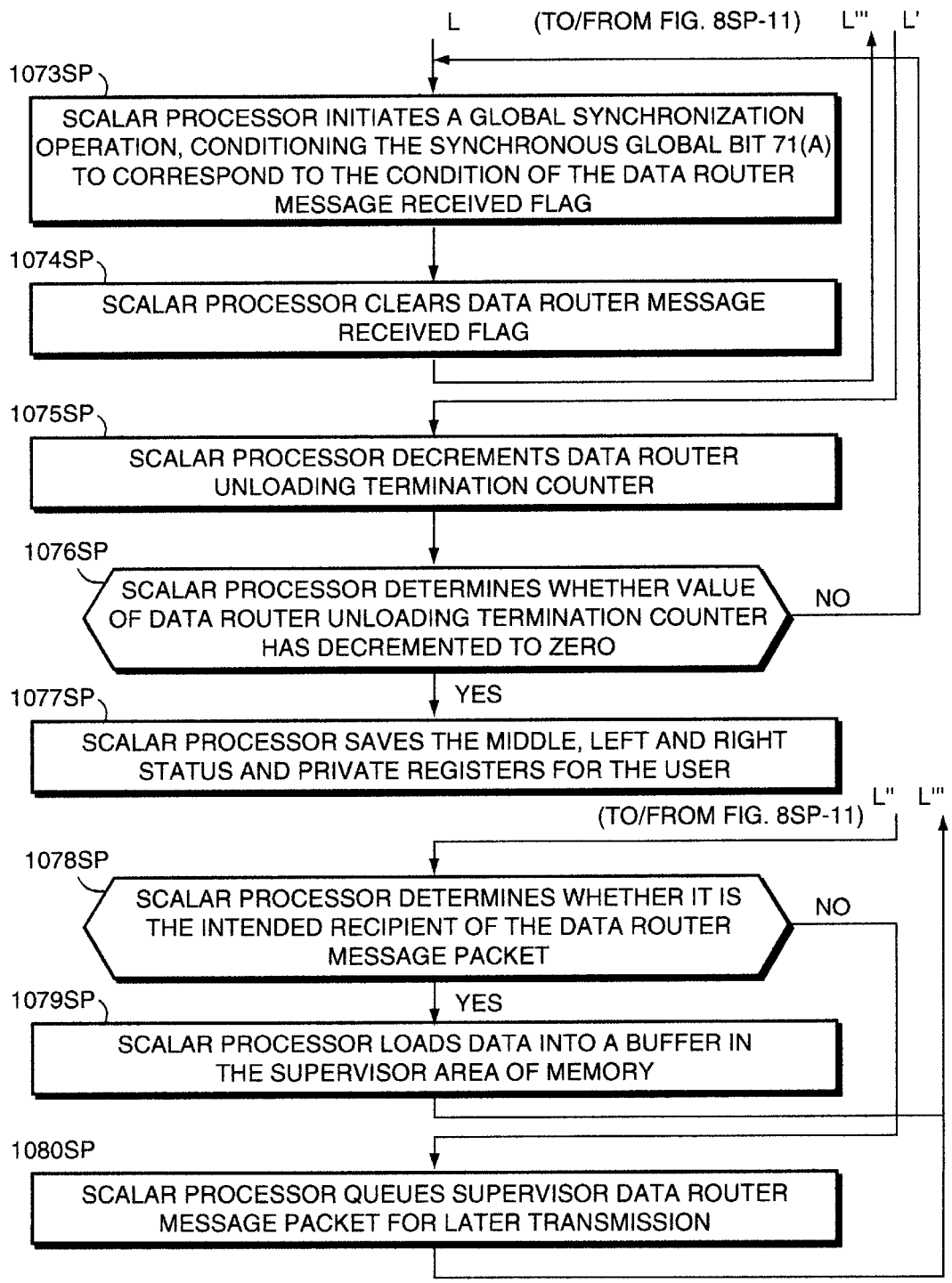
Figure 8P:
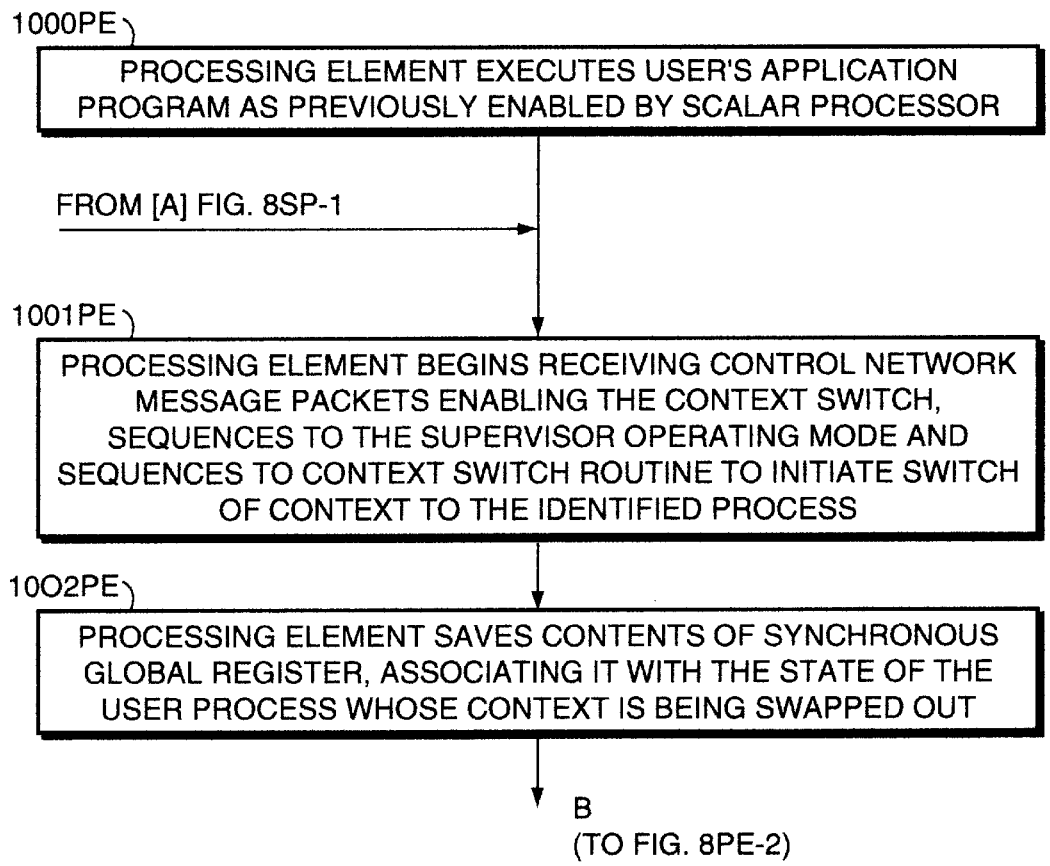
Figure 8P:
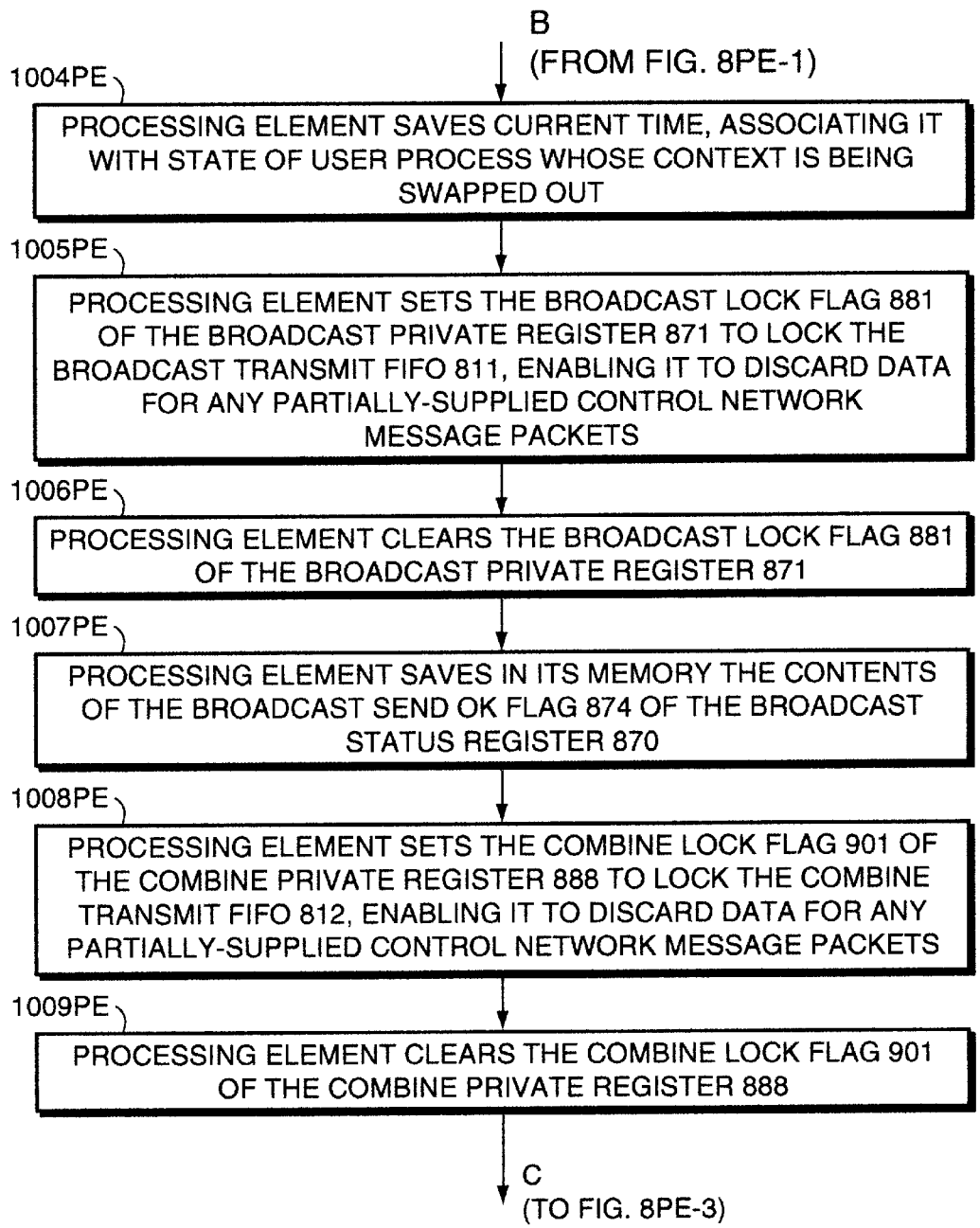
Figure 8P:
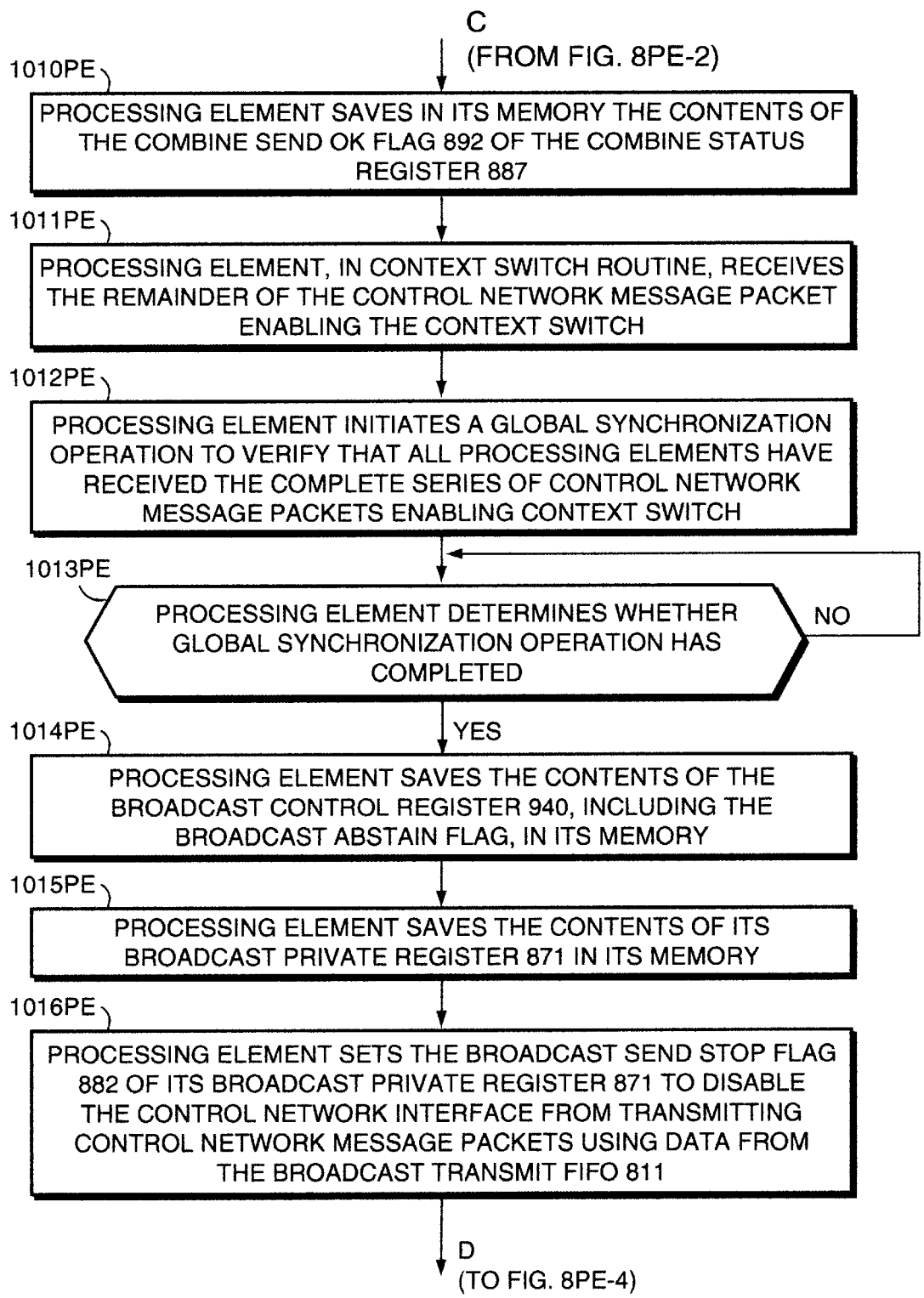
Figure 8P:
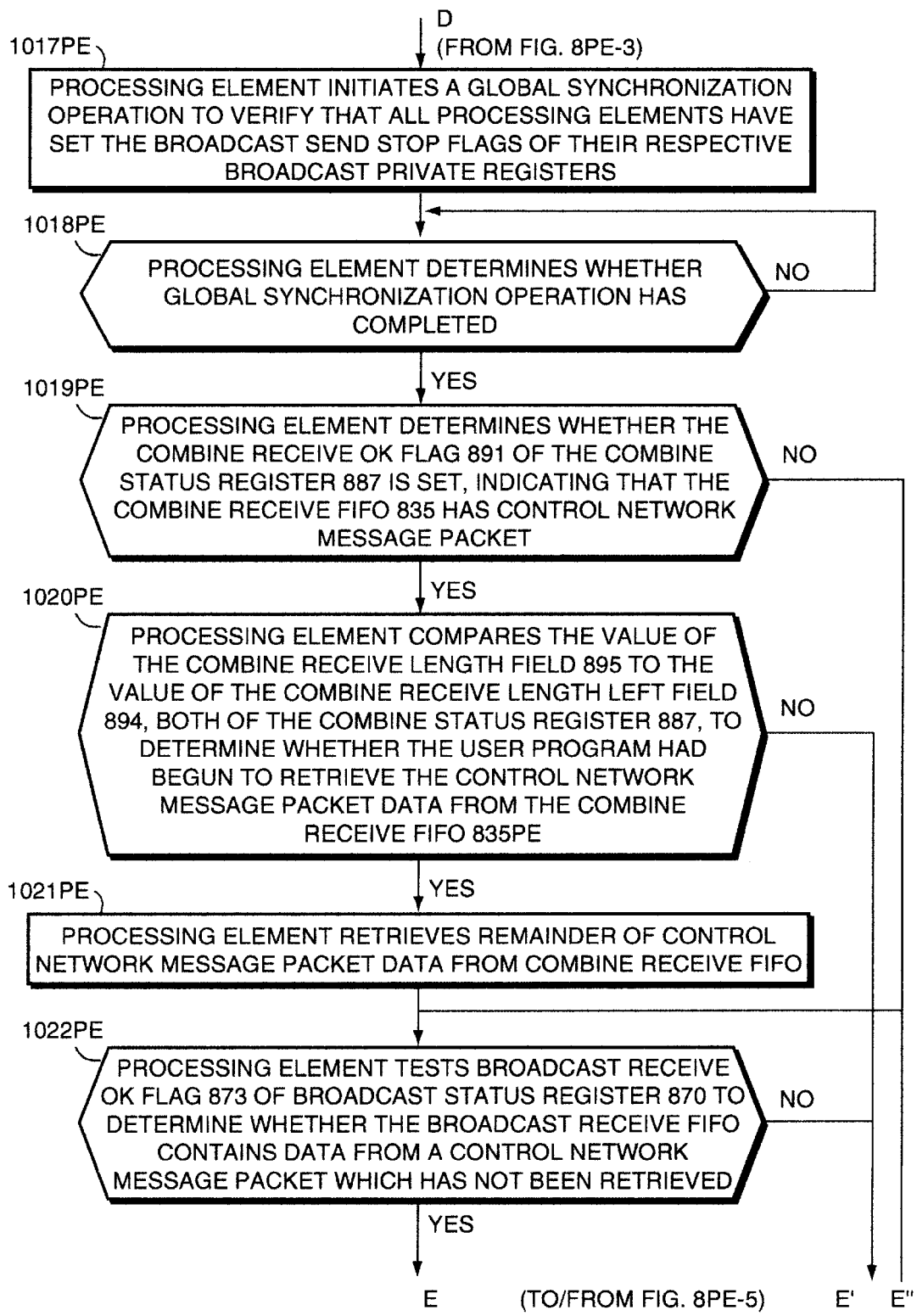
Figure 8P:
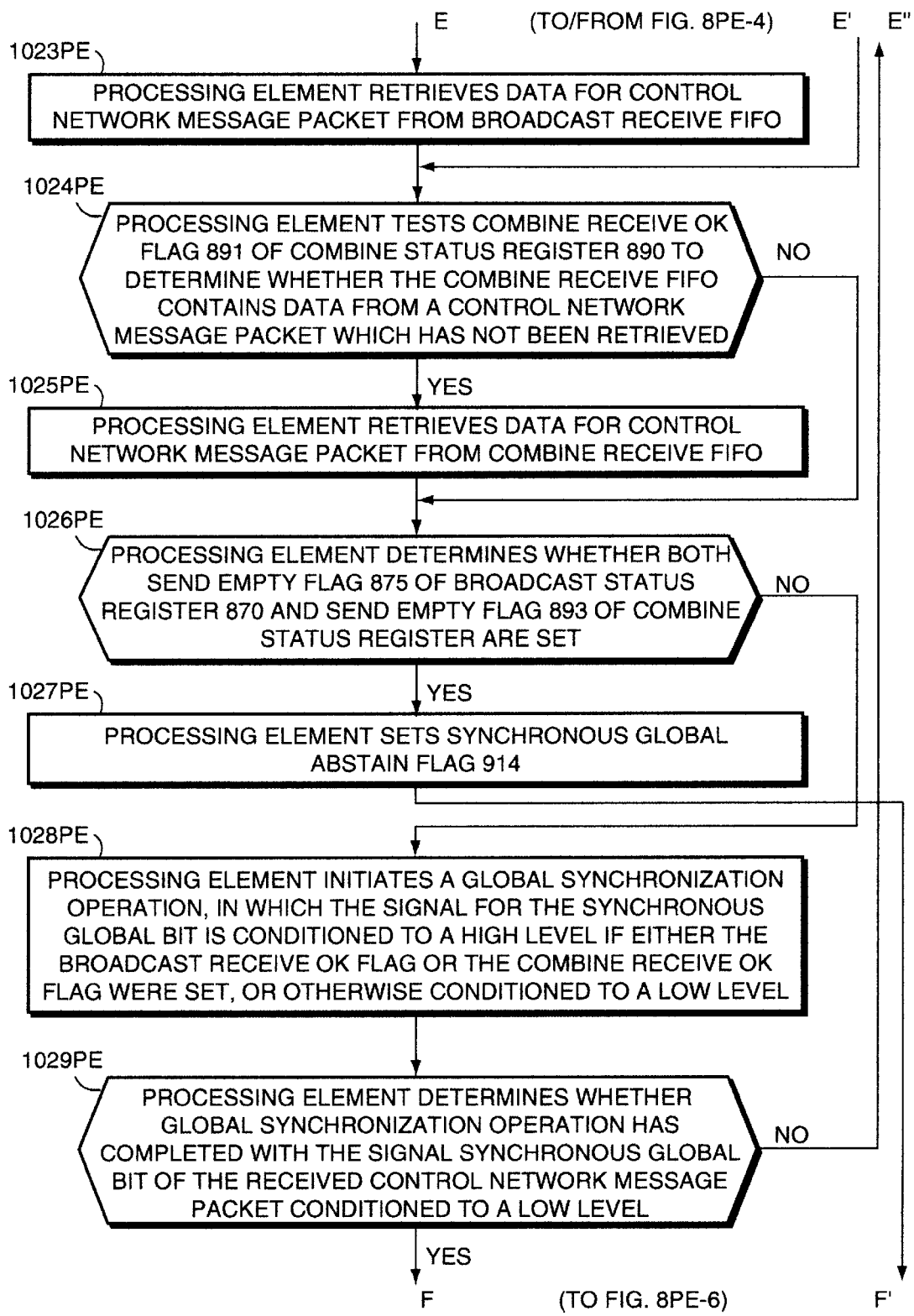
Figure 8P:
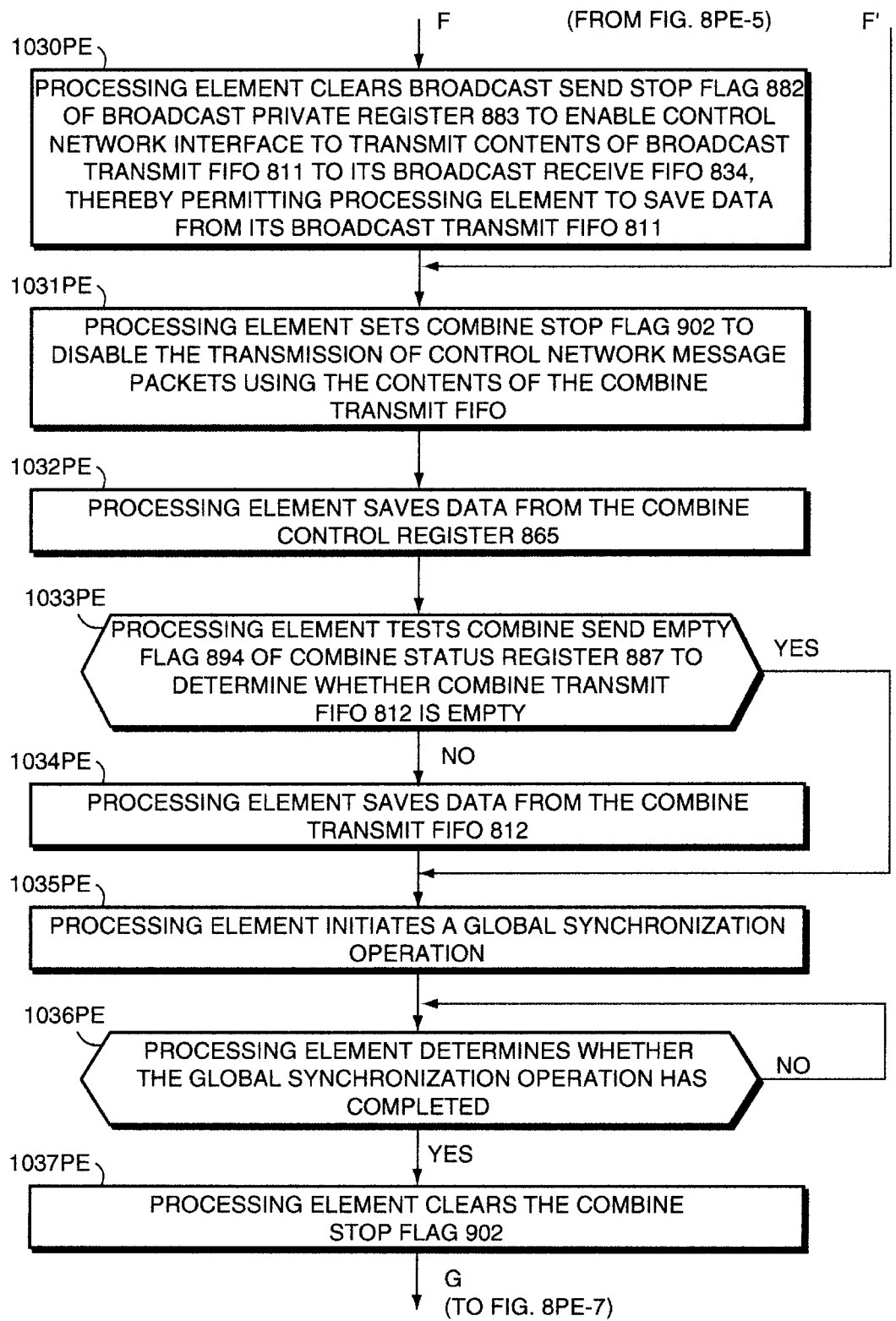
Figure 8P:
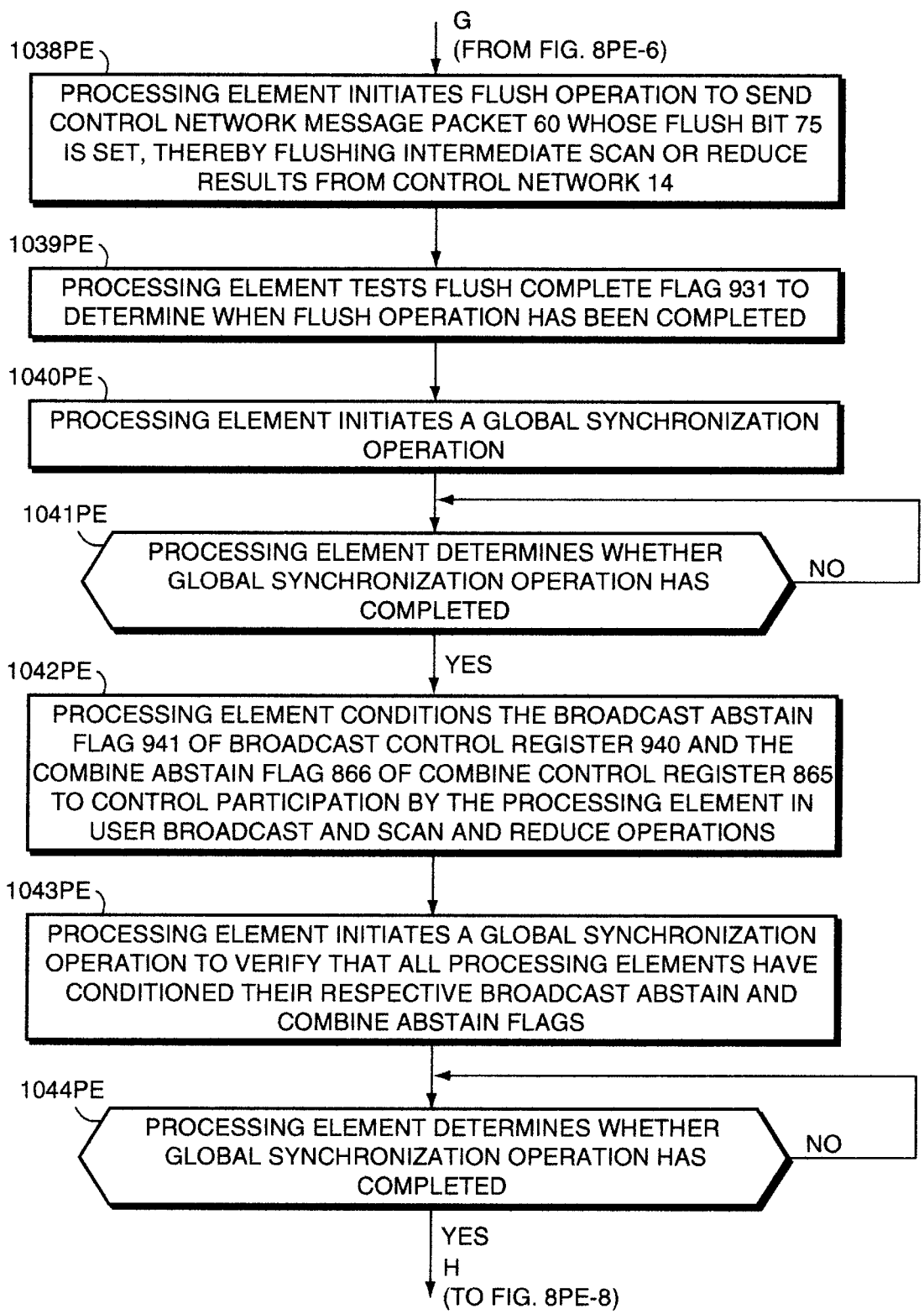
Figure 8P:
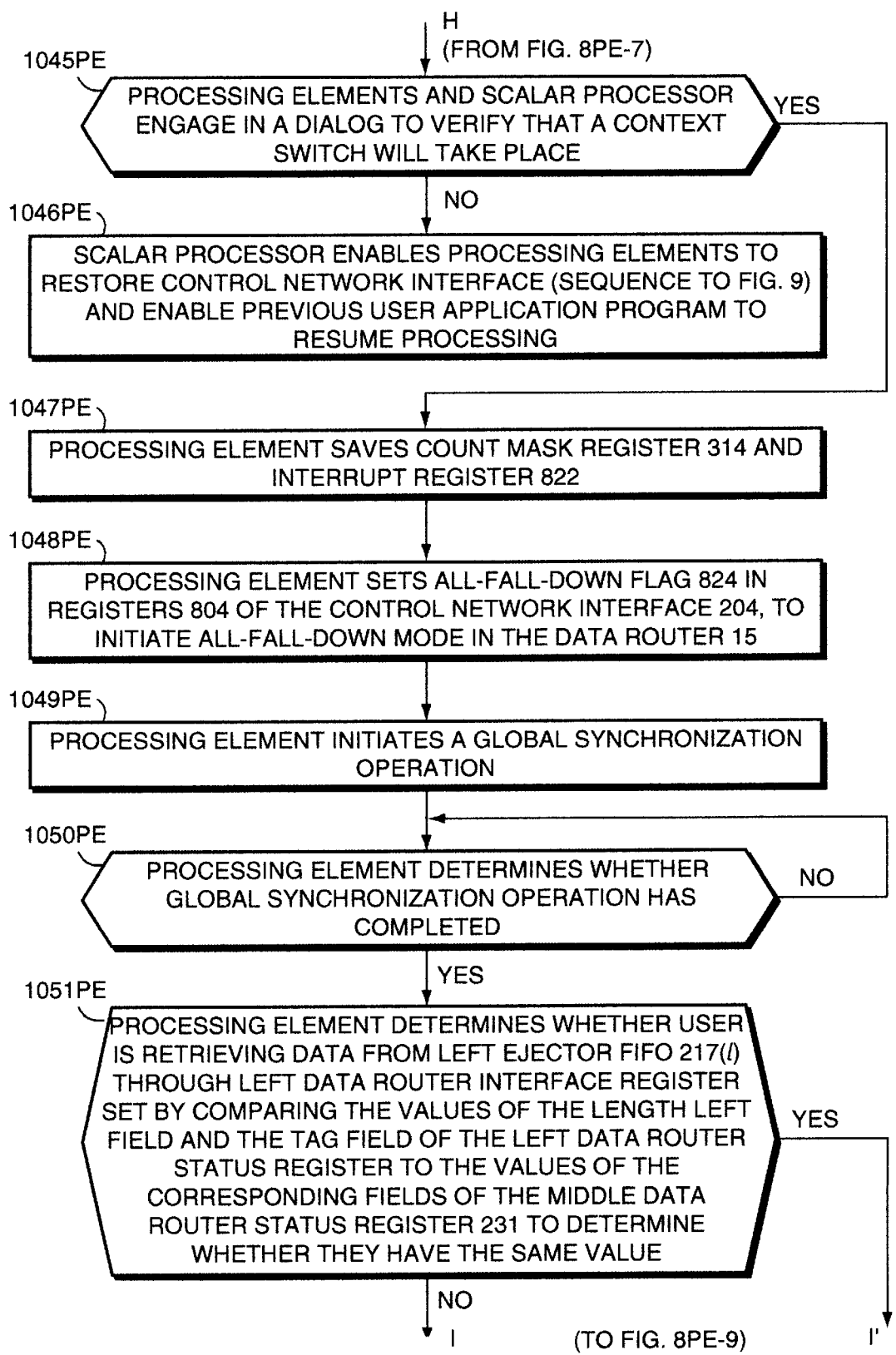
Figure 8P:
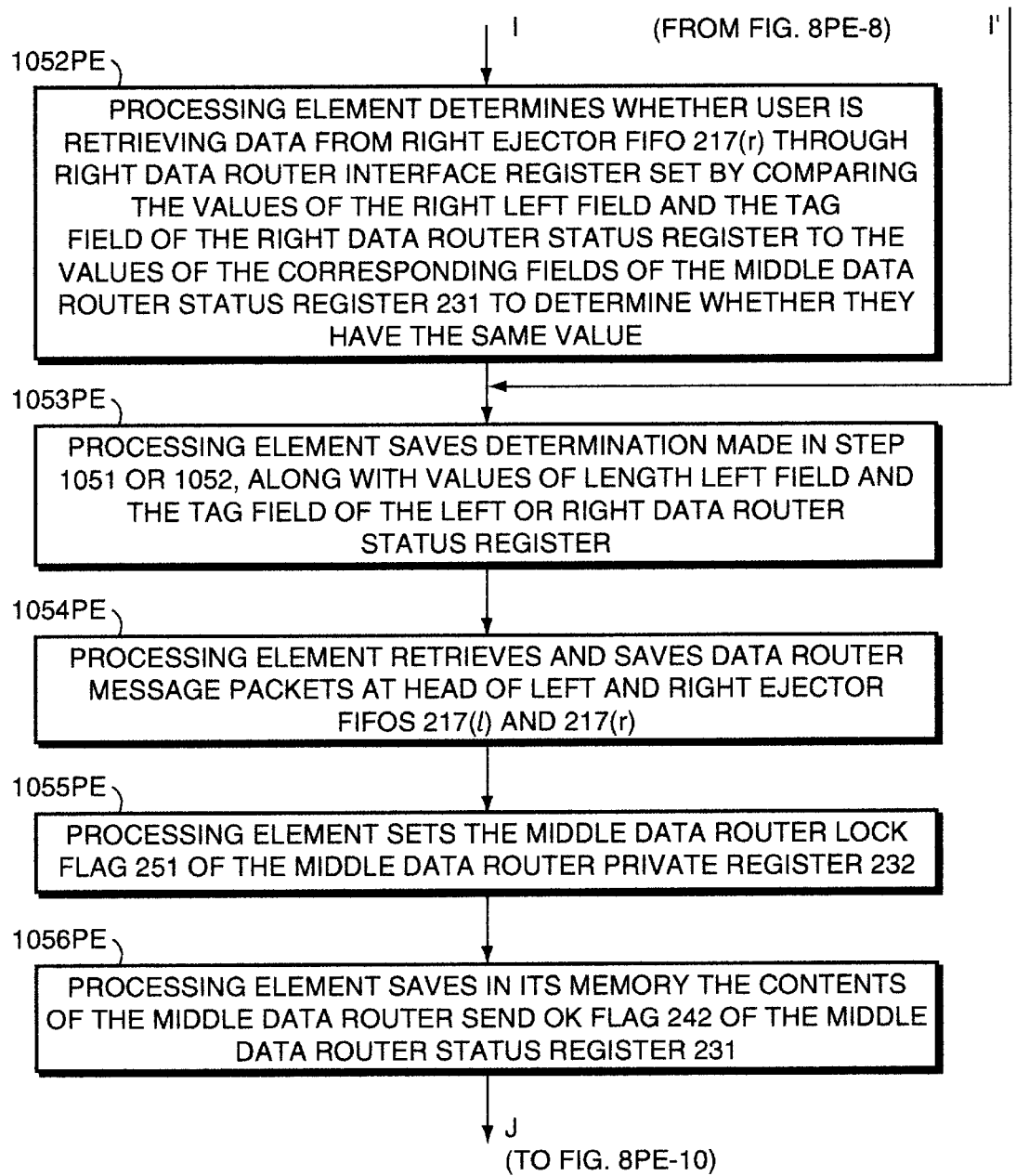
Figure 8P:
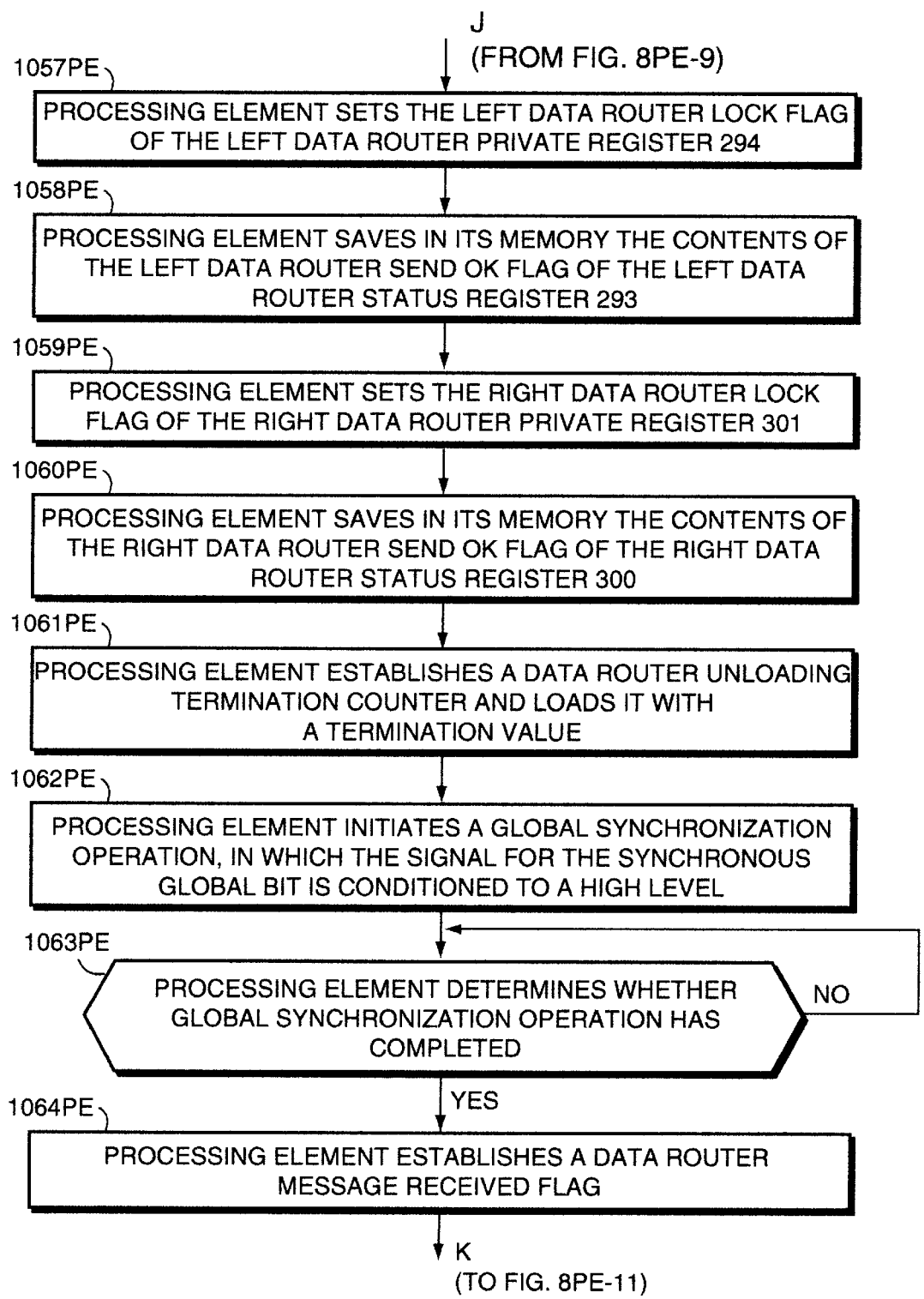
Figure 8P:
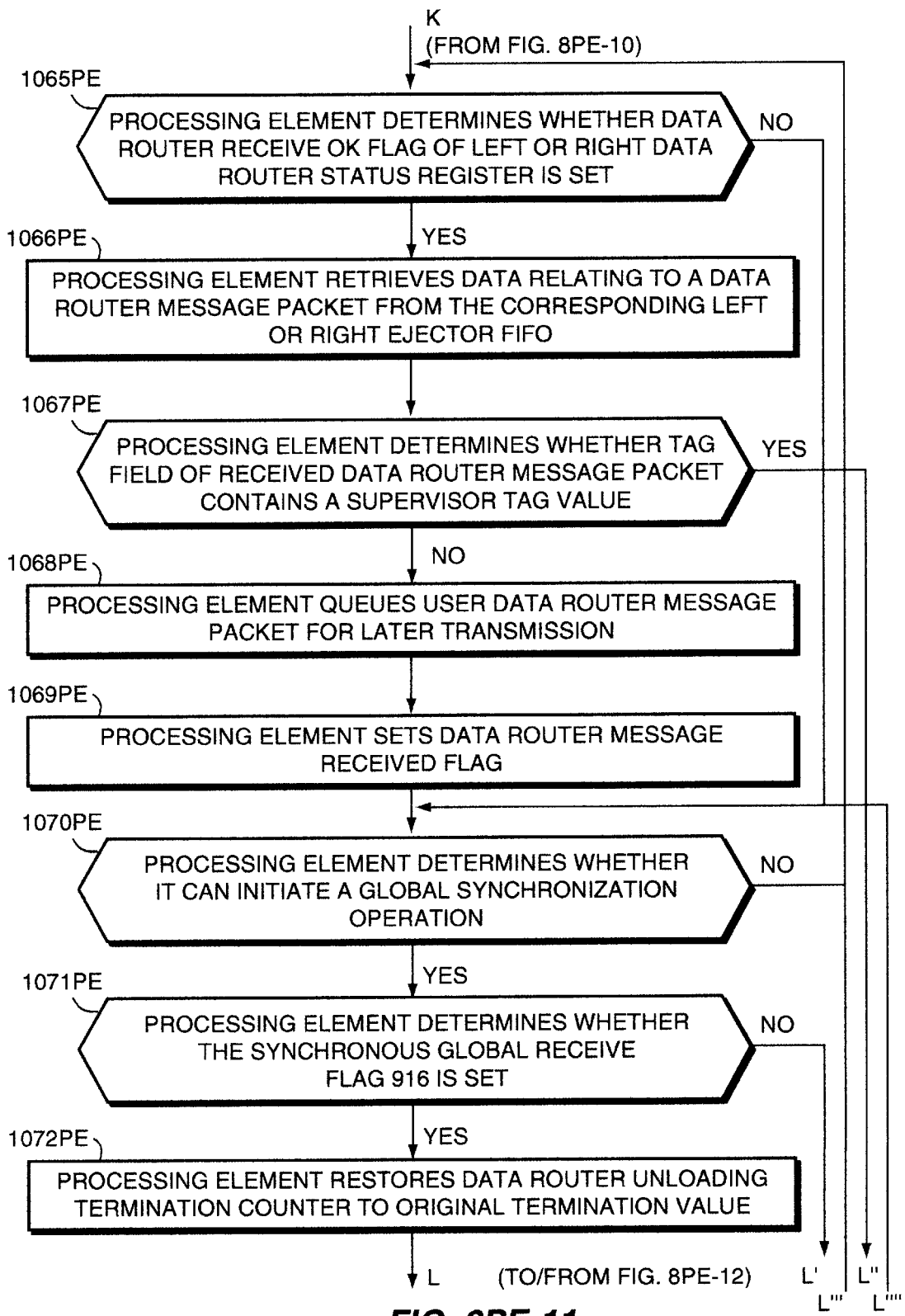
Figure 8P:
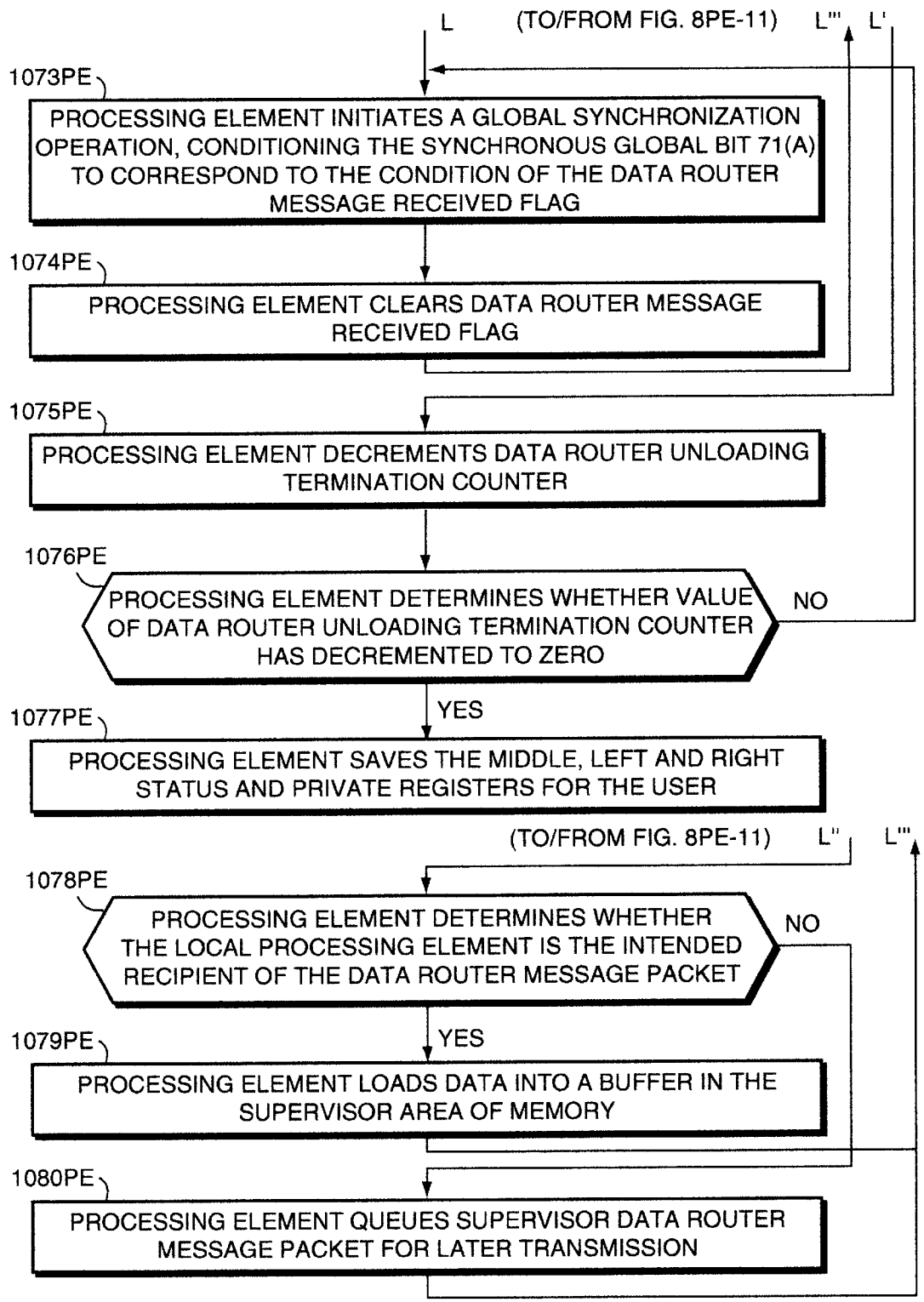

With reference to FIGS. 8SP-1 through 8SP-13 and 8PE-1 through 8PE-13, the scalar processor 12 initiating the context switch operation and the processing elements 11 initially perform a diverse series of steps, identified in FIG. 8SP-1 as steps 1000SP through 10003SP (for the scalar processor 12 initiating the context switch operation), and in FIGS. 8PE-1 and 8PE-2 as steps 1000PE through 1002PE. Beginning with steps 1004SP (in FIG. 8SP-2) and 1004PE (in FIG. 8PE-2), the scalar processor 12 initiating the context switch operation and the processing elements 11 in the partition perform the same series of operations to switch the context of the current user process out.

Initially, the scalar processor 12 and processing elements 11 are executing the user process application program in the current user process context (steps 1000SP and 1000PE). Periodically, the scalar processor 12 will sequence to the supervisor operating mode (step 1001SP) to perform selected housekeeping operations. In one of these housekeeping operations, the scalar processor 111 will update various timers, and will determine whether a time period for processing of the current user process has ended. If the scalar processor 12 determines that the time period had not ended, it will return to step 1000SP after finishing the housekeeping operations to continue processing the user application program in the current process context.

At some point in processing step 1000SP, the scalar processor 12 will determine that the current user process's time period has ended. When that occurs, the scalar processor 12 will sequence to step 1002SP to initiate a context switch operation. Initially, the scalar processor 12 will generate a control network message packet 60 of the single-source message type, and a supervisor packet type, which identifies the context switch operation and identifies a process whose context is to be switched in (step 1002SP), in response to which the processing elements 11 sequence to the supervisor operating mode to begin processing a context switch routine to switch out the current process (step 1001PE). As part of that operation, the scalar processor 12 generates not only the packets 60 of the single-source type to initiate the context switch operation but also a number of additional packets 60, also of the single-source type, which will be used to provide synchronization information. This synchronization information permits the scalar processor 12 and processing elements 11 to determine that all of the processing elements 11 have reached a predetermined step in the context switch procedure. Effectively, after receiving the control network message packets 60, enabling the switch to the supervisor operating mode and the beginning of processing of the context switch routine, the processing elements 11 will stop receiving control network message packets 60, causing the packets to back up in the control network 14, and the scalar processor 12 attempts to generate so many of such packets 60 that it will be unable to transmit all of them until after all of the processing elements have reached a predetermined point in their processing of the context switch routine. More specifically, the processing elements 11, as well as the scalar processor 12 will initially receive and buffer the packets 60, following the packets 60 initiating the context switch operation, in their supervisor broadcast receive FIFOs 833. The scalar processor 12 generates a series of packets 60 of the single-source type such that the number buffered in the processing elements' supervisor broadcast receive FIFOs 833 will be such that the processing elements 11 will, at some point, condition their respective supervisor broadcast flow bits 74 (FIG. 5) in control network message packets 60 transmitted thereby to disable the scalar processor 12 from transmitting additional such packets 60. As will be described below in connection with step 1011PE, when the processing elements 11 reach that point in processing of the context switch routine, they will resume receiving packets from their respective supervisor broadcast receive FIFOs 833, in the process conditioning their supervisor broadcast flow bits 74 in control network message packets 60 transmitted thereby to enable the scalar processor 12 to resume transmitting the remainder of the control network message packets 60 to be transmitted thereby. The scalar processor 12 can thus use the stream of control network message packet 60 of the single-source type to synchronize the processing elements in connection with that step 1011PE.

In the context switch operation, the scalar processor 12 and processing elements 11 in succeeding operations will process the context switch routines generally concurrently; however, because of diverse conditions at the scalar processor and various processing elements, such as may result from their individual servicing of interrupts or the like, they will not necessarily perform the various operations of context switch routine simultaneously. Accordingly, they will periodically make use of global synchronization operations, which use the synchronous global register 910, to synchronize themselves to verify that the scalar processor and all processing elements have reached particular points in their performance of the context switch operation before proceeding. The scalar processor 12 saves the state of its synchronous global register 910, associating it as part of the context of the process whose context is being switched out (step 1003SP). The processing elements 11 perform the same operation in connection with their beginning of processing of the context switch routine (step 1002PE).

The scalar processor 12 and processing elements 11 then continue with the context switch routine, performing generally the same steps up to the point (steps 1011 SP and 1011 PE) at which, as described above, the scalar processor 12 transmits and the processing elements 11 receive the remaining control network message packets 60 initiating the context switch operation. Prior to that point, the scalar processor 12 and processing elements 11 will save the current time and associate it with the process whose context is being switched out (step 1004SP and 1004PE). The scalar processor 12 and processing elements 11 then begin a series of operations to begin saving the state of the control network 14 and the control network interface 204 of their respective network interfaces 202. Initially, the scalar processor 12 and processing elements 11 enable the control network interface 204 to discard data for any partial control network message packets that the user process had supplied through the user broadcast and combine interface register sets 850 and 852. If the user process had supplied such data to the broadcast interface register set 850, the scalar processor 12 and processing elements 11 will effectively force the respective broadcast send OK flag 874 in the broadcast status register 870 to a clear condition. The scalar processor 12 and processing elements 11 will save the condition of the broadcast send OK flag 874 for the process whose context is being switched out, and will restore it when the context is again switched in. In that case, the scalar processor 12 and processing elements 11, under control of the process, will determine that the attempt to load data for a control network message packet through the broadcast interface register set 850 failed, and will repeat the attempt. Similar operations occur with the combine send OK flag 892.

To perform these operations, the scalar processor 12 and processing elements 11 first set the broadcast lock flag 881 of the broadcast private register 871, which locks the respective broadcast transmit FIFO 811 (step 1005SP and 1005PE). This inhibits the broadcast transmit FIFO 811 from receiving data, and in addition causes any previously supplied data for a partial control network message packet 60 to be discarded. If the broadcast transmit FIFO 811 does not contain any data for a partial control network message packet 60, the send OK flag will not be reset, but instead will remain in its current condition. Contemporaneously, the send OK flag will be reset. It will be appreciated that the broadcast transmit FIFO 811 will not discard any previously-supplied data for complete control network message packets 60, as the scalar processor 12, in particular the user process whose context is being switched out, will assume that such message packets 60 will be or have been transmitted over the control network 14. Thereafter, the scalar processor 12 and processing elements 11 clear the respective broadcast lock flag 881 to allow the network interfaces 202 to again use the contents of the respective broadcast transmit FIFOs 811 (steps 1006SP and 1006PE) and save the contents of the broadcast send OK flags 874 of their broadcast status registers 870 along with the process whose context is being switched out (steps 1007SP and 1007PE). The clearing of the broadcast lock flag 881 allows the broadcast transmit FIFO 811 to resume receiving data, which may be provided by the user process whose context will be switched in. The scalar processor 12 and processing elements 11 repeats these operations with respect to their respective combine lock flags 901, the combine transmit FIFOs 812, and combine send OK flags 892 (steps 1008SP, 1009SP, 1010SP and 1008PE, 1009PE and 1010PE).

When the scalar processor 12 and processing elements 11 have reached this point in processing the context switch routine, they will need to initiate a global synchronization operation before proceeding. However, prior to initiating the global synchronization operation, the scalar processor and processing elements 11 verify that they have all reached a point in executing the context switch routine at which all of them can initiate the global synchronization operation using the various flags of the synchronous global register 910 as conditioned pursuant to the context switch routine. Prior to that point, the various flags had been conditioned pursuant to the user program whose context is being switched out and, if a global synchronization operation is initiated before the flags are conditioned pursuant to the context switch routine, the global synchronization operation may give erroneous results. Prior to initiating a global synchronization operation, the scalar processor 12 and processing elements 11 synchronize using the remaining control network message packets 60 transmitted after those which initiated the context switch operation as described above. That is, following step 1010PE, the processing elements 11 resume receiving of control network message packets 60 of the single-source type, effectively providing room in their supervisor broadcast receive FIFO 833 to allow them to resume receiving such packets. When all of the processing elements 11 are in this condition, which will be indicated by all of them suitably conditioning the supervisor scan flow bits 74 of their respective control network message packets, the scalar processor 12 will resume transmitting the remaining series of the control network message packets 60, which will, in turn, be received by the processing elements 11 (step 1011SP and 1011PE). After the scalar processor 12 and processing elements 11 have finished, respectively, transmitting and receiving the series of control network message packets, they may proceed to initiate the global synchronization operation (step 1012SP and 1012PE) to verify receipt by all of the processing elements 11 of all of the control network message packets 60 transmitted by the scalar processor 12, and will wait until after the global synchronization operation has completed (step 1013SP and 1023PE) before proceeding.

After the scalar processor 12 and processing elements 11 determine that the global synchronization operation has completed (step 1013SP and 1013PE) they save the contents of their respective broadcast control registers 940, each of which includes the respective broadcast abstain flag 941 (step 1014SP and 1014PE), and the respective broadcast private registers 871 (step 1015SP and 1015PE) associating them with the process whose context is being switched out. Thereafter, the scalar processor 12 and processing elements 11 may use their respective broadcast control and private registers 940 and 871 to control transmission of control network message packets 60 using data from the broadcast transmit FIFO 811. The scalar processor 12 and processing elements 11 then set the broadcast send stop flags 882 of their respective broadcast private registers 871, which disables the control network interface 204 from transmitting control network message packets 60 using data from the broadcast transmit FIFO 811 (step 1016SP and 1016PE), and initiate a global synchronization operation to verify that all processing elements 11 and the scalar processor in the partition have completed this operation (step 1017SP and 1017PE).

When the scalar processor 12 and processing elements 11 determine that the global synchronization operation has completed (step 1018SP and 1018PE), they proceed to a series of steps (steps 1019SP through 1029SP and 1019PE through 1029PE) to retrieve the contents of their respective broadcast receive FIFOs 834 and combine FIFOs 835. The scalar processor 12 and processing elements 11, after each retrieval of data for a control network message packet from one or both FIFOs 834 and 835, initiates a global synchronization operation to determine when the FIFOs 834 and 835 have been drained. The scalar processor 12 and processing elements II will repeat these operations until a global synchronization operation indicates that the all of them have drained their FIFOs 834 and 835. It will be appreciated that, since (a) the broadcast and combine transmit FIFOs 811 and 812 were previously locked, and thus none of the scalar processor 12 or processing elements 11 are transmitting control network message packets 60 which contain data for the corresponding receive FIFOs 834 and 835, and (b) the synchronous global bits 71(a) which are used in the global synchronization operation are in control network message packets 60 which follow packets 60 which may contain additional data are transmitted along the same paths through the control network 14 as any previously transmitted control network message packets 60, by the time the global synchronization operation indicates that all of the processing elements 11 and the scalar processor 12 have drained their FIFOs 834 and 835, there would also be no control network message packets 60 in the control network 14 with data for these FIFOs. More specifically, after determining (step 1018SP and 1018PE) that the global synchronous operation initiated in step 1017PE and 1017PE has completed, each scalar processor 12 and processing element 11 determines whether the combine receive OK flag 891 in its combine status register 887 is set (step 1019SP and 1019PE). If so, the combine receive FIFO 835 has data from a control network message packet. It will be appreciated that the user process whose context is being switched out may have initiated retrieval of the data for the first control network message packet 60 in the combine receive FIFO 835 before the context switch operation began, in which case the scalar processor 12 or processing element 11 will retrieve the remainder of that data during the context switch operation. To determine whether the user process had begun retrieving the data, the scalar processor 12 or processing element 11 compares the values of the combine receive length field 895 and combine receive length left field 894 of the respective combine status register 887 (step 1020SP and 1020PE). If the values differ, the user process had begun the retrieval, and so the scalar processor 12 or processing element 11 sequences to step 1021SP or 1021PE to retrieve the remainder of the data for the user process, as well as the contents of the original length and the length remaining fields.

Following step 1021SP and 1021PE, or after step 1019SP and 1019PE if the scalar processor 12 or a processing element 11 determines that the combine receive OK flag 891 is not set, the respective scalar processor 12 or processing element 11 sequences to step 1022SP or 1022PE to test the broadcast receive OK flag 873 of the broadcast status register 870. If the scalar processor 12 or processing element 11 determines that the broadcast receive OK flag 873 is set, the broadcast receive FIFO 834 contains data for a control network message packet 60 received for the user process whose context is being switched out. In that case, the scalar processor 12 or processing element 11 retrieves the data for the user process (step 1023SP and 1023PE).

Following (a) step 1023SP and 1023PE, (b) step 1022SP and 1022PE if the respective scalar processor 12 or processing element 11 determines that the broadcast receive FIFO 834 does not contain unretrieved control network message packet data, or (c) step 1020SP and 1020PE if the respective scalar processor 12 or processing element 11 determines that the user process (specifically, the scalar processor 12 or processing element 11 while processing the user process) has not begun to retrieve control network message packet data from its combine receive FIFO 835, the respective scalar processor 12 and processing element 11 sequence to steps 1024SP and 1024PE, respectively, to test their respective combine receive OK flags 891 to determine whether their respective combine receive FIFOs 835 contain data from a control network message packet which has not been retrieved. If the scalar processor 12 or a processing element 11 makes a positive determination in step 1024SP and 1024PE, it sequences to steps 1025SP and 1025PE to retrieve the data.

Following either step 1025SP and 1025PE, or step 1024SP and 1024PE if the scalar processor 12 or a processing element 11 determines in that step that the combine receive OK flag 891 indicates that the combine receive FIFO 835 does not contain an unretrieved control network message packet, the respective scalar processor 12 or processing element 11 sequences to step 1026SP and 1026PE. In those steps, the scalar processor 12 and processing elements 11, respectively, determine whether the send empty flags 875 of their respective broadcast and combine status registers 870 and 887 are both set. If so, both the broadcast transmit FIFO 811 and the combine transmit FIFO 812 are empty. In subsequent steps the processing elements 11 whose FIFOs 811 and 812 are not empty, or the scalar processor if its FIFOs are not empty, will return to steps 1022SP and 1022PE to repeat the operations described above. However, following step 1025SP and 1025PE, or following step 1024SP and 1025PE for those of the scalar processor 12 or processing elements 11 which skip respective steps 1025SP and 1025PE, if the scalar processor 12 and a processing element 11 determine that their broadcast and combine send empty flags 875 and 893 are both set (step 1026SP and 1026PE), indicating that the broadcast and combine transmit FIFOs 811 and 812 are both empty, they will instead set their synchronous global abstain flags 914 and sequence to step 1031 SP and 1031 PE, respectively (step 1027SP and 1027PE).

Those of the scalar processor 12 and processing elements 11 which make a negative determination in step 1026SP and 1026PE sequence to step 1028SP and 1028PE, respectively to initiate a global synchronization operation in which the signal for the synchronous global bit 71(*a*) is conditioned to a high level if it is determined that (a) in step 1020SP or 1020PE, the user program had begun to retrieve data for a control network message packet from the respective combine receive FIFO 835, (b) in step 1022SP or 1022PE, the broadcast receive OK flag 873 was set, indicating that the broadcast receive FIFO 834 contained control network message packet data, or (c) in step 1024SP or 1024PE, the combine receive OK flag 891 was set, indicating that the combine receive FIFO 835 contained control network message packet data (step 1026SP and 1026PE). Otherwise, the scalar processor 12 or processing elements 11 will condition the synchronous global bit 71(*a*) to a low level. Those of the scalar processor 12 and processing elements 11 which have set their synchronous global abstain flags 914 in step 1027SP and 1027PE will abstain from the global synchronization operation in step 1028SP and 1028SP.

Following initiation of a global synchronization operation in step 1028SP or 1028PE, the respective scalar processor 12 or processing element 11 participating in the global synchronization operation waits until the operation completes (step 1029SP and 1029PE). After the global synchronization operation ends, if the scalar processor 12 and processing elements 11 determine that the signal representing the global synchronization bit 71(*a*) has a high level, indicating that the scalar processor 12 or at least one processing element 11 has retrieved data from either the broadcast receive FIFO 834 or the combine receive FIFO 835 for the user process whose context is being switched out, the scalar processor 12 and processing elements 11 return to step 1022SP and 1022PE to repeat the above-described operations.

At some point, all of the scalar processor 12 and processing elements 11 will have drained the contents of their respective broadcast and combine FIFOs 834 and 835 and will either (a) sequence through step 1026SP and 1026PE to respective step 1027SP and 1027PE to set their synchronous global abstain flags 914, and from there to step 1031SP and 1031PE, or (b) determine in the global synchronization operation (steps 1029SP and 1029PE) that the global synchronization bits 71(*a*) are conditioned to a low level. When scalar processor 12 and processing elements 11 determine in step 1029SP and 1029PE that the global synchronization operation has terminated, they will save the contents of the broadcast transmit FIFO 811 (step 1030SP and 1030PE). Following step 1030SP and 1030PE, or step 1027SP and 1027PE for those of the scalar processor 12 and processing elements 11 which abstained from the global synchronization operation (step 1028SP and 1028PE) set the combine stop flag 902 in the respective combine private register 888 to disable transmission of control network message packets using the contents of the combine transmit FIFO 812 (step 1031SP and 1031PE) and save the contents of the respective combine control register 865 (step 1032SP and 1032PE).

Thereafter, the respective scalar processor 12 and processing element 11 test the combine send empty flag 894 of the combine status register 887 to determine whether the combine transmit FIFO 812 is empty (step 1033SP and 1033PE) and if so saves the contents of the combine transmit FIFO 812 for the user process whose context is being switched out (step 1034SP and 1034PE). The scalar processor 12 and processing element 11 then initiate a global synchronization operation (step 1035SP and 1035PE) to verify that all of them have saved any contents of their respective combine transmit FIFOs 812 for the user process whose context is being switched out. When the scalar processor 12 and processing elements 11 all determine that the global synchronization operation has completed (step 1036SP and 1036PE), they clear the respective combine stop flag 902 (step 1037SP and 1037PE).

The scalar processor 12 and processing elements 11 then initiate a flush operation, by setting the flush send flag 930 of their respective flush register 821 (step 1038SP and 1038PE). In response, the flush bit 75 of the next control network message packet 60 transmitted by the respective scalar processor 12 or processing element 11 will be set, which enables the control network nodes 52(i,j,k,1) to flush intermediate results of previously initiated scan or reduce operations from their respective park buffers or scan buffers. The scalar processor 12 and processing elements 11 determine when the flush operation has completed by monitoring the conditions of their respective flush complete flags 931. When they determine that the flush operation has completed (step 1039SP and 1039PE) they initiate a global synchronization operation (step 1040SP and 1040PE).

When the scalar processor 12 and processing elements 11 determine that the global synchronization operation has completed (step 1041SP and 1041PE) they proceed to condition the broadcast abstain flags 941 of their respective broadcast control registers 940 and the combine abstain flags 866 of their respective combine control registers 866 to control participation by the scalar processor 12 and processing elements 11 in any subsequent scan and reduce operations as may be required by the context switch routine (step 1042SP and 1042PE). After conditioning the flags in their respective control registers, the scalar processor 12 and processing elements 11 initiate a global synchronization operation to verify that the scalar processor 12 and all processing elements 11 in the partition have appropriately conditioned their respective flags 941 and 866 (step 1043SP and 1043PE). When the scalar processor 12 determines that the global synchronization operation has completed (step 1044SP), it engages in a dialog with the processing elements 11 to verify that the context of the prior user process is to be switched out (step 1045SP and 1045PE). If not, the scalar processor 12 and processing elements 11 sequence to step 1130 (FIG. 9E) to restore the prior user process, that is, the user process which was being processed at the beginning of the context switch operation (step 1046SP and 1046PE).

If, on the other hand, the scalar processor 12 and processing elements 11 determine in step 1045SP and 1045PE that the context of the prior user is to be switched out, they step to a sequence beginning with step 1047SP and 1047PE, to save the data in the data router interface 205 of the network interface 202 and the data in data router message packets 30 in data router 15 related to the user process whose context is being switched out. Initially, the scalar processor 12 and processing elements 11 save the contents of their respective count mask register 314 and interrupt register 822 (step 1047SP and 1047PE) and set the all-fall-down flag 824 (step 1048SP and 1048PE). The setting of the all-fall-down flag, when reflected in suitable conditioning of the all-fall-down bits 81 of control network message packets 60, places the data router 15 in all-fall-down mode as described above. The scalar processor 12 and processing elements 11 at that point in processing their context switch routines initiate a global synchronization operation (step 1049SP and 1049PE).

After initiating all-fall-down mode (step 1048SP and 1048PE), and following completion of the global synchronization operation initiated in steps 1049SP and 1049PE (steps 1050SP and 1050PE) each of the scalar processor 12 and processing elements 11 will perform a series of steps to determine whether, when the context switch operation was initiated, the user process was retrieving data for a data router message packet 30 from the message ejector portion 221 through the middle data router interface register set 230 and, if so, if the data was being provided by either the left ejector port 225(1) or the right ejector port 225(r). In that operation, the respective scalar processor 12 and processing elements 11 will compare the value of the data router receive length left field 244 and receive tag field 245 of the data router status register 231 to the corresponding fields of the left status register 293 (step 1051 SP and 1051 PE). If for the scalar processor 12 or a processing element 11 the corresponding fields from the two status registers 231 and 293 have the same values, the user process controlling the scalar processor 12 or processing element 11 was retrieving data from the left ejector FIFO 217(1) of the left ejector port 225(1) using the middle data router interface register set 230. If the scalar processor 12 or a processing element 11 makes a negative determination in step 1051SP and 1051PE, it sequences to step 1052SP and 1052PE to repeat the operation with respect to the right status register 300 to determine whether the user process was retrieving data from the right ejector FIFO 217(r) of the right ejector port 225(r) using the middle data router interface set 230.

Thereafter, each scalar processor 12 and processing element 11 saves the determination made in steps 1051SP, 1051PE, 1052SP and 1052PE as to whether the user process was retrieving data from the left or right ejector port 225(1) or 225(r) through the middle data router interface set 230, along with the values of the length left field and the tag field of the respective left or right data router status register (step 1053SP and 1053PE). The scalar processor 12 and processing elements 11 then retrieve and save the data for any data router message packets at the head of the left and right ejector FIFOs 217(1) and 217(r) (step 1054SP and 1054PE). When the user process's context is next switched in, the scalar processor 12 and processing elements 11 will provide that the data from these message packets is returned to the head of the left and right ejector FIFOs 217(1) and 217(r) to ensure that the middle, left, right and data router status registers 231, 293 and 300 have the same condition as at the beginning of the context switch operation.

Thereafter, the scalar processor 12 and processing elements 11 perform a series of operations (steps 1055SP through 1060SP and 1055PE through 1060PE) to condition and save the values of the respective send OK flags 242 of the status registers 231, 293 and 300 of the middle, left and right data router interface register sets 230, 290 and 291. In these operations, prior to saving the values of the respective send OK flags, the scalar processor 12 and processing elements 11 first set the middle, left and right data router lock flags 251 of the corresponding middle, left and right data router private registers 232, 294 and 301 (steps 1055SP, 1057SP, 1059SP and 1055PE, 1057PE and 1059PE). As a result, if the user process was in the process of loading data for a new data router message packet 30 through the middle, left or right data router interface register set 230, 290 or 291 when the context switch operation was initiated, the injector FIFO 214(1) or 214(r) which was being used by the data router message injector portion 220 at that point will have received data for a partial data router message packet 30. When the scalar processor 12 or processing element 11 sets the data router lock flag 251 (step 1055SP, 1057SP, 1059SP and 1055PE, 1057PE, 1059PE) the injector FIFO 214(1) or 214(r) discards the data and clears the data router send OK flag 242 of the corresponding data router status register 231, 293 or 300. If the middle register set is being used, in addition to conditioning the send OK flag of the middle status register 231, the send OK flag of the left or right status register 293 or 300 will also be cleared, depending on the particular injector FIFO 214(1) or 214(r) which was being used. It will be appreciated that, if the injector FIFO 214(1) or 214(r) has not received data for a partial data router message packet 30 prior to the initiation of the context switch routine, the FIFO will maintain the data router send OK flag 242 in a set condition, as well as the send OK flag of the associated left or right data router and the send OK flag of the corresponding status register 293 or 300.

After setting the middle, left and right data router lock flags 251, the scalar processor 12 and processing elements 11 save the contents of the middle, left and right data router send OK flags 242 for the user process whose context is being switched out (steps 1056SP, 1058SP, 1060SP and 1056PE, 1058PE, 1060PE). It will be appreciated that a restored user process may, if it was in the process of loading data for a data router message packet 30 through the middle, left or right interface register sets 230, 291 or 291 when the context switch operation was initiated, use the condition of the send OK flag 242 from the appropriate status register 231, 293 or 300 to determine whether data for an entire packet 30 was successfully loaded. If the user process reads the send OK flag and determines that it is set, it can determine therefrom that it had completed successful loading of data for a data router message packet 30. On the other hand, if the user process reads the send OK and determines that it is clear, it can determine therefrom that complete loading was unsuccessful, and retry the loading operation.

At this point, the scalar processor 12 and processing elements 11 maintain the lock flags controlling left and right injector FIFOs 214(1) and 214(r) in their set conditions, in which case new data for data router message packets 30 cannot be loaded therein. However, the left and right injector ports 223(1) and 223(r), in particular the injector message generators 215(1) and 215(r), may still be generating data router message packets 30 if the associated injector FIFOs 214(1) and 214(r) contain previously-supplied data for complete data router message packets 30.

As noted above in connection with step 1048SP and 1048PE, the data router 15 is at this point in all-fall-down mode. More particularly, the sub-tree of the data router 15 limited to the scalar processor 12 and processing elements 11 in the partition in which the context switch operation is occurring will be in all-fall-down mode. This causes the data router 15 to begin transferring data router message packets 30 in the sub-tree of the data router 15 limited to the scalar processor 12 and processing elements 11 in the partition to that scalar processor 12 and those processing elements 11. It will be appreciated that the data router message packets 30 so transferred may include packets 30 related to the user process whose context is being switched out, and may also include packets generated by he scalar processor 12 or by processing elements 11 in the supervisor operating mode. The scalar processor 12 and processing elements 11 will, in a series of operations following step 1060SP and 1060PE, save the data in the data router message packets 30 related to the user process for the user process, but they need not save the data in data router message packets 30 related to the supervisor operating mode. In those operations, the scalar processor 12 and processing elements 11 can iteratively retrieve data for data router message packets 30 received by the respective left and right message ejector ports 225(1) and 225(r) either using the middle data router interface register set 230, or by iteratively using the left and right data router interface register sets 290 and 291.

The scalar processor 12 and processing elements 11 can determine when the data router has been emptied of all of the data router message packets 30 related to the context that is being switched out. The processors 11, 12 determine this by initiating a series of router done operations in connection with the control network 14 as described above. When a router done operation provides a result of zero, all data router message packets 30 initiated by the user process have been received by either the scalar processor 12 or by a processing element 11.

Alternatively, the scalar processor 12 and processing elements 11 can perform a series of operations which will be described in connection with FIGS. 8SP-10 through 8SP-12 and 8PE-10 through 8PE-12 to retrieve the data from data router message packets 30 related to the user process, that the message ejector port 221 receives from the data router 15. In brief, each scalar processor 12 and processing elements 11 sequentially retrieves data for data router message packets 30 from the left and right ejector FIFOs 217(1) and 217(r). The scalar processor 12 and processing elements 11 perform these operations through a sequence of one or more iterations, with the duration of each iteration being governed by the time to complete a global synchronization operation. If the scalar processor 12 or a processing element 11 determines during the iteration that a data router message packet 30 containing user process data was received, it initiates a global synchronization operation in which the synchronous global bit 71(a) is conditioned to so indicate.

If the scalar processor 12 or any processing element 11 initiates a global synchronization operation in which it conditions the synchronous global bit 71(a) to indicate receipt of a data router message packet 30 containing user process data, the global synchronization operation terminates to identify that to the scalar processor 12 and all of the processing elements 11, and they perform another iteration. After the scalar processor 12 and processing elements 11 perform a predetermined number of consecutive global synchronization operations in which none of them have conditioned the synchronous global bit 71(a) to indicate receipt of a data router message packet 30 containing user process data, they determine that the portion of the data router 15 in the sub-tree of the data router 15 limited to the scalar processor 12 and processing elements 11 in the partition, is empty of such packets. It will be appreciated that, during those iterations the scalar processor 12 or processing elements 11 may have received data router message packets 30 whose message tag fields 35 identify the supervisor, and that similar data router message packets 30 may also be traversing that portion of the data router 15.

More specifically, and with reference to FIGS. 8SP-10 and 8PE-10, the scalar processor 12 and processing elements 11 first establish a data router unloading termination counter and load it with a termination value (step 1061SP and 1061PE). The data router unloading termination counter will be used to count the sequential iterations in which no data router message packet 30 is received. The scalar processor 12 and processing elements 11 then initiate a global synchronization operation (step 1062SP and 1062PE) and when it has completed (step 1062SP and 1062PE) establish a data router message received flag (step 1063SP and 1063PE). The scalar processor 12 and processing elements 11 use the data router message received flag to indicate whether a data router message packet 30 containing user process data has been received during an iteration.

Thereafter, the scalar processor 12 and processing elements 11 test their left and right data router receive OK flags (corresponding to flag 241 in the respective left and right status registers 293 and 300) to determine whether the left and right message ejector ports 225(1) and 225(r) have received data router message packets 30 (step 1065SP and 1065PE). If the scalar processor 12 or a processing element 11 determines that a data router message packet 30 was received, it retrieves the packet 30 from the FIFO 217(1) or 217(r) of the respective ejector port (step 1066SP or 1066PE) and determines whether the tag field 35 contains a value indicating that the packet contains supervisor data or user process data (step 1067SP and 1067PE). If the scalar processor 12 or processing element 11 determines that the tag field 35 indicates that the packet 30 contains user process data, it queues the packet 30 for transmission when the context of the user process currently being switched out, is later to be switched in again (step 1068SP and 1068PE) and sets the data router message received flag (step 1069SP and 1069PE). The scalar processor 12 or processing element 11 will then sequence to step 1070SP and 1069PE, respectively.

On the other hand, if the scalar processor 12 or a processing element 11 determines in step 1065SP and 1065PE that the left and right data router receive OK flags (corresponding to flag 241 in the respective left and right status registers 293 and 300) indicate that the left and right message ejector ports 225(1) and 225(r) have not received data router message packets 30, it will sequence directly to respective step 1070SP and 1070PE, without setting the data router message received flag.

Similarly, if the scalar processor 12 or a processing element 11 determines in step 1067SP and 1067PE that a received data router message packet 30 has a tag field 35 whose value indicates that the packet 30 has supervisor data, it sequences to step 1078SP and 1078PE, respectively. In that step, the scalar processor 12 or processing element 11 determines whether it is the intended recipient of the data router message packet 30, and if so loads the data into a supervisor buffer in memory 201 (step 1079SP and 1079PE). If the scalar processor 12 or a processing element 11 determines that the data router message packet 30 is intended for another scalar processor or processing element, it queues the packet for later transmission over the data router 15 (step 1080SP and 1080PE). After either step 1078SP and 1078PE or step 1079SP and 1079PE, the respective scalar processor 12 or processing element 11 sequences to step 1070SP and 1070PE.

In step 1070SP and 1070PE, the scalar processor 12 or processing element 12 then determines whether it can initiate a global synchronization operation. If a previously initiated global synchronization operation has not completed, the scalar processor 12 or processing element 11 cannot initiate a new one, in which case it returns to step 1065SP and 1065PE to repeat the above-identified operations. At some point, a previously-initiated global synchronization operation will be completed, in which case the scalar processor 12 and processing elements 11 will sequence to step 1071 SP and 1071 PE, respectively. In that step, the scalar processor 12 and processing elements 11 will determine whether the synchronous global receive flag 916, which reflects the result of the previously-completed global synchronization operation, is set. If so, the scalar processor 12 or at least one processing element 11 received a data router message packet 30 containing user process data during the period prior to initiation of the previously-completed global synchronization operation, as will be described below.

In that case, the scalar processor 12 and processing elements 11 will restore the data router unloading termination counter to its original termination value (step 1072SP and 1072PE), and initiate a global synchronization operation (step 1073SP and 1073PE) in which the synchronous global bit 71(*a*) is conditioned to correspond to the condition of the data router message received flag. That is, the scalar processor 12 or processing element 11 will set the bit 71(*a*) if its data router message receive flag is set, indicating that a data router message packet 30 was received containing user process data during time period since the last initiation of a global synchronization operation, and otherwise it will clear the bit 71(*a*). The scalar processor 12 and processing elements 11 then clear the data router message received flag (step 1074SP and 1074PE) and return to step 1065SP and 10565E to initiate another iteration. It will be appreciated that, at the end of the iteration, which is determined by the scalar processor 12 and each processing element 11 when it determines in step 1070SP and 1070PE that the previously-initiated global synchronization operation has completed and that it can initiate a new global synchronization operation, the scalar processor 12 and processing elements 11 can determine from the condition of the synchronous global receive flag 916 whether the scalar processor 12 or any of the processing elements 11 received data router message packets 30 containing user process data during time period since the last initiation of a global synchronization operation.

The operations described in connection with steps 1065SP through 1074SP, 1078SP through 1080SP, 1065PE through 1074PE, and 1078PE through 1080PE, will be repeated until the scalar processor 12 and processing elements 11 determine in step 1071SP and 1071PE that the global synchronization operation has completed with the synchronous global receive flag 916 in the clear condition. When that occurs, neither the scalar processor 12 nor any of the processing elements 11 received data router message packets 30 containing user process data during the previous time period, in which case they step to decrement the data router unloading termination counter (step 1075SP and 1075PE). The scalar processor 12 and processing elements 11 then determine whether the values of their respective data router unloading termination counters have decremented to zero (step 1076SP and 1076PE). It will be appreciated that, if the scalar processor 12 and processing elements 11 use the same termination value in loading (in step 1061SP and 1061PE) and restoring (in step 1072SP and 1072PE) the data router unloading termination counter, the counters of the respective scalar processor 12 and processing elements 11 will maintain uniform values during the operations depicted in FIGS. 8SP-10 through 8SP-12 and 8PE-10 through 8PE-12. Accordingly, the scalar processor 12 and processing elements 11 will all make the same determination in step 1076SP and 1076PE.

If the scalar processor 12 and processing elements 11 determine in step 1076SP and 1076PE that the value of the data router unloading termination counter has not decremented to zero, they will return to step 1073SP and 1073PE to initiate a new global synchronization operation, and will eventually return through step 1074SP and 1074PE to step 1065SP and 1065PE to begin another iteration. It will be appreciated that eventually the scalar processor 12 and processing elements 11 will all determine in step 1076SP and 1076PE that the data router unloading termination counter has decremented to zero, in which case the data router 15 has been drained of data router message packets 30 containing user process data. At that point, the scalar processor 12 and processing elements 11 all save the contents of their respective middle, left and right data router status and private registers 231,232,293, 294, 300 and 301, for the user process (step 1077SP and 1077PE). At that point, the context for the user process has been completely switched out.

Thereafter during the context switch operation, the scalar processor 12 and processing elements 11 perform a series of operations to switch in the context of another user process. The scalar processor 12 and processing elements 11 perform the same series of operations, which will be described in connection with the same set of figures, namely, FIGS. 9A through 9K. Generally this context restoration, after taking the data router out of all-fall-down mode, initially restores their respective data router interfaces 205 and enable previously-saved data router message packets 30 to be transmitted over the data router 15. Thereafter, the scalar processor 12 and processing elements 11 restore the control network interface 204.

Figure 9A:
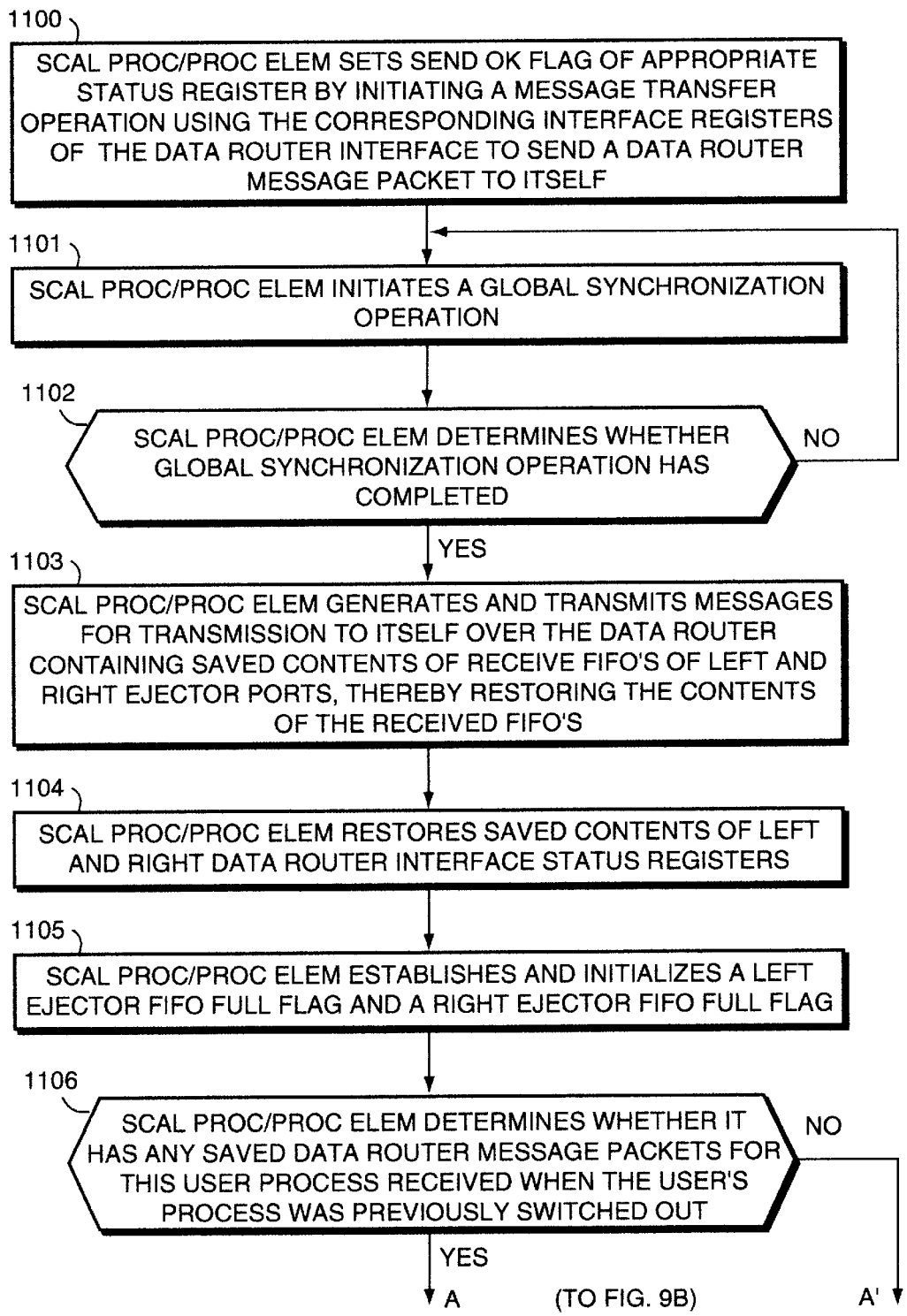
Figure 9B:
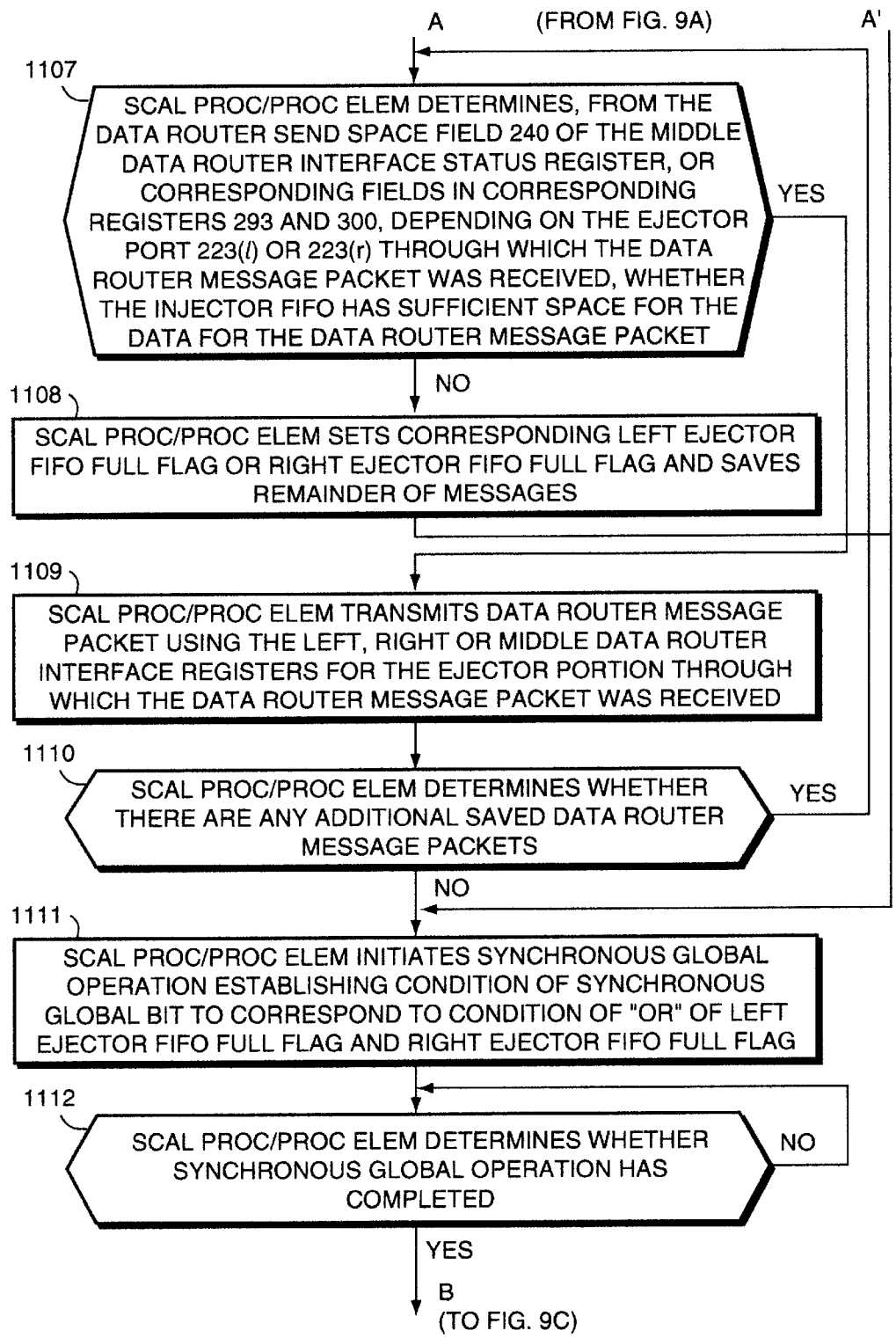
Figure 9C:
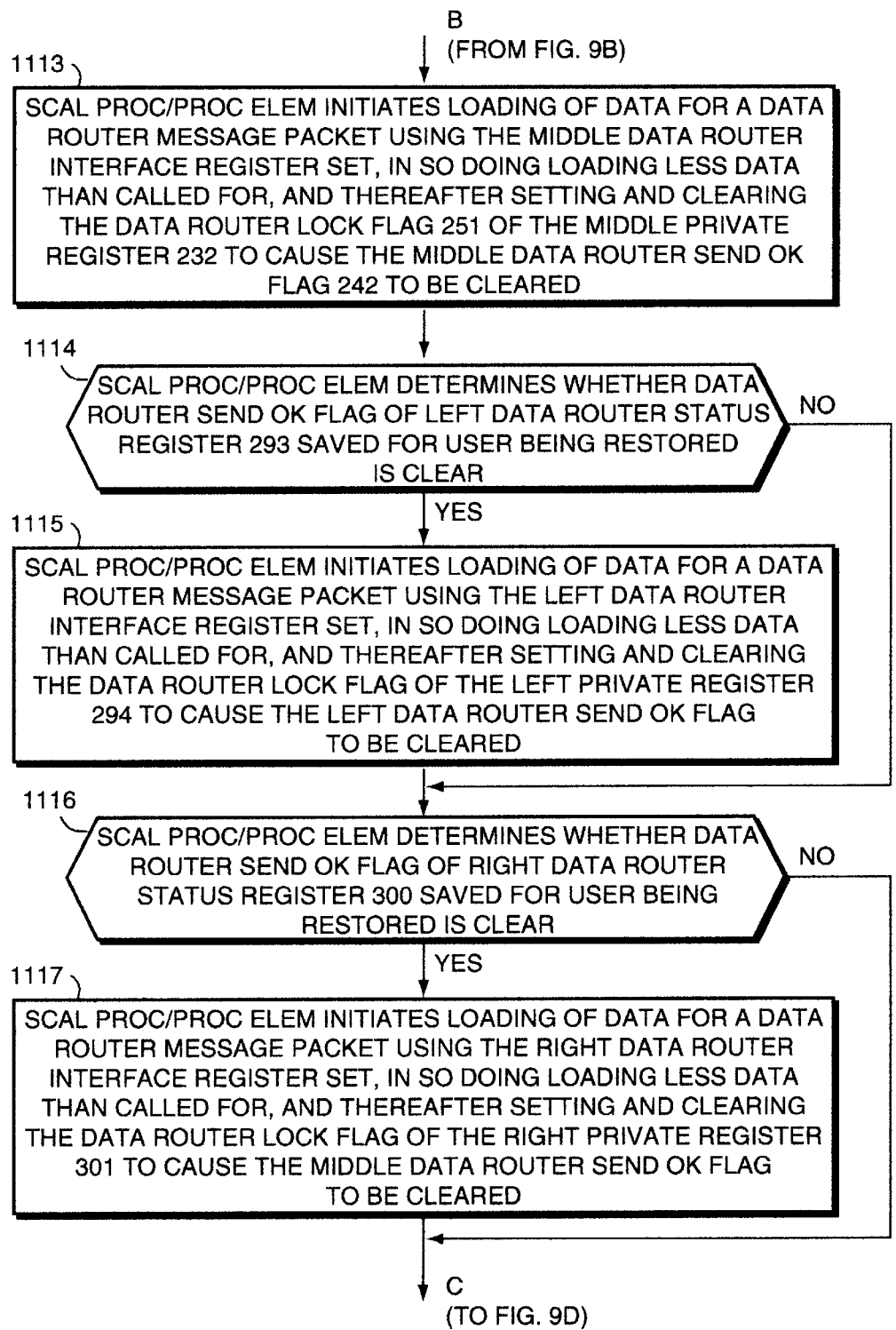
Figure 9D:
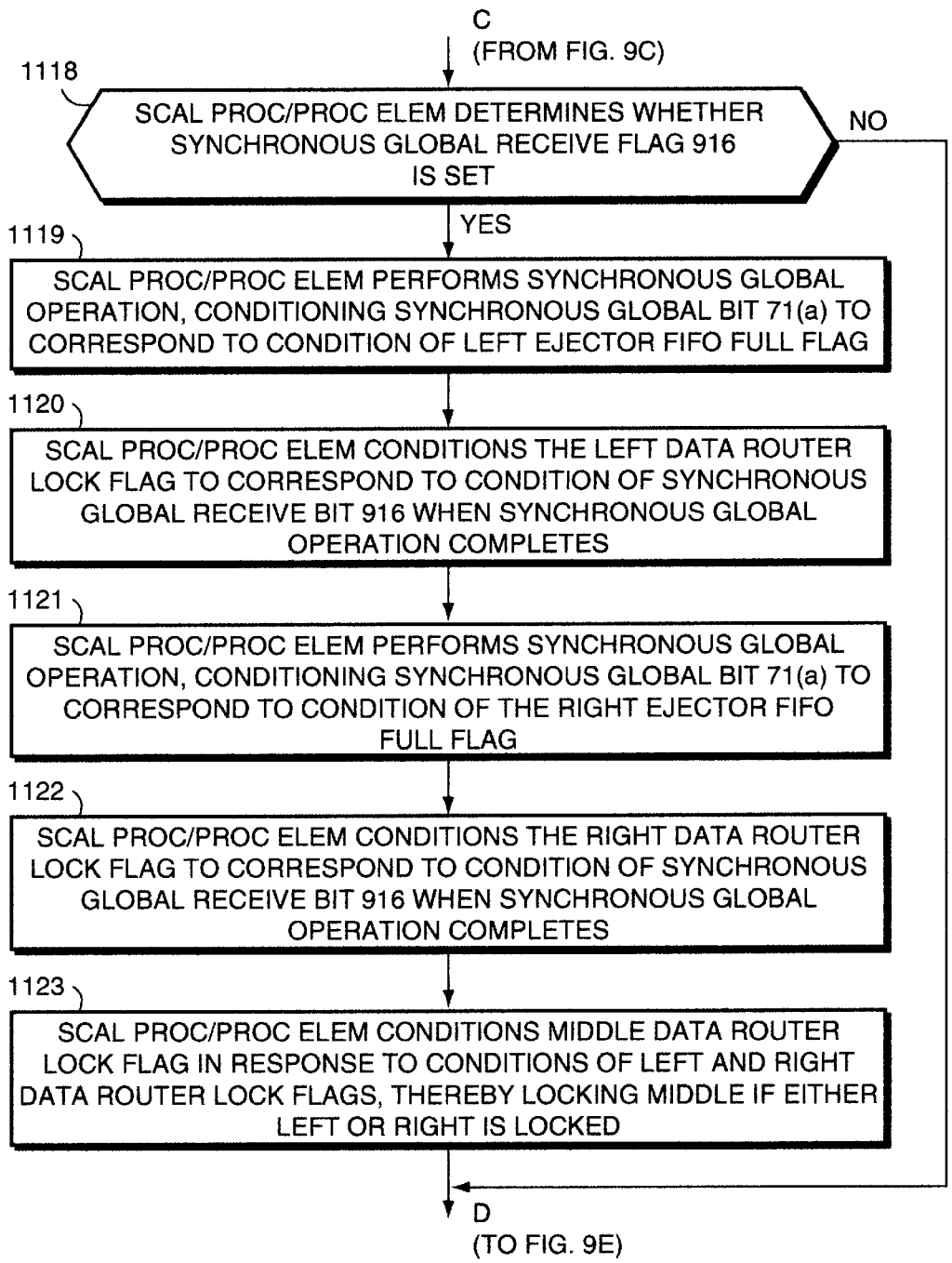
Figure 9E:
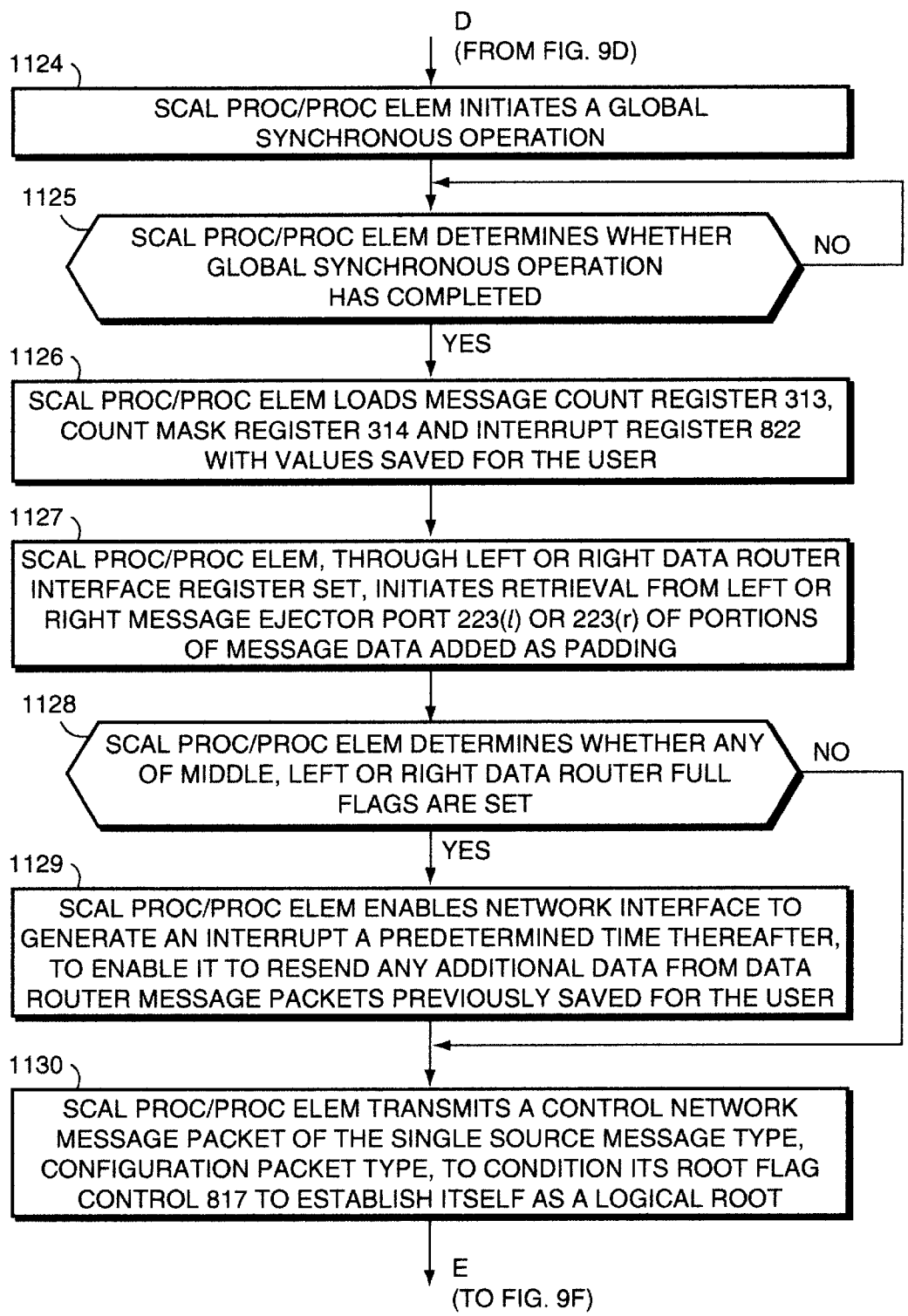
Figure 9F:
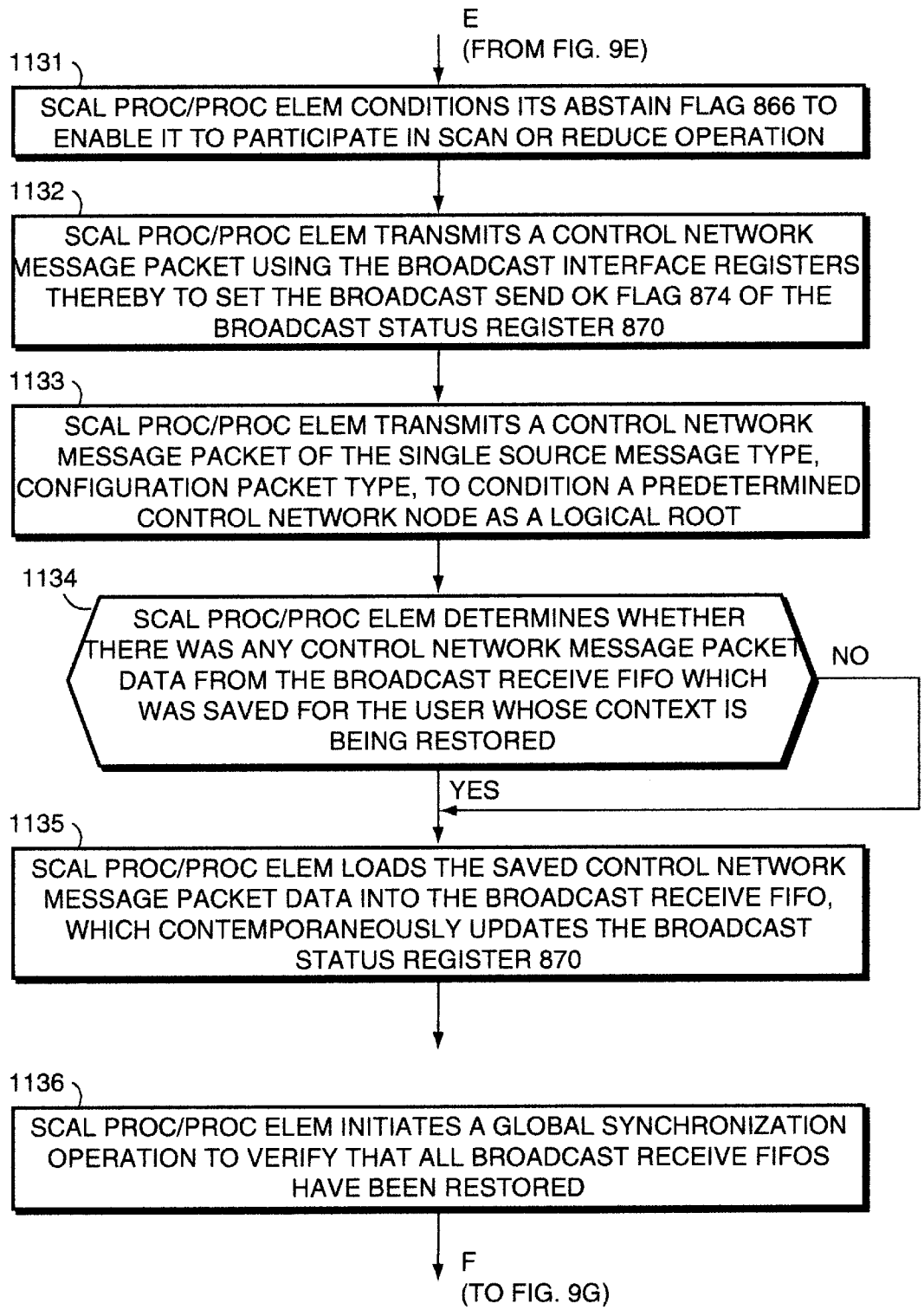
Figure 9G:
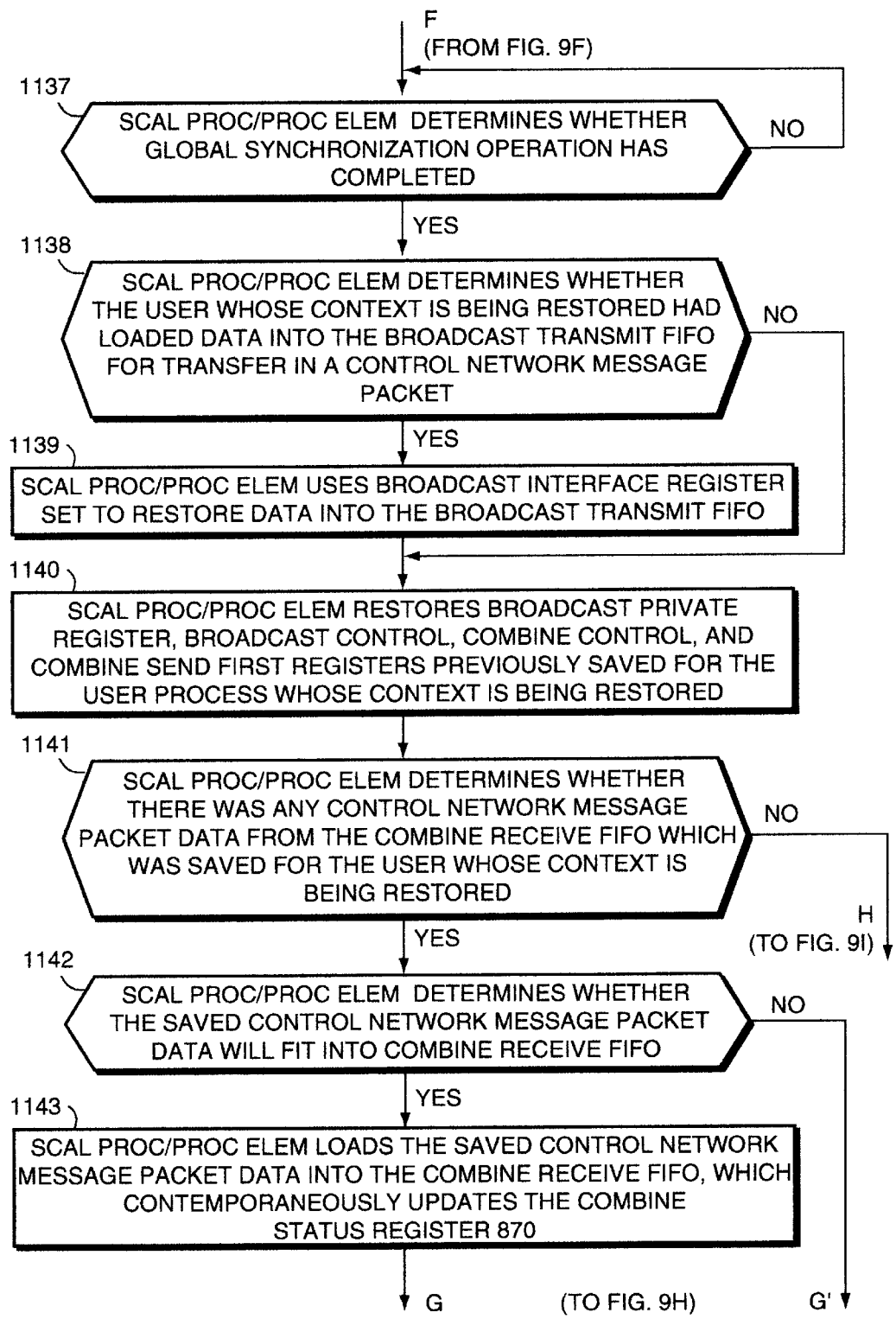
Figure 9H:
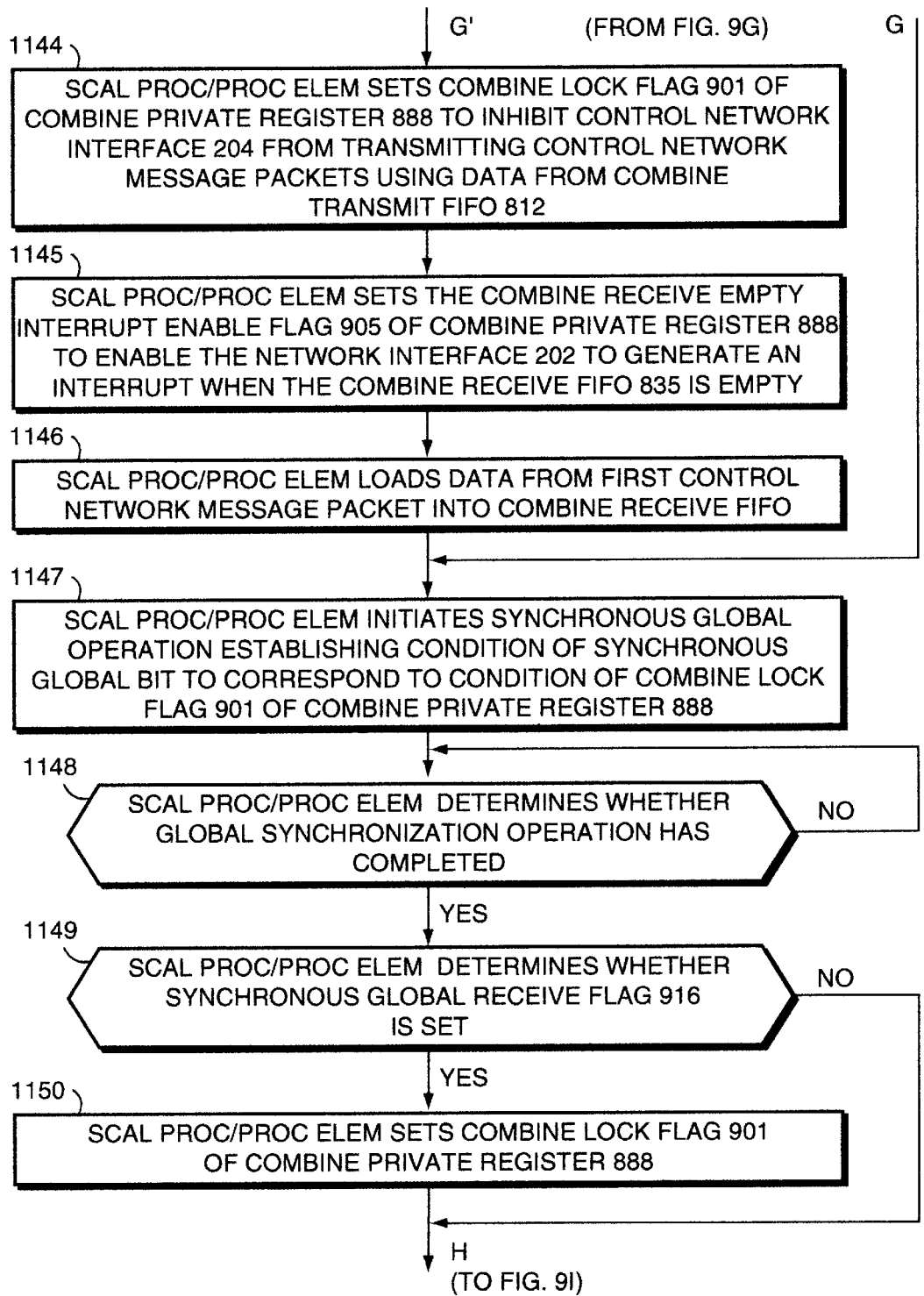
Figure 9I:
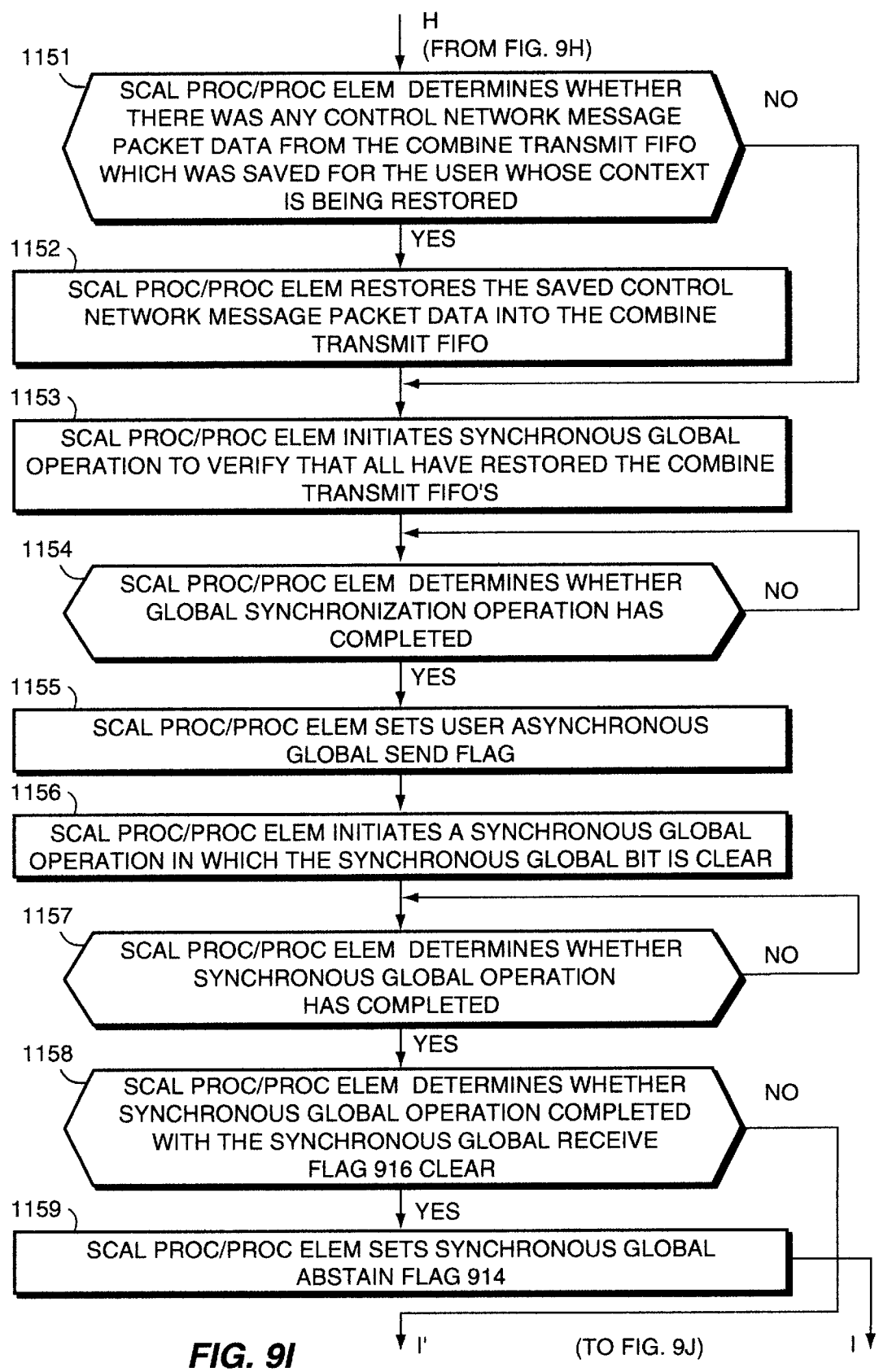
Figure 9J:
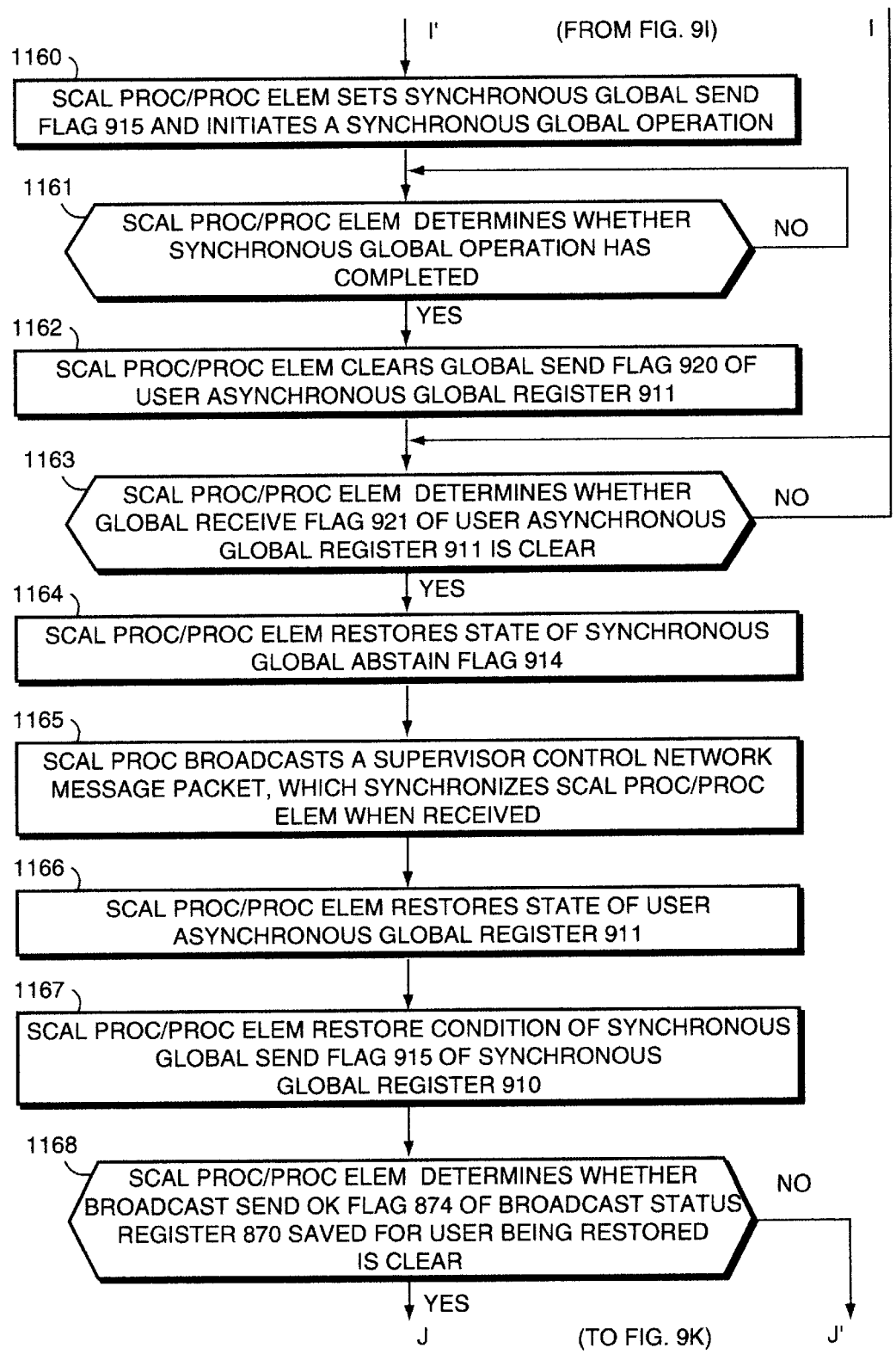
Figure 9K:
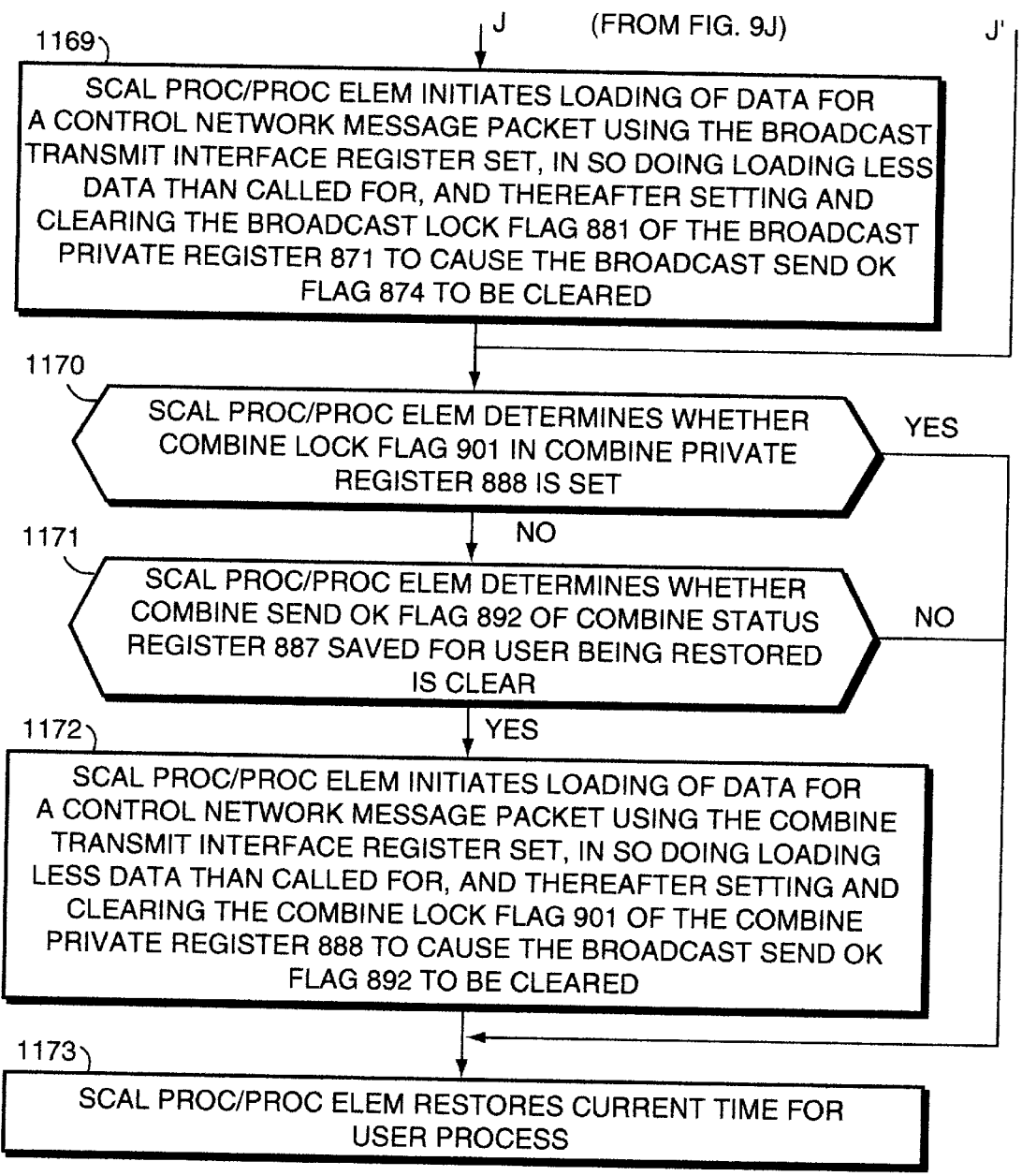

With reference to FIG. 9A, the scalar processor 12 and processing elements 11 first set the data router send OK flags 242 of the left, middle and right status registers 231, 293 and 300 of their respective middle, left and right data router interface register set 230, 290 and 291 (step 1100). The scalar processor 12 and each processing element sets its send OK flag for a particular one of the interface register sets 230, 290 and 291 by loading data through the send first and send registers to initiate generation of a data router message packet 30 for transmission to itself. As described above, when no error occurs in the loading by the scalar processor 12 or processing element 11 of data into the data router interface 205 for a data router message packet 30 through an interface register set 230, 290 or 291, the send OK flag of the status register 231, 293 or 300 of the corresponding interface register set will be set.

The scalar processor 12 and processing elements 11 then initiate a global synchronization operation (step 1101) to verify that all have set their respective send OK flags 242. When the global synchronization operation completes (step 1102), they restore the contents of the left and right ejector FIFOs 217(1) and 217(r) of the left and right message ejector ports 225(1) and 225(r) (step 1103). The data used in this operation was previously saved for the process whose context is being switched in. In restoring the FIFOs 217(1) and 217(r), the scalar processor 12 and processing elements 11 generate data router message packets 30 containing the saved data addressed to themselves and transmit the packets 30 over the data router 15. The scalar processor 12 and processing elements 11 transmit each data router message packet 30 using the left interface register set 290 if the packet 30 was saved from the left ejector FIFO 217(1), or the right interface register set 291 if the packet 30 was saved from the right ejector FIFO 217(r), to guarantee that at least the data from the packet 30 at the head of each ejector FIFO 217(1) and 217(r) will be the same as when the user process context was switched out. If the data so transmitted was for a packet 30 partially retrieved by the user process before its context was previously switched out, the scalar processor 12 or processing element 11 pads the beginning portion of the data so that the message so transmitted has the same length as the original packet 30, before any data was retrieved. The scalar processor 12 or processing element 11 will later remove the padding (see step 1127 below) before control is returned to the user process so that the data at the head of the FIFO after the user process context is restored is the same as when the context was last switched out. Thereafter, the scalar processor 12 and processing elements 11 restore the contents of the left and right data router status registers 293 and 300 which had previously been saved for the process (step 1104).

The scalar processor 12 and processing elements 11 then proceed to a series of steps 1106 through 1110 to initiate transmission of data router message packets 30 containing user process data which were received from the data router 15 during the switching-out of the context of the user process whose context is currently being switched in. In this operation, the scalar processor 12 and processing elements 11, using the left and right data router interface register sets 290 and 291, load the previously-saved data into the left and right injector FIFOs 214(1) and 214(r) of the respective left and right message injector ports 223(1) and 223(r), the particular set 290 or 291 corresponding to the left or right message ejector port 225(1) or 225(r) from which the data was retrieved. Prior to loading data for a data router message packet 30 into the appropriate injector FIFO 214(1) or 214(r), the scalar processor 12 or processing element 11 determines whether the FIFO has sufficient space to receive the data. This ensures that the scalar processor 12 or processing element 11 does not attempt to load more data into the injector FIFO than will fit, which may cause the data router send OK flag of the corresponding status register 293 or 300 to be reset.

After the scalar processor 12 or a processing element 11 has either determined that it has no previously-saved user process data, or if it has transferred all previously-saved user process data to the data router interface 205, or after it has determined that it is unable to load data into one of the injector FIFOs, it will initiate a global synchronization operation. In the global synchronization operation, the scalar processor 12 or processing element 11 will condition the synchronous global bit 71(a) according to whether it transferred all of the previously-saved user process data to the data router interface 205, or after it has determined that it was unable to load data into one of the injector FIFOs, in which case the processor 12 or 11 identifies the particular injector FIFO. If the scalar processor 12 and all of the processing elements 11 had conditioned their respective synchronous global bits to indicate that they had transferred all of the previously-saved user process data to the data router interface 205, they proceed to another sequence starting with step 1121.

However, if the at least one of the scalar processor 12 or processing elements 11 conditioned its synchronous global bit 71(a) to indicate that it was unable to load data into one of the injector FIFOs, the scalar processor 12 and all processing elements 11 will condition the set the lock flag(s) 251 of either or both left or right private registers 294 or 301, depending on the identified FIFO(s). The scalar processor 12 and processing elements 11 will all set their lock flags in the corresponding left and right data router interface register sets 290 and 291 to disable them from loading data therein for data router message packets 30 when the user process subsequently takes control, and enables a timer interrupt to interrupt a selected time thereafter. In servicing the interrupt, the scalar processor 12 and processing elements 11 will continue initiating transmission of data router message packets 30 containing user process data. This will continue until all of the previously-saved user process data for the user process whose context is being switched in is transmitted in data router message packets 30 over the data router 15.

More specifically the scalar processor 12 and processing elements 11 each establish and initialize a left ejector FIFO full flag and a right ejector FIFO full flag (step 1105). These flags will be used by the respective scalar processor 12 or processing element 11 to indicate whether it determines that the corresponding left or right ejector FIFO 214(1) or 214(r) is at some point unable to receive data for a data router message packet 30, and to control conditioning of the synchronous global bit 71(a). Each scalar processor 12 and processing element 11 then determines whether it has any saved data from data router message packets 30 received when the context of the user process was being switched out (step 1106). If the scalar processor 12 or a processing element 11 makes a negative determination, it sequences to step 1111 to begin initiating a global synchronization operation.

On the other hand, if the scalar processor or a processing element 11 makes a positive determination in step 1106, it sequences to step 1107 to begin loading data for a data router message packet 30, using the left and right data router interface register sets 290 and 291, into the message injector ports 223(1) and 223(r), in particular into the corresponding injector FIFOs 214(1) and 214(r). Initially, the scalar processor 12 or processing element 11 determines, from the contents of the send space field of the left or right data router status register 293 or 300, depending on the injector FIFO into which it will load the data, whether the particular FIFO 214(1) or 214(r) has enough room to receive the data (step 1107). If so, it loads the data into the particular FIFO 214(1) or 214(r) to initiate transmission of a data router message packet 30 containing the data (step 1109), and determines whether it has any data for an additional data router message packet 30 (step 1110). If the scalar processor 12 or processing element 11 has such additional data, it returns to step 1107 to repeat these operations.

At some point, the scalar processor 12 or a processing element 11 may determine either (a) that the FIFO 214(1) or 214(r) into which it is to load data for a data router message packet 30 has insufficient space to receive the data (step 1107), or (b) that it has loaded into the message injector ports all previously-saved data for data router message packets 30 for the user process whose context is being switched in (step 1110). If the scalar processor 12 or processing element 11 makes the determination in step 1110, it will sequence directly to step 1111 to begin a global synchronization operation. It will be appreciated that if the scalar processor 12 or processing element 11 sequences to step 1111 from step 1110, the left and right ejector FIFO full flags will both be clear. On the other hand, if the scalar processor 12 or processing element 11 determines in step 1107 that the FIFO 214(1) or 214(r) into which it is to load data for a data router message packet 30 has insufficient space to receive the data, it sequences to step 1108 to set the corresponding left or fight ejector FIFO full flag, and from there to step 1111.

In step 1111, the scalar processor 12 or processing element 11 first performs a global synchronization operation in which it conditions the synchronous global bit 71(a) to the OR of the left and right ejector FIFO full flags. Thus, if the scalar processor 12 or processing element 11 was unable to load data for a complete data router message packet 30 into either of the left or right injector FIFOs 214(1) or 214(r), the scalar processor 12 or processing element 11 will set the synchronous global bit 71(a) during the global synchronization operation. When the scalar processor 12 or processing element 11 determines that the global synchronization operation has completed (step 1112), the scalar processor 12 and processing elements 11 perform a series of steps 1113 through 1117 to successively condition the data router send OK flag 242 of the data router status register 231, and corresponding send OK flags of the status registers 293 and 300 of the left and right data router interface register sets 290 and 291, according to their respective conditions when the user process, whose context is being switched in, was previously switched out. For example, to condition the send OK flag of the data router status register 231 the middle data router interface register set 231, the scalar processor 12 and each processing element 11 initially determines whether the middle data router send OK flag which it previously saved for the user process is clear. If the scalar processor 12 or a processing element 11 determines that the middle data router send OK flag is clear, it initiates loading of data for a data router message packet 30 using the middle register set 230 (step 1113). After loading data for an incomplete data router message packet 30, that is, less data than indicated in the send message length field 270 of the middle data router send first register 234, it successively sets and clears the data router lock flag 251 of the data router private register 232, which clears the data router send OK flag 242. If the scalar processor 12 or a processing element 11 determines that the saved data router send OK flag 242 is set, since the data router send OK flag was already set in step 1100, it skips step 1113. The scalar processor 12 and processing elements 11 repeat these operations for the left and right data router send OK flags (steps 1114 through 1117).

After conditioning the respective send OK flags in the middle, left and right status registers 231, 293 and 300, the scalar processor 12 and the processing elements 11 determine whether their respective synchronous global receive flag 916, which was conditioned during the global synchronization operation of steps 1111 and 1112, is set (step 1118). If so, at least one of the scalar processor 12 or a processing element 11 was unable to load data for a complete data router message packet 30 into one of its left or right injector FIFOs 214(1) or 214(r). In that case, the scalar processor 12 and processing elements 11 perform sequential global synchronization operations, sequentially conditioning the synchronous global bit 71(a) to the condition of the left and right injector FIFO full flag (steps 1119 and 1121) and conditioning the lock flags of the left and right data router private registers 294 and 301 in response to the condition of the synchronous global receive flag 916 (steps 1120 and 1122). Thus, if the scalar processor 12 and processing elements 11 determine in step 1119 that the synchronous global receive flag 916 is set, the left injector FIFO full flag of at least one of them was set, and so all of them will set their respective lock flags in their left data router private registers 294. Similarly, if the scalar processor 12 and processing elements 11 determine in step 1120 that the synchronous global receive flag 916 is set, the right injector FIFO full flag of at least one of them was set, and so all of them will set their respective lock flags in their right data router private registers 301. In addition, the scalar processor 12 and processing elements 11 set the lock flags 251 of their respective middle data router private registers 232 if the lock flag of either the left or right interface set 290 and 291 is set (step 1123). This will lock the middle interface register set 230 so that the scalar processor 12 and processing elements 11 will be unable to transmit data router message packets 30 using register set 230, if the lock flag of either the left or right interface register set is also set. The scalar processor 12 and processing elements 11 then initiate a global synchronization operation to synchronize at this point (step 1124).

After the scalar processor 12 and processing elements 11 determine that the global synchronization operation has completed (step 1125), they proceed to load the respective message count values saved for the user process whose context is being switched in, into the message count register 313 (step 1126). In addition, the scalar processor 12 and processing elements 11 restore the respective count mask into count mask register 314 and interrupt values into interrupt register 822. Each scalar processor 12 and processing elements 11 then determines whether any of the lock flags 251 of the respective middle, left or right interface register sets 230, 290 and 291 is set (step 1128). A lock flag will be set if the scalar processor 12 or a processing element was, in steps 1106 through 1110, unable to transmit all of the data in data router message packets 30 saved for the user process when its context was previously switched out. This inhibits loading of data for data router message packets 30 into the respective injector FIFO, in which case the scalar processor 12 or processing element 11 was unable to transmit all of the data. If that occurs, the scalar processor 12 or processing element 11 enables the network interface 202, in particular the processing element interface 212, to generate an interrupt at a predetermined time thereafter (step 1129). As will be described below, in servicing the interrupt, the scalar processor 12 and processing elements 11 will generate data router message packets 30 containing remaining saved data. At this point, the data router interface 205 is restored, except for unsent data, which will be sent while servicing the interrupt.

Following step 1129, the scalar processor 12 and processing elements 11 step to a sequence to restore the control network interface 204. Initially, the scalar processor 12 and processing elements 11 perform a series of operations to set their respective broadcast send OK flags 874 in their respective broadcast status registers 870. In that operation, the scalar processor 12 and each processing element 11 initially establishes itself as a logical root by suitably conditioning its root flag control circuit 817. To accomplish this, the scalar processor 12 and each processing element 11 generates a control network message packet 60 of the single-source message type, and a configuration packet type, identifying itself as a logical root, and transmits it over the control network 14 (step 1130). After establishing itself as a logical root, each scalar processor 12 and processing element 11 conditions its abstain flag 866 in its combine control register 865 to permit it to participate in scan and reduce operations (step 1131). Thereafter, the scalar processor 12 and each processing element 11 can load data through the broadcast interface register set 850 for a control network message packet 60, which enables their respective broadcast send OK flags 874 to be set (step 1132). The scalar processor 12 and processing elements 11 thereupon generate control network message packets 60 of the single-source message type and configuration packet type, which re-establish the logical root at a selected control network node 52(i,j,k,1) in the control network 14. The selected control network node may be one which encompasses the entire partition (step 1133), or another selected control network node.

The scalar processor 12 and each processing element 11 then determines whether it has any control network message packet data which it saved from the broadcast receive FIFO 834 for the user process whose context is being restored (step 1134). If the scalar processor 12 or a processing element 11 has such saved data, it loads it into the broadcast receive FIFO 834, which contemporaneously updates the receive OK flag 873 and receive length left field 876 of the broadcast status register 870 (step 1135). Thereafter, or following step 1134 if the scalar processor 12 or a processing element 11 determines that it does not have any saved control network message packet data to be restored to the broadcast receive FIFO 834, it initiates a global synchronization operation (step 1136). When the global synchronization operation completes (step 1137), scalar processor 12 and processing elements 11 will determine that they all have finished loading into the broadcast receive FIFO 834 the data saved therefrom.

After the scalar processor 12 and processing elements 11 have restored their broadcast receive FIFOs 834, they sequence to step 1138 to restore their broadcast transmit FIFOs 811. It will be appreciated that they will restore their broadcast receive FIFOs 834 before restoring the broadcast transmit FIFOs 811, otherwise the control network interfaces 204 may generate control network message packets 60 from the data in the broadcast transmit FIFOs 811 and transmit them over the control network 14 using data from the broadcast transmit FIFOs, which could be received in the broadcast receive FIFOs 834 before they are loaded with the saved data. If that were to occur, the saved data, when restored in the broadcast receive FIFOs 834, could overwrite the newly-received data. In step 1137, the scalar processor 12 and processing elements 11 determine whether they had saved data from the broadcast transmit FIFOs 834 for the user process whose context is being restored, when the process was previously switched out. If so, the scalar processor 12 or processing element 11 with saved data, through the broadcast interface register set 850, restores the previously-saved data by loading it into the broadcast transmit FIFO 811 (step 1139). Each scalar processor 12 and processing element 11 then restores the contents of the broadcast private register 871 that it previously saved for the user process whose context is being restored (step 1140), at which point the user broadcast portion of the control network interface 204 will be restored.

Each scalar processor 12 and processing element 11 then restores the combine portion of the control network interface 204. Initially, the scalar processor 12 and a processing element 11 will attempt to restore the combine receive FIFO 835. In that operation, the scalar processor 12 or processing element 11 first determines whether there was any control network message packet data saved from the combine receive FIFO 835 when the context of the user process, whose context is being restored, was switched out (step 1141). If so, the scalar processor 12 or processing element 11 will determine whether all of the saved data will fit into the combine receive FIFO 835 (step 1142). If the scalar processor 12 or a processing element 11 makes a positive determination, it loads the saved data into the combine receive FIFO 835 (step 1143), which, in turn, updates the combine status register 887, particularly the combine receive OK field 891, combine receive length left field 894 and the combine receive length field 895.

On the other hand, if the scalar processor 12 or a processing element 11 determines in step 1141 that all of the saved data will not fit into the combine receive FIFO 835, it sets the combine lock flag 901 in the combine private register 888 (step 1144). The scalar processor 12 or processing element then sets the combine receive empty interrupt enable flag 905 of the combine private register 888 (step 1145), and loads the data from the first data router message packet 30 that was saved from the combine receive FIFO 835 when the context of the user process was previously switched out, into the combine receive FIFO 835 (step 1146). It will be appreciated that this will be less than all of the data that was previously saved for the user process. The setting of flag 905 will enable the network interface 202 to generate an interrupt when, after the context of the user process, whose context is being restored, has been restored, and the user process has retrieved the data from the combine receive FIFO 835, to enable the scalar processor 12 or processing element 11 to, in supervisor mode as described below, restore more data to the combine receive FIFO 835. The setting of the combine lock flag in step 1143 disables the control network interface 204 from generating control network message packets 60 using data from the combine transmit FIFO 812, when it is restored as described below. This prevents data from either the control network 15 or the scalar processor 12 or processing element 11 from being overwritten in the combine receive FIFO 835 when the user process is restored.

Following step 1146, or step 1142 for the scalar processor 12 or a processing element 11 if it determines that all of the data for the combine receive FIFO 835 previously saved for the user process will fit into the combine receive FIFO 835, the scalar processor 12 and processing elements 11 initiate a global synchronization operation (step 1147). In the global synchronization operation, the scalar processor 12 or processing element 11 establishes the condition of the synchronous global bit 71(*a*) to correspond to the condition of the combine lock flag 901 of the combine private register 888. Thus, if the scalar processor 12 or a processing element 11 had set its combine lock flag 901 in step 1144, the synchronous global bit 71(*a*) will be set, and otherwise it will be clear. When the scalar processor 12 and processing elements 11 determine that the global synchronization operation has completed (step 1148), they all determine whether the synchronous global receive flag 916 is set (step 1149), and if so, set their respective combine lock flag 901 (step 1150). Accordingly, if the scalar processor 12 or any processing element 11 sets its combine lock flag 901 in step 1144, all of the others will set their combine lock flags 901 in step 1149. In that case, the scalar processor 12 and all of the processing elements 11 will be inhibited from transmitting control network message packets 60 using data from the combine transmit FIFO 812, which would result in data being loaded into the combine receive FIFO 835.

Following step 1150, or step 1141 if the scalar processor 12 and processing elements 11 determine that they had not saved any control network message packet data from their combine receive FIFOs 835 when the process was previously switched out, the scalar processor 12 and processing elements 11 then determine whether they have any control network message packet data which was previously saved from the combine transmit FIFO 812 for the user process, whose context is currently being switched in, when its context was previously being switched out (step 1151). If so, it restores the saved data by loading it into the combine transmit FIFO 812 (step 1152). Unless the scalar processor 12 or processing elements 11 had set their combine lock flags 901 in step 1144 or step 1150, their respective control network interfaces 204 may begin transmitting control network message packets 60 using data from the combine transmit FIFO 812 when data is loaded into it. After restoring their respective combine transmit FIFOs 812, the scalar processor 12 and processing elements 11 then initiate a global synchronization operation to verify that all have restored the combine transmit FIFO 812 (step 1153).

When the scalar processor 12 and processing elements 11 determine that the global synchronization operation completes (step 1154), they sequence through a series of steps which permit them to restore the state of the synchronous global register 910, user asynchronous global register 911 and synchronous global abstain register 914 for the user process whose context is being switched in (steps 1155 through 1167), and further conditioning the supervisor asynchronous global register to facilitate use of supervisor asynchronous operations for subsequent synchronization operations. In that sequence, the scalar processor 12 and processing elements 11 initially set their respective user asynchronous global send flags 920 in their user asynchronous global registers 911 (step 1155) and initiate a global synchronization operation in which the signal representing the synchronous global bit 71(a) in the respective control network message packet 60 represents a clear bit (step 1156). When the scalar processor 12 and processing elements 11 determine that the global synchronization operation completes (step 1157), they determine whether it completed such that the signal of the control network message packet 60 represented a synchronous global bit 71(a) which was clear (step 1158). If so, the scalar processor 12 and processing elements set their respective synchronous global abstain flags 914 and sequence to step 1163.

If, on the other hand, the processing elements 11 and scalar processor 12 determine in step 1158 that the global synchronization operation completed (step 1157) completed such that the signal of the control network message packet 60 represented a synchronous global bit 71(a) which was not clear, they sequence to step 1160 to initiate a global operation in which the signal representing the synchronous global bit 71(a) of the control network message packets 60 represents a set bit. When the scalar processor 12 and processing elements 11 determine that that global synchronization operation has completed (step 1162), they clear the global send flag 920 of their respective user asynchronous global registers 911 (step 1162). It will be appreciated that control network message packets 60 generated prior to step 1162 will have global bits 71(d) representing the condition of the global send flag 920 as it was conditioned in step 1155, that is, representing a set condition, and as such packets 60 are received they will result in the global receive flag 921 of the user asynchronous global register 912 being conditioned to reflect that state of the global bit 71(d). At some point after the scalar processor 12 and processing elements 11 have all reached step 1162, the control network message packets 60 transmitted by the scalar processor 12 and processing elements 11 will all have global bits 71(d) which reflect the clear state of their global send flags 920, and the global bits 71(d) of the packets 60 received thereby will so indicate, at which point the global receive flag 921 of the user asynchronous global register 911 will also be clear. When the scalar processor 12 and processing elements 11 determine that the global receive flag 921 is clear (step 1163), they sequence to step 1164 to restore the state of the synchronous global abstain flag 914. The scalar processor 12 then broadcasts a supervisor control network message packet, that is, a control network message packet 60 of the single-source type, the reception of which by it and the processing elements 11 serves to synchronize them (step 1165). The scalar processor 12 and processing elements 11 then restore the state of their respective user asynchronous global register 911 (step 1166) and the condition of the synchronous global send flag 915 of the synchronous global register (step 1167) to reflect the respective conditions previously saved for the user process whose context is being switched in.

The scalar processor 12 and processing elements 11 then perform a series of steps to condition their respective broadcast send OK flags 874, in their broadcast status registers 870, and combine send OK flags 892, in their combine status registers 887, using the contents as saved for the user process, whose context is being switched in, when its context was previously switched out. It will be appreciated that the scalar processor 12 and processing elements 11 initially set their respective broadcast and combine send OK flags, and the scalar processor 12 and a processing element 11 will clear the respective flag if it was cleared when the user process's context was previously switched out. In that operation, the scalar processor 12 and each processing element 11 initially determines whether its broadcast send OK flag 874 is to be clear (step 1168). If so, it initiates loading of data for a control network message packet 60 using the broadcast register set 850 (step 1169). After loading data for an incomplete data router message packet 30, that is, less data than indicated in the send message length field 829 of the broadcast send first register 853, it successively sets and clears the broadcast lock flag 881 of the broadcast private register 871, which clears the broadcast send OK flag 874. If the scalar processor 12 or a processing element 11 determines in step 1168 that the saved broadcast send OK flag 874 is set, since the broadcast send OK flag was already set, it skips step 1169.

Each scalar processor 12 and processing element 11 then tests the combine lock flag 901 in the respective combine private register set 888 to determine if it is set (step 1171). As described above in connection with steps 1142 through 1150, the scalar processor 12 and processing elements 11 will have set combine lock flags 901 if at least one of them was unable to load into the combine receive FIFO 835 all control network message packet data which was saved from the combine receive FIFO 835 when the context of the user process was previously switched out. If the combine lock flags are not set, it repeats the operations described in steps 1168 and 1169 with respect to the combine send OK flag 892 (steps 1171 and 1172). If the scalar processor 12 and processing elements 11 determine in step 1170 that the combine lock flag 901 is set, the send OK flag 892 will not be reset until after the scalar processor 12 or processing elements 11 finishes the operations described below to finish loading the remainder of the saved control network message packet data into the combine receive FIFO 835.

Following step 1172, or step 1170 if the scalar processor 12 or processing element 11 determines that the combine lock flag 901 is set, the scalar processor 12 and processing elements 11 restore the current time for the user process whose context is being restored, and thereafter initiates processing by the user process.

As described above in connection with steps 1109 through 1126, if any scalar processor 12 or processing element 11 initially starts to load data from data router message packets 30 previously saved for the user process, whose context is being restored, when it was previously being switched out, but if one or both of the left or right injector FIFOs 214(1) and 214(r) is unable to receive all of the data during those steps, an interrupt occurs in the scalar processor 12 and processing elements 11 a selected time after the restoration of the user process to permit further loading of data into the injector FIFOs. In response to the interrupt, the scalar processor and each processing element 11 determines whether it has additional data to send, and if so, performs the same operations described above in connection with steps 1109 through 1117. If the scalar processor 12 or one of the processing elements 11 determines that it has no data to send, it nonetheless participates in the three global synchronization operations described in those steps, conditioning the synchronous global bit 71(*a*) to indicate that all data has been loaded into the respective injector FIFOs. Depending on the amount of data that the scalar processor 12 and processing elements 11 have to transmit, they may again enable an interrupt and repeat these operations until all of the data has been transmitted in data router message packets 30.

As also described above in connection with steps 1141 through 1148, if the scalar processor 12 or any processing element 11 determined when loading saved data into the combine receive FIFO 835 that it is unable to load all of the saved data therein, it will load such data as it can into its combine receive FIFO 835 and then all will set their combine lock flags 901 to disable their control network interfaces 204 from transmitting control network message packets 60 using data from the combine transmit FIFO 812. In addition, the scalar processor 12 and processing elements 11 will set their combine receive empty interrupt enable flag 905 in their respective combine private registers 888 to enable them to be interrupted when their combine receive FIFOs 835 are empty, which will occur after they, under control of the user process, drain the data from the combine receive FIFO. In servicing the interrupt, the scalar processor 12 and processing elements 11 will perform substantially the same operations described above in connection with steps 1141 through 1148. If the scalar processor 12 or a processing element 11 determines that it has already loaded all of its data in the combine receive FIFO 835, it nonetheless participates in the global synchronization operation described in those steps, conditioning the synchronous global bit 71(*a*) to indicate that all data has been loaded into the combine receive FIFO 835. Depending on the amount of data that the scalar processor 12 and processing elements 11 have to load into the combine receive FIFO 835, they may again enable an interrupt and repeat these operations until all of the data has been loaded into the combine receive FIFO 835.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A parallel computer comprising a plurality of processing nodes interconnected by a control network and a data router, wherein:
    (a) each processing node comprises a data router interface, a control network interface, and a processor, each processor being either a scalar processor or a processing element;
    (b) the control network comprises a plurality of network nodes arranged in a fat-tree structure for transferring program commands and status information between the processing nodes, whereby each processing node can transfer program commands and status information to every other processing node through the control network;
    (c) the data router comprises a plurality of router nodes arranged in a fat-tree structure for transferring data packets between the processing nodes, whereby each processing node can transfer data packets to every other processing node through the data router;
    (d) one of the scalar processors comprises means for periodically issuing a context switch command to initiate a context switch causing the parallel computer to switch from a first user program in a first context to a second user program in a second context;
    (e) the data router comprises means for replacing data packets relating to the first context with data packets relating to the second context in each router node in response to the context switch command;
    (f) the control network comprises means for replacing program commands and status information relating to the first context with program commands and status information relating to the second context in each network node in response to the context switch command; and
    (g) each processing node comprises means for replacing internal data relating to the first context with internal data relating to the second context in response to the context switch command.

2. The parallel computer of claim 1 wherein one of the scalar processors is a control processor, the control processor including:
    (a) means for periodically sequencing into a supervisor operating mode to determine whether a time period for processing the first context has expired; and
    (b) initiating means for initiating the context switch if the time period has expired.

3. The parallel computer of claim 2 wherein the processing nodes further comprise:
    (a) means responsive to the initiating means for emptying the control network, the data router, and the processing nodes of information relating to the first context;
    (b) means responsive to the initiating means for loading the control network, the data router, and the processing nodes with information relating to the second context; and
    (c) means responsive to the initiating means for storing the information relating to the first context so that the first context may be subsequently restored.

4. The parallel computer of claim 3 wherein:
    (a) the initiating means comprises means for issuing a context switch packet from the control processor to the control network, the context switch packet comprising an identification of the second context and a time at which the second context was initiated;
    (b) the control network further comprises:
        (i) means for directing the context switch packet up the control network fat-tree structure to a root network node; and
        (ii) means for propagating the context switch packet down the control network fat-tree structure from the root network node to reach every processing node; and
    (c) the processing nodes further comprise
        (i) means responsive to the context switch packet for emptying the control network, the data router, and the processing nodes of information relating to the first context;
        (ii) means responsive to the context switch packet for loading the control network, the data router, and the processing nodes with information relating to the second context; and (iii) means responsive to the context switch packet for storing the information relating to the first context so that the first context may be subsequently restored.

5. The parallel computer of claim 3 wherein:

(a) each data packet further comprises a message address that specifies an intended destination processing node;

(b) the initiating means comprises means for issuing an all-fall-down command to the data router whereby the data router directs every data packet relating to the first context directly down the fat-tree structure for storage in a processing node;

(c) the processing nodes further comprise a data router monitoring means for determining when the data router is empty of data packets relating to the first context; and (d) the initiating means further comprises means, responsive to the data router monitoring means, for transmitting data router packets relating to the second context up the data router fat-tree structure such that the processing nodes can begin processing the second user program in the second context.

6. The parallel computer of claim 1 wherein the context switch command is processed within a partition, the partition comprising:

(a) a control processor;

(b) less than all of the processing nodes;

(c) a logical root of the control network comprising a network node which is a root of a fat-tree sub-structure within the control network fat-tree structure that interconnects every processing node within the partition; and (d) a logical root of the data router comprising a router node which is a root of a fat-tree sub-structure within the data router fat-tree structure that interconnects every processing node within the partition.

7. In a parallel computer comprising a plurality of processing nodes, one of the processing nodes being a control processor, a control network, the control network being arranged in a first fat-tree structure interconnecting the processing nodes, and a data router, the data router being arranged in a second fat-tree structure interconnecting the processing nodes, a method for performing a context switch from a first context to a second context comprising the steps of:

(a) issuing a context switch command from the control processor to the control network, the data router, and the processing nodes;

(b) emptying the data router of data relating to the first context in response to the context switch command;

(c) loading the data router with data relating to the second context in response to the context switch command;

(d) emptying the control network of program information relating to the first context in response to the context switch command; and (e) loading the control network with program information relating to the second context in response to the context switch command.

8. The method of claim 7 wherein the step of emptying the data router comprises the steps of:

(a) associating a destination address with each item of data in the first fat-tree structure;

(b) directing each item of data down the first fat-tree structure toward any of the processing nodes;

(c) storing each item of data in one of the processing nodes when the item of data arrives at one of the processing nodes; and (d) generating a signal to the control processor when the data router contains no further items relating to the first context.

9. The method of claim 7 wherein the step of emptying the control network further comprises the steps of:

(a) buffering program information relating to the first context received from the control network at each processing node;

(b) storing program information to be transmitted over the control network at each processing node;

(c) determining the last item of program information received at each processing node and the last item of program information sent from each processing node so that the state of the control network may be subsequently restored; and (d) flushing the control network of all program information relating to the first context.

10. The method of claim 7 wherein the step of issuing a context switch command further comprises the step of broadcasting a context switch command packet over the control network.

* * * * *